(12) United States Patent
Swafford

(10) Patent No.: US 10,357,118 B2
(45) Date of Patent: Jul. 23, 2019

(54) SYSTEMS AND METHODS FOR MERCHANDIZING ELECTRONIC DISPLAYS

(71) Applicant: RTC Industries, Inc., Rolling Meadows, IL (US)

(72) Inventor: John Swafford, Palatine, IL (US)

(73) Assignee: RTC Industries, Inc., Rolling Meadows, IL (US)

( * ) Notice: Subject to any disclaimer, the term of this patent is extended or adjusted under 35 U.S.C. 154(b) by 416 days.

(21) Appl. No.: 14/713,809

(22) Filed: May 15, 2015

(65) Prior Publication Data

US 2016/0134930 A1    May 12, 2016

Related U.S. Application Data

(63) Continuation-in-part of application No. 14/591,421, filed on Jan. 7, 2015.
(Continued)

(51) Int. Cl.

| | |
|---|---|
| *H04N 21/4363* | (2011.01) |
| *H04N 21/2668* | (2011.01) |
| *H04N 21/81* | (2011.01) |
| *H04N 21/41* | (2011.01) |
| *H04N 21/442* | (2011.01) |
| *A47F 5/00* | (2006.01) |
| *G06Q 10/08* | (2012.01) |
| *G06Q 30/02* | (2012.01) |

(52) U.S. Cl.
CPC ......... *A47F 5/0068* (2013.01); *G06Q 10/087* (2013.01); *G06Q 30/02* (2013.01)

(58) Field of Classification Search
CPC .. G06Q 10/087; G06Q 30/0241; A47F 1/126; A47F 1/125; A47F 10/00; G07F 11/38; G08B 13/08
See application file for complete search history.

(56) References Cited

U.S. PATENT DOCUMENTS

| | | |
|---|---|---|
| 154,940 A | 9/1874 | Adams |
| 355,511 A | 1/1887 | Danner |
| (Continued) | | |

FOREIGN PATENT DOCUMENTS

| | | |
|---|---|---|
| BE | 906083 A2 | 4/1987 |
| BE | 1008382 A3 | 4/1996 |
| (Continued) | | |

OTHER PUBLICATIONS

Apr. 2, 2014—(RU)—Office Action—App 2013109955.
(Continued)

*Primary Examiner* — Quan-Zhen Wang
*Assistant Examiner* — Rajsheed O Black-Childress
(74) *Attorney, Agent, or Firm* — Banner & Witcoff, Ltd.

(57) ABSTRACT

Systems and methods for a merchandizing display related to a continuous display formed by electronic displays embedded along product shelves and on the packages stored on the product shelves. An electronic label device may detect the presence of a consumer and send a trigger to the packages on its product shelf. The electronic label device may also send a trigger to surrounding electronic label devices. A streaming video may then be apportioned among displays on electronic label devices and the packages. Each of the displays may simultaneously output a different portion of the streaming video.

31 Claims, 58 Drawing Sheets

Related U.S. Application Data

(60) Provisional application No. 62/078,809, filed on Nov. 12, 2014.

(56) References Cited

U.S. PATENT DOCUMENTS

| | | |
|---|---|---|
| 632,231 A | 9/1899 | Blades |
| 808,067 A | 12/1905 | Briggs |
| 847,863 A | 3/1907 | Watts |
| 1,156,140 A | 10/1915 | Hair |
| 1,703,987 A | 3/1929 | Butler |
| 1,712,080 A | 5/1929 | Kelly |
| 1,714,266 A | 5/1929 | Johnson |
| 1,734,031 A | 11/1929 | Carlston |
| 1,786,392 A | 12/1930 | Kemp |
| 1,964,597 A | 6/1934 | Rapellin |
| 1,971,749 A | 8/1934 | Hamilton |
| 1,991,102 A | 2/1935 | Kernaghan |
| 2,057,627 A | 10/1936 | Ferris |
| 2,079,754 A | 5/1937 | Waxgiser |
| 2,085,479 A | 6/1937 | Shaffer et al. |
| 2,110,299 A | 3/1938 | Hinkle |
| 2,111,496 A | 3/1938 | Scriba |
| 2,129,122 A | 9/1938 | Follett |
| 2,218,444 A | 10/1940 | Vineyard |
| 2,499,088 A | 2/1950 | Brill |
| 2,516,122 A | 7/1950 | Hughes |
| 2,555,102 A | 5/1951 | Anderson |
| 2,563,570 A | 8/1951 | Williams |
| 2,652,154 A | 9/1953 | Stevens |
| 2,670,853 A | 3/1954 | Schneider |
| 2,678,045 A | 5/1954 | Erhard |
| 2,738,881 A | 3/1956 | Michel |
| 2,750,049 A | 6/1956 | Hunter |
| 2,775,365 A | 12/1956 | Mestman |
| 2,893,596 A | 7/1959 | Gabrielsen |
| 2,918,295 A | 12/1959 | Milner |
| 2,934,212 A | 4/1960 | Jacobson |
| 2,948,403 A | 8/1960 | Vallez |
| 3,083,067 A | 3/1963 | Vos et al. |
| 3,103,396 A | 9/1963 | Portnoy |
| 3,151,576 A | 10/1964 | Patterson |
| 3,161,295 A | 12/1964 | Chesley |
| 3,166,195 A | 1/1965 | Taber |
| 3,285,429 A | 11/1966 | Propst |
| 3,308,961 A | 3/1967 | Chesley |
| 3,308,964 A | 3/1967 | Pistone |
| 3,348,732 A | 10/1967 | Shwarz |
| 3,405,716 A | 10/1968 | Cafiero |
| 3,452,899 A | 7/1969 | Libberton |
| 3,497,081 A | 2/1970 | Field |
| 3,501,020 A | 3/1970 | Krikorian |
| D219,058 S | 10/1970 | Kaczur |
| 3,550,979 A | 12/1970 | Protzmann |
| 3,598,246 A | 8/1971 | Galli |
| 3,652,154 A | 3/1972 | Gebel |
| 3,667,826 A | 6/1972 | Wood |
| 3,698,568 A | 10/1972 | Armstrong |
| 3,709,371 A | 1/1973 | Luck |
| 3,724,715 A | 4/1973 | Auriemma |
| 3,751,129 A | 8/1973 | Wright et al. |
| 3,814,490 A | 6/1974 | Dean et al. |
| 3,815,519 A | 6/1974 | Meyer |
| 3,830,169 A | 8/1974 | Madey |
| 3,848,745 A | 11/1974 | Smith |
| 3,868,021 A | 2/1975 | Heinrich |
| 3,870,156 A | 3/1975 | O'Neill |
| 4,007,841 A | 2/1977 | Seipel |
| 4,042,096 A | 8/1977 | Smith |
| 4,106,668 A | 8/1978 | Gebhardt et al. |
| 4,269,326 A | 5/1981 | Delbrouck |
| 4,300,693 A | 11/1981 | Spamer |
| 4,303,162 A | 12/1981 | Suttles |
| 4,314,700 A | 2/1982 | Dylag |
| 4,331,243 A | 5/1982 | Doll |
| 4,351,439 A | 9/1982 | Taylor |
| 4,378,872 A | 4/1983 | Brown |
| 4,448,653 A | 5/1984 | Wegmann |
| 4,454,948 A | 6/1984 | Spamer |
| 4,460,096 A | 7/1984 | Ricci |
| 4,463,854 A | 8/1984 | MacKenzie |
| 4,467,927 A | 8/1984 | Nathan |
| 4,482,066 A | 11/1984 | Dykstra |
| 4,488,653 A | 12/1984 | Belokin |
| 4,504,100 A | 3/1985 | Chaumard |
| 4,588,093 A | 5/1986 | Field |
| 4,589,349 A | 5/1986 | Gebhardt et al. |
| 4,602,560 A | 7/1986 | Jacky |
| 4,615,276 A | 10/1986 | Garabedian |
| 4,620,489 A | 11/1986 | Albano |
| 4,629,072 A | 12/1986 | Loew |
| 4,651,883 A | 3/1987 | Gullett et al. |
| 4,685,574 A | 8/1987 | Young et al. |
| 4,705,175 A | 11/1987 | Howard et al. |
| 4,706,821 A | 11/1987 | Kohls et al. |
| 4,724,968 A | 2/1988 | Wombacher |
| 4,729,481 A | 3/1988 | Hawkinson et al. |
| 4,730,741 A | 3/1988 | Jackle, III et al. |
| 4,742,936 A | 5/1988 | Rein |
| 4,762,235 A | 8/1988 | Howard et al. |
| 4,762,236 A | 8/1988 | Jackle, III et al. |
| 4,775,058 A | 10/1988 | Yatsko |
| 4,776,472 A | 10/1988 | Rosen |
| 4,790,037 A | 12/1988 | Phillips |
| 4,809,856 A | 3/1989 | Muth |
| 4,828,144 A | 5/1989 | Garrick |
| 4,830,201 A | 5/1989 | Breslow |
| 4,836,390 A | 6/1989 | Polvere |
| 4,846,367 A | 7/1989 | Guigan et al. |
| 4,883,169 A | 11/1989 | Flanagan, Jr. |
| 4,899,668 A | 2/1990 | Valiulis |
| 4,901,853 A | 2/1990 | Maryatt |
| 4,901,869 A | 2/1990 | Hawkinson et al. |
| 4,907,707 A | 3/1990 | Crum |
| 4,934,645 A | 6/1990 | Breslow |
| 4,954,697 A | 9/1990 | Kokubun et al. |
| 5,009,334 A | 4/1991 | Bodkins |
| 5,012,936 A | 5/1991 | Crum |
| 5,025,936 A | 6/1991 | Lamoureaux |
| 5,027,957 A | 7/1991 | Skalski |
| 5,082,125 A | 1/1992 | Ninni |
| 5,088,607 A | 2/1992 | Risafi et al. |
| 5,110,192 A | 5/1992 | Lauterbach |
| 5,111,942 A | 5/1992 | Bernardin |
| 5,123,546 A | 6/1992 | Crum |
| 5,148,927 A | 9/1992 | Gebka |
| 5,161,702 A | 11/1992 | Skalski |
| 5,172,314 A | 12/1992 | Poland et al. |
| 5,178,258 A | 1/1993 | Smalley et al. |
| 5,183,166 A | 2/1993 | Belokin, Jr. et al. |
| 5,190,186 A | 3/1993 | Yablans et al. |
| 5,203,463 A | 4/1993 | Gold |
| 5,215,199 A | 6/1993 | Bejarano |
| 5,255,802 A | 10/1993 | Krinke et al. |
| 5,257,090 A | 10/1993 | Meinzer et al. |
| 5,265,738 A | 11/1993 | Yablans et al. |
| 5,316,154 A | 5/1994 | Hajec, Jr. |
| 5,341,945 A | 8/1994 | Gibson |
| 5,351,839 A | 10/1994 | Beeler et al. |
| 5,366,099 A | 11/1994 | Schmid |
| 5,381,908 A | 1/1995 | Hepp |
| 5,390,802 A | 2/1995 | Pappagallo et al. |
| 5,413,229 A | 5/1995 | Zuberbuhler et al. |
| 5,415,297 A | 5/1995 | Klein et al. |
| 5,448,226 A | 9/1995 | Failing, Jr. et al. |
| 5,450,969 A | 9/1995 | Johnson et al. |
| 5,458,248 A | 10/1995 | Alain |
| 5,464,105 A | 11/1995 | Mandeltort |
| 5,469,975 A | 11/1995 | Fajnsztajn |
| 5,469,976 A | 11/1995 | Burchell |
| 5,537,312 A | 7/1996 | Sekiguchi et al. |
| 5,542,552 A | 8/1996 | Yablans et al. |
| 5,548,282 A | 8/1996 | Escritt et al. |
| 5,562,217 A | 10/1996 | Salveson et al. |
| 5,613,621 A | 3/1997 | Gervasi et al. |

(56) References Cited

U.S. PATENT DOCUMENTS

| | | |
|---|---|---|
| D378,888 S | 4/1997 | Bertilsson |
| 5,615,780 A | 4/1997 | Nimetz et al. |
| 5,634,564 A | 6/1997 | Spamer et al. |
| 5,638,963 A | 6/1997 | Finnelly et al. |
| 5,665,304 A | 9/1997 | Heinen et al. |
| 5,671,362 A | 9/1997 | Cowe et al. |
| 5,671,851 A | 9/1997 | Johnson et al. |
| 5,673,801 A | 10/1997 | Markson |
| D386,363 S | 11/1997 | Dardashti |
| 5,685,664 A | 11/1997 | Parham et al. |
| 5,730,320 A | 3/1998 | David |
| 5,737,504 A | 4/1998 | Yamada |
| 5,738,019 A | 4/1998 | Parker |
| 5,740,944 A | 4/1998 | Crawford |
| 5,743,428 A | 4/1998 | Rankin, VI |
| 5,746,328 A | 5/1998 | Beeler et al. |
| 5,788,090 A | 8/1998 | Kajiwara |
| 5,803,276 A | 9/1998 | Vogler |
| 5,826,731 A | 10/1998 | Dardashti |
| 5,839,588 A | 11/1998 | Hawkinson |
| 5,855,283 A | 1/1999 | Johnson |
| 5,859,414 A | 1/1999 | Grimes et al. |
| 5,873,473 A | 2/1999 | Pater |
| 5,878,895 A | 3/1999 | Springs |
| 5,880,449 A | 3/1999 | Teicher et al. |
| 5,906,283 A | 5/1999 | Kump et al. |
| 5,933,813 A | 8/1999 | Teicher et al. |
| 5,963,134 A | 10/1999 | Bowers et al. |
| 5,971,204 A | 10/1999 | Apps |
| 5,992,652 A | 11/1999 | Springs |
| 6,006,678 A | 12/1999 | Merit et al. |
| 6,041,720 A | 3/2000 | Hardy |
| 6,082,557 A | 7/2000 | Leahy |
| 6,105,004 A | 8/2000 | Halperin et al. |
| 6,105,791 A | 8/2000 | Chalson et al. |
| 6,112,938 A | 9/2000 | Apps |
| 6,129,218 A | 10/2000 | Henry et al. |
| 6,142,317 A | 11/2000 | Merl |
| 6,158,598 A | 12/2000 | Josefsson |
| 6,164,491 A | 12/2000 | Bustos et al. |
| 6,173,845 B1 | 1/2001 | Higgins et al. |
| 6,209,733 B1 | 4/2001 | Higgins et al. |
| 6,227,385 B1 | 5/2001 | Nickerson |
| 6,234,325 B1 | 5/2001 | Higgins et al. |
| 6,234,326 B1 | 5/2001 | Higgins et al. |
| 6,234,328 B1 | 5/2001 | Mason |
| 6,253,190 B1 | 6/2001 | Sutherland |
| D445,615 S | 7/2001 | Burke |
| 6,253,954 B1 | 7/2001 | Yasaka |
| 6,269,285 B1 | 7/2001 | Mignault |
| 6,289,326 B1 | 9/2001 | LaFleur |
| 6,357,606 B1 | 3/2002 | Henry |
| 6,382,431 B1 | 5/2002 | Burke |
| 6,389,991 B1 | 5/2002 | Morrisson |
| 6,401,942 B1 | 6/2002 | Eckert |
| 6,405,880 B1 | 6/2002 | Webb |
| 6,409,027 B1 | 6/2002 | Chang et al. |
| 6,409,028 B2 | 6/2002 | Nickerson |
| 6,464,089 B1 | 10/2002 | Rankin, VI |
| 6,484,891 B2 | 11/2002 | Burke |
| 6,497,326 B1 | 12/2002 | Osawa |
| 6,497,367 B2 | 12/2002 | Conzola et al. |
| 6,507,352 B1 | 1/2003 | Cohen et al. |
| 6,523,703 B1 | 2/2003 | Robertson |
| 6,527,127 B2 | 3/2003 | Dumontet |
| 6,533,131 B2 | 3/2003 | Bada |
| 6,536,658 B1 | 3/2003 | Rantze |
| D472,411 S | 4/2003 | Burke |
| 6,550,674 B1 | 4/2003 | Neumark |
| 6,598,754 B2 | 7/2003 | Weiler |
| 6,622,874 B1 | 9/2003 | Hawkinson |
| 6,655,536 B2 | 12/2003 | Jo et al. |
| 6,666,533 B1 | 12/2003 | Stavros |
| D485,699 S | 1/2004 | Mueller et al. |
| 6,717,516 B2 | 4/2004 | Bridgelall |
| 6,738,628 B1 | 5/2004 | McCall et al. |
| 6,772,888 B2 | 8/2004 | Burke |
| 6,866,156 B2 | 3/2005 | Nagel et al. |
| 6,886,699 B2 | 5/2005 | Johnson et al. |
| 6,889,854 B2 | 5/2005 | Burke |
| 6,897,763 B2 | 5/2005 | Schulmerich et al. |
| 6,914,648 B2 | 7/2005 | Niiyama et al. |
| 6,948,900 B1 | 9/2005 | Neuman |
| 6,964,235 B2 | 11/2005 | Hardy |
| 7,002,451 B2 | 2/2006 | Freeman |
| 7,084,769 B2 | 8/2006 | Bauer et al. |
| 7,090,125 B2 | 8/2006 | Goel et al. |
| 7,093,546 B2 | 8/2006 | Hardy |
| 7,152,040 B1 | 12/2006 | Hawthorne et al. |
| 7,152,791 B2 | 12/2006 | Chappidi et al. |
| 7,155,238 B2 | 12/2006 | Katz |
| 7,216,770 B2 | 5/2007 | Mueller et al. |
| 7,252,230 B1 | 8/2007 | Sheikh et al. |
| 7,319,397 B2 | 1/2008 | Chung et al. |
| 7,400,251 B2 | 7/2008 | Czyszczewski et al. |
| 7,458,473 B1 | 12/2008 | Mason |
| 7,493,336 B2 | 2/2009 | Noonan |
| 7,520,429 B2 | 4/2009 | Koster |
| 7,526,762 B1 | 4/2009 | Astala et al. |
| 7,542,283 B1 | 6/2009 | Curran et al. |
| 7,565,108 B2 | 7/2009 | Kotola et al. |
| 7,580,845 B2 | 8/2009 | Burman et al. |
| 7,614,065 B2 | 11/2009 | Weissmueller, Jr. et al. |
| 7,641,057 B2 | 1/2010 | Mueller et al. |
| 7,675,422 B2 | 3/2010 | Stevens et al. |
| 7,743,984 B2 | 6/2010 | Olsen et al. |
| 7,775,130 B2 | 8/2010 | Harish et al. |
| 7,775,430 B2 | 8/2010 | Lin |
| 7,792,711 B2 | 9/2010 | Swafford, Jr. et al. |
| 7,837,106 B2 | 11/2010 | Fabre et al. |
| 7,853,477 B2 | 12/2010 | O'Shea et al. |
| 7,864,041 B2 | 1/2011 | Godlewski |
| 7,904,333 B1 | 3/2011 | Perkowski |
| 7,982,622 B2 | 7/2011 | Burchell et al. |
| 8,089,357 B2 | 1/2012 | Irmscher et al. |
| 8,135,482 B2 | 3/2012 | Caldwell et al. |
| 8,144,245 B2 | 3/2012 | Vik |
| 8,171,142 B2 | 5/2012 | Kolin et al. |
| 8,184,005 B2 | 5/2012 | Kamel |
| 8,207,819 B2 | 6/2012 | Bonner et al. |
| 8,219,558 B1 | 7/2012 | Trandal et al. |
| 8,231,017 B2 | 7/2012 | Clontz et al. |
| 8,255,500 B2 | 8/2012 | Cacheria, III et al. |
| 8,280,784 B2 | 10/2012 | Hurtis et al. |
| 8,284,059 B2 | 10/2012 | Ross |
| 8,284,061 B1 | 10/2012 | Dione |
| 8,321,302 B2 | 11/2012 | Bauer et al. |
| 8,410,931 B2 | 4/2013 | Petite et al. |
| 8,463,431 B2 | 6/2013 | Segal et al. |
| 8,629,772 B2 | 1/2014 | Valiulis et al. |
| 8,698,606 B2 | 4/2014 | Choi et al. |
| 8,751,318 B2 | 6/2014 | Kim et al. |
| 8,781,622 B2 | 7/2014 | Mockus et al. |
| 8,810,392 B1 | 8/2014 | Teller et al. |
| 9,167,916 B2 | 10/2015 | Grant et al. |
| 9,318,007 B2 | 4/2016 | Valiulis et al. |
| 9,318,008 B2 | 4/2016 | Valilulis et al. |
| 9,898,712 B2 | 2/2018 | Johnson et al. |
| 9,968,129 B2 * | 5/2018 | Sebastian ............... A24F 15/18 |
| 10,210,478 B2 * | 2/2019 | Johnson ............... G06Q 30/02 |
| 2001/0010302 A1 | 8/2001 | Nickerson |
| 2001/0051901 A1 | 12/2001 | Hager et al. |
| 2002/0036178 A1 | 3/2002 | Tombu |
| 2002/0108916 A1 | 8/2002 | Nickerson |
| 2002/0148794 A1 | 10/2002 | Marihugh |
| 2002/0158133 A1 | 10/2002 | Conzola et al. |
| 2002/0170866 A1 | 11/2002 | Johnson et al. |
| 2002/0178013 A1 | 11/2002 | Hoffman et al. |
| 2003/0000956 A1 | 1/2003 | Maldonado |
| 2003/0010732 A1 | 1/2003 | Burke |
| 2003/0053014 A1 | 3/2003 | Niiyama et al. |
| 2003/0055727 A1 | 3/2003 | Walker et al. |
| 2003/0057167 A1 | 3/2003 | Johnson et al. |
| 2003/0061973 A1 | 4/2003 | Bustos |

(56) References Cited

U.S. PATENT DOCUMENTS

| | | |
|---|---|---|
| 2003/0078691 A1 | 4/2003 | Holt et al. |
| 2003/0085187 A1 | 5/2003 | Johnson et al. |
| 2003/0141265 A1 | 7/2003 | Jo et al. |
| 2003/0193481 A1 | 10/2003 | Sokolsky |
| 2003/0217980 A1 | 11/2003 | Johnson et al. |
| 2003/0233288 A1* | 12/2003 | Sweeney ............. G06Q 10/087 705/28 |
| 2004/0104239 A1 | 6/2004 | Black et al. |
| 2004/0140278 A1 | 7/2004 | Mueller et al. |
| 2004/0140279 A1 | 7/2004 | Mueller et al. |
| 2004/0145451 A1 | 7/2004 | Failing |
| 2004/0245197 A1 | 12/2004 | McElvaney |
| 2004/0260572 A1 | 12/2004 | George et al. |
| 2005/0108098 A1 | 5/2005 | Syed et al. |
| 2005/0131578 A1 | 6/2005 | Weaver |
| 2005/0165649 A1 | 7/2005 | Mahaffey et al. |
| 2005/0168345 A1 | 8/2005 | Swafford et al. |
| 2005/0190072 A1 | 9/2005 | Brown et al. |
| 2005/0195081 A1 | 9/2005 | Studnicki et al. |
| 2005/0228718 A1 | 10/2005 | Austin |
| 2005/0279722 A1 | 12/2005 | Ali |
| 2006/0049122 A1 | 3/2006 | Mueller et al. |
| 2006/0071774 A1 | 4/2006 | Brown et al. |
| 2006/0102718 A1 | 5/2006 | Kajino et al. |
| 2006/0163272 A1 | 7/2006 | Gamble |
| 2006/0163349 A1 | 7/2006 | Neugebauer |
| 2006/0186064 A1 | 8/2006 | Merit et al. |
| 2006/0237381 A1 | 10/2006 | Lockwood et al. |
| 2006/0279527 A1 | 12/2006 | Zehner et al. |
| 2006/0289637 A1 | 12/2006 | Brice et al. |
| 2007/0016494 A1 | 1/2007 | Brown et al. |
| 2007/0159298 A1 | 7/2007 | Zegelin et al. |
| 2008/0074264 A1 | 3/2008 | Shame et al. |
| 2008/0164310 A1 | 7/2008 | Dupuy et al. |
| 2008/0208695 A1 | 8/2008 | Condron |
| 2008/0228346 A1 | 9/2008 | Lucas et al. |
| 2008/0249658 A1 | 10/2008 | Walker et al. |
| 2008/0250464 A1 | 10/2008 | Masucci et al. |
| 2008/0255894 A1 | 10/2008 | Falls et al. |
| 2008/0303637 A1 | 12/2008 | Gelbman et al. |
| 2009/0133301 A1 | 5/2009 | Saxena et al. |
| 2009/0134103 A1 | 5/2009 | Saxena et al. |
| 2009/0157515 A1 | 6/2009 | Lafauci et al. |
| 2009/0179825 A1 | 7/2009 | Enarvi et al. |
| 2009/0248198 A1 | 10/2009 | Siegel et al. |
| 2009/0287992 A1 | 11/2009 | Bresolin et al. |
| 2009/0313365 A1 | 12/2009 | Whitehead |
| 2009/0319399 A1 | 12/2009 | Resta et al. |
| 2010/0017025 A1 | 1/2010 | Lockwood et al. |
| 2010/0100460 A1 | 4/2010 | Aronson |
| 2010/0106588 A1 | 4/2010 | Jones et al. |
| 2010/0106662 A1 | 4/2010 | Ramaswamy |
| 2010/0138304 A1 | 6/2010 | Boyarsky et al. |
| 2010/0169189 A1 | 7/2010 | Allison et al. |
| 2010/0169190 A1 | 7/2010 | Allison et al. |
| 2010/0205045 A1 | 8/2010 | Zhang et al. |
| 2010/0262554 A1 | 10/2010 | Elliott |
| 2011/0010271 A1 | 1/2011 | Black et al. |
| 2011/0017532 A1 | 1/2011 | Langford et al. |
| 2011/0018685 A1 | 1/2011 | Tanaka et al. |
| 2011/0022980 A1 | 1/2011 | Segal et al. |
| 2011/0106653 A1 | 5/2011 | Wein |
| 2011/0128378 A1 | 6/2011 | Raji |
| 2011/0161146 A1 | 6/2011 | Walker et al. |
| 2011/0178863 A1 | 7/2011 | Daigle |
| 2011/0234514 A1 | 9/2011 | Gothard |
| 2011/0251920 A1 | 10/2011 | Watson |
| 2012/0004769 A1 | 1/2012 | Hallenbeck et al. |
| 2012/0044056 A1 | 2/2012 | Byun et al. |
| 2012/0120327 A1 | 5/2012 | Marx et al. |
| 2012/0147055 A1 | 6/2012 | Pallakoff et al. |
| 2012/0223943 A1 | 9/2012 | Williams et al. |
| 2012/0228240 A1 | 9/2012 | Gentile et al. |
| 2012/0245969 A1 | 9/2012 | Campbell |
| 2012/0246023 A1 | 9/2012 | Starr |
| 2012/0273442 A1 | 11/2012 | Hardy |
| 2012/0280810 A1 | 11/2012 | Wheeler |
| 2012/0284085 A1 | 11/2012 | Walker et al. |
| 2012/0284132 A1 | 11/2012 | Kim et al. |
| 2012/0286937 A1 | 11/2012 | Cote et al. |
| 2012/0330781 A1 | 12/2012 | Borrero |
| 2013/0002422 A1 | 1/2013 | Wiese et al. |
| 2013/0024023 A1 | 1/2013 | Siegel et al. |
| 2013/0030953 A1 | 1/2013 | Marsic |
| 2013/0109323 A1 | 5/2013 | Ruutu et al. |
| 2013/0132216 A1 | 5/2013 | Aihara et al. |
| 2013/0157569 A1 | 6/2013 | Torvmark et al. |
| 2013/0210360 A1 | 8/2013 | Ljung et al. |
| 2013/0214909 A1 | 8/2013 | Meijers et al. |
| 2013/0226742 A1 | 8/2013 | Johnson et al. |
| 2013/0235206 A1 | 9/2013 | Smith et al. |
| 2013/0275261 A1 | 10/2013 | Yoked |
| 2013/0317903 A1 | 11/2013 | Majrani |
| 2013/0332271 A1 | 12/2013 | Hay |
| 2014/0006225 A1 | 1/2014 | Bowman et al. |
| 2014/0006229 A1 | 1/2014 | Birch et al. |
| 2014/0043162 A1 | 2/2014 | Siciliano et al. |
| 2014/0055243 A1 | 2/2014 | Kerai |
| 2014/0100769 A1 | 4/2014 | Wurman et al. |
| 2014/0100999 A1 | 4/2014 | Mountz et al. |
| 2014/0110584 A1 | 4/2014 | Campbell |
| 2014/0113560 A1 | 4/2014 | Graube et al. |
| 2014/0139548 A1 | 5/2014 | Byers |
| 2014/0145828 A1 | 5/2014 | Bassan-Eskenazi et al. |
| 2014/0197953 A1 | 7/2014 | Valiulis et al. |
| 2014/0201042 A1 | 7/2014 | Meyer |
| 2014/0210692 A1 | 7/2014 | Waters et al. |
| 2014/0214195 A1 | 7/2014 | Worsley |
| 2014/0220883 A1 | 8/2014 | Emigh et al. |
| 2014/0239061 A1 | 8/2014 | Smith et al. |
| 2014/0247116 A1 | 9/2014 | Davidson |
| 2014/0258028 A1 | 9/2014 | Bynum et al. |
| 2014/0268949 A1 | 9/2014 | Kayser |
| 2014/0291405 A1 | 10/2014 | Harkes |
| 2014/0299620 A1 | 10/2014 | Swafford, Jr. et al. |
| 2014/0352372 A1 | 12/2014 | Grant et al. |
| 2015/0088306 A1 | 3/2015 | Varrasso |
| 2015/0186982 A1 | 7/2015 | Higgins et al. |
| 2015/0382150 A1 | 12/2015 | Ansermet et al. |
| 2016/0055562 A1* | 2/2016 | Kim ................... G06Q 30/0623 705/26.61 |
| 2016/0132822 A1 | 5/2016 | Swafford |

FOREIGN PATENT DOCUMENTS

| | | |
|---|---|---|
| CH | 223095 A | 8/1942 |
| CH | 412251 A | 4/1966 |
| CN | 1972228 A | 5/2007 |
| CN | 101472509 A | 7/2009 |
| DE | 969003 C | 4/1958 |
| DE | 1819158 U | 10/1960 |
| DE | 2002720 A1 | 7/1971 |
| DE | 7311113 U | 8/1973 |
| DE | 2232398 A1 | 1/1974 |
| DE | 2825724 A1 | 12/1979 |
| DE | 3116145 A1 | 11/1982 |
| DE | 8308485 U1 | 9/1983 |
| DE | 8426651 U1 | 2/1985 |
| DE | 8520125 U1 | 1/1986 |
| DE | 3628609 A1 | 2/1988 |
| DE | 19745813 A1 | 4/1999 |
| DE | 299026888 | 7/1999 |
| DE | 102004037365 A1 | 3/2006 |
| EP | 0004921 A1 | 10/1979 |
| EP | 0018003 A2 | 10/1980 |
| EP | 0048479 A1 | 3/1982 |
| EP | 0176209 A2 | 4/1986 |
| EP | 0224107 A2 | 6/1987 |
| EP | 270016 A2 | 6/1988 |
| EP | 298500 A2 | 1/1989 |
| EP | 0337340 A3 | 5/1990 |
| EP | 0398500 A1 | 11/1990 |
| EP | 0408400 A1 | 1/1991 |
| EP | 0454586 A1 | 10/1991 |

(56) References Cited

FOREIGN PATENT DOCUMENTS

| | | |
|---|---|---|
| EP | 0572119 A2 | 12/1993 |
| EP | 0587059 A2 | 3/1994 |
| EP | 0806749 A1 | 11/1997 |
| EP | 986980 A1 | 3/2000 |
| EP | 0779047 B1 | 4/2000 |
| EP | 1057164 A1 | 12/2000 |
| EP | 1249804 A2 | 10/2002 |
| EP | 1356425 A1 | 10/2003 |
| EP | 1395152 A1 | 3/2004 |
| EP | 2309377 A1 | 4/2011 |
| EP | 2367101 A1 | 9/2011 |
| FR | 2385365 A1 | 10/1978 |
| FR | 2526338 A1 | 11/1983 |
| FR | 2617385 A1 | 1/1989 |
| GB | 697994 A | 10/1953 |
| GB | 740311 A | 11/1955 |
| GB | 881700 A | 11/1961 |
| GB | 1082150 A | 9/1967 |
| GB | 1088654 A | 10/1967 |
| GB | 2027339 B | 8/1982 |
| GB | 2180527 A | 4/1987 |
| GB | 2 232 398 A | 12/1990 |
| GB | D2037553 | 7/1994 |
| GB | 2281289 A | 3/1995 |
| GB | 2290077 A | 12/1995 |
| GB | 2297241 A | 7/1996 |
| GB | 2283407 B | 10/1997 |
| GB | 2392667 A | 3/2004 |
| GB | 2480462 A | 11/2011 |
| JP | 54168195 | 11/1979 |
| JP | 59218113 | 8/1984 |
| JP | 62060521 A | 3/1987 |
| JP | 6329463 | 2/1988 |
| JP | 6056224 | 3/1994 |
| JP | 6209945 | 7/1994 |
| JP | 7257714 | 9/1994 |
| JP | H11342054 A | 12/1999 |
| JP | 2007525393 A | 9/2007 |
| KR | 1020040089123 A | 10/2004 |
| KR | 1020060123497 | 6/2008 |
| KR | 1020090054501 | 12/2010 |
| KR | 1020100022890 | 8/2011 |
| KR | 1020100041969 | 11/2011 |
| NL | 106617 A | 11/1963 |
| RU | 2101731 C1 | 1/1998 |
| SE | 394537 B | 6/1977 |
| SU | 1600615 A3 | 10/1990 |
| WO | 91/15141 A1 | 10/1991 |
| WO | 9311449 A1 | 6/1993 |
| WO | 0061438 A1 | 10/2000 |
| WO | 0071004 A1 | 11/2000 |
| WO | 02/091885 A1 | 11/2002 |
| WO | 03016938 A2 | 2/2003 |
| WO | 2003032775 | 4/2003 |
| WO | 03039301 A1 | 5/2003 |
| WO | 2004104951 A1 | 12/2004 |
| WO | 2005057444 A1 | 6/2005 |
| WO | 2006023954 A2 | 3/2006 |
| WO | 06133487 A1 | 12/2006 |
| WO | 2007024639 A2 | 3/2007 |
| WO | 2007073334 A1 | 6/2007 |
| WO | 07140800 A1 | 12/2007 |
| WO | 2007149967 A2 | 12/2007 |
| WO | 10082835 A1 | 7/2010 |
| WO | 10137883 A2 | 12/2010 |
| WO | 11001024 | 1/2011 |
| WO | 2011089452 A1 | 7/2011 |
| WO | 2012166613 A1 | 12/2012 |
| WO | 14080252 A1 | 5/2014 |

OTHER PUBLICATIONS

Sep. 5, 2013—U.S.—Office Action—U.S. Appl. No. 12/876,919.
FFr Yello Pages 02003 Product Catalog, "Merchandising Ideas Made Easy for Every Retail Environment!", Cover pg., 9-11, 48-49, 52-58, Back Cover.
Letter from Maria Comninou of Harness Dickey to Stephanie Knapp dated Nov. 11, 2009.
Document entitled "Relevant Prior Art for U.S. Appl. No. 10/772,010".
Shelf-edge digital price tags invade the South of France http://www.digitalsignagetoday.com/article/196299/Shelf-edge-digital-price-tags-invade-the-South-of-France.
eSignage http://www.episys.com/page/25/esignage.htm.
Electronic Shelf-Edge Labels ("Realprice system") http://www.hitech-lcd.com/ESL.html.
Segmented Dot Matrix Electronic Shelf Label â€SM Model and Segmented Dot Matrix Electronic Narrow Facing Label http://www.ilid.com.au/product-range.php#sm.
Electronic Shelf-Edge Labels http://www.fujitsu.com/downloads/EU/uk/pdf/industries/retail/retail-solutions-electronic-self-edge-labels.pdf.
The NZ ESL range from pricer http://www.electronicshelflabelling.co.nz/products/.
Retailer introduces electronic shelf-edge labelling http://www.conveniencestore.co.uk/news/retailer-introduces-electronic-shelf-edge-labelling/231511_article.
Revolutionary Shelf Edge Displays from in the UK http://crystal-display.com/digital-signage/shelf-edge-displays/.
XDS-1068: 10-inch All-in-One Multi-touch Signboard with Power-over-Ethernet http://www.iadea.com/products/xds-1068.
ZBD Solutions, Shelf Edge Labelling http://www.zbdsolutions.com/solutions/index.html (printed Jan. 29, 2013).
VECTRON, Speedy POS Solutions to make ezi-profits. 15 pages.
"How physics drives the supermarket industry," IOP Institute of Physics, PhysicsWorks. 4 pages.
John Ross, "Retail technology and the evolving shopper," Shopper Sciences. 11 pages.
Altierre Digital Retail, Altierre Corp., "Altierre Unveils E-Paper Product Family for Digital Signs and Price Tags." 2 pages, http://www.altierre.com/pr_e-paper.html (printed Jan. 31, 2013).
Suzanne Vita Palazzo, "New life for ESLs?, Advanced capabilities being built into electronic shelf labels may help overcome retailers' concerns about ROI.", Grocery Headquarters (www.groceryheadquarters.com), Mar. 2007, pp. 97-100.
Scott D. Walkins & Megan E. Henriksen of Anderson Economic Group, LLC, "Michigan's Item Pricing Law: The Price Tag for Retailers and Consumers," Dec. 11, 2010 (http://www.AndersonEiectronicGroup.com) 39 pages.
"Product Range :: I LID—The next generation in electronic shelf labels,": http://www.ilid.com.au/product-range.php, printed on Mar. 5, 2013, dale of website unknown but prior to the filing of the present matter.
"Electronic Shelf Label controlling various information in real lime (ESL)," hllp:l/cesl.co.kr/eng/product-inlroduction/cest-esl.hlml, CEST—Center for Embedded Software Technology, printed on Mar. 5, 2013, dale of website unknown but prior to the filing of the present matter.
Jun. 24, 2014—(MX)—Office Action—App MX/a/2013/001455—Eng Tran.
Mar. 3, 2015—(AU) Office Action—App 2011285929.
Mar. 3, 2015—(AU) Office Action—App 2013205058.
Apr. 6, 2015—(PCT) International Search Report—App PCT/US14/29124.
Dec. 14, 2015—(EP) Exam Report—App 11745636.8.
Apr. 19, 2016—(KR) Office Action—App 10-2015-7027591.
Jun. 22, 2016—(AU) Search Report—App 2014225837.
Jun. 28, 2016—(AU) Examination Report—App 2014228923.
Aug. 18, 2016—(EP) Office Action—App 14716461.0.
Jun. 10, 2014—(PCT) ISR & Written Opinion—App PCT/US2014/020797.
Oct. 27, 2016—(KR) Final Rejection—App 10-2015-7027591.
Mar. 20, 2008—(WO) ISR and Written Opinion—App. No. PCT/US05/02836.
Jan. 28, 2011—(EP) Supplementary Search Report—App. No. 05712322.6-2221.
Dec. 6, 2011—(EP) Office Action—App. No. 05712322.6-2221.
May 25, 2011—(EP) Office Action—App. No. 05712322.6-2221.

(56) References Cited

OTHER PUBLICATIONS

Nov. 24, 2011—(WO) ISR and Written Opinion—App. No. PCT/US2011/046209.
Feb. 21, 2013—(WO) IPR and Written Opinion—App. No. PCT/US2011/046209.
Apr. 2, 2014—(RU) Office Action—App. No. 2013109955.
Sep. 24, 2015—(WO) IPRP and Written Opinion—App. No. PCT/US2014/29124.
Apr. 6, 2015—(WO) Written Opinion—App. No. PCT/US2014/29124.
Mar. 1, 2017—(AU) Second Office Action—App. No. 2014228923.
Aug. 19, 2016—(EP) Extended ESR—App. No. 14723571.7-1903.
Jun. 19, 2017—(CN) First Office Action and ISR—App. No. 201480026575.9.
Jun. 7, 2017—(CN) ISR—App. No. 201480026575.9.
Jul. 18, 2017—(KR) Office Action—App. 10-2015-7029832.
Sep. 19, 2016—(PCT) International Search Report—App PCT/US2016/032328.
Robertson, "Food Packaging: Principles and Practice, Second Edition", CRC Press, XP055301114, ISBN: 978-0-8493-3775-8, vol. 0, p. 308, dated Sep. 22, 2005.
George Coulouris et al., "Distributed Systems: Concepts and Design (5th Edition)", Addison-Wesley, US, XP055261658, ISBN: 978-0-13-214301-1 pp. Ch01-Ch06, Ch09-Ch10, ch 13,, Chapters 1, 3 and 19, dated May 7, 2011.
Apr. 22, 2016—(PCT)—International Search Report—App PCT/US2015/060404.
Sep. 7, 2017—U.S. Final Office Action—U.S. Appl. No. 14/591,421.
Jan. 18, 2018—(AU) Examination Report—App. No. 2015346254.
Feb. 23, 2018—(CN) Second Office Action—App. No. 201480026575.9.
Mar. 14, 2018—(EP) Communication Pursuant to Article 94(3) EPC—App 15798644.9.
Nov. 7, 2017—(EP) Extended Search Report—App. No. 17177125.6.
Nov. 7, 2017—(EP)—Communication 94(3) EPC—App 14716461.0.
Nov. 28, 2017 U.S.—Non-Final Office Action—U.S. Appl. No. 14/713,809.
Apr. 2, 2018—(CN) First Office Action—App 201480024831.0.
May 30, 2018—(AU) Examination Report—App 2015346254.
Jun. 7, 2018—U.S. Non-Final Office Action—U.S. Appl. No. 14/591,421.
Jul. 16, 2018—(CN) Third Office Action—App 201480026575.9.
Jul. 26, 018 U.S.—Non-Final Office Action—U.S. Appl. No. 14/939,220.
Oct. 28, 2018—(KR) Final Rejection—App 10-2017-7015819.
Dec. 17, 2018—U.S. Final Office Action—U.S. Appl. No. 14/591,421.
Dec. 26, 2018—(KR) Notice of Allowance—App 10-2017-7015819.

\* cited by examiner

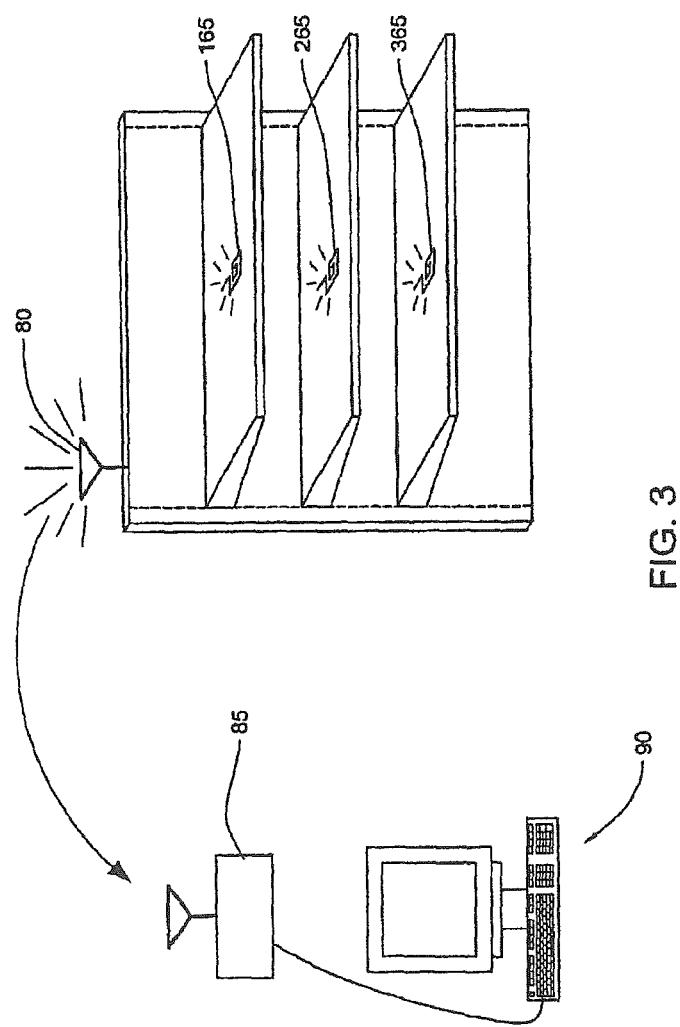

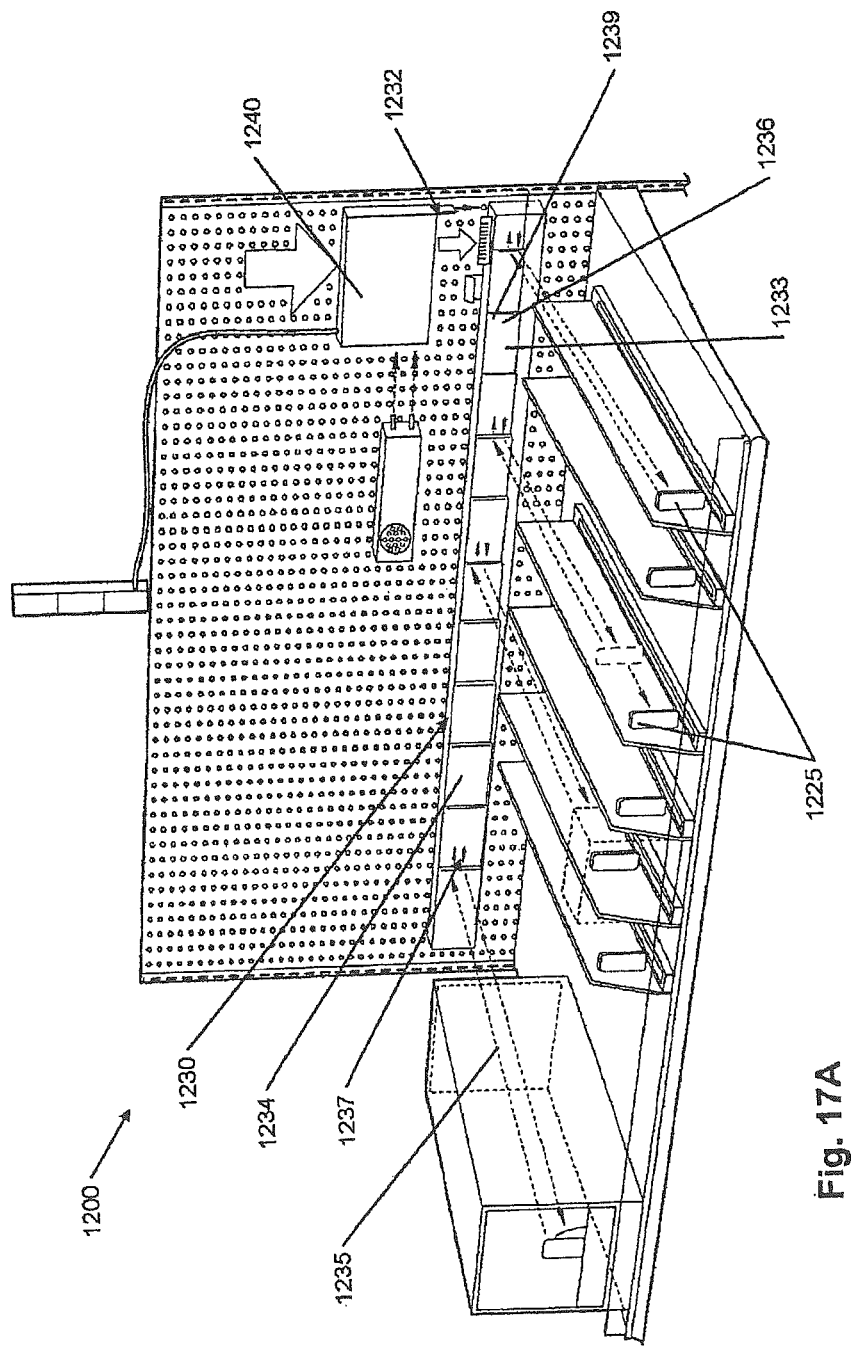

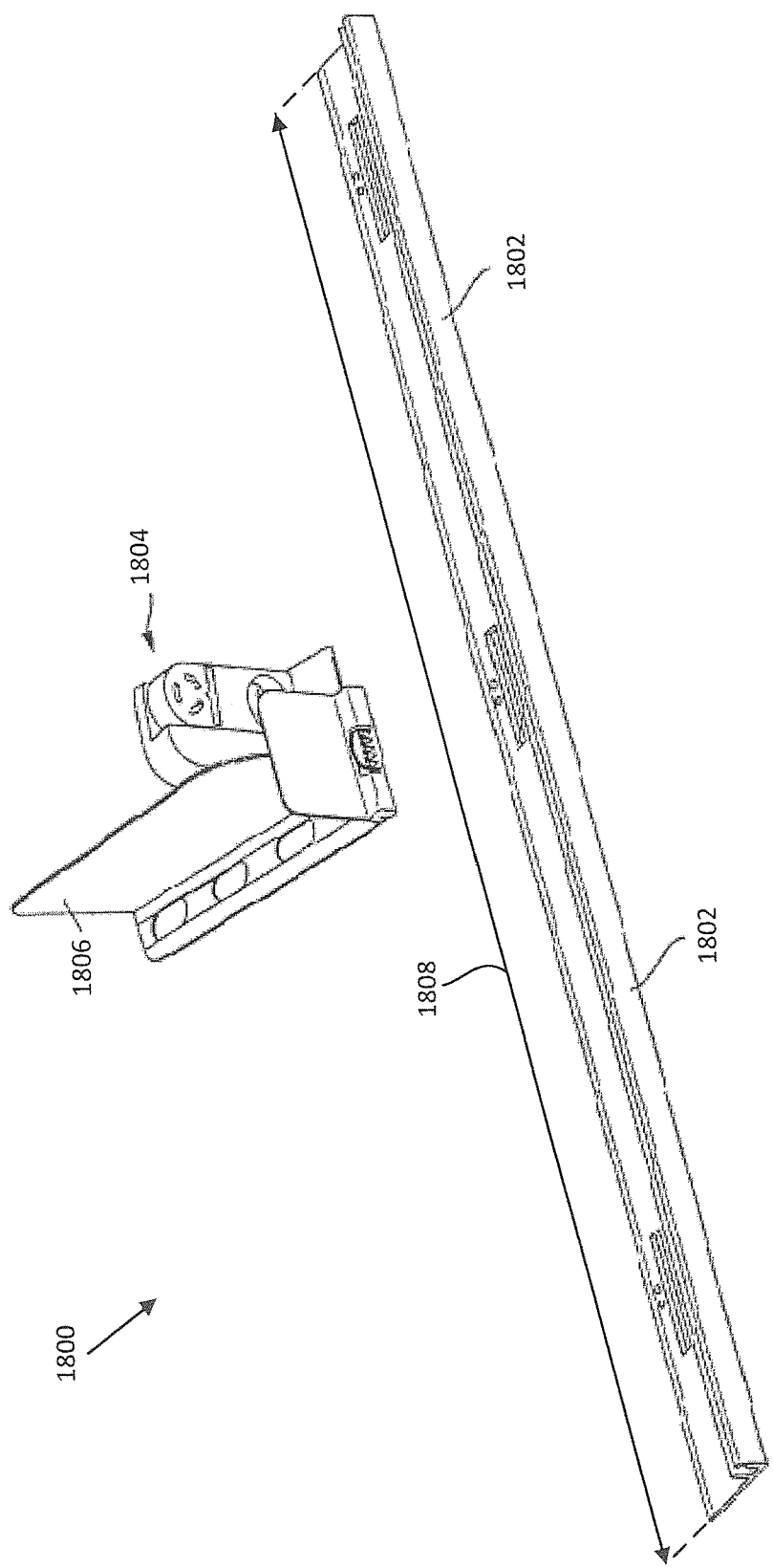

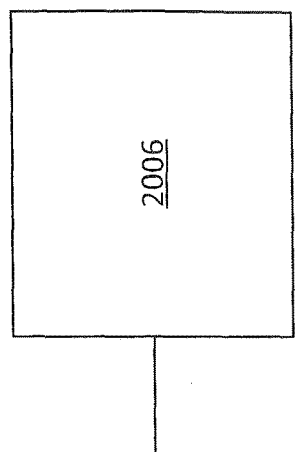
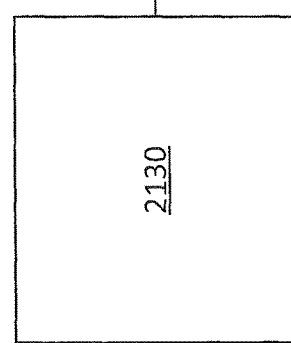
FIG 22B
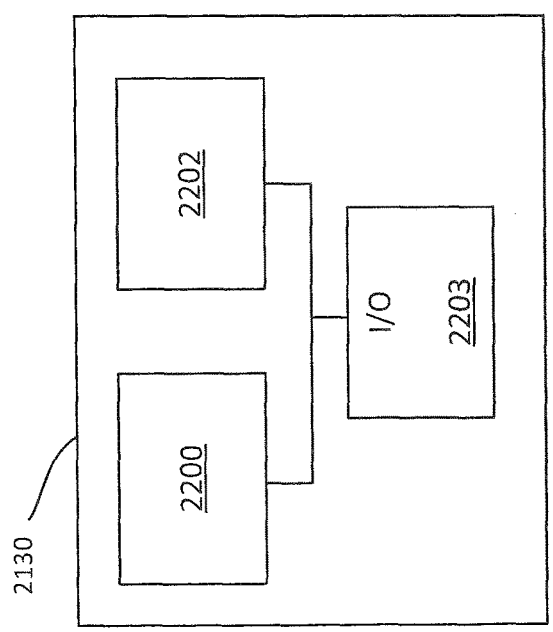
FIG 22A

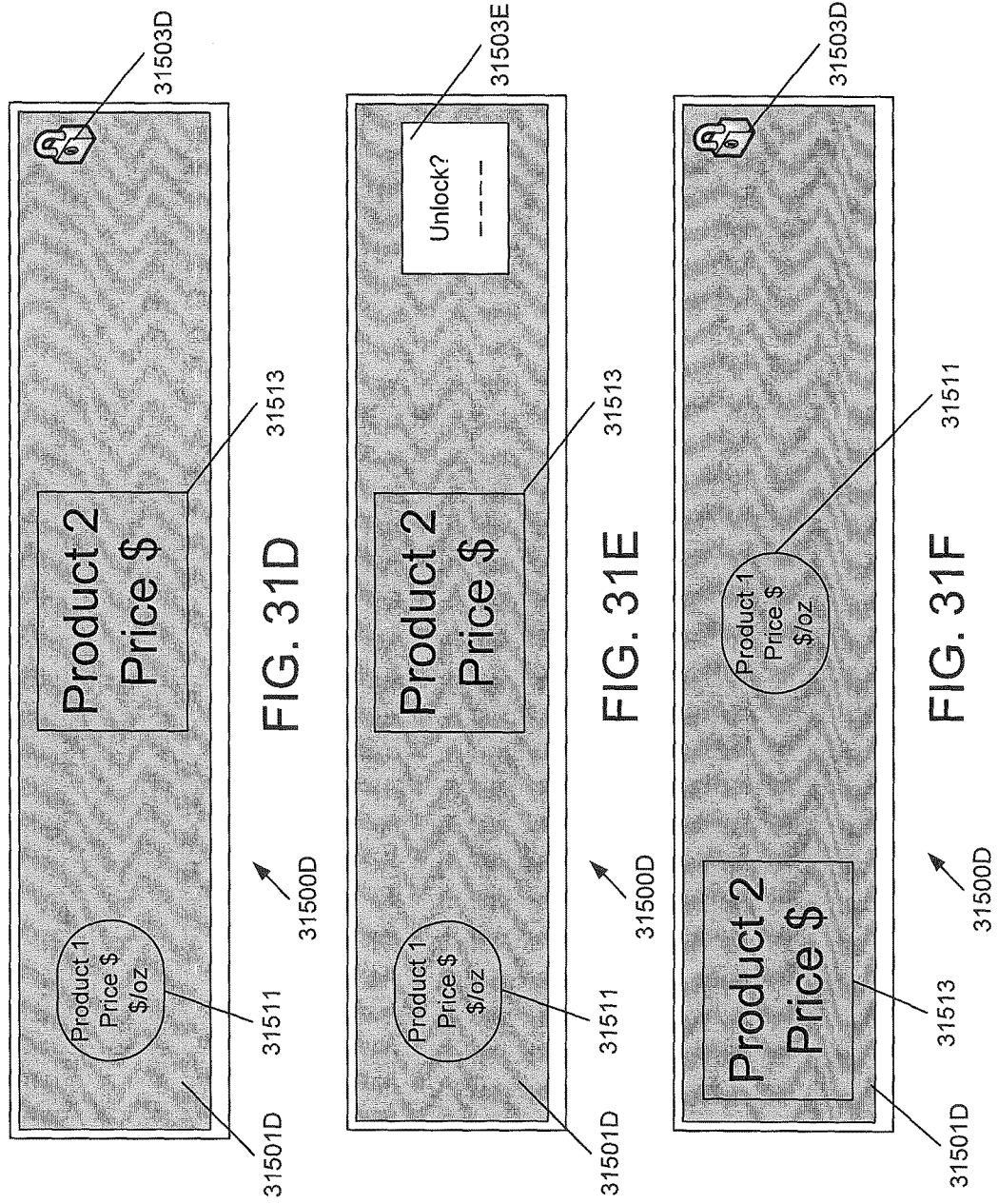

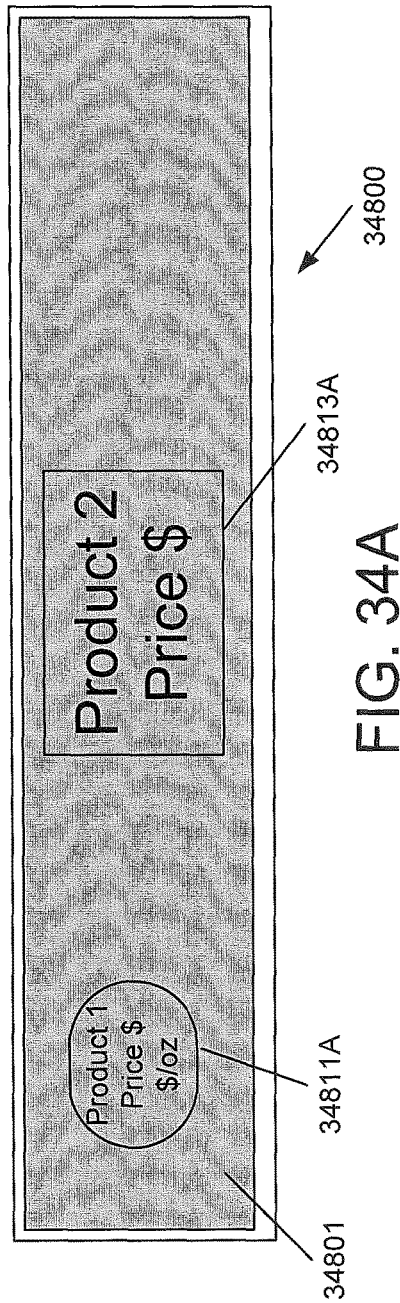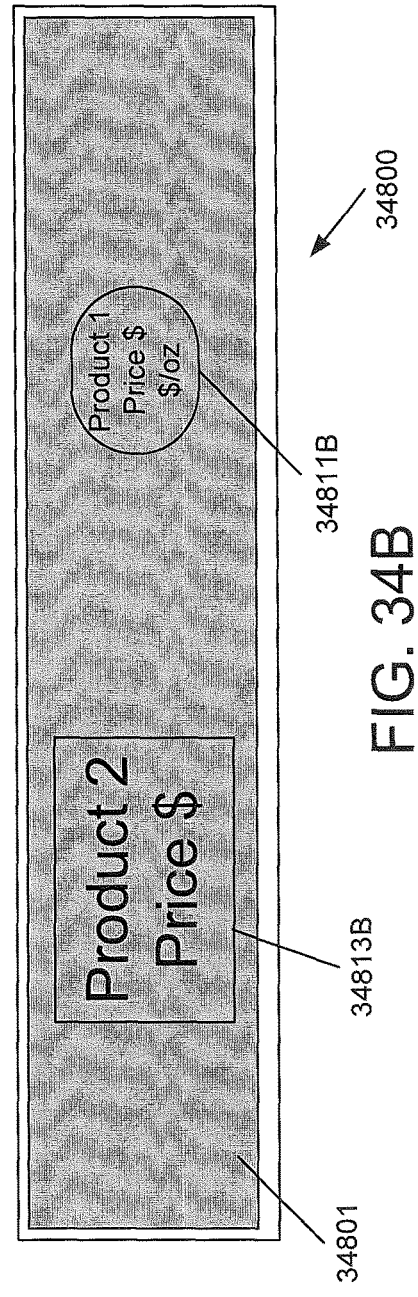

SYSTEMS AND METHODS FOR MERCHANDIZING ELECTRONIC DISPLAYS

CROSS REFERENCE TO RELATED APPLICATIONS

This Application is a continuation-in-part of U.S. application Ser. No. 14/591,421 filed Jan. 7, 2015, which claims priority to U.S. Application No. 62/078,809 filed Nov. 12, 2014. This application is related to U.S. application Ser. No. 14/308,989, filed 19 Jun. 2014, which is a divisional of U.S. application Ser. No. 13/194,649, filed Jul. 29, 2011, which claims priority to U.S. Provisional Application No. 61/371,417, filed Aug. 6, 2010 and is a continuation of U.S. application Ser. No. 12/876,919, filed Sep. 7, 2010, which is a continuation-in-part of U.S. application Ser. No. 10/772,010, filed Feb. 3, 2004, now U.S. Pat. No. 7,792,711. This application is also related to U.S. application Ser. No. 13/836,680, filed on Mar. 15, 2013, which is a continuation-in-part of U.S. application Ser. No. 13/194,649, filed Jul. 29, 2011, which is a continuation of U.S. application Ser. No. 12/876,919, filed Sep. 7, 2010, which is a continuation-in-part of U.S. application Ser. No. 10/772,010, filed Feb. 3, 2004, now U.S. Pat. No. 7,792,711. U.S. application Ser. No. 13/836,680 also claims priority to U.S. Provisional Application No. 61/371,417, filed Aug. 6, 2010 and is a continuation-in-part of U.S. application Ser. No. 13/785,082, filed Mar. 5, 2013. The contents of each of these applications are incorporated herein by reference in their entirety.

BACKGROUND

The present disclosure relates to a store intelligence system that can be configured to be used to, for example, provide one or more of: interactive electronic price displays, provide marketing messaging, and provide a continuous display across an electronic price display, packages, and/or products.

DESCRIPTION OF RELATED ART

A major cost in the operation of retail stores relates to inventory management, which includes the tracking and storing of inventory. A significant portion of this cost relates to product inventory management in the selling area of the store. A considerable portion of inventory management cost is the periodic counting of product on the store shelves. This counting is necessary to determine the amount of product on the shelf and to help ensure the shelves are fully stocked.

Historically, the counting of inventory on store shelves was done manually, and the results were recorded on paper. More recently, however, inventory has been counted manually with the use of a small hand-held computer that can be configured to transmit the entered data to a central computer that compiles data and can be programmed to make decisions regarding the purchase of products for restocking the shelves. These recent advances have helped reduce the cost of inventory management; however, counting inventory still requires significant manual labor. It may be beneficial to reduce the amount of manual labor required to count the inventory.

Another significant cost relating to inventory management is product theft. Certain items are relatively small but represent a high value to potential thieves who can either resell the items or use them for other illegitimate purposes, as in the case of certain pharmaceutical products. The losses generated by such thefts have a negative impact on the profitability of retail stores.

Theft can be the result of both customers' and employees' actions and has been difficult to eliminate. Attempts to deter and prevent theft have proven to be only partially effective. For instance, in-store cameras often do not observe the theft clearly enough to catch or prosecute the thief. In addition, in-store security personnel are rarely in the correct position to actually observe a thief in action. As a result, theft continues to be a significant problem and cost in the management of inventory. It may, therefore, be beneficial to provide aid in monitoring for theft.

Currently, retail stores can track the amount of product sold based on a number of items scanned at the checkout counter. While this ability has proven useful, certain inherent disadvantages result from the use of such a system. One inherent disadvantage is that the scanner only counts the number of products that are legitimately purchased. Therefore, if product is removed from the shelf but not purchased, the store is unable to determine the fact that product has been misplaced or stolen without visual inspection or detection. It would be useful to compare changes in product level on the shelves with the amount of product sold.

A second inherent disadvantage relates to store-run product promotions. A typical promotion will have a product located at the end of an aisle or in some type of promotional location that increase customer awareness of the product. Usually the product is also placed on the shelf in its traditional location so that customers familiar with the product placement of the store can find the product without undue searching. Therefore, customers can obtain the product being promoted in multiple places, and it can be difficult to determine the effectiveness of a particular promotional display, i.e., the effect of a promotional discount offered for the product versus the normal purchasing of the product. It may, therefore, be beneficial to more accurately determine the effectiveness of in-store promotions.

Another major cost of inventory management is associated with having to maintain more inventory in the store then is actually needed to meet customer demand. As current systems of inventory do not automatically indicate that a shelf is empty, retail stores tend to rely on output measured through the checkout or, alternatively, through visual inspection to determine if additional product needs to be placed on the shelf. In order to ensure the shelves are stocked with product, often more product than is typically needed for a given period of time will be placed on the shelf, sometimes in multiple facings on each shelf. The use of multiple facings tends to take up valuable shelf space that could otherwise be allocated towards additional product choices so as to maximize consumer satisfaction. It may, therefore, be beneficial to reduce the amount of inventory of a particular product in the retail store.

Methods of minimizing the amount of required shelf space are known. For example, U.S. Pat. No. 6,041,720 to Hardy and U.S. Pat. No. 4,830,201 to Breslow, which are incorporated by reference in their entirety, teach a system for organizing and displaying items on a shelf through the use of a pusher assembly.

Additionally, retail businesses often are tasked with rapid changes in customer product interests and in implemented internal changes to handle the same. As new products become increasingly popular among customers, retailers are tasked with changing shelf edge labels of products in order to attract customers to other products, market specific products, or to update product information, such as pricing, as quickly as possible.

Electronic shelf edge label devices allow retailers to manually swap out one device representing one single product for another device representing another single product or even changing a device to provide different information on a single product or to change from outputting data on one single product for data on another single product. However, further technological improvements and innovations in the retail space are desired.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

Several embodiments of the present invention are illustrated by way of example, but are not limited to the accompanying figures in which like reference numerals indicate similar elements and in which:

FIG. 3 illustrates a schematic view of an embodiment of the present invention, including an antenna, an access point and a store computer.

FIG. 15b illustrates a schematic of a beam, a fixed mirror, and a pusher assembly in accordance with the embodiment illustrated in FIG. 15a.

FIG. 16b illustrates a schematic of a beam, a fixed mirror, and a pusher assembly in accordance with the embodiment illustrated in FIG. 16a.

FIG. 17a illustrates an isometric view of yet another alternative embodiment of the present invention.

FIG. 17b illustrates a schematic of a beam, a fixed mirror, and a pusher assembly in accordance with the embodiment illustrated in FIG. 17a.

FIGS. 18A-18C depict an alternative implementation of a display management system.

FIG. 22A schematically depicts an integrated accelerometer device.

FIG. 22B schematically depicts an integrated accelerometer device in communication with a control circuit.

FIGS. 31D-31F illustrates an example of a changing continuous display with locking mechanism user interface according to one or more illustrative aspects of the disclosure.

FIGS. 34A-34B illustrate an example of a changing location of user interfaces according to one or more illustrative aspects of the disclosure.

Figure 1A:
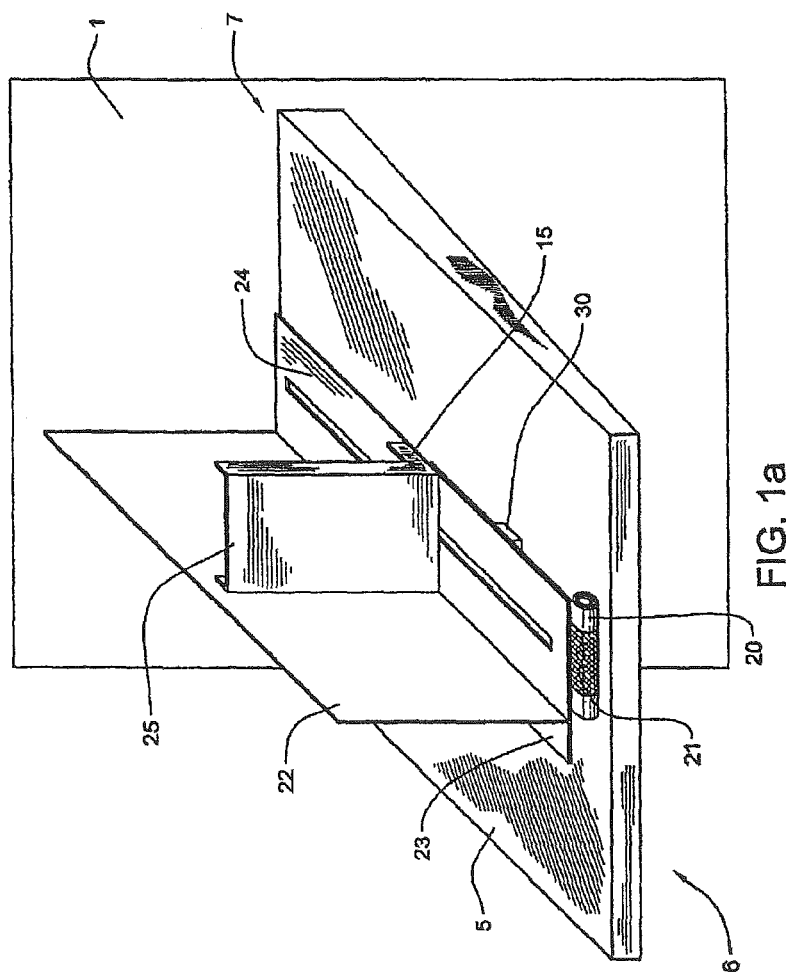
FIG. 1a illustrates an isometric view of an embodiment of the present invention including a pusher assembly and a sensor assembly.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

The present disclosure may be used with the shelf and pusher assembly system described in either U.S. Pat. No. 6,041,720 to Hardy or U.S. Pat. No. 4,830,201 to Breslow. The present disclosure may also be used with other pusher assemblies and shelf configurations known in the art.

FIG. 1a illustrates an embodiment of the present disclosure. A shelf wall 1 is configured to support a shelf 5. The shelf 5 has a front side 6, the front side 6 typically facing the aisle where customers walk when shopping, and a rear side 7. Mounted on the shelf is a pusher assembly 15. As depicted, the pusher assembly 15 includes a biasing mechanism such as a sheet coil spring 20 containing an indicia strip 21. The pusher assembly 15 further includes an integral divider wall 22 and a floor section 23 on one side of the divider wall 22 and a floor section 24 on the other side of the divider wall 22. The sheet coil spring 20 is operatively connected to a pusher 25 and can be used to urge the pusher 25, and the associated product, toward the front side 6 of the shelf 5. The pusher assembly 15 may be modular and can include a divider wall or an additional floor section that fit or mate in place.

As depicted FIG. 1a, a sensor assembly 30 can be mounted to the underside of the floor 24 over which the pusher 25 travels or to the shelf 5 and is configured to read the indicia strip 21. The sensor assembly 30 can be located at any position along the floor 24 and preferably near the coil spring 20. The indicia strip 21 is configured to provide a pattern that includes a representation associated with the position of the pusher 25. Thus, when the pusher 25 is moved as far as possible towards the rear side 7 (i.e. the facing is full of product), the sensor assembly 30 can scan a representation on the indicia strip 21 that reflects the pusher 25 being in that position.

The indicia strip 21 is depicted in FIG. 1a as a strip mounted on the sheet coil spring 20. The indicia strip 21 can be printed on a paper that can be attached to the coil spring 20, and can be black on white, white on black, or some other colors in a known manner. Alternatively, the indicia strip 21 can be printed or acid etched or laser etched, depending on the sensor assembly 30 used to read the indicia strip 21, in a known manner. Moreover, the indicia strip 21 can be separate from the coil spring 20. In this embodiment, the indicia strip 21 can be mounted alongside or adjacent to the coil spring 20.

The representations in the pattern contained on the indicia strip 21 can be optically readable or can be read based on other methods, including but not limited to passive variable capacitance, inductance, resistance, or magnetic, or active signal detection.

Figure 1B:
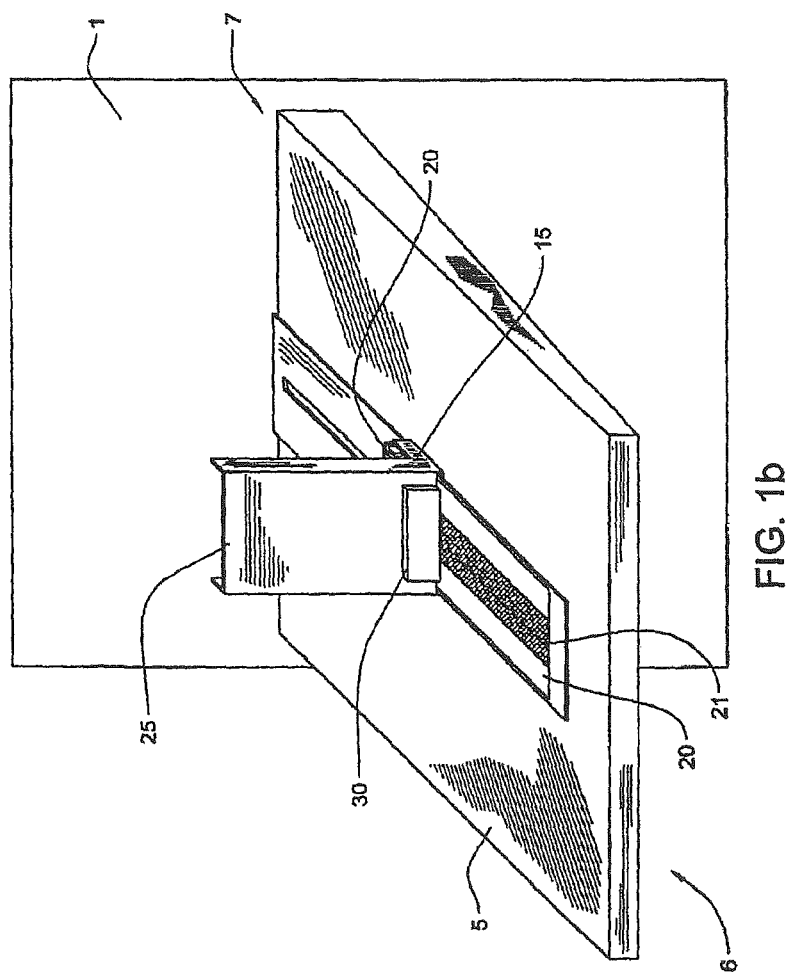
FIG. 1b illustrates another isometric view of an embodiment of the present invention including a pusher assembly and a sensor assembly

FIG. 1b depicts an alternative embodiment of the invention with the sensor assembly 30 mounted on the front side of the pusher 25, the sensor assembly 30 configured to read the indicia strip 21. In an alternative embodiment, the sensor assembly 30 could be mounted behind the pusher 25. Depending on the location of the coil spring 20, the sensor assembly 30 can be mounted in different places. Preferably, the sensor assembly 30 will be mounted in such a manner so as to avoid direct contact with the product on the shelf so as to minimize damage to the sensor assembly 30.

In another alternative embodiment, the sensor assembly 30 may be mounted within or on the pusher 25 and configured to read the indicia strip 21. In this embodiment, the indicia strip 21 is not mounted to or part of the coil spring; rather, the indicia strip 21 may be positioned along the top of the floor 24 or along the underside of the floor 24 and is read by the sensor assembly 30. In one aspect of this embodiment, the indicia strip 21 is of the type that may have variable magnetic or capacitive characteristics. The sensor assembly 30 may incorporate an analog oscillator whose frequency is determined by the magnetism or capacitance of the indicia strip 21 at the particular position of the pusher 25. The oscillator can directly modulate the radio frequency signal and send that signal to a central access point, as discussed below. The central access point can then demodulate the signal and use the signal to determine the position of the pusher 25.

For a black/white printed indicia strip 21, an optical infrared or visible light LED retro-reflective sensor array can be used. In an embodiment, the indicia strip 21 pattern containing the various representations could be 6 bits wide. In an alternative embodiment, depending on the width of the shelf and the desired precision, the pattern on the indicia strip could be more than 6 bits wide.

In yet another alternative embodiment, the indicia strip 21 could be less than 6 bits wide. Reducing the number of bits on the indicia strip 21 reduces the precision regarding the position of the pusher 25 but has the advantage of potentially avoiding the need to determine the dimension of the product. An embodiment with a reduced number of bits will be discussed below. The indicia strip will preferably include at least two representations so that the two representations can be used to reflect at least two positions of the pusher.

Depending on the indicia strip 21 and the sensor assembly 30, the number of measurable positions of the pusher 25 can be varied. For example, a configuration of a 6 bit wide pattern on an indicia strip 21 with a sensor assembly 30 that can scan 6 bits could scan at least 64 representations associated with 64 positions of the pusher 25. The representations in the pattern on the indicia strip 21 can be in many symbologies but a Gray Code provides that only one bit will change in each increment of movement, reducing potential errors. The sensor assembly 30 and the indicia strip 21 can be configured depending on the distance of travel of the pusher 25 and the expected size of the product.

In an embodiment, the coil spring 20 has a width of about 1 inch and the indicia strip 21 covers approximately 80% of the width of the coil spring 20. One skilled in the art will understand that other widths of the coil spring 20, and other dimensions of the indicia strip 21 are possible with the invention.

In an embodiment, the number of products on the shelf could be measured by the number of measurable positions of pusher 25. In such an embodiment, the position of the pusher 25 could be used to determine the amount of product on the shelf without the need to manually count the product. In an alternative embodiment, the number of measurable positions could exceed the number of products that can be placed in a facing. In this alternative embodiment, it would be preferable to have the number of measurable positions be an integer multiple of the number of products for ease of calculating the amount of product on the shelf Increasing the number of measurable positions can therefore improve the ability of the system to precisely calculate the amount of product in a facing. This can become more important when a product package is unusually thin and therefore the incremental movement of the pusher 25 from one code to the next becomes a large percentage of the thickness of each product package that it is pushing.

Thus, as different products have different dimensions, a configuration of the sensor assembly 30 and indicia strip 21 might be desired with an increased number of measurable positions. For example, a configuration where 256 positions of the pusher 25 are measured might be desirable. Such a configuration could be used to determine the actual number of product on the shelf for a wide variety of product dimensions.

In an alternative embodiment, the sensor assembly 30 and indicia strip 21 can be configured to provide a decreased number of measurable positions. In an embodiment, four positions of the pusher 25 are measurable. In such a configuration, the shelf would provide information regarding how full the shelf was but would not provide the actual quantity of items on the shelf (assuming that 4 products would not fill the facing). This configuration could be useful in providing an automatic notification that a shelf was running out of product and needed to be restocked without the need to determine the product dimensions.

Figure 2A:
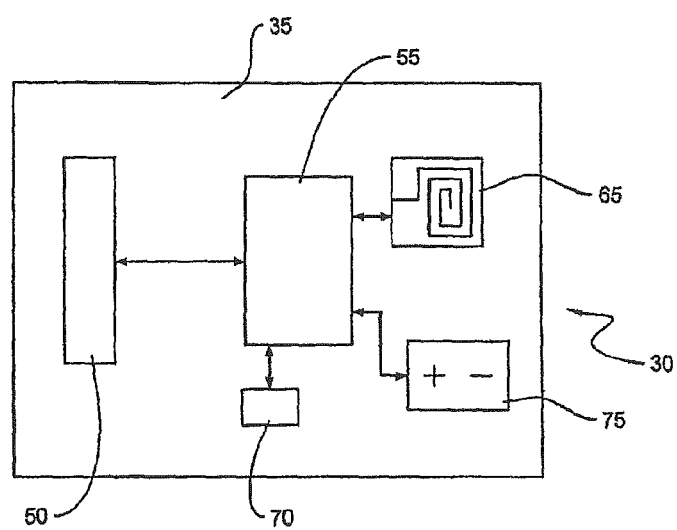
FIG. 2a illustrates a schematic view of an embodiment of the sensor assembly used with the present invention.

FIG. 2a depicts a schematic of an embodiment of the sensor assembly 30. A printed circuit board ("PCB") 35 is configured to support a sensor 50, the sensor 50 being compatible with the chosen type of indicia strip 21. A controller 55 is mounted to the PCB 35 and is configured to control the sensor 50 and transmit signals regarding the position of the pusher 25 via an antenna 65. The controller 55 can be configured to actuate the sensor 50 based on an input from the timing device 70. The timing device 70 can include, but is not limited to, a low power interval timer or a real time clock and is configured to provide information relating to the passage of time.

For a black/white printed indicia strip 21, the sensor 50 can include, but is not limited to, an optical infrared or visible light LED retro-reflective sensor. Preferably, for a 6 bit wide pattern, a linear array of 6 emitters/sensors will be used where one emitter/sensor is aligned with each bit position printed on the indicia strip 21. In an embodiment, the sensor 50 is positioned approximately 0.1 inches from the surface of the printed strip mounted on the indicia strip 21. As each emitter/sensor pair illuminates its bit position, a binary code can be assembled by the controller 55 that corresponds to the representation on the indicia strip 21, the representation associated with a position of the pusher 25.

Regardless of how the position of the pusher 25 is determined, the controller 55 generates a pusher code that represents the position of the pusher 25. The pusher code can be in digital or analog form and reflects the position of the pusher 25. In addition, the pusher code can be processed data or unprocessed data. Thus, the pusher code can be, but is not limited to, the scanned representation or a controller processed representation. Alternatively, the pusher code can be some other data that reflects the relative position of the pusher 25.

The controller 55 is powered by a power source 75. The power source 75 can be, but is not limited to, a long life battery, a wired power supply, or a solar panel. As can be appreciated, the type of power supply will have an impact on the functionality of the sensor assembly 30. If the power source 75 is a long life battery, a system configuration designed to utilize less energy will be preferable to avoid the need to change the battery on a frequent basis. If the power source 75 is a wired power source, the sensor 50 can be used more frequently without the need to replenish the power supply and the sensor assembly 30 can even be configured to provide real time information.

The controller 55 can be manufactured with a unique serial number. In this embodiment, each pusher 25 would be associated with a unique serial number or identity code. Alternatively, each indicia strip 21 can include a unique identity code along with the representation associated with the position of the pusher 25. Encoding the indicia strip 21 with a unique identity code can reduce the complexity of the controller 55 but typically will result in increased complexity of the sensor 50. Regardless, when the information is transmitted from the sensor assembly 30, the information may include an identity code and the pusher code representative of the pusher 25 position. In addition, information such as time of sending and the status of the circuitry or the status of the power source may also be transmitted.

Figure 2B:
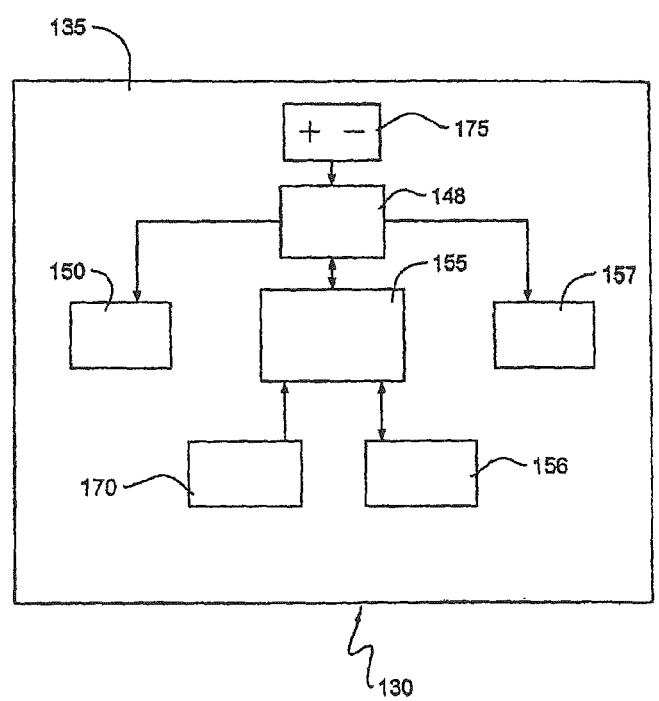
FIG. 2b illustrates a schematic view of an alternative embodiment of a sensor assembly used with the present invention.

FIG. 2b illustrates a schematic of an alternative embodiment of a sensor assembly 130. A PCB 135 has a power management circuit 148 configured to minimize use of power. The power management circuit 148 provides power to a sensor 150, a controller 155 and associated memory 156. The memory 156 can be volatile type memory, such as dynamic random access memory, but preferably the memory is non-volatile type memory, such as flash memory, so as to minimize power consumption. As depicted, the power management circuit 148 also provides power to a communication control 157. The power management circuit 148 can also provide power to a timing device 170. As depicted, the power management circuit 148 is powered by a power source 175.

In this embodiment, an input signal is provided to the controller 155. The input signal can be a signal generated by the timing device 170 or can be from some other source. The controller 155, in response, activates the sensor 150 by sending a signal to the power management circuit 148. The controller 155 receives data from the sensor 150 which is used to form the pusher code representative of the position of the pusher 25. The controller 155 compares the data scanned by the sensor 150 with the previous data scanned by the sensor 150, which is data residing in the memory 156. Depending on the configuration of the system, if the data scanned by the sensor 150 is the same as the previous scanned data, the controller 155 can be configured to wait until the end of the next interval of the timer. If the data scanned by the sensor 150 is different, the controller 155 can then activate the communication control 157 and provide the pusher code to the communication control 157 for transmission. The communication control 157 can then transmit the pusher code for further processing. The terms "transmit" and "transmission," unless otherwise specified, include sending of information over a wire or via a wireless system and can be direct or indirect (i.e. through a network). If the power source 175 is not a wired power supply, however, it is preferable to use a method of communication that consumes relatively little power.

Figure 2C:
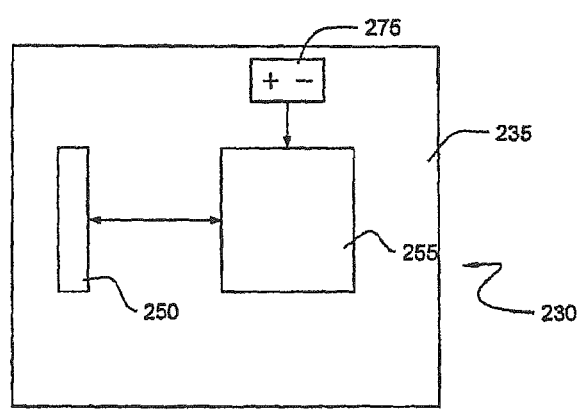
FIG. 2c illustrates a schematic view of another alternative embodiment of a sensor assembly used with the present invention.

FIG. 2c illustrates a schematic of an alternative embodiment of a sensor assembly 230. A PCB 235 is configured to support a sensor 250 and a controller 255. The controller 255 is powered by a power source 275 and is configured to control the sensor 250 and has integrated functionality, including but not limited to, time keeping, power management, and communication control. In an alternative embodiment, the controller 255 transmits the data scanned by the sensor 250 without any processing of the data. Thus, in this embodiment the pusher code is the data scanned by the sensor 250. In another alternative embodiment, the sensor and controller can be integrated together.

FIG. 3 illustrates a possible configuration for providing data regarding the position of the pusher 25 to a processing device, such as a store computer 90. As depicted, an access point 80 is configured to transmit information to a central access point 85. The central access point 85 is connected to the store computer 90 and provides the data received from the access point 80 to the store computer 90. The data sent from the access point 80 is received from antenna 165, antenna 265 and antenna 365. The antenna 165 is associated with a particular pusher 25 and sensor assembly 30, typically via the use of a unique serial number that can be associated with a controller. The antenna 265 and the antenna 365 are also associated with different pushers 25 and sensor assemblies 30, each with a unique serial number. Alternatively, one or more antennas could be associated with more than one pushers 25.

In general, the power required to transmit wireless signals increases as the transmission distance increases. Thus, especially with a battery powered controller, the preferred wireless communication configuration will transmit low powered signals over a short distance. As depicted in FIG. 3, the various antennas 165, 265 and 365 transmit a wireless signal to the access point 80, located nearby, thus a low powered transmission is suitable. The access point 80 then re-transmits the signal to the central access point 85 using higher power during the secondary transmission. In this manner, the power source for the various controllers connected to the antenna 165, 265 and 365 can more readily utilize a power source 75 consisting of a long life battery. While the transmission method between access point 80 and central access point 85 is depicted as wireless, the access point 80 and central access point 85 can also communicate over wires.

In an alternative embodiment, the controller 55 corresponding to each pusher 25 can be hard-wired to an access point 80 so that the controller 55 transmits the data to access point 80 over one or more wires. The access point 80 can then transmit the data to the store computer 90. In another alternative embodiment, the data is transmitted directly from the sensor assembly 30 to the store computer 90. In this embodiment, the transmission can be either wireless, such as an infrared, ultrasonic or electromagnetic wave transmission, or can be hard-wired. Depending on the method of transmission, it may be desirable to transmit the data from the sensor assembly 30 to the store computer 90 via a network protocol that can compensate for, or minimize, communication errors.

The use of a wired connection can provide a useful source of power and can reduce the possibility of communication collisions, especially if the signals are directly to the store computer 90. In addition, by providing additional power, the controller 55 can be configured to provide a real time update on the level of product on the shelf or in the store so that more accurate decisions regarding the need to order additional product can be made. This configuration also makes it possible to recognize and send alerts regarding potential theft situations based on the real-time movement of the pusher 25. The real time product information may make it possible to provide a more responsive inventory system so as to lower the amount of inventory in the store and therefore reduce the cost of inventory.

Wireless systems, on the other hand, provide increased flexibility in installation and can be readily installed in existing shelves without the need to install wires for either power or communication. In addition, the use of a wireless system allows for the gradual installation of an inventory system. For example, items of high value (and therefore suffering from an increased likelihood of being stolen) or items that tend to have significant variations in customer demand can be monitored first.

In an embodiment, the sensor assemblies 30 may be networked together via a series of wireless access points 80 where each access point 80 accepts transmissions from any sensor assembly 30 in the vicinity of the access point 80. Thus, in an embodiment, there exist a number of wireless access points 80 and the access points 80 are connected via a network, where the network transmits the data to the store computer 90. In an alternative embodiment, each wireless access point 80 transmits the data directly to the store computer 90.

Naturally, some combination of network and direct transmission is also possible and is considered within the scope of the present invention. For example, a battery powered sensor assembly 30 could communicate via a low powered wireless transmission to an access point 80, the access point 80 being powered by a wired power supply. The access point would transmit a wireless signal to a central access point 85 that was powered by a wired power supply. The central access point 85 could be connected via a wire to the store computer 90.

Referring back to FIG. 2a, if a timing device 70 comprises a low powered timer, the controller 55 can rest dormant until a signal from the timing device 70 indicates it is time to send an update regarding the position of the pusher 25. An example of a low powered timer includes a low powered, low cost interval timer. Low powered, low cost interval timers may not be highly accurate and therefore multiple pusher devices in a store will likely randomize their transmission times so as to reduce transmission collisions. The period of data transmission typically will be on the order of a few milliseconds, and therefore, it is unlikely that signals from different controllers will be sent at the same time. This likelihood can be further decreased if the controllers are not all started at the same time. If the transmissions only occur a few times per day (i.e. to provide periodic updates on the amount of product on the shelf), the likelihood of communication collisions is further reduced. In addition, the decreased frequency of transmission and the short transmission period helps reduce the amount of power consumed.

In an alternative embodiment, the sensor 50 continuously monitors the indicia strip 21. When a product is removed from the shelf, the pusher 25 will move and the sensor 50 can scan a new representation on the indicia strip 21 corresponding to the new position of the pusher 25. The controller 55 can then send a transmission including the new position of the pusher 25 to the store computer 90 (i.e. the controller 55 can send a new pusher code). In this alternative embodiment, the store computer 90 can monitor the amount of product on the shelf in real time.

As depicted in FIG. 3, the transmission of signals, from the antenna 165 to the store computer 90 for example, is a one-way transmission. In an alternative embodiment, the system may be set up to handle two-way transmission of signals between the sensor assembly 30 and the store computer 90. In a two-way wireless system, additional hardware such as a receiver is included in the sensor assembly 30. The two-way system allows for bi-directional transfer of information.

For example, the store computer 90 could query a particular controller 55 about the position of the associated pusher 25. The controller 55 could activate the sensor 50 in response to the query and determine a pusher code reflecting the position of the pusher 25. The controller 55 could then transmit the pusher code along with the identity code of the controller 55 to the store computer 90. Based on the pusher code, the store computer 90 could determine the inventory level of a product. To avoid activating the wrong controller 55, the store computer 90 could include the identifying code in the transmission. The store computer 90 may store, access, and perform functions with the identifying codes of all or a subset of the controllers or pusher systems in the store.

In an embodiment, all the controllers 55 associated with products purchased from the same vendor could be queried just before the order to the respective vendor was placed. The order to that vendor could then be updated with the latest product inventory information. In this manner, the order placed to the vendor could be made more accurate without the need for laborious counting of products on the shelf.

Some vendors are responsible for stocking the shelves in a retail store instead of the store personnel. In a situation where a vendor was responsible for stocking the shelves, an embodiment of the present invention could provide the vendor with updates in response to queries from the vendor's computer. In an embodiment, the vendor could track the amount of product available on the shelves as frequently as desired, even in real time.

For example, a vendor could send a query to a controller 55 via a wide area network ("WAN"). The controller 55 could determine the position of the pusher 25 and transmit a signal back to the vendor via the WAN. In an alternative embodiment, the vendor could communicate with the store computer 90 to obtain information regarding the inventory level of products on the shelf.

In an embodiment, the vendor could control the manufacturing process of the product in response to inventory levels on the shelves. As can be appreciated, the vendor would have an increasingly effective inventory system if multiple stores were networked to the vendor's computer so that the aggregate amount of product on all the store shelves could be determined. If the vendor was only connected to a single store, the information, while less indicative of the total inventory, could provide valuable details regarding patterns of behavior of the consumers.

Figure 4:
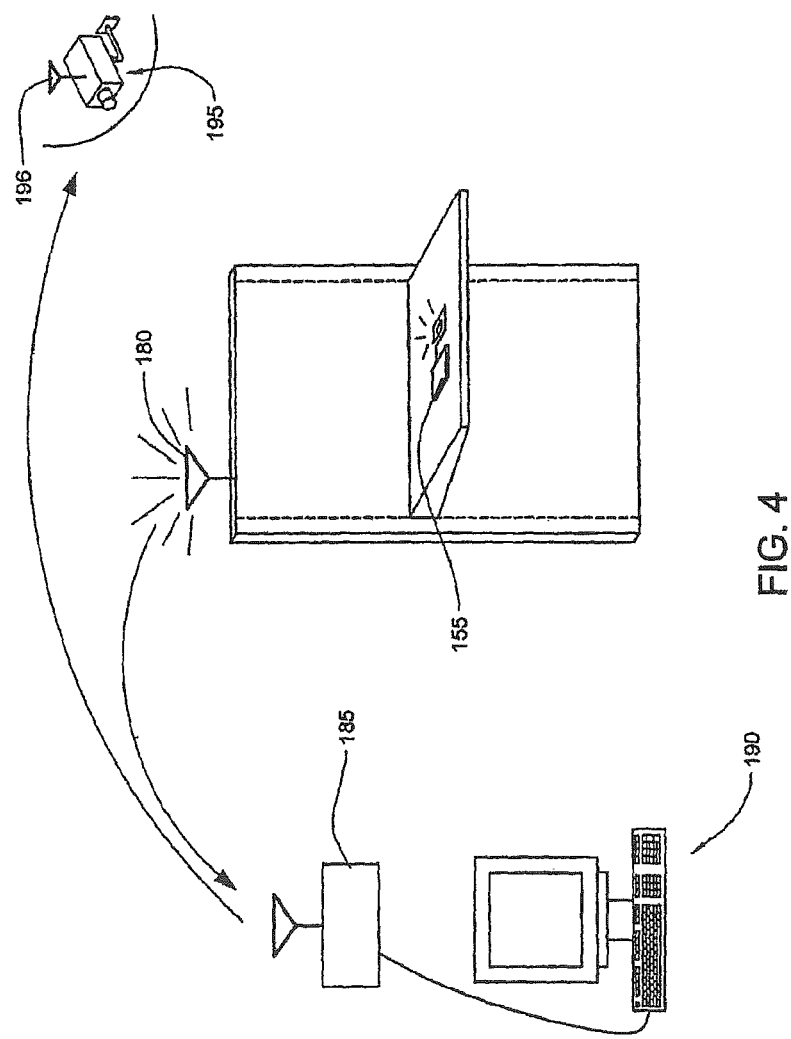
FIG. 4 illustrates a schematic view of an embodiment of the present invention, including an access point, a store computer and a security camera.

FIG. 4 illustrates an embodiment of the present invention that includes the use of a security camera 195. As depicted, an access point 180 receives a signal from a controller 155 indicating that pusher 25, not shown, has moved. The access point 180 transmits the signal to a central access point 185 that is connected to a store computer 190. The store computer 190 determines that the rate of change in product level of the product associated with the controller 155 is indicative of a potential theft. The store computer 190 then transmits a signal, either wired, or wirelessly, to an antenna 196, which is mounted to the security camera 195. The signal instructs the security camera 195 to monitor a position associated with the location of the controller 155. As can be appreciated, security personnel can sometimes provide a more nuanced response, thus it is advantageous to notify security personnel. Therefore, the store computer 190 can also notify security personnel to monitor the area by displaying a warning on the store computer screen or by transmitting a signal to a security computer or by activating an audible tone or flashing light in the vicinity of the potential theft or by other known methods of notification such as a signal to the pager or beeper carried by the security personnel.

Information from the security camera could be sent to a television or other visual display device that is located near the location where the potential theft is occurring. The visual display device could display an image of the potential thief such that the potential thief could appreciate the fact that the thief was being watched.

As can be appreciated, the controller 155 preferably monitors the position of pusher 25 on a frequent or even real time basis so as to provide a more timely response. If a power source 75 consisting of a long life battery is utilized, it may be beneficial to utilize a controller that can determine a potential theft situation without the need to transmit data to the store computer 190. In such an embodiment, the controller can be configured to transmit data to provide inventory level updates and also to provide security notifications.

As can be appreciated, the position of the potential theft relative to the security camera 195 would be beneficial to provide an instruction to the security camera 195 to focus on a particular position. This positional information could be generated by a number of methods, including providing the store computer 190 with the security camera coordinate system for the security camera 195. The position of the controller 155 relative to the security camera 195 could be determined during setup and during a potential theft situation; the position of the controller 155 could be used to direct the focus of the security camera 195. Alternatively, the security camera 195 could be configured to focus in several positions, such as three points along an aisle, and the store computer 190 could indicate which position was the most appropriate for the particular situation. The described methods are illustrative because of the numerous methods of controlling the security camera 195 that exist.

In an embodiment with a two-way transmission between the store computer 190 and the controller 155, the store computer 190 could signal to the controller 155 to activate a device capable of providing an audible warning tone.

In another embodiment, the controller 155 could determine that a potential theft had occurred and could provide a notification, including the sounding of an audible warning tone. In addition, the controller 155 could transmit a signal to the store computer 190. In this alternative embodiment, the sensor assembly 30 would preferably include a timing device 70 so as to allow the controller 155 to more readily determine whether the rate of movement of pusher 25 exceeds a preset level.

In another embodiment, a two-tiered response could be implemented. If the change in position of the pusher 25 was greater than normal, a signal could be transmitted to the security camera 195. In addition, an inaudible notification could be provided directly to security personnel. If the positional change of the pusher 25 more clearly indicated a potential theft, an audible alarm and flashing lights could also be activated. Thus, the response could be configured to more carefully match the situation.

Figure 5:
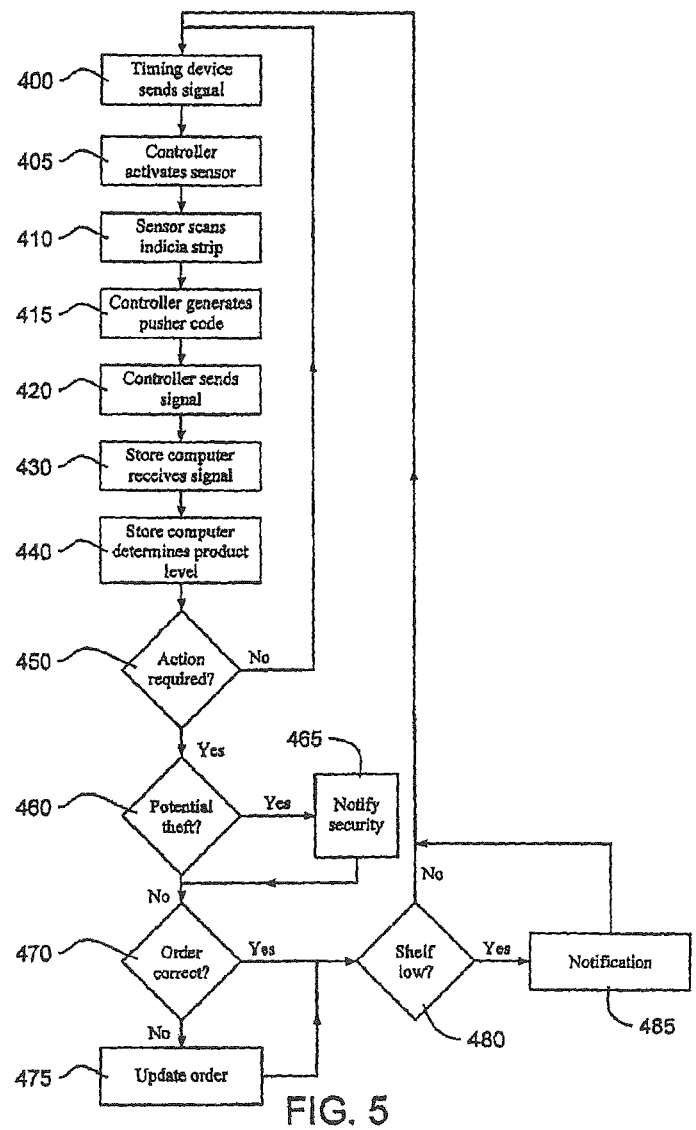
FIG. 5 illustrates a flow chart demonstrating a method of providing data from the indicia strip to a store computer.

FIG. 5 illustrates an embodiment of a method for determining the amount of a particular product available in a facing on a shelf. In this embodiment, the sensor assembly 30 uses a timing device 70 consisting of a low powered interval timer. The controller 55 is initially in a dormant state and only the timing device 70 is running In step 400, the timing device 70 provides a signal to the controller 55 that the time interval is complete. In step 405 the controller 55, in response to the signal from the timing device 70, becomes activated and the controller 55 then activates the sensor 50.

In step 410, the sensor 50 scans the representation contained in the pattern on the indicia strip 21 so that the controller 55 can generate the pusher code representative of the position of the pusher 25. In step 415, the controller 55 generates the pusher code in response to the pattern scanned by the sensor 50. In step 420, the controller 55 transmits a signal that can include the unique serial number of the controller 55 and the pusher code, to the store computer 90.

Next, in step 430, the store computer 90 receives the data from the controller 55. In an embodiment, the transfer of data from the controller 55 to the store computer 90 is direct. In another embodiment, the controller 55 transmits data to the store computer 90 indirectly through an access point or a network.

Then, in step 440, the store computer 90 calculates the amount of product on the shelf based on the position of the pusher 25. The store computer 90 also updates the inventory list at this point. In an embodiment where multiple facings have the same product, the total amount of product on all of the facings that have that product can be calculated. In an embodiment, the calculation of product in a facing can be accomplished through the use of a database of products and the relevant dimensions of a product, and the position of the pusher. In another embodiment, the number of products placed in the facing can be provided during setup of the controller 55 for that product. The position of the pusher 25 and the number of products corresponding to that position of the pusher 25 can be used to calculate the quantity of remaining products based on a later position of the pusher 25 through the use of well-known extrapolation techniques.

In another embodiment, the position of the pusher 25 can be one of four positions representing $X > 3/4$, $3/4 \geq X > 1/2$, $1/2 \geq X > 1/4$, and $X \leq 1/4$. This latter embodiment provides less precise information but also requires less computation effort to provide the approximate inventory level. In addition, this embodiment can be used to manage inventory without the need to determine and track the dimension of the product. In an embodiment, the amount product on the shelf can be roughly determined based the number of facings containing the product and whether the pusher 25 for each facing is in a position representative of a full, mostly full, low or almost empty facing.

In step 450, the store computer 90 determines whether any action is required. In an embodiment, a potential theft, a decrease in the inventory below a pre-set level or the emptying of a facing of product while ample product still remains on the shelf in other facings would indicate that some action was required. For example, the store computer 90 could determine that, based on historical usage and the average delivery time and the cost per delivery, the current level of inventory was low. In an alternative embodiment, the minimum inventory level could be preset and once the inventory level drops below a preset level, the store computer 90 could determine that the product level was low.

In step 460, the store computer 90 would determine if a potential theft was taking place. In an embodiment, the store computer 90 could compare the current level of inventory, based on the position of the pusher 25, to the previous level of inventory. If the rate of change in inventory level exceeded a preset level, the store computer 90 would determine that a potential theft was taking place. In step 465, the store computer 90 would notify security. The notification could include a page to security or a signal to a security camera 195 to focus in a particular direction.

Next, in step 470, the store computer 90 would determine if the existing order needed to be modified. The store computer 90 could compare the current product requirement to the current order. If the store computer 90 determined that an amount of product ordered was insufficient, the store computer 90 would proceed to step 475. In step 475, the store computer 90 would update the current inventory order so that the inventory order matched the current product requirements.

Next, in step 480, the store computer 90 would determine if a facing on a shelf was empty. If there was an empty facing, the store computer 90 would then notify the store management that there was an undesirable empty facing in step 485. The store management could then decide the appropriate action to take depending on the type of product and the availability of substitute goods. If the facing was not empty, the store computer 90 would wait until the next product update.

Figure 6:
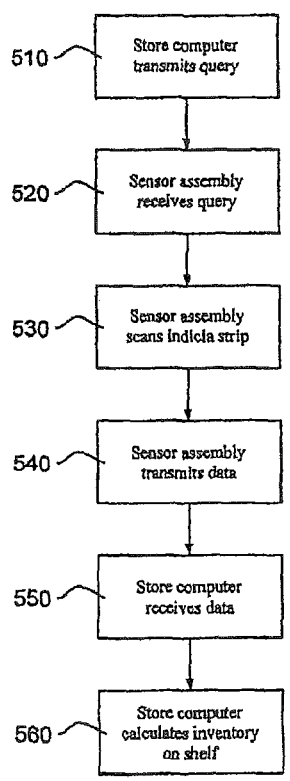
FIG. 6 illustrates a flow chart demonstrating a method of determining the amount of product on the shelf via a query from store computer.

FIG. 6 depicts an embodiment of a method for determining the amount of inventory on the shelf in a two-way system. In step 510, the store computer 90 sends a query to a sensor assembly 30. The sensor assembly 30 contains a controller 55 that is identified by a unique serial number or identifying code.

In step 520, the sensor assembly 30 receives the query from the store computer 90. In response to the query, the controller 55 activates the sensor 50 and prepares to receive data reflecting the position of the pusher 25. In step 530, the sensor 50 scans the indicia strip 21 and the controller 55 generates a pusher code representative of the position of the pusher 25.

In step 540, the sensor assembly 30 transmits the pusher code representative of the position of the pusher 25 along with the unique serial number of the controller 55 to the store computer 90.

Next, the store computer 90 receives this transmission in step 550. This transmission can be sent directly from the sensor assembly 30 to the store computer 90 or, preferably, it can be indirectly through a network. The transmission can be sent in a wireless manner, over wires, or some combination of a wireless and wired transmission.

Then, in step 560, the store computer 90 determines the level of inventory on the shelf. In an embodiment, the determination can be based on the product dimension and the position of the pusher 25. In an alternative embodiment, the determination can be based solely on the position of the pusher 25.

Figure 7:
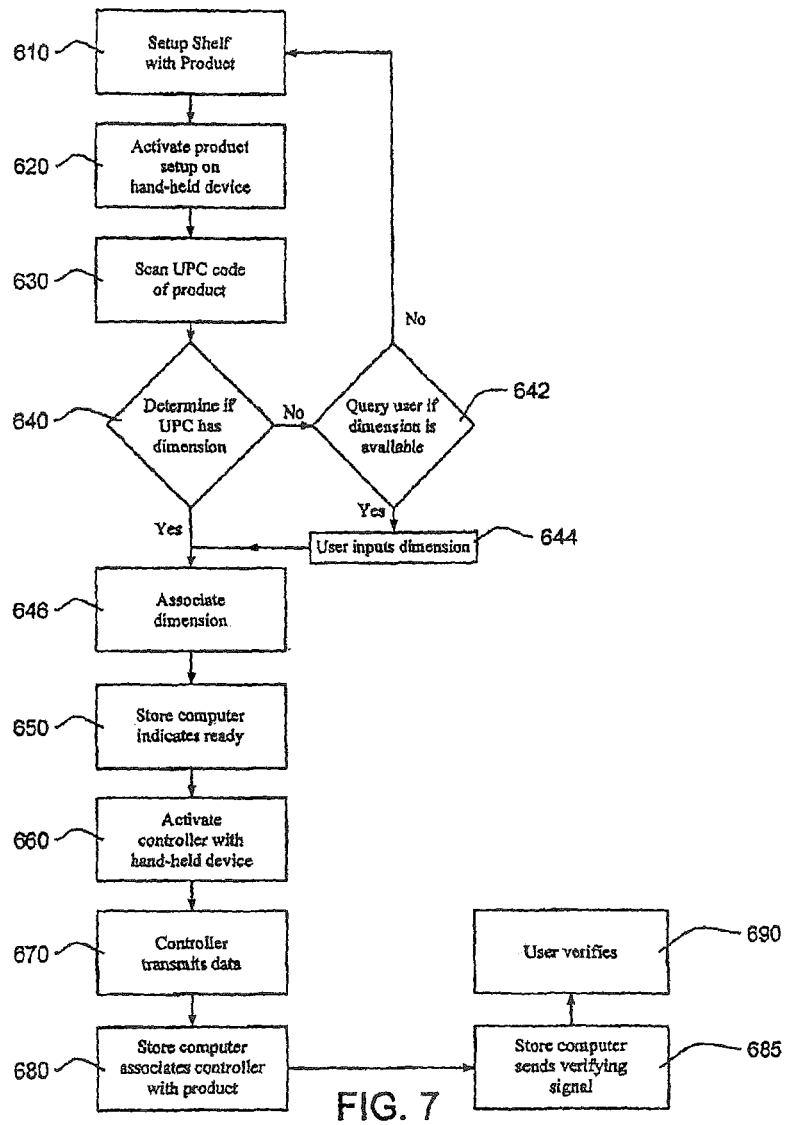
FIG. 7 illustrates a flow chart demonstrating a method of updating the association of particular product with a particular shelf location.

FIG. 7 depicts an embodiment of a method for setting up a controller for a particular product. In step 610, the product can be placed on the shelf in the appropriate facing. Alternatively, step 610 can be skipped and the set-up can start with step 620.

In step 620, a set-up button on a hand-held device is pressed. The hand-held device is configured to transmit a signal to a store computer 90 indicating that the user of the hand-held device is about to associate a product with a serial number or identifying code of a controller 55. Preferably, the transmission of signals between the hand-held device and the store computer 90 is done in a wireless manner. In an embodiment, the store computer 90 provides feedback to the user indicating that the store computer 90 is ready to proceed. In an alternative embodiment, no feedback is provided.

Next, in step 630, the UPC code of the product is scanned and transmitted to the store computer 90. Then, in step 640, the store computer 90 looks up the product dimension based on the UPC code. If the UPC code does not have a listed dimension, the store computer 90 checks if the user can input the needed dimension in step 642. If the user cannot, the setup is terminated and the user can try to setup a new product. If the user can determine the dimension, the user enters the dimension in step 644.

Next, in step 646, a dimension is associated with the UPC code. Then, in step 650 the store computer 90 sends a signal to the hand-held device to indicate that the user should proceed with the setup.

Next, in step 660 the user activates the controller 55 with the hand-held device. In an embodiment, an optical setup sensor is mounted on the pusher assembly and is connected to the controller 55. Preferably, the setup sensor is recessed in the pusher 25 but could be mounted in other locations such as on the top or the side of the pusher 25. The hand-held device will be configured to transmit a signal to the setup sensor. The act of transmitting the setup signal to the setup sensor will cause the controller 55 to awake from a dormant state.

Then in step 670, the controller 55, in response to the setup signal, will send data indicating that the controller 55 is being setup to the store computer 90. The data will include the unique serial number of the controller 55. The data may also include a generic setup code or a setup code corresponding to the hand-held scanner and can include a pusher code representative of the position of the pusher 25. In the event that multiple hand-held devices are being utilized at the same time, it may be beneficial to provide a setup code associated with a particular hand-held device.

Next, in step 680, the store computer 90 will receive the data from the controller 55. If the data includes the pusher code, the store computer 90 can calculate the amount of product in the facing at this time. In step 685, the store computer 90 sends a signal to the hand-held device indicating that the controller 55 has been setup and associated with the UPC code of a particular product. In addition, if the position of the pusher 25 was originally included, the store computer 90 can also provide a calculation of the current quantity of product in the facing that was just set up. In addition, the store computer 90 requests that the user verify that the setup information is correct.

Finally, in step 690, the user indicates the information correct. Upon verification, the setup for the controller 55 is complete. To change the product associated with the controller 55, the process can be repeated.

Figure 8:
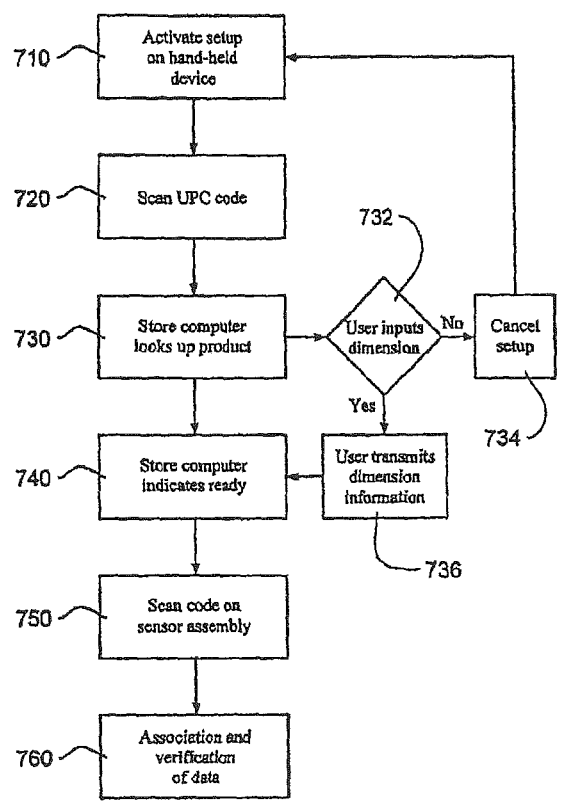
FIG. 8 illustrates a flow chart demonstrating an alternative method of updating the association of a particular product with a particular shelf location.

FIG. 8 illustrates an alternative method of associating a controller with a product. In step 710, a hand-held device is activated to indicate that the user is about to setup controller 55. The activation includes the transmission of a signal to a store computer 90.

In step 720, the hand-held device is used to scan the UPC code of the product and transmit the information to the store computer 90. Next, in step 730, the store computer 90 looks to see if a product dimension is listed for that scanned UPC code. In the event that no dimension is associated with the UPC code, the computer, in step 732, transmits a signal to the hand-held device requesting the user to input the appropriate product dimension.

If the user does not know the product dimension or cannot measure the dimension, the user can cancel the setup and start over with a new product in step 734.

If the user does know the dimension or is able to measure the dimension, the user then enters the dimension and transmits the information to the store computer 90 in step 736. After the product dimension is determined, in step 740, the store computer 90 sends a signal to the hand held device indicating that the user should proceed.

Next, in step 750, the user scans the serial number of the controller 55. Preferably, the serial number of the controller 55 is printed in a black/white code on a sticker mounted to the sensor assembly 30. After scanning the serial number, the hand held device transmits the serial number to the store computer 90.

Then, in step 760, the store computer 90 associates the UPC code of the product with the serial number of the controller 55. The store computer 90 then signals the hand held device that the setup for the device is complete. To avoid potential communication problems during setup, all communications between the hand-held device and the store computer 90 can include a code representing the hand-held device.

In an alternative embodiment, the method of associating a product with a controller 55 could be done without sending a signal to the store computer 90. In this embodiment, the data would be uploaded from the hand-held device once the user had associated the various controllers with the various products.

As can be appreciated, numerous methods of product association with a controller 55 are possible, thus the above methods are illustrative.

A system for determining the location of the pusher with an indicia strip and sensor has been described. Numerous additional methods exist for measuring the distance between the front or rear of a shelf and the pusher or the final product in a facing of products. Based on this distance, and understanding the dimension of the products in the facing, a simple calculation can be performed to determine the number of products in the facing. This calculation can be performed by a microprocessor, store computer, controller or some other processing device which has received the information regarding the distance between the shelf front and the last product in a facing. Moreover, the pusher assembly has been described to include a spring. However, some other biasing method, such as gravity or magnetism, would also work to move the pusher and the product forward.

Figure 9:
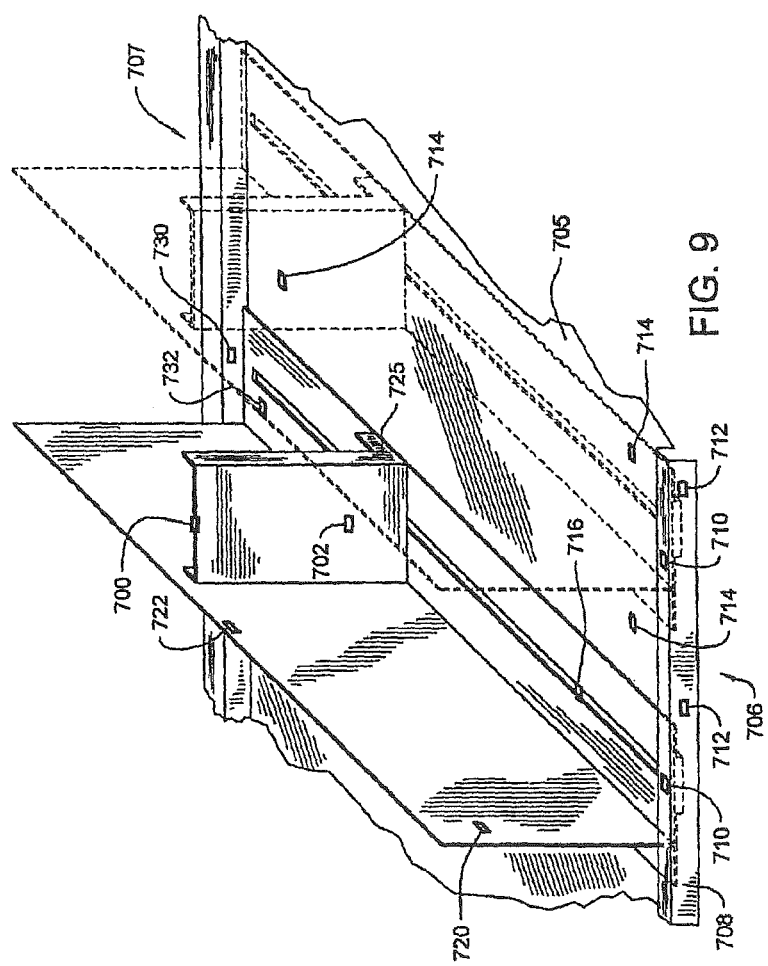
FIG. 9 illustrates an isometric view of an alternative embodiment of the present invention.

In an embodiment of the present invention, as illustrated in FIG. 9, the use of transmitted light or other signal, such as a radio frequency signal, that is passed between a position near the back of the facing of products and a stationary position can be used to measure the distance between the front of the shelf and the pusher. In one embodiment, a transmitter 700 or 702 is incorporated into a pusher 725. The transmitter generates a light or other signal that can be transmitted on command, periodically or continuously. A light emitting diode (LED), radio frequency or ultrasonic generator or other signal generation device can be used to generate the light or signal.

A corresponding receiver is incorporated into a location that is stationary in relation to the pusher 725. The receiver 712 can be incorporated into a front rail or another location at or near the front of the shelf, a receiver 730 can be incorporated into a rear rail or other location at or near the rear of the shelf, it also can be incorporated into the floor of the shelf, the track of the pusher, the roof of the shelf or the divider wall. The receiver detects the signal that is sent from the transmitter. For example, a LED may radiate light having a particular intensity. A phototransistor acting as a receiver detects the light signals being emitted from the LED. The sensitivity of the phototransistor and the intensity of the LED may be adjusted by the microprocessor in order to adjust the overall sensitivity of the optical components. In an embodiment, the adjustment can be done remotely. Thus, the transmitter can communicate in a wireless fashion with the receiver through RF, IR or other known means such as magnetic fields, electrical fields, sound waves and the like.

The transmitter and receiver may be in communication with a controller that tracks the time of sending and receiving. This data can be provided to a processing device such as a microprocessor or a store computer, thus in this embodiment the pusher code would include the time interval between sending and receiving. Information regarding the time at which the signal was sent and the time at which it was received may be utilized by a processing device to determine the time between the transmission and the receipt of the signal. Based on this length of time, the processing device can calculate the distance between the transmitter and the receiver. Knowing the dimensions of the shelf, the pusher system and the components thereof, this distance can then be translated into the distance between the front side 6 of the shelf and the face of the pusher 25 that is biased against the back of the facing of products. Such a translation is well known and within the knowledge of one of ordinary skill. If the relevant dimension of the products in the facing is known, the processing device can then calculate the number of products in the facing based on the known dimension of the products.

In an alternative embodiment, the transmitter and the receiver switch locations. The transmitter can be placed at or near the front or the rear of the shelf or other relatively stationary position and the receiver can be placed on or near the pusher. In an alternative embodiment, the transmitter and the receiver can be incorporated into the same device which merely bounces a signal off a stationary position. For example, a reflector can be placed on the pusher and a transmitter/receiver using a laser, or some other light source, can determine the distance between the reflector and the transmitter/receiver based on the time of travel. Examples of possible transmitter/receivers include, but are not limited to, optical displacement measurement sensors and reflective laser sensors. As can be appreciated, if a transmitter and a receiver are used to determine distance, it is preferable that the location of either the part that is stationary be located near the front side or the rear side of the shelf so as to make the distance calculation simpler and to avoid problems with symmetric distances on both sides of the stationary unit mounted to the shelf. For example, mounting a transmitter halfway between the front and rear of the shelf would make determining the location of the pusher more complicated because there would be two possible locations for a given distance.

In an embodiment, depicted in FIG. 9, a transmitter (700, 702) is incorporated into a pusher 725. The transmitter is a light emitting diode and is located at any location on the pusher 725 that allows the transmitter to function. The transmitter can be located at the top of the pusher 725 at 700 or at the base of the pusher 725 at 702 or at other locations on the pusher 725.

A receiver is located at a position that is fixed in relation to the movement of the pusher 725. The receiver may be a phototransistor and can be located on the front of the shelf 705, such as receiver 710 or on a front rail 708 connected to the front of the shelf, such as receiver 712. The receiver can further be located on the floor of the shelf at any number of positions as represented by 714, on the floor of the pusher track at 716 or at a location above the shelf 705 such as on another shelf (not shown) mounted above the shelf 705. The receiver can be located on the divider wall at 720 or 722 or other location on the divider wall. The receiver also can be located near the rear side 707 at 730 or at 732. Preferably, the receiver will be mounted near the either front side 706 or the rear side 707 so as to make distance calculation simpler.

The receiver and the transmitter can also switch locations. The pusher can incorporate a receiver, and a transmitter can be incorporated at any of the locations 710-732 as well as in any other location that is fixed in relation to the movement of the pusher. Preferably, however, the location of the transmitter will be near either the front side 706 or the rear side 707 so as to make calculation of distance simpler.

In an embodiment, the transmitter is located at 700 and the receiver is located at 710. When the pusher moves backward or forward on the shelf, the transmitter 700, mounted on the pusher 725, moves with the pusher 725. When the pusher 725 is located near the back of the shelf, a signal will take a certain amount of time to travel from the transmitter 700 to the receiver 710. When the pusher 725 is located closer to the front of the shelf, a signal will take less time to travel from the transmitter 700 to the receiver 710. Data regarding the transmission and receipt of the signal (i.e. the pusher code) is sent to a microprocessor or other processing device. The processing device determines the amount of time it takes the signal to travel from the transmitter to the receiver. Knowing the signal travel speed, the processing device determines the distance between the transmitter and the receiver.

With an understanding of the location of the transmitter in relation to the products and an understanding of the location of the receiver in relation to the front or back of the shelf, the processing device will be able to determine the distance between the pusher and the front of the shelf. Using the dimension of the products, the processing device can then determine the number of products in the facing. The light emitting diode or other transmitter can be set to function periodically, continuously or on command from a remote location.

Alternatively, the processing device may control both the LED and phototransistor. The processing device may record a time T1 in which the microprocessor issues a command to generate a pulse from the LED and a time T2 in which the light signal is detected by the phototransistor. Both of these times T1 and T2 may be stored in memory and used to determine the number of product in the facing, using the above described relationships.

In an alternative sensing environment, a capacitive proximity sensor may be utilized to measure the distance between the front of the shelf and the pusher or the final product in a facing of products. The capacitive proximity sensor detects the pusher which acts as a target for the capacitive proximity sensor. The capacitive proximity sensor generates an electrostatic field which is directed at the target. As the distance of the pusher changes with respect to the location of the capacitive proximity sensor, the capacitive proximity sensor reacts to the changes in capacitance caused by the movement of the pusher in relation to the sensor.

Additional sensing environments may also include the use of magnetic proximity sensor or an inductive proximity sensor. In both sensing environments, the proximity sensors may be utilized to measure the distance between the front of the shelf and the pusher or the final product in a facing of product.

An inductive proximity sensor is useful in detection of metal targets as the inductive proximity sensor uses an induced field to sense the target object. In an embodiment with an inductive proximity sensor, the proximity of a pusher in relation to the inductive proximity sensor can be detected as the distance of the pusher changes with respect to the location of the inductive proximity sensor. Similarly, a magnetic proximity sensor based on the Hall Effect principle may also be utilized to sense the location of the pusher.

In an embodiment, a proximity sensor could be mounted near the rear side 707, the proximity sensor configured to sense the distance to the pusher 25. A processing device, such as the store computer or microprocessor, could determine the distance between the pusher 725 and the front side 706 and use that distance to determine how much product was left on the shelf.

In an alternative embodiment, a Radio Frequency Identifying Transponder ("RFIT") having a unique identity code is mounted to the pusher 725. A sensor assembly including a transmitter/receiver can be mounted on the rear side 707 of the shelf 705. The transmitter/receiver, when activated, transmits an activation signal that activates the RFIT. The RFIT, upon activation, transmits a responsive signal that includes the unique identifying code. The transmitter/receiver receives the responsive signal from the RFIT. The sensor assembly is equipped with a timing device and measures the time between the initial transmission of the signal from the transmitter/receiver until the receipt of the responsive signal from the RFIT. In an embodiment, a controller can initiate the transmission of the signal and record the receipt of the responsive signal into memory. The controller is also equipped with a timing device to measure the delay. The delay in time can be used to calculate the distance between the transmitter/receiver and the RFIT. In an embodiment, the controller can calculate the distance and provide a pusher code that includes the distance. Alternatively, the pusher code will include data regarding the delay and the pusher code will be forwarded to a processing device for distance calculation. As discussed above, the distance between the pusher 25 and the transmitter/receiver can be used to calculate the amount of product remaining in the shelf.

An advantage of using an RFIT in combination with a transmitter/receiver is that it can be easily retro-fitted to existing systems. As the RFIT does not require internal power, this embodiment eliminates the need to provide a powered device on the pusher 725. The transmitter/receiver, however, is powered. Preferably, the transmitter/receiver transmits a focused or low powered signal so that only the RFIT associated with the transmitter/receiver is activated. Alternatively, the transmitter/receiver ignores responsive signals from RFIT's that do not include the proper unique identifying code.

In another alternative embodiment, a low powered, one-chip radar sensor may be used to determine the distance between the radar sensor and the pusher 725. Preferably the radar sensor may be mounted near the rear side 707 so as to make distance determinations less complex.

In an alternative embodiment of the present invention, a device for measuring the tension of the spring used for pushing the products can be used. The tension on the spring will, at least in part, be dependent upon the number of products in front of the pusher. As more products are placed in front of the pusher, the spring either further compresses or expands. In the case of a coil spring, as more products are placed in front of the pusher, the two ends of the spring move further apart and the spring further uncoils. As the spring uncoils, the amount of tension or pressure within the remaining coil of the spring increases. By measuring the tension of the spring, the length of the spring that is uncoiled can be determined.

The spring tension measuring device can incorporate a processing device or can transmit the information it measures to a microprocessor or other processing device. With a previous understanding of how the tension on the spring relates to the length of the spring, the processing device can determine the amount or length of spring that is uncoiled. For example, if the coil spring has a fixed spring constant, "k", then the formula $F=-kX$ can be used to calculate the length of spring that is uncoiled. This information can be used to determine the distance between the front of the shelf and the pusher. Understanding the dimensions of the products, the computing device can then determine the number of products in a facing.

A spring tension measuring device may include a force measuring unit that includes, but is not limited to, strain gauges, tensiometers, torque transducers or some other force measuring device to determine the tension exerted on the coil spring. The force measuring unit is preferably connected to a controller, where the controller is configured to convert the data from the force measuring unit into a force value. The controller could then transmit the force value to a processing device. In this embodiment, the pusher code would include a force value. Numerous other methods of measuring spring tension will be apparent to one of skill in the art and are within the scope of the invention.

In an alternative embodiment of the present invention, the number of products remaining in a particular facing is determined in part through the use of one or more transmitter(s) and receiver(s) placed on opposite lateral sides of the products. In one embodiment the transmitters or receivers may be placed on divider walls that separate facings of products. In one embodiment, a series of transmitters is incorporated into or onto the base of a divider wall. A series of receivers in incorporated into or onto the other side of the divider wall. In this manner, when products are on a shelf, those products that are being pushed are between the transmitters on one divider wall and the receivers on another divider wall.

Periodically, when prompted, or continuously, the transmitter sends a signal. If there is no product between the transmitter and the receiver, the receiver will receive the signal. If there is a product between the transmitter and the receiver, the product will block the signal, and the signal will not be received by the receiver.

A microprocessor receives the information regarding whether or not the various receivers received a signal. Based on this information, the microprocessor can determine the approximate distance between the front of the facing and the last product in the facing. With an understanding of the dimension of the products, the information regarding receipt and non-receipt of signals can be translated into an understanding of the approximate number of products in the particular facing. In an embodiment, one transmitter and one receiver is used to indicate that a particular shelf is running low on the associated product. In this embodiment, the location of the transmitter/receiver is preferably closer to the front side 706 then the rear side 707. Preferably a controller with a unique identifying code is associated with the transmitter and receiver so that the unique identifying code can be associated with the product.

The transmitter and the receiver can be incorporated into the same device which attempts to bounce a signal off a predetermined target affixed to a particular location. If the signal bounces as expected, it indicates that there is no product between the transmitter and the target location. If the signal does not bounce as expected, a product exists between the transmitter and the target location.

Figure 10:
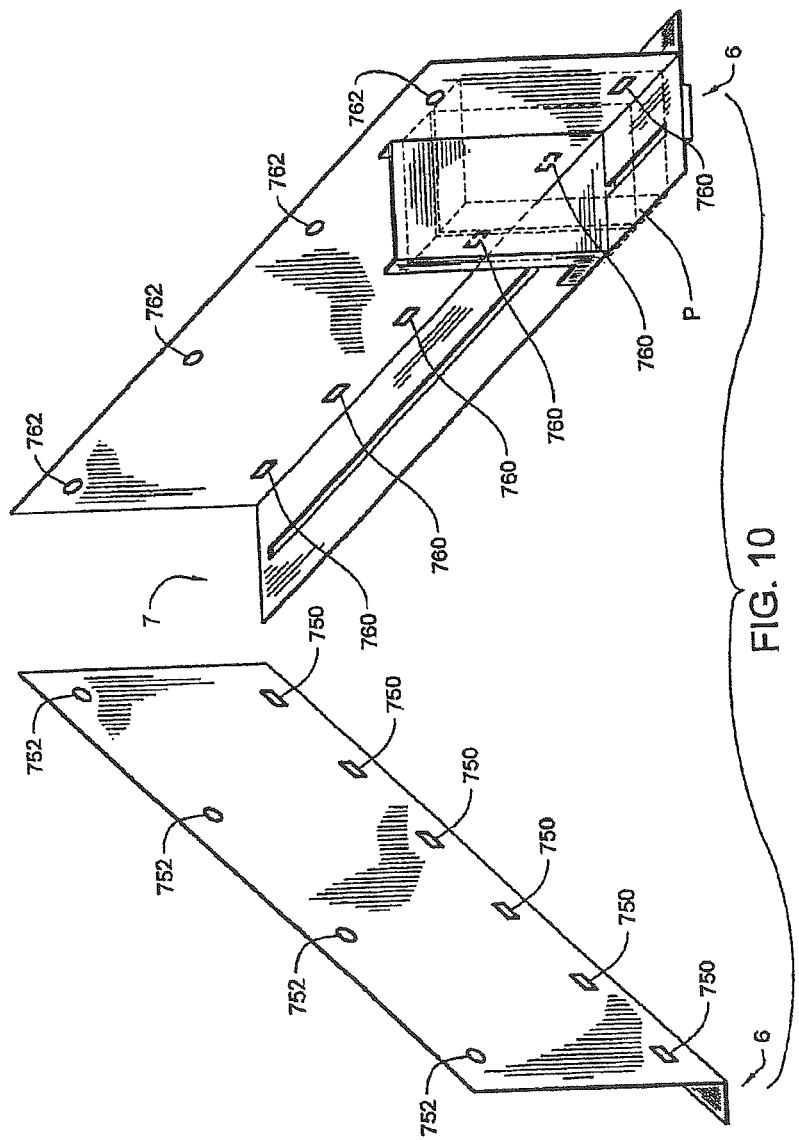
FIG. 10 illustrates a partially exploded view of an alternative embodiment of the present invention.

FIG. 10 depicts a partially exploded view of an alternative embodiment of a shelf and pusher assembly, the shelf having divider walls. As depicted in FIG. 10, several transmitters 750 are placed on the left side of the divider wall toward the bottom. The transmitters also can be placed higher on the divider wall as shown at 752. Corresponding receivers 760 are placed on the right side of the divider wall toward the bottom. These receivers also can be placed higher on the divider wall as shown at 762. The receivers and the transmitters are positioned such that an unobstructed signal can be sent from a transmitter and received by a corresponding receiver. When product, such as product P, is positioned in front of a pusher, it can obstruct the signal sent from the transmitter. As shown in FIG. 10, product P (shown in dashed lines) will prevent the signal from reaching the receiver 760 nearest the front side 6 of the shelf. The receivers that are positioned further back than product P will receive the signals sent to them. A microprocessor receives the information regarding whether each of the receivers 760 received signals. Based on this information, the microprocessor can determine the distance between the front of the shelf and the last product in a particular facing. With an understanding of the width of each product, the microprocessor can determine the number of products in a particular facing.

In one embodiment of the present invention, the pusher contacts a variety of sensing devices as it moves backward or forward on a shelf. Sensing devices are placed on a surface below, above, or on the sides of a pusher. These sensing devices include devices that are mechanical, electrical and eletromechanical, optical and magnetic, and can include spring loaded latches, electrical contacts, light emitting diodes or metal wires or other sensors such as linear position sensors.

As the pusher moves backward or forward on a shelf, it interacts with the sensing devices. The pusher may interact with the devices through the mechanical contact of the pusher and the devices. The pusher may also be equipped with a separate sensing device that interacts with the stationary sensing devices as the pusher moves backward or forward.

Information regarding the interaction between the pusher and the sensing devices (i.e. the pusher code) is sent to a processing device. Based on the determination of the devices with which the pusher interacted, the processing device can determine the approximate position of the pusher in relation to the front of the shelf. With an understanding of product data, such as the dimension of the product, a processing device can then determine the approximate number of products that are in the particular facing related to the pusher and the sensing devices.

Figure 11:
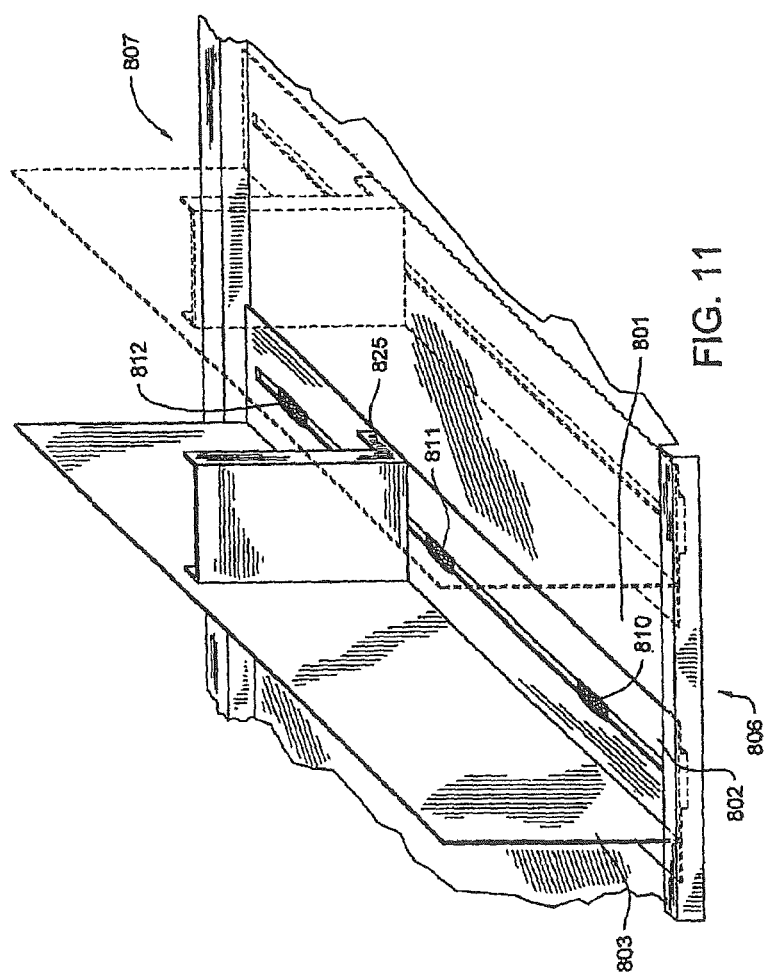
FIG. 11 illustrate an isometric view of an alternative embodiment of the present invention.

In an embodiment, as depicted in FIG. 11, sensing devices 810, 811 and 812 are incorporated into the base of the track on which the products rest. When products are resting directly over the switches, the sensing devices are closed. As products are removed and the pusher 825 travels forward, the sensing devices that are to the rear of the pusher 825 are released and open. A controller determines which sensing devices are open or closed. Based on this information, a processing device can determine the approximate distance between the pusher 825 and the front side 806 of the shelf. Knowing the dimension of the products, the processing device can determine the number of products in a particular facing.

Figure 12:
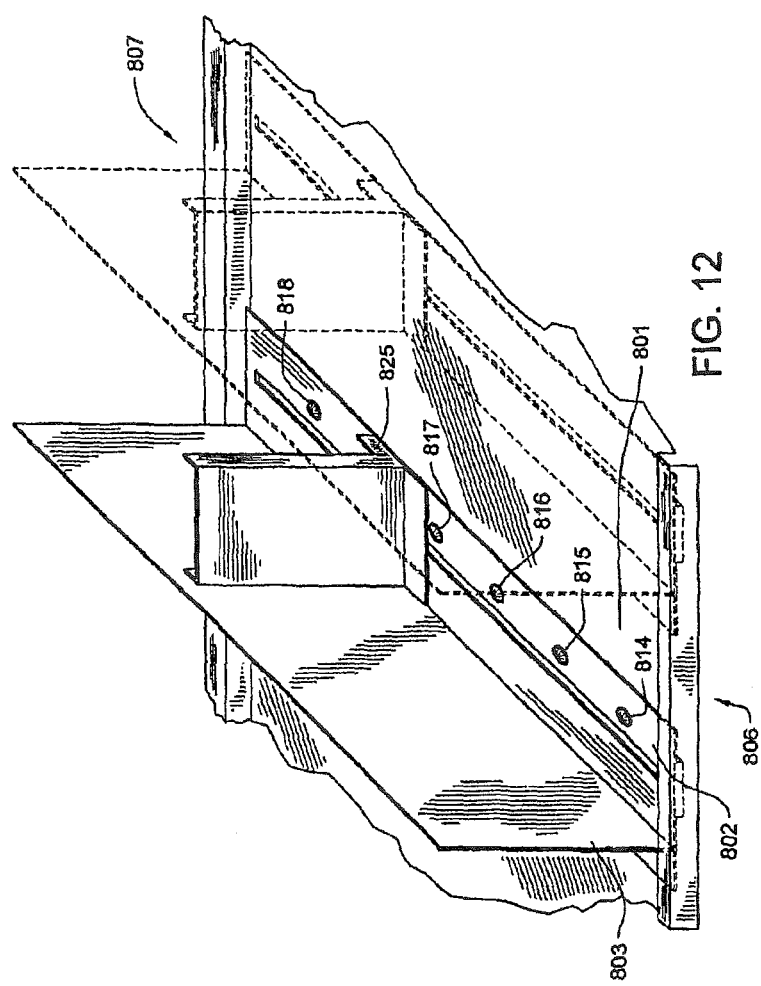
FIG. 12 illustrates an isometric view of another alternative embodiment of the present invention.

In an alternative embodiment, as depicted in FIG. 12, sensing devices 814, 815, 816, 817, and 818 are placed on the pusher track 802. A separate contact (not shown) is placed on the bottom of the pusher 825. The contact on the pusher 825 is configured such that when the contact on the pusher 825 is adjacent to a sensing device mounted on the pusher track 802, the sensing device on the pusher track 802 is activated. When the sensing device is activated, a signal is sent to a processing device, the signal providing information as to which sensing devices has been activated. Based on this information, the processing devise can determine the approximate distance of the pusher from the front of the shelf Knowing additional data about the products, such as the product dimensions, the processing device can determine the number of products in a particular facing.

For example, while contact 816 is activated, the processing device can determine that the amount product is equal to the amount of product that can fit in the space between the contact 816 and the front side 806 of the shelf 801. In the event that the contact 816 is activated and then deactivated, the processing device can determine that the pusher 825 is between contacts 815 and 817. This, therefore, provides an approximate position of the pusher 825 and the approximate position can be used to determine the approximate quantity of product remaining on the shelf In an embodiment, the contacts can be spaced closer together near the front side 806 of the shelf 801 so that more accurate measurements can be taken as the amount of product on the shelf decreases. Alternatively, enough contacts can be used to provide a relatively precise location of the pusher 825.

Figure 13:
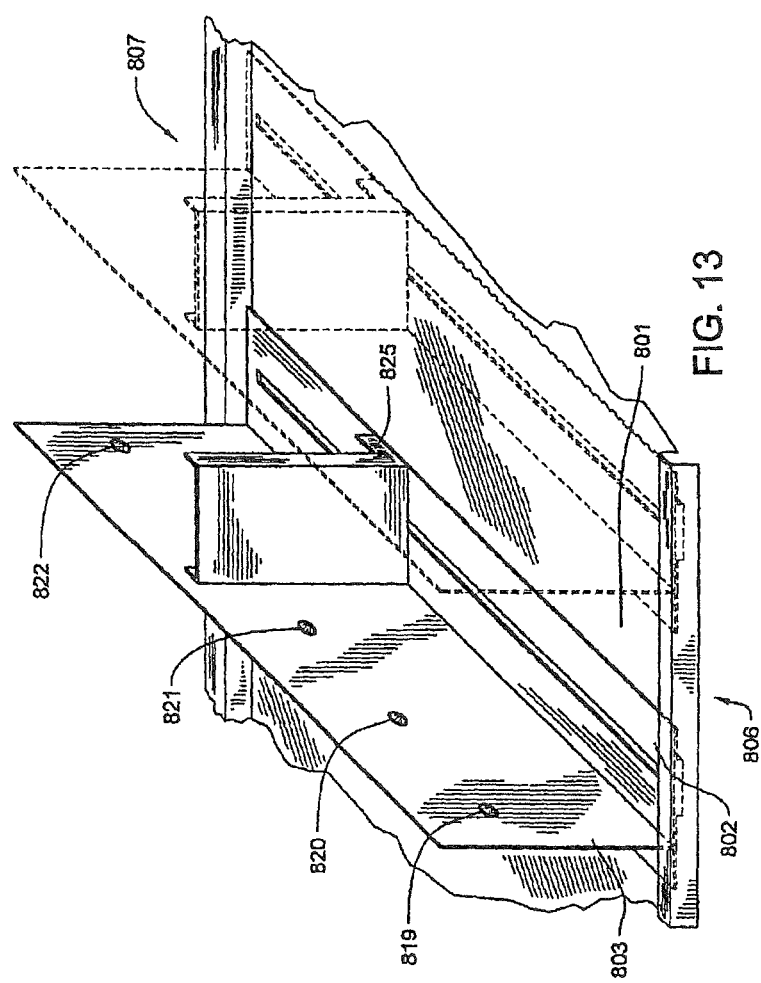
FIG. 13 illustrates an isometric view of yet another alternative embodiment of the present invention.

In an alternative embodiment, as depicted in FIG. 13, the contacts 819, 820, 821 and 822 can be mounted to the divider wall 803. As with contacts 814-818, the activation of one of the contacts 819-822 indicates the location or the approximate location of the pusher 825. Locating the contacts along the divider wall 803 can help prevent problems with accidental activation of the contacts by product on the shelf. As with the contacts mounted in the pusher track 802, the distance between contacts 819-822 can be non-uniform so that greater precision is provided as the shelf becomes less full.

Figure 14:
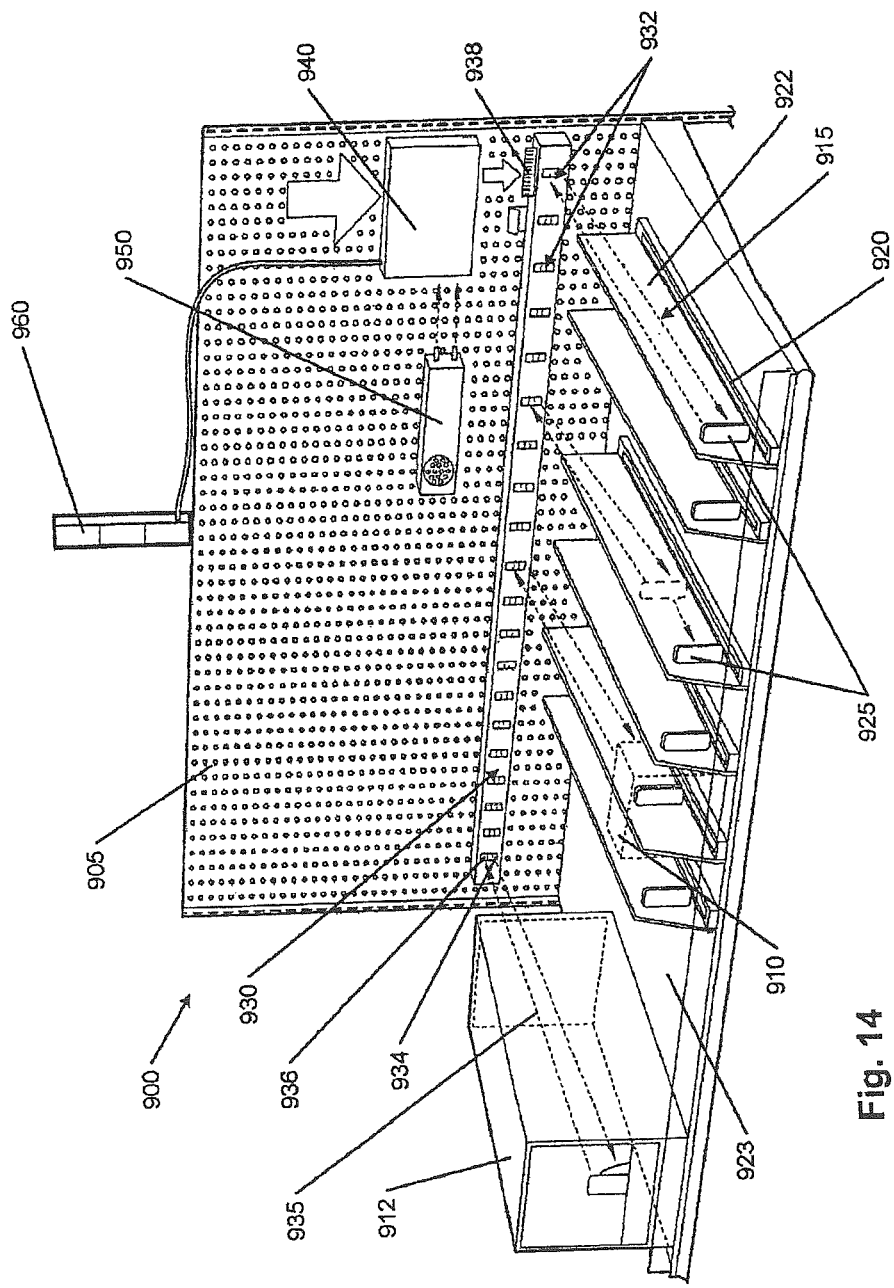
FIG. 14 illustrates an isometric view of yet another alternative embodiment of the present invention.

In an alternative embodiment similar to the embodiments described above, a shelf management system 900 for detecting and communicating the position of a pusher assembly on a shelf is depicted in FIG. 14. The shelf management system 900 may include a pusher assembly 915, a light assembly, and a control module 940. The pusher assembly 915, light assembly, and control module 940 may all be secured to a gondola wall 905 or similar structure that holds a product 910. The product 910 may be aligned or arranged along the pusher assembly 915. Additionally, the product 910 may be contained in separate product container box 912 as illustrated in FIG. 14.

As depicted, the pusher assembly 915 may include a biasing mechanism such as a coil spring. The pusher assembly 915 may include an integral divider wall 922 and a floor section 920 on one or both sides of the divider wall 922. The coil spring may be operatively connected or associated with a pusher 925 and can be used to urge the pusher 925, and the associated product 910, toward the front side of the shelf. The pusher assembly 915 may be modular and can include a divider wall or an additional floor section that fits or mates in place. Additionally, since the present invention has no connection to the pusher assembly 915, the present invention may work with any product shelving system.

The light assembly may include a light channel 930 and a light transceiver 932. The light transceiver 932 may be one of many light transceivers located on the light channel 930. The light transceiver 932 may be located behind the product 910 to be measured on a shelf. The light transceiver 932 may consist of a light transmitter 934 and a light sensor 936. The light transmitter 934 is configured to send a light signal 935 towards the pusher 925, while the light sensor 936 is configured to receive the light signal 935 from the pusher 925. In an alternative embodiment, the light transmitter 934 and the light sensor 936 may be the same component as part of the light transceiver 932. The spacing of the light transmitters 934 and the light sensors 936 on the light channel 930 may ensure that at least one light transmitter 934 and one light sensor 936 is focused on or sees every pusher 925. Additionally, the light channel 930 may include an electronic connection 938.

Without departing from this invention, the light assembly may utilize one of many different types of light, with one type of light being utilized is in the "infrared spectrum." For example, the light assembly could include an infrared (IR) transceiver, wherein the IR transceiver may consist of an IR transmitter and an IR sensor.

As illustrated in FIG. 14, the shelf management system 900 may also include a control module 940. The control module 940 may align with the electronic connection 938 on the light channel 930 and lock into place. The control module 940 may include a microcomputer. Additionally, the control module 930 may have internal wireless capability without departing from the invention.

As illustrated in FIG. 14, the product 910 may be pushed forward by the spring-urged pusher 925 or pusher paddle in the shelf management system 900. As the product 910 is pushed forward, a light signal 935 is transmitted from the light transmitter 934 found on the light channel 930. The light signal 935 may then reflect off the back of the pusher paddle 925 or the product 910 and then back to the light sensors 936. This information may then be relayed to the control module 940, thereby measuring the distance to the pusher 925 or the product 910. The light transceiver 932 may be controlled by the control module 940 and microcomputer connected to the light transceiver 932. The process of sending the light signal 935 to and from the pusher paddle 925 or the product 910 may be taken on a continuous or near continuous basis, such as a fraction of a second, or may be taken on a periodic basis such as a second, or 5 seconds.

In an aspect of the invention, the microcomputer in the control module 940 may compare the most current position of the pusher 925 with a previous position of the pusher. The difference in positions of the pusher 925 may result in the microcomputer determining a condition of the shelf management system 900. First, the microcomputer may determine that no activity has occurred since the last reading. Second, the microcomputer may determine that a normal shopping instance has occurred, and if so how many product packages are still being urged by the pusher 925. Third, if more than a predetermined number of product packages have been removed in less than a predetermined amount of time, the microcomputer may determine that a potential theft situation is in progress. Another condition that may be communicated is a low product condition. For example, the microcomputer may determine a low product condition if any pusher location is empty of product packages or less than a predetermined number of product packages are still being urged by the pusher 925.

As illustrated in FIG. 14, without departing from the present invention, the shelf management system may include a local audio box 950. Any of the conditions described above may be communicated by the microcomputer to the local audio box 950 remotely via wired or wireless communication devices to a remote computer, a store public announcement system, a cell phone, a pager, or a remote annunciator. Additionally, without departing from the present invention, the shelf management system may include a light annunciator 960. Any of the conditions described above may be communicated by the microcomputer to the light annunciator 960 remotely via wired or wireless means to a remote computer, a store public announcement system, a cell phone, a pager, or a remote annunciator. An internal wireless capability of the control module 940 may wirelessly transmit signals to/from a remote location to indicate the condition of the shelf management system.

Additionally, for the shelf system 900 illustrated in FIG. 14, the number of products aligned on the shelf could be measured. In such an embodiment, the position of the pusher 925 could be used to determine the amount of product 910 on the shelf without the need to manually count the product. For example, the light transceiver 932 transmits the light signal 935 to the pusher 925 or the product 910. The light signal 935 may then be reflected back to the light transceiver 932 to determine the location of the pusher 925 by measuring and calculating the time to receive the light signal 935 at the light transceiver 932. When one product is removed, for example by a purchaser, the time to receive the light signal 935 back at the light transceiver 932 increases a particular amount. Based on the dimensions of the product 910, specifically the thickness of the product, the control module can calculate how many products have been removed from the shelf by an algorithm of how fast the light signal is traveling back to the light transceiver 932. The control module also can calculate the number of products that remain on the shelf in front of the pusher using in part information regarding the shelf dimensions, including the shelf depth. Additionally, the system can be used in an inventory management mode to help the retailer determine the number of products for inventory purposes and restocking in low-stock or no-stock situations. Without departing from this invention, a user may input the thickness of the product 910 as a setting into the control module 940 during the set-up or loading of the product 910 on the shelf. Additionally, without departing from this invention, the thickness of the product 910 may be determined by the control module 940 after taking a number of different readings from the system, such as a smart or learning system for determining the thickness of the product 910.

The thickness of the product also may be determined by the system when products are initially stocked in the system. The light transceiver 932 transmits the light signal 935 to the pusher 925 when no product is on the shelf. The light signal 935 may then be reflected back to the light transceiver 932 to determine the location of the pusher 925 by measuring and calculating the time to receive the light signal 935 at the light transceiver 932. When one product is added to the shelf, for example by an employee, the time to receive the light signal 935 back at the light transceiver 932 decreases a particular amount. Based on this decrease in the amount of time, the control module can calculate the thickness of the product.

In an alternative embodiment similar to the embodiments described above, FIGS. 15*a* and 15*b* illustrate another shelf management system 1000 for detecting and communicating the position of a pusher assembly on a shelf similar to the shelf management system 900 described above and illustrated in FIG. 14. The shelf management system 1000 may include a pusher assembly 1015, a laser assembly, and a control module 1040. The pusher assembly 1015, laser assembly, and control module 1040 may all be secured to a gondola wall 1005 or similar structure that holds a product 1010. The product 1010 may be aligned or arranged along the pusher assembly 1015. Additionally, the product 1010 may be contained in separate product container box 1012 as illustrated in FIG. 15*a*.

The pusher assembly 1015 may include a biasing mechanism such as a sheet coil spring. The pusher assembly 1015 may include an integral divider wall 1022 and a floor section 1020 on one or both sides of the divider wall 1022. The sheet coil spring may be operatively connected to a pusher 1025 and can be used to urge the pusher 1025, and the associated product 1010, toward the front side of the shelf. The pusher assembly 1015 may be modular and can include a divider wall or an additional floor section that fits or mates in place.

The laser assembly may include a rear reflector strip 1030 and a single light transceiver or laser scanner 1032. The laser scanner 1032 may emit or transmit a laser light or output beam 1035. The laser scanner 1032 may include a moving mirror or rotating mirror (not shown) located within or associated with the laser scanner 1032. Without departing from this invention, in place of or in addition to the moving mirror, the laser scanner 1032 may include an integrated circuit mirror technology, such as microelectromechanical systems (MEMS) mirrors used in the Digital Light Projector (DLP) field, wherein an array of tiny microscopic mirrors are used to direct and alter the output beam 1035. The moving mirror may rotate within the laser scanner to alter the output beam 1035 being emitted from the laser scanner 1032. The transmission and angles of the output beam 1035 may also be altered by other various ways. The moving mirror may be controlled by a microcomputer within the control module 1040. The moving mirror may direct the output beam 1035 from the laser scanner 1032 at various angles, thereby creating a swept beam 1037. The swept beam 1037 may be directed along the rear reflector strip. An example of a portion of the swept beam 1037 is illustrated in FIG. 15*b*. The process of transmitting the swept beam 1037 from the laser scanner 1032 to and from the pusher paddle 1025 or the product 1010 may be taken on a continuous or near continuous basis, such as a fraction of a second, a second, or 5 seconds.

Figure 15A:
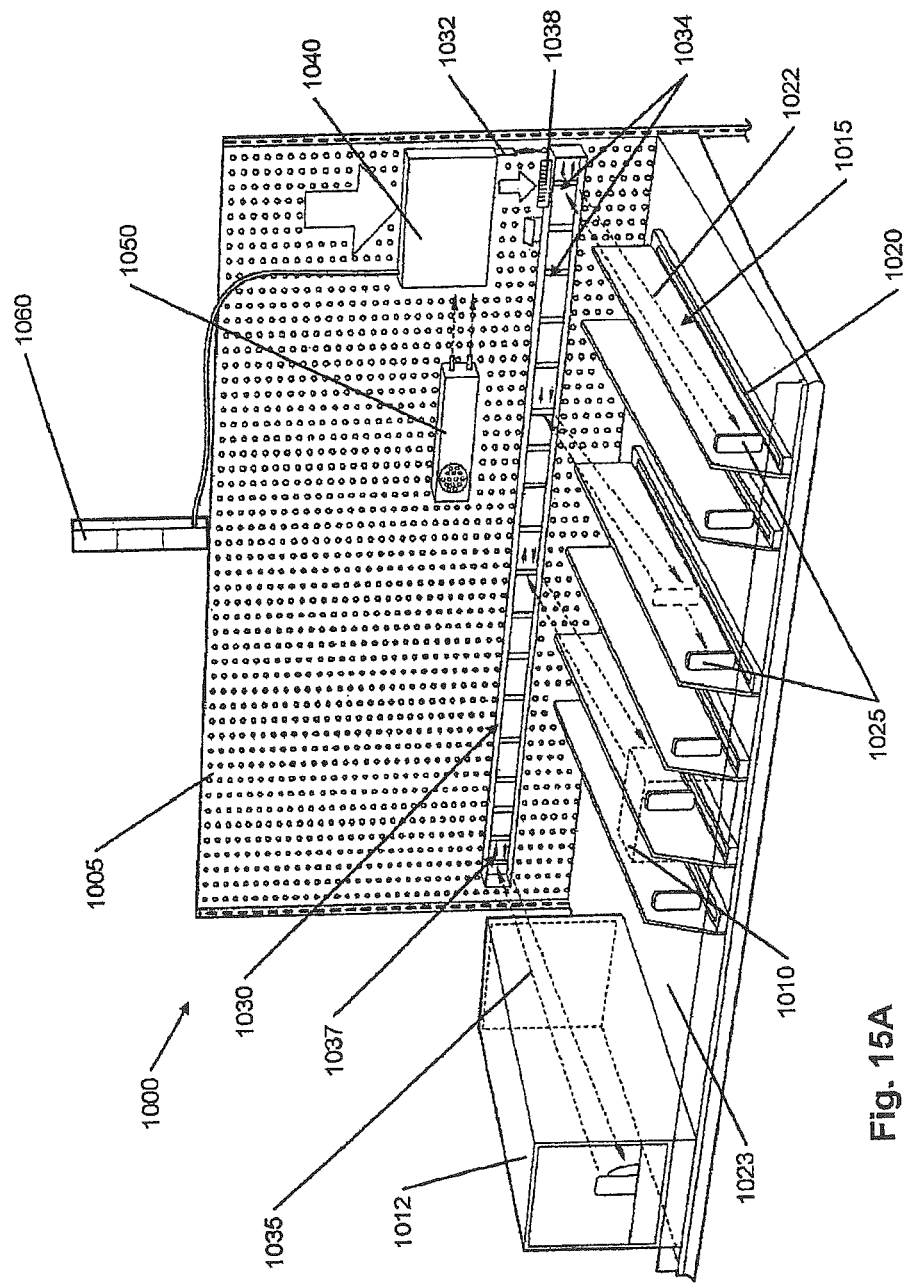
FIG. 15a illustrates an isometric view of yet another alternative embodiment of the present invention.
Figure 15B:
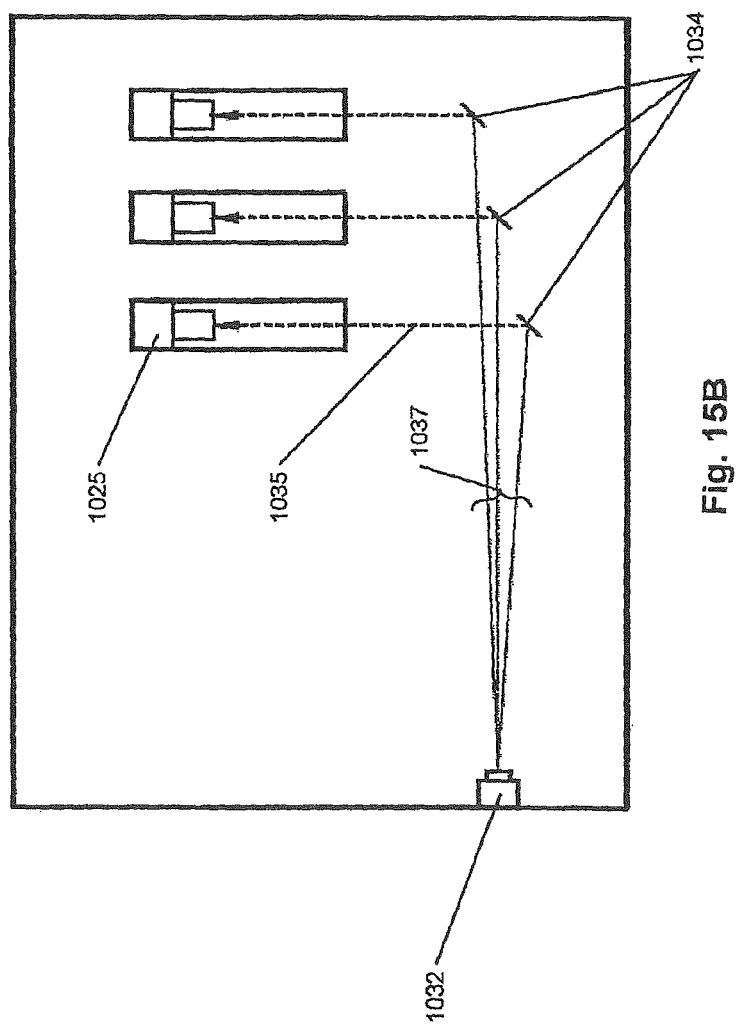

As further illustrated in FIGS. 15*a* and 15*b*, the rear reflector strip 1030 may include piece-wise linear or smooth fixed mirrors 1034. The fixed mirrors 1034 may be positioned along the rear reflector strip 1030. The fixed mirrors 1034 may be along, parallel or near-parallel to the path of the swept beam 1037 such that each individual fixed mirror 1034 intercepts the output beam 1035 along its swept path (as shown in FIG. 15*b*). The fixed mirrors 1034 may also be located along the rear reflector strip 1034 and located behind and essentially perpendicular to the direction of travel of the pushers 1025 in the shelf management system 1000. Additionally, the rear reflector strip 1030 may include an electronic connection 1038.

As illustrated in FIG. 15*a*, the shelf management system 1000 may also include a control module 1040. The control module 1040 may align with the electronic connection 1038 on the rear reflector strip 1030 and lock into place. The control module 1040 may include a microcomputer. Additionally, the control module 1040 may have internal wireless capability without departing from the invention.

As illustrated in FIGS. 15*a* and 15*b*, the product 1010 may be pushed forward by the spring-urged pusher 1025 or pusher paddle in the shelf management system 1000. As the product 1010 is pushed forward, the laser scanner 1032 directs the swept beam 1037 along the rear reflector strip 1030 at one of the fixed mirrors 1034. The fixed mirror 1034 may then redirect the output beam 1035 at a preferred angle (such as a right angle) to the altered path of the output beam 1035 such that the fixed mirror 1034 essentially directs the output beam 1035 to the back of the pusher 1025. The output beam 1035 may then reflect off the back of the pusher 1025 wherein the output beam 1035 then returns back to the laser scanner 1032 for analysis. This information may then be relayed to the control module 1040. The laser scanner 1032 may be configured to measure the distance to the pusher 1025. The laser scanner 1032 may be controlled by the control module 1040 and the microcomputer.

The microcomputer in the control module 1040 may compare the most current position of the pusher 1025 with a previous position. The difference in positions of the pusher 1025 may result in the microcomputer determining a condition of the shelf management system 1000. First, the microcomputer may determine that no activity has occurred since the last reading. Second, the microcomputer may determine that a normal shopping instance has occurred, and if so how many product packages are still being urged by the pusher 1025. Third, if more than a predetermined number of product packages have been removed in less than a predetermined amount of time, the microcomputer may determine that a potential theft situation is in progress. Another condition that may be communicated is a low product condition. For example, the microcomputer may determine a low product condition if any pusher location is empty of product packages or less than a predetermined number of product packages are still being urged by the pusher 1025.

As illustrated in FIGS. 15*a* and 15*b*, without departing from the present invention, the shelf management system 1000 may include a local audio annunciator 1050. Any of the conditions described above may be communicated by the microcomputer via wired or wireless means to various communication modules, such as: a local or remote audio annunciator 1050, a local or remote light annunciator 1060, a remote computer, a store public announcement system, a cell phone, a pager, or an other remote annuciator. An internal wireless capability of the control module 1040 may wirelessly transmit signals to/from a remote location to indicate the condition of the shelf management system.

Figure 16A:
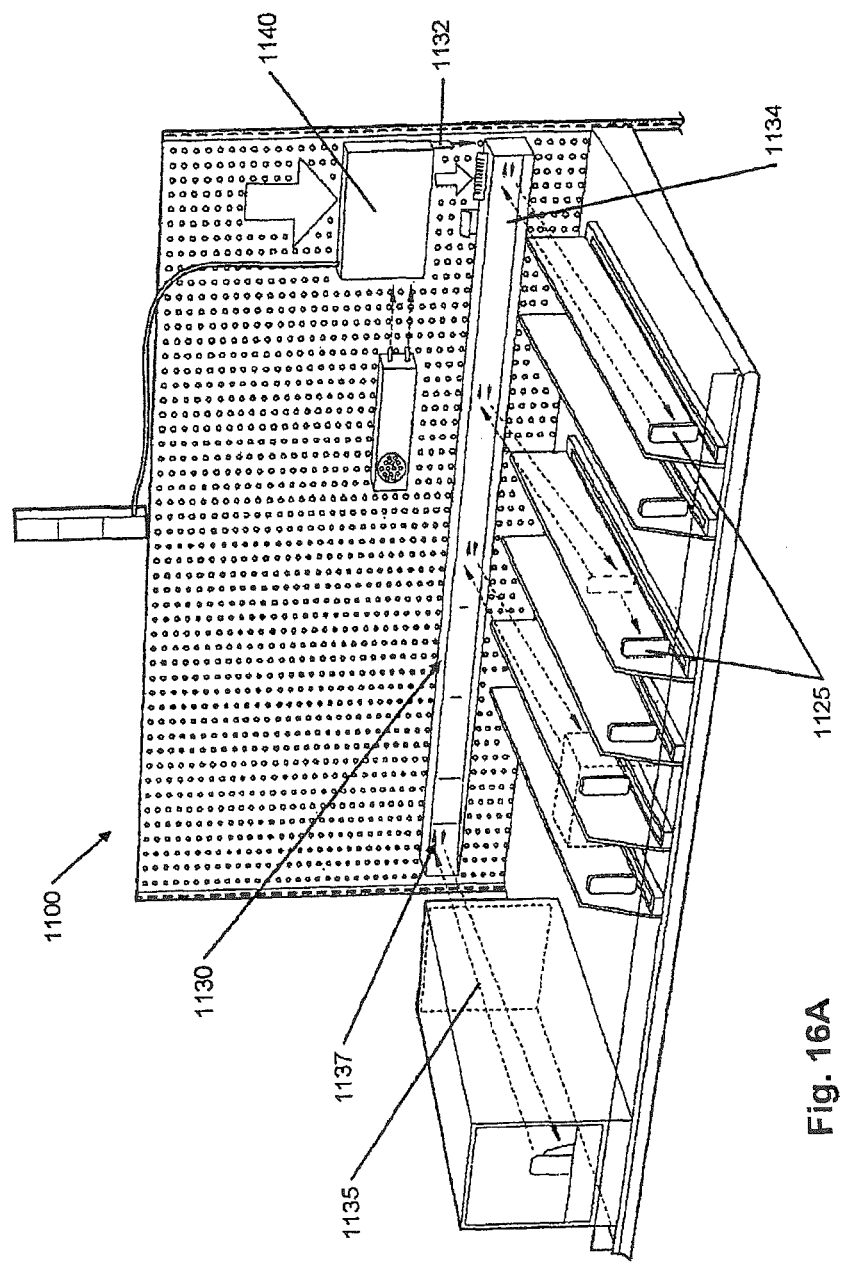
FIG. 16a illustrates an isometric view of yet another alternative embodiment of the present invention.
Figure 16B:
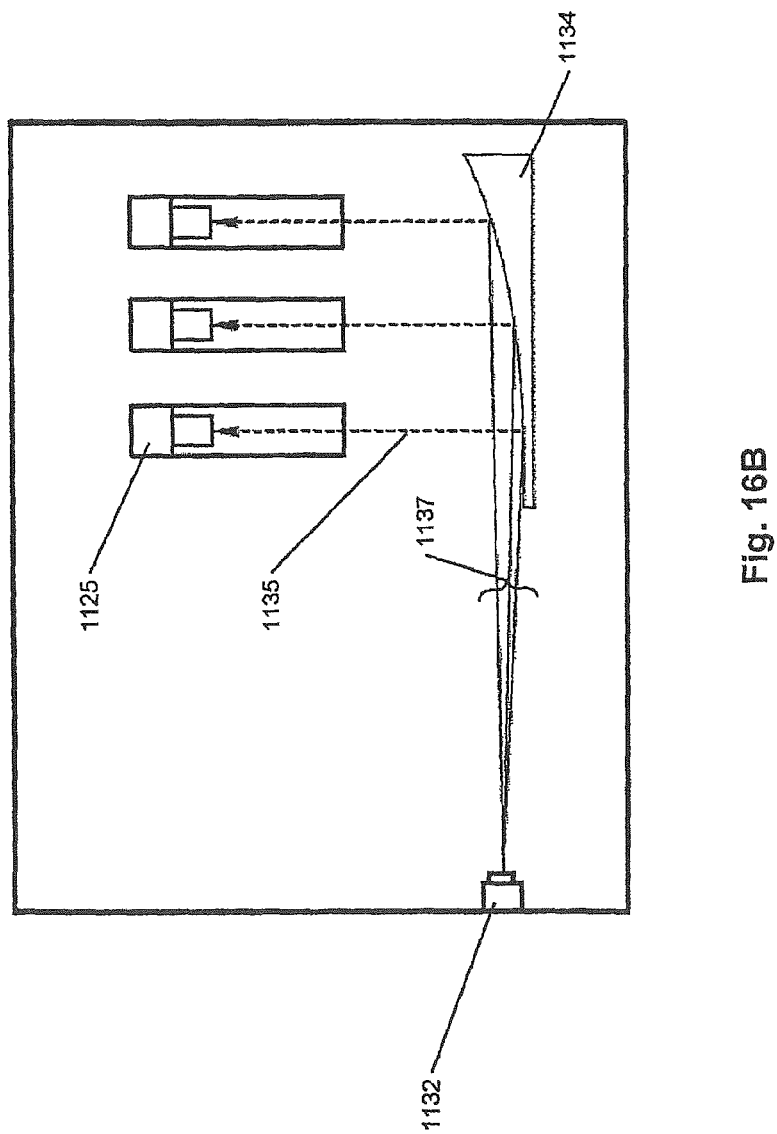

In another embodiment similar to the embodiments described above, as illustrated in in FIGS. 16*a* and 16*b*, a shelf management system 1100 may include one fixed mirror 1134 located along the length of the rear reflector strip 1130. In this embodiment, and as illustrated in FIGS. 16*a* and 16*b*, the shape of the fixed mirror 1134 may be curved and may be approximately a parabola shape. Since the laser scanner 1132, the moving mirror, and ultimately the swept beam 1137, are controlled by the microcomputer or control module 1140, the microcomputer is capable of determining the position of each pusher 1125 on the shelf by knowing and using the position of the moving mirror at any point in time during the sweeping motion and analyzing the output beam 1135. Additionally, the process of transmitting the swept beam 1137 from the laser scanner 1132 to and from the pusher paddle 1125 may be taken on a continuous or near continuous basis, such as a fraction of a second, or on a periodic bases such as a second, or every 5 seconds.

Additionally, the microcomputer may execute an algorithm which determines that multiple readings represent only one wide pusher 1125. This might be the case if readings are taken every 1 inch along the length of an example 48 inch-long shelf. A product position 1110 in front of a pusher 1125 on the shelf may be six inches wide. Therefore, in this example, five or six readings may be taken across the back of the pusher 1125 and product as the mirror sweeps and directs the swept beam 1137. If one of the six-inch wide products is removed from the pusher 1125, the microcomputer detects that at least five or six sensing positions essentially simultaneously changed an equal amount. The microcomputer may then be able to determine that all five or six readings represent one product width. This can be a learned aspect of the shelf management system 1100 which can change as different products are merchandised on the shelf over time.

Figure 17B:
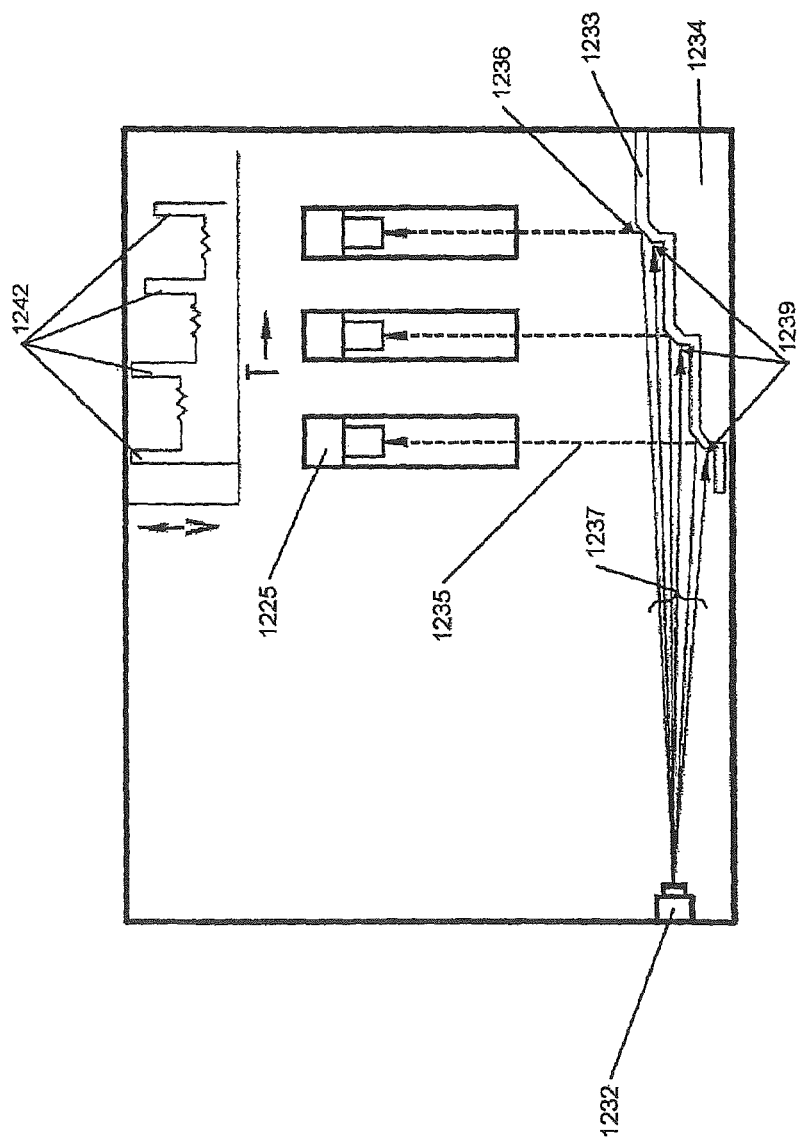

In another embodiment similar to the embodiments described above, as illustrated in FIGS. 17*a* and 17*b*, a parabolic piece-wise linear mirror 1234 with a piece-wise linear approximation of a parabola may be utilized. As illustrated in FIGS. 17*a* and 17*b*, a shelf management system 1200 may include a piece-wise parabolic mirror 1234 that may be positioned along the rear reflector strip 1230. This piece-wise parabolic mirror 1234 may include multiple linear sections 1233 with multiple leading edges 1236. The linear sections 1233 may be wide enough to be easily manufacturable. Additionally, the linear sections 1233 may be narrow enough so that a shelf filled with the narrowest pushers 1225 will have at least one linear mirror section 1233 reflecting the output beam 1235 to/from it. As illustrated in FIGS. 17*a* and 17*b*, the leading edge 1236 of each linear mirror section 1233 may include a small flat section 1239 and an angled leading edge 1236. The small flat section 1239 may retro-reflect the swept beam 1237 directly back to the laser scanner 1232, without first allowing it to reflect from the back of a pusher 1225. The process of transmitting the swept beam 1137 from the laser scanner 1132 to and from the pusher paddle 1125 may be taken on a continuous or near continuous basis, such as a fraction of a second, or a periodic basis such as a second, or 5 seconds.

For example, as specifically illustrated in FIG. 17*b*, as the beam 1237 sweeps, the laser scanner 1232 will see a series of short bright bursts directed back to the laser scanner 1232, followed by a reflection from the angled leading edge 1236. The reflection from the angled leading edge 1236 indicates the position of a pusher 1225. As the moving mirror sweeps the beam beyond the edge of the first linear section, the mirror will again encounter a small flat section 1239 preceding the second angled leading edge 1236. These small flat sections 1239 may represent cue points on the piece-wise parabolic mirror 1234. These cue points 1239 may be interpreted by the microcomputer as 'cue' signals 1242. Additionally, these small flat sections 1239 may divide the shelf up into designated sections that can be analyzed by the microcomputer for movement. Based on the distance and location of the small flat sections 1239, the laser scanner 1232 may alert the control module 1240 that an angled leading edge 1236 is about to be encountered and a reading should be taken. In this way, the control module 1240 does not need to have a fine level of measurement of the moving mirror position. Additionally, the length of the piece-wise parabolic mirror 1234 can be any length. The control module 1240 may determine the number of pusher positions to read based on the number of cueing signals 1244 it receives between the 'home' and 'end' positions of the swept beam 1237.

Additionally, for the shelf system illustrated in FIGS. 15*a*-17*b*, the number of products aligned on the shelf could be measured. In such an embodiment, the position of the pusher could be used to determine the amount of product on the shelf without the need to manually count the product. For example, the laser scanner sends the output beam to the pusher or the product. The output beam may then be reflected back to the laser scanner to determine the location of the pusher by measuring and calculating the time to receive the output beam at the laser scanner. When one product is removed, for example by a purchaser, the time to receive the output beam back at the laser scanner may increase a set amount. Based on the dimensions of the product, specifically the thickness of the product, the control module can calculate how many products have been removed from the shelf by an algorithm of how fast the output beam is traveling back to the laser scanner. Without departing from this invention, the thickness of the product may be a setting or input that can be input into the control module during the set-up of the product on the shelf. Additionally, without departing from this invention, the thickness of the product may be determined by the control module after taking a number of different readings from the system, such as a smart or learning system for determining the thickness of the product.

The advantage of the invention illustrated in FIGS. 14-17*b* is evident in several ways. First, the present invention has no connection to the spring-urged pusher system and hence can work with almost any system currently in use. Second, the present invention has no physical moving connection to the pusher system or the product which precludes the system from wearing out or getting dirty and reducing its effectiveness over time or with the number of products sold. Third, the present invention can operate from batteries for an extended period of time. RFID inventory systems require relatively high power radio-frequency transmitters to scan the product on the shelf and cannot operate from batteries. Fourth, the cost of the system may be amortized over the number of products sold from the shelf over a number of years. This cost of the system is as opposed to having to justify the cost of an individual RFID tag on each product package as well as amortizing an expensive reader system and infrastructure in each product's price. Lastly, the present invention can be programmed to ignore the replacement of product back onto the shelf as is the case when the shelf is being restocked.

The sensors of the various sensing configurations discussed in the above embodiments may output a signal representing the sensed parameter in either analog or digital format. The analog output may in the form of a voltage or current signal. As one skilled in the art will realize, an analog-to-digital converter may be utilized to transform the analog signal to a digital signal for use by a controller or processing device.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Figure 18B:
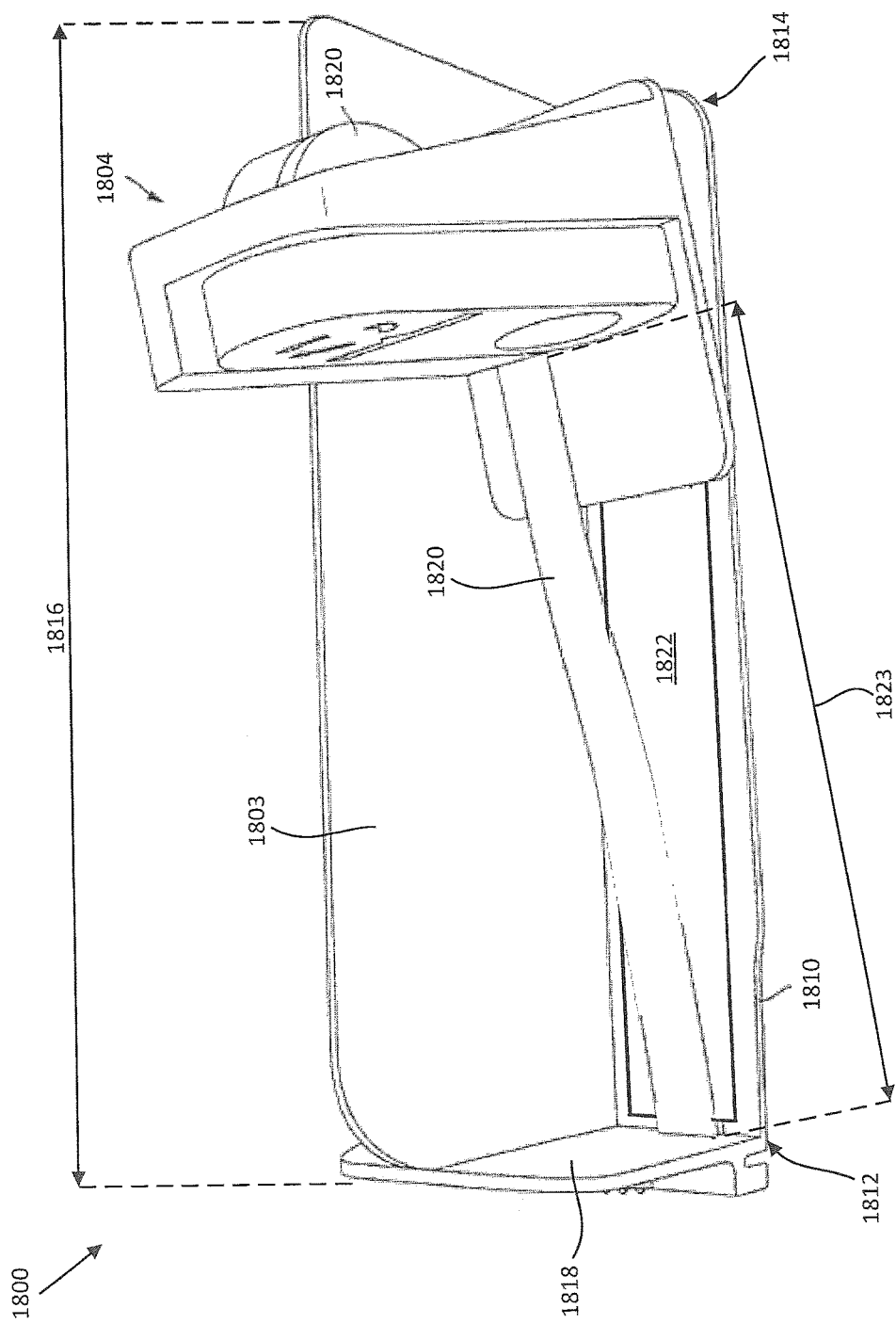
Figure 18C:
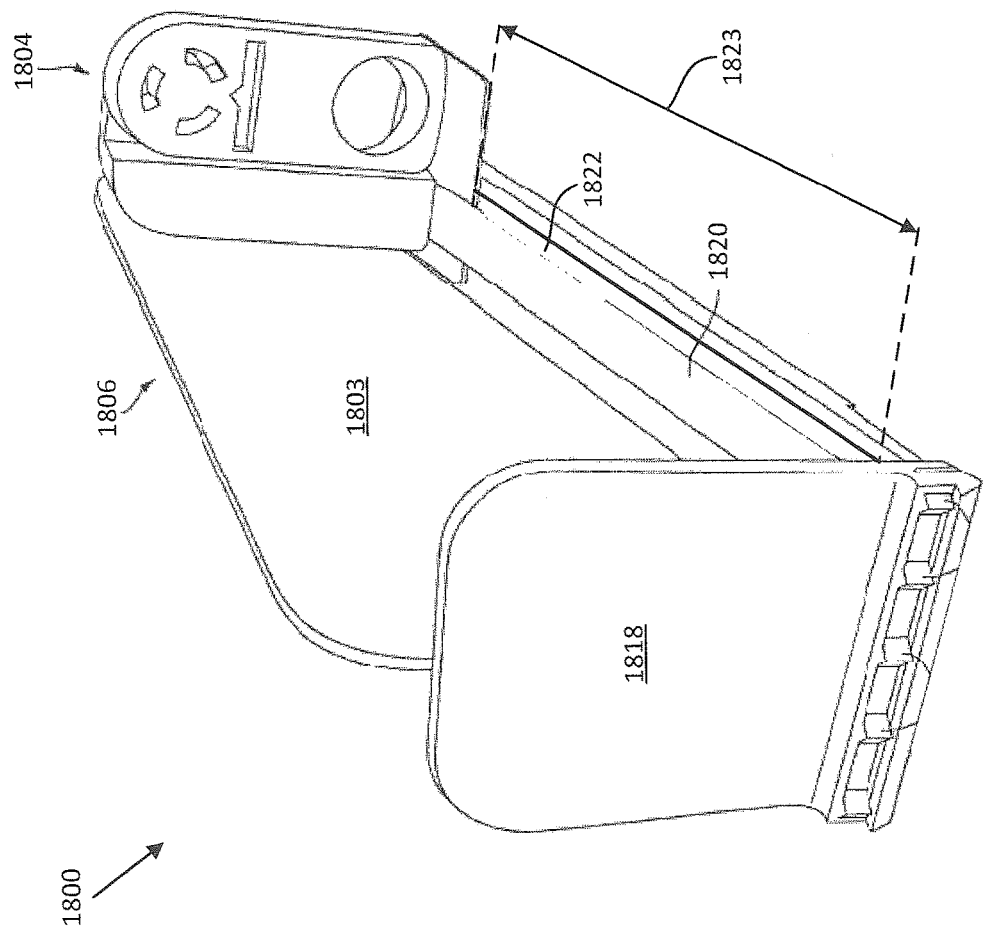

FIGS. 18A-18C depict an alternative implementation of a display management system 1800. In particular, the display management system 1800 comprises a front rail 1802, configured to be removably-coupled to a display surface (not shown). In one example, a display surface may comprise a shelf structure, and the like. As such, in one example, the front rail 1802 may be configured to be removably-coupled at a front edge of a display surface (not shown). However, those of ordinary skill in the art will recognize that the front rail 1802 may be removably-coupled to a display surface at a position other than an edge of the display surface, and the like. In one implementation, the front rail 1802 has a front rail length 1808. In one example, front rail 1802 may be configured such that the front rail length 1808 is parallel to a front edge of a display surface (not shown). Accordingly, the front rail length 1808 may be embodied with any dimensions, without departing from the scope of the disclosures described herein. As such, the front rail length 1808 may be configured to fit one or more physical dimensions of a given display surface (not shown). In one example, the display management system 1800 may comprise a pusher 1804. In one implementation, pusher 1804 may be generally referred to as a movable mechanism of a display management system, such as display management system 1800. As such, and as depicted in FIG. 18B, the pusher 1804 may be configured to urge one or more display products (not shown) along a floor structure 1810 towards a first end 1812 of the floor structure from a second end 1814 of the floor structure. Additionally or alternatively, the display management system 1800 may comprise one or more dividers 1806. As such, a divider 1806, and in particular, a divider wall 1803, may be configured to separate a first group of display products (not shown) associated with a first pusher 1804 from a second group of display products (not shown) associated with a second pusher on a display surface (not shown). In one example, the divider 1806, including the divider wall 1803, the floor structure 1810, and/or the barrier 1818 may have a divider length 1816. As such, in one implementation, the divider 1806 may be configured to be removably-coupled to the front rail 1802 such that the front rail length 1808 is substantially perpendicular to the divider length 1816. However, those of ordinary skill in the art will recognize that the display management system 1800 may be implemented such that the front rail length 1808 may be configured to be positioned at any angle relative to the divider length 1816, and such that an angle between the front rail length 1808 and the divider length 1816 may not be substantially 90°, and without departing from the scope of the disclosures described herein.

In one implementation, and as depicted in FIGS. 18B and 18C, the pusher 1804 may be urged towards the first end of the floor structure 1812 by a coiled spring 1820. As such, a barrier 1818 may be configured to retain one or more display products (not pictured in FIG. 18A-18C) within the display management system 1800 as the pusher 1804, urged by the coiled spring 1820, exerts a force on the one or more display products to slide them towards the barrier 1818. Further, in one implementation, the pusher 1804 may be configured to slide along the floor structure 1810 without being guided by one or more rail structures. In particular, one or more elements of the display management system 1800, and specifically including the front rail 1802, the pusher 1804, the divider 1806, the divider wall 1803, the floor structure 1810, the coiled spring 1820, and the barrier 1818 may provide functionality similar to the front rail 580, the pusher 520, the divider 550, the divider wall 552, the floor 554, the coiled spring 534, and the barrier 556 as described in FIG. 58, FIG. 62, and FIG. 72 of U.S. patent application Ser. No. 14/444,357, filed 28 Jul. 2014, the entire contents of which are incorporated herein by reference for any and all non-limiting purposes.

In one implementation, and as depicted in FIGS. 18B and 18C, the display management system 1800 may comprise a capacitive sensor 1822. As such, the capacitive sensor 1822 may be configured to output a signal that may be processed to determine a position of one or more elements of the display management system 1800. In one example, the capacitive sensor 1822 may be configured to output a signal that may be processed to determine a position of the pusher 1804. As such, the capacitive sensor 1822 may be utilized to determine a number of display products retained within the display management system 1800. In the description that follows, one or more aspects of the capacitive sensor 1822 are discussed. As such, those of ordinary skill in the art will recognize that the capacitive sensor 1822 may be utilized to determine a position of the pusher 1804 within the display management system 1800, independently of specific geometrical features of the display management system 1800. As such, the systems and methods described herein related to the capacitive sensor 1822 may be practiced with alternative display management systems described throughout this paper, as well as U.S. patent application Ser. No. 14/444,357, which has been incorporated herein by reference.

In one implementation, the capacitive sensor 1822 may be configured to be positioned along the divider length 1816 on the floor structure 1810, and such that an uncoiled length 1823 of the coiled spring 1820 makes contact with a portion of the capacitive sensor 1822 extending along the divider length 1816. Accordingly, the capacitive sensor 1822 is described in further detail in relation to FIG. 20.

Figure 19A:
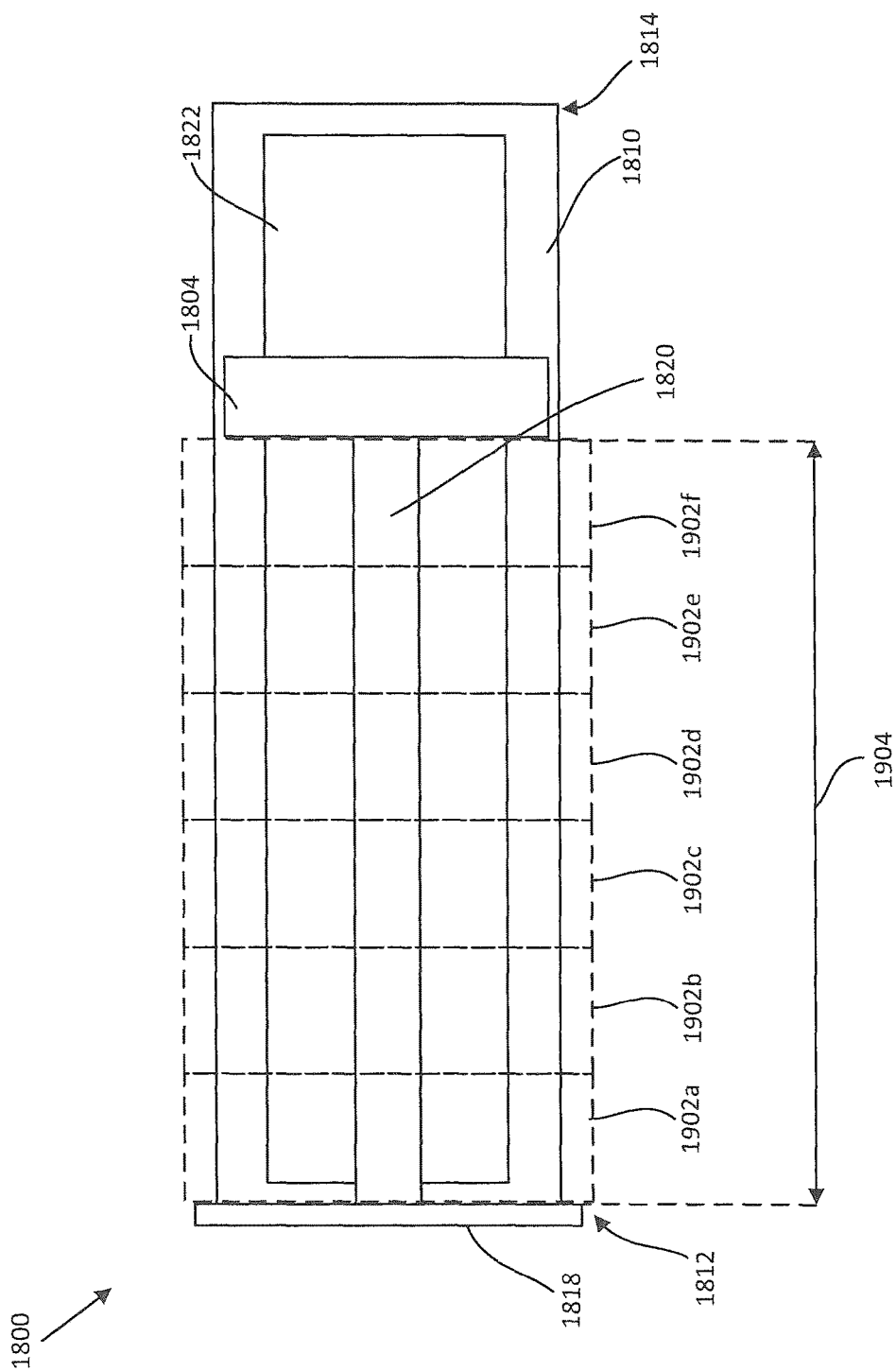
FIGS. 19A and 19B schematically depict plan views of an alternative implementation of a display management system.
Figure 19B:
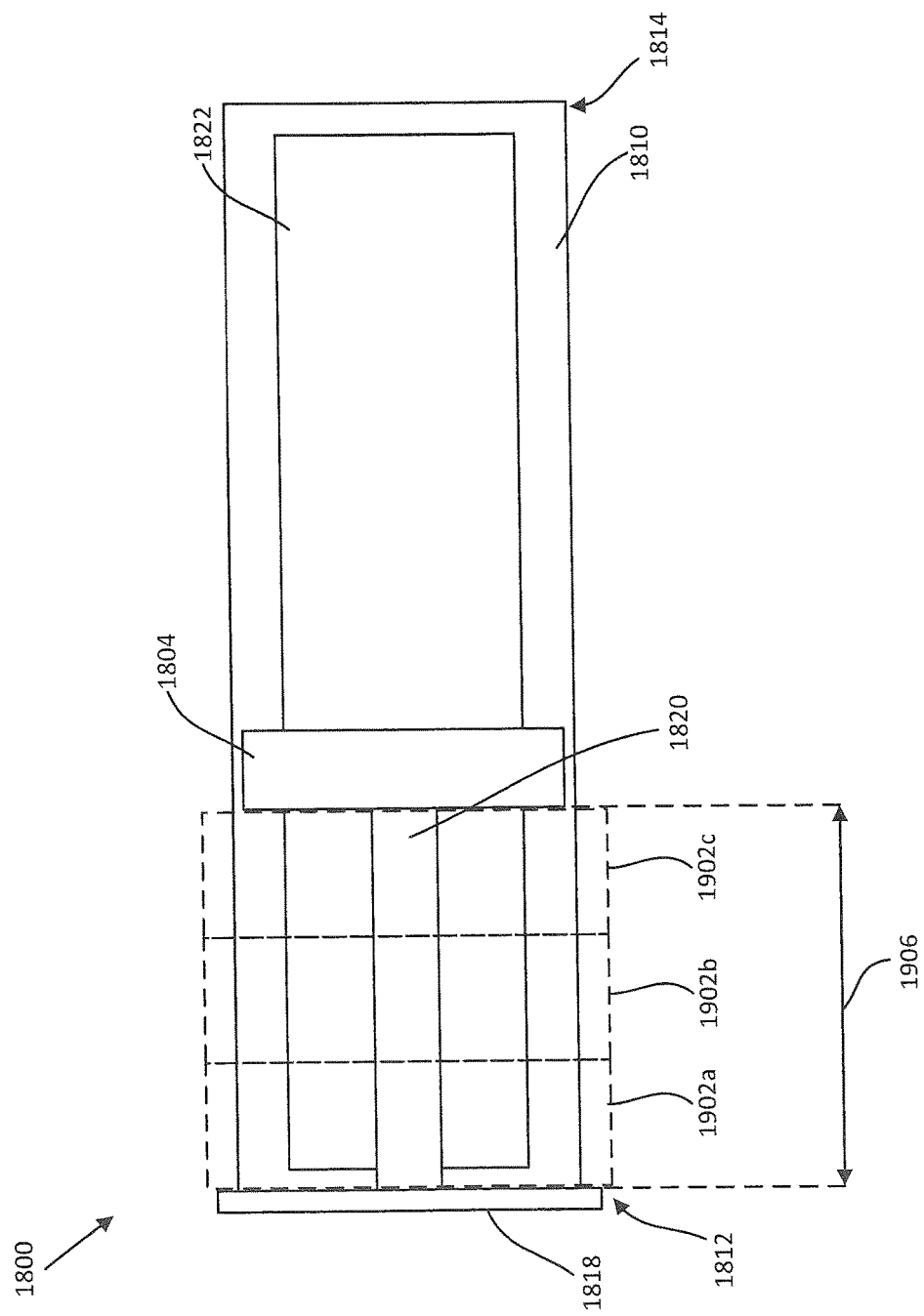

FIGS. 19A and 19B schematically depict plan views of the display management system 1800. Accordingly, FIG. 19A schematically depicts the display management system 1800 in a first configuration having a first plurality of display products 1902a-1902f sandwiched between the barrier 1818 and the pusher 1804. As such, in this depicted first configuration of the display management system 1800, the coiled spring 1820 has a first uncoiled length 1904. Turning to FIG. 19B, the display management system 1800 is depicted in a second configuration having a reduced number of display products 1902a-1902c contained within the system 1800. Consequently, the coiled spring 1820 has a reduced, or a second, uncoiled length 1906.

In one example, a conductive material (in one example, a metal or alloy) from which the coiled spring 1820 in constructed makes contact with the capacitive sensor 1822. In one implementation, the extent to which the coiled spring 1820 makes contact with the capacitive sensor 1822 is proportional to an uncoiled length, such as, in one example, uncoiled length 1904 or 1906. In turn, an output signal from the capacitive sensor 1822 may vary based upon a length of the coiled spring 1820 in contact with the capacitive sensor 1822. Accordingly, an output signal from the capacitive sensor 1822 may vary based upon a position of the pusher 1804, and correspondingly, a number of display products (1902a-1902f) retained within the display management system 1800.

Figure 20A:
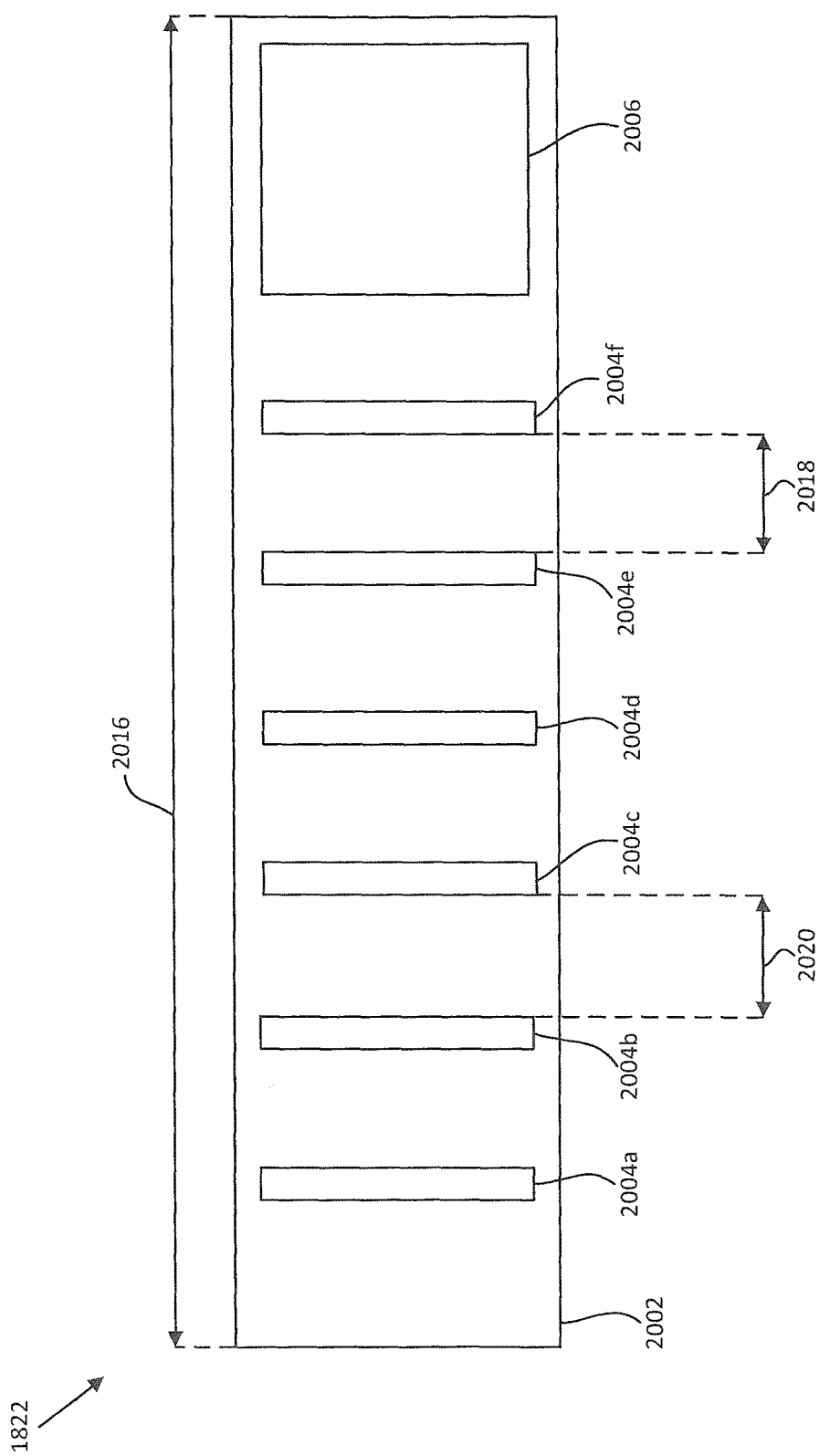
FIG. 20A schematically depicts a capacitive sensor.

FIG. 20A schematically depicts a detailed view of a capacitive sensor 1822. In one implementation, the capacitive sensor 1822 comprises a circuit board 2002, the circuit board 2002 having a longitudinal length 2016. As schematically depicted as in FIGS. 18A-18C, the capacitive sensor 1822 may be coupled to a floor structure 1812 of a divider 1806, and such that the longitudinal length 2016 of the capacitive sensor 1822 is substantially parallel to the divider length 1816. In one implementation, the capacitive sensor 1822 may be configured to be retrofitted into a display management system 1800, such that all electronic components associated with capacitive sensor 1822 may be self-contained on the circuit board 2002. In one example, the capacitive sensor 1822 may comprise a plurality of capacitive sensor elements 2004a-2004f. As such, those of ordinary skill in the art will recognize that the capacitive sensor elements 2004a-2004f depicted in FIG. 20A merely represent one example implementation of the capacitive sensor 1822, and various alternative implementations of capacitive sensor 1822 may be realized, having a different number of capacitive sensor elements to those capacitive sensor elements 2004a-2004f depicted in FIG. 20A.

In one example, the capacitive sensor 1822 may be configured to output a signal proportional to a capacitance value, and such that the capacitance value is based upon an uncoiled length (e.g. uncoiled lengths 1904 and 1906) of the coiled spring 1820. In one example, the control circuit 2006 comprises electronic elements configured to calculate one or more capacitance values associated with the capacitive sensor elements 2004a-2004f. In another implementation, the control circuit 2006 may be referred to as a transmitter circuit, and configured to transmit one or more data points received from the capacitive sensor elements 2004a-2004f to a remote processor, such as the display management system controller device 2400 from FIG. 24. In another example, one or more calculated capacitance values may vary based upon a length of a conductor in contact with the circuit board 2002. As such, the one or more calculated capacitance values may vary based upon an uncoiled length of the coiled spring 1820, such as those uncoiled lengths 1904 and 1906 depicted as examples in FIGS. 19A and 19B. In one specific example, the control circuit 2006 may be configured to calculate a value of capacitance between one or more successive pairs of capacitive sensor elements, selected from the capacitive sensor elements 2004a-2004f. Accordingly, a value of capacitance calculated between a pair of capacitive sensor elements, selected from the capacitive sensor elements 2004a-2004f may change if one or more of the pair of capacitive sensor elements comes into contact with a portion of an uncoiled length of the coiled spring 1820. As such, a change in capacitance between successive pairs of the capacitive sensor elements 2004a-2004f may be utilized to indicate a position of the pusher 1804. As such, one or more of the capacitive sensor elements 2004a-2004f may comprise an exposed electrically-conducting structure configured to contact a portion of the electrically-conducting uncoiled length of coiled spring 1820.

In one implementation, the circuit board 2002 may comprise a substantially insulating material configured to electrically insulate the capacitive sensor elements 2004a-2004f from one another. Further, the capacitive sensor elements 2004a-2004f may be connected to the control circuit 2006 by electrical conductors (not depicted in FIG. 20A). In one example, a pair of capacitive sensor elements, selected from the capacitive sensor elements 2004a-2004f, may be separated by a separation distance 2018. Accordingly, in one implementation, the separation distance 2018 may be uniform between each pair of capacitive sensor elements, selected from the capacitive sensor elements 2004a-2004f, or may be non-uniform, such that a first separation distance 2018 may be different from a second separation distance 2020. Further, those of ordinary skill in the art will recognize that separation distances 2018 and 2020 may be embodied with any dimensions, without departing from the scope of the disclosures described herein. For example, the separation distances 2018 and 2020 may range from a millimeter or less to several hundred millimeters or more, and the like.

In one example, a separation distance, such as separation distance 2018 and/or 2020, between a pair of capacitive sensor elements, selected from capacitive sensor elements 2004a-2004f, may determine a resolution of the capacitive sensor 1822. As such, a resolution of the capacitive sensor 1822 may be proportional to a precision with which the capacitive sensor 1822 can determine a location of a pusher, such as pusher 1804. In particular, as a number of capacitive sensor elements, such as capacitive sensor elements 2004a-2004f, is increased, the precision with which the capacitive sensor 1822 can determine the location of a pusher on the floor structure 1810 may also increase.

In one implementation, the capacitive sensor 1822 may be utilized to calculate an absolute location of the pusher 1804 on the floor structure 1810. As such, the location of the pusher 1804 may not be calibrated based upon a zeroed position on the floor structure 1810. Accordingly, a location of pusher 1804 may not be determined relative to another location on the capacitive sensor 1822, and the like.

In yet another implementation, the control circuit 2006 may be utilized to calculate a position of the pusher 1804 on the capacitive sensor 1822 using interpolation methodology. In particular, the control circuit 2006 may receive signals (otherwise referred to as sensor data) from multiple capacitive sensor elements, from the capacitive sensor elements 2004a-2004f, and by processing the received signals, determine that the location of the pusher 1804 lies between a pair of the capacitive sensor elements, selected from capacitive sensor elements 2004a-2004f. Specifically, the control circuit 2006 may be utilized to interpolate a closeness of a pusher 1804 to a first capacitive sensor element versus a second, adjacent, capacitive sensor element. In this way, those of ordinary skill in the art will recognize that the capacitive sensor 1822 may be implemented, in one example, using a single pair of capacitive sensor elements 2004 spaced apart between the first end 1812 and the second end 1814 of the floor structure 1810.

Figure 20B:
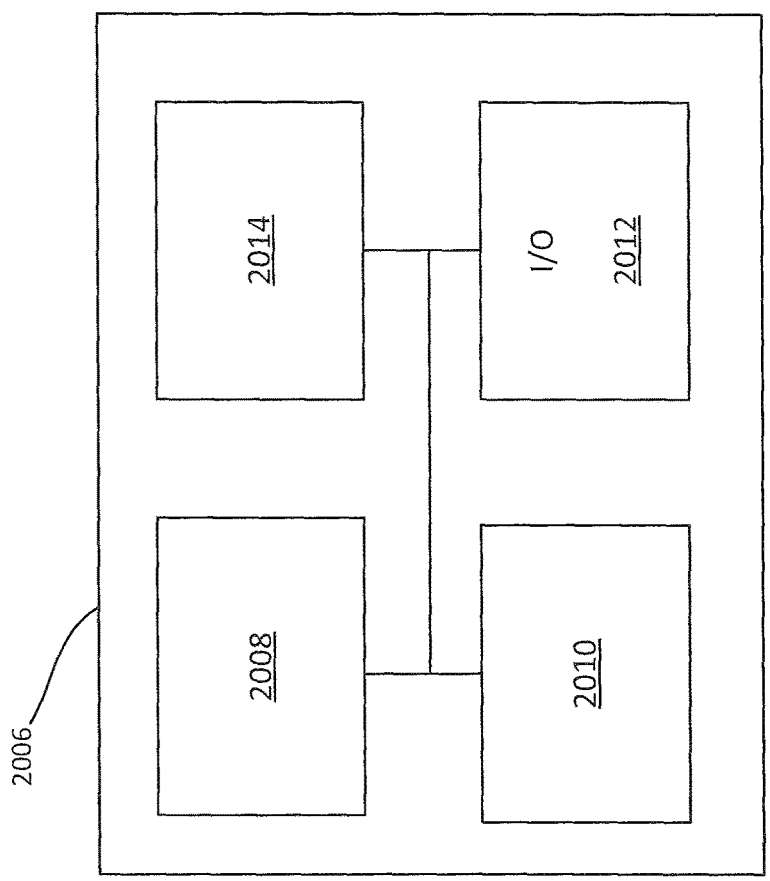
FIG. 20B schematically depicts a control circuit.

FIG. 20B schematically depicts a more detailed view of the control circuit 2006. In particular, and in one example, the control circuit 2006 comprises a power supply 2008, a memory 2010, an interface 2012, and a processor 2014. In one implementation, the memory 2010, interface 2012, and processor 2014 may be embodied as a single microcontroller circuit, or may be implemented as discrete electronic elements. In one example, the power supply 2008 may represent a source of electrical energy provided by one or more electrochemical cells, otherwise referred to simply as a cell or as a battery. In one specific example, power supply 2008 may be implemented as a single "button cell" or "coin cell," with multi-year battery life. In another example, power supply 2008 may be a rechargeable or a non-rechargeable battery. In another example, power supply 2008 may represent electronic hardware configured to receive, and potentially to condition (rectify AC to DC, and/or step-up/step-down a voltage, smoothen, among others) a wired electrical supply. In yet another example, power supply 2008 may represent electronic hardware configured to receive, and potentially to condition, a power supply received from an external source wirelessly, such as by electromagnetic induction (electrodynamic induction, electrostatic induction, and the like). In another implementation, power supply 2008 may comprise one or more photovoltaic (solar cells). Further, those of ordinary skill in the art will recognize that power supply 2008 may represent any technology, or combination of technologies, configured to provide electrical power to the control circuit 2006, without departing from the scope of the disclosures described herein. Similarly, power supply 2008 may be configured to store any amount of energy (J), and/or to provide an electrical potential (voltage (V)), or an electrical current (A) of any value, without departing from the scope of the disclosures described herein. Additionally, these power supply examples can be used in conjunction with any of the devices discussed herein.

Memory 2010 may be a form of persistent, a form of volatile memory, or a combination thereof. As such, memory 2010 may comprise a form of random access memory (RAM) that is cleared by a power cycle or other reboot operation of the control circuit 2006. In other embodiments, memory 2010 may be non-volatile, such that it does not require power from power supply 2008 to maintain information. As such, memory 2010 may comprise a form of read only memory (ROM), or flash memory. Generally, memory 2010 may be referred to as a form of a non-transitory, computer-readable medium and utilized to store instructions that may be executed by processor 2014.

Interface 2012 may comprise hardware and/or firmware configured to facilitate communication between the control circuit 2006 and one or more external devices. For example, interface 2012 may be utilized to facilitate communication between processor 2014 and an external computer device across a network. In this way, interface 2012 may be configured to communicate via one or more of a wired connection, such as utilizing an Ethernet connection, or a wireless connection, such as utilizing a Bluetooth connection, a Wi-Fi connection, or the industrial, scientific, and medical (ISM) radio bands. However, those of ordinary skill in the art will recognize that interface 2012 may be configured to facilitate communication between the control circuit 2006 and any wired or wireless link or network.

In one implementation, processor 2014 comprises a microprocessor having one or more processing cores. As such, processor 2014 may be configured to execute instructions stored within memory 2010. Further, one or more processes executed by processor 2014 may be utilized to drive one or more electrical circuits associated with the circuit board 2002 and the plurality of capacitive sensor elements 2004a-2004f. Additionally, processor 2014 may be configured to receive and process, via interface 2012, one or more sensor readings from the plurality of capacitive sensor elements 2004a-2004f. In one specific example, a capacitive sensor element, from the plurality of capacitive sensor elements 2004a-2004f may be configured to output an analog signal (voltage, current, and the like) or a digital signal (for example, a binary signal, among others).

In one example, one or more signals communicated from the plurality of capacitive sensor elements 2004a-2004f may be received by processor 2014. In turn, the processor 2014 may execute one or more processes on the received signals before communicating, via the interface 2012, the received signals to a remote processor, such as that processor 2404 associated with the display management system controller device 2400 described in FIG. 24. These one or more processes may include determining that a received signal is above a threshold value, compressing the received signals for communication, or filtering the received signals, among others. Accordingly, in this example, the processor 2404 of the display management system controller device 2400 may calculate one or more capacitance values as previously described in relation to FIG. 20A, and further calculate a position of a pusher 1804 on a display management system 1800. In another example, one or more signals communicated from the plurality of capacitive sensor elements 2004a-2004f may be processed by processor 2014 to calculate the one or more capacitance values as previously described in relation to FIG. 20A. In turn, the calculated capacitance values may be utilized to calculate the location of the pusher 1804 on the display management system 1800. In yet another example, a combination of processor 2014 and processor 2404 may be utilized to determine a location of a pusher 1804, and the like.

In one implementation, control circuit 2006 may be configured to communicate directly with a mobile device. As such, in one specific example, control circuit 2006 may be configured to establish a Bluetooth connection with a smart phone or tablet of a shopper in a store in order to receive one or more pieces of biographic information associated with the shopper. In this way, upon activation of pusher 1804 as one or more display products, such as display products 1902a-1902f, are removed from the display management system 1800, the control circuit 2006 may be configured to query a mobile device of a user removing the one or more display products to receive one or more pieces of biographic information associated with the user. In another implementation, upon activation of the pusher 1804 as one or more display products are removed from the display management system, the control circuit 2006 may be configured to communicate with the display management system controller device 2400. In turn, the display management system controller device 2400 may attempt to establish a connection (via Bluetooth, and the like) to a mobile device associated with a user removing said one or more display products.

In one example, the capacitive sensor 1822 may be configured to operate within a low power mode until the pusher 1804 is moved as a result of one or more display products, such as display products 1902a-1902f, or removed from the display management system 1800. In particular, this low power mode may include processor 2014 operating in a low power configuration that continuously monitors the sensor outputs from the capacitive sensor elements 2004a-2004f. Accordingly, in this example, the processor 2014 may execute one or more processes to enter a high power configuration upon receiving one or more sensor signals indicative of movement of the pusher 1804. Specifically, the high power configuration may include executing one or more processes to deliver additional electrical power to memory 2010, interface 2012, and/or processor 2014 in order to execute additional processes on the received sensor data and/or communicate the received sensor data to a remote processor. In this way, the capacitive sensor 1822 may be configured to consume a reduced amount of electrical energy while the pusher 1804 remains stationary. As such, this low power configuration may be utilized to prolong a battery life associated with power supply 2008. In another example, the capacitive sensor 1822 may be configured to operate within a low power configuration while the pusher 1804 remains stationary, and such that the low power configuration delivers electrical energy to one or more of the plurality of capacitive sensor elements 2004a-2004f. Accordingly, in response to motion of the pusher 1804, one or more of the capacitive sensor elements 2004a-2004f may be configured to communicate a wake signal to the control circuit 2006 in order to enter a high power configuration. As such, the wake signal may be received by the control circuit 2006, and in response, additional power may be delivered to one or more of the memory 2010, interface 2012, and/or processor 2014. In this way, maintaining the capacitive sensor 1822, and in particular, the control circuit 2006, within a low power configuration for a period of time during which the pusher 1804 is stationary may allow for decreased overall energy consumption, and in one example, increased battery life of the capacitive sensor 1822.

Figure 21A:
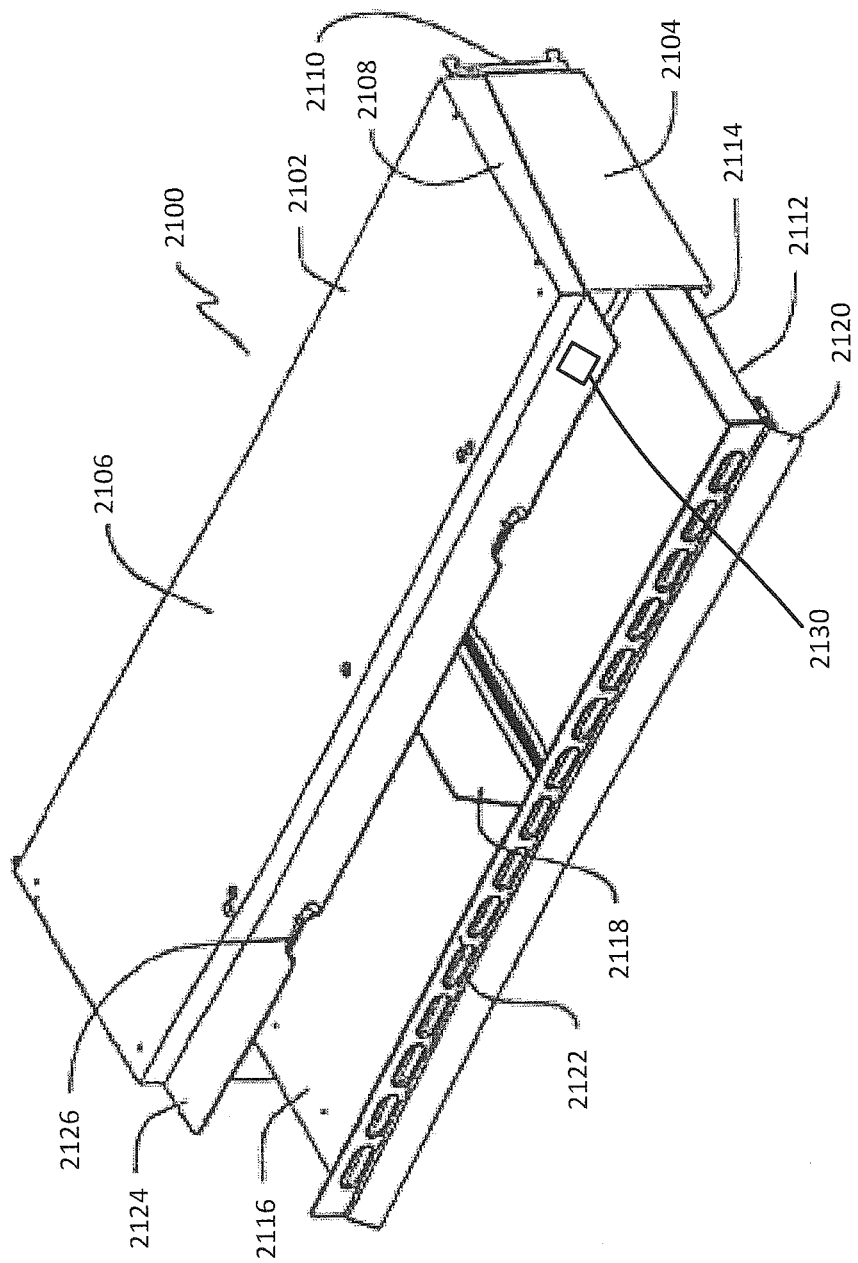
FIGS. 21A and 21B depict an alternative implementation of a display management system.
Figure 21B:
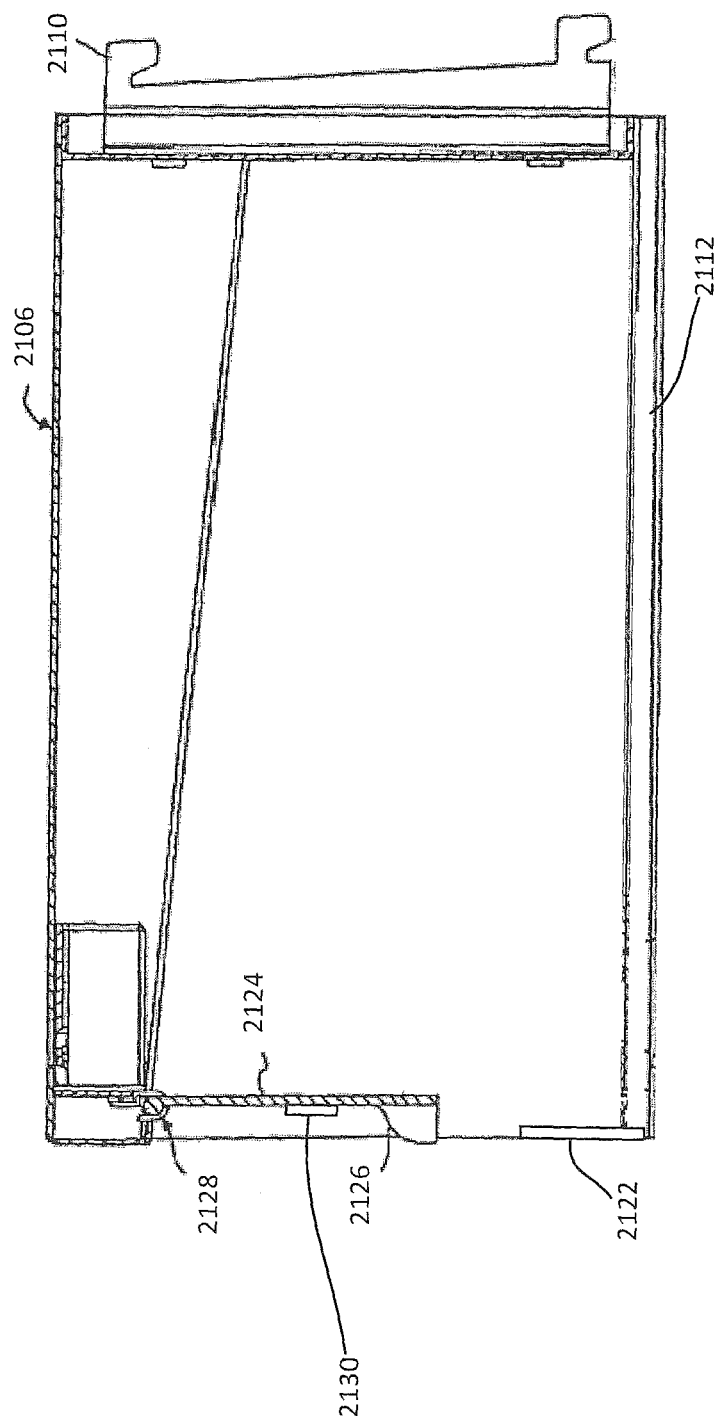

FIGS. 21A and 21B depict an alternative implementation of a display management system 2100. In particular, FIG. 21A depicts an isometric view of a display management system 2100 configured as a box-shelf. In particular, the box-shelf display management system 2100 comprises a top 2102 and two sides 2104 that can be connected together to form part of a housing 2106. A recessed portion 2108 is provided so that in the event that the box-shelf display management system 2100 is mounted under a shelf (not shown), the recessed portion 2108 will aid in ensuring that there is no interference with the brackets that support the shelf or other structure that may extend downward (not shown). One or more shelf supports 2110 are mounted to the box-shelf display management system 2100 to facilitate the box-shelf display management system 2100 to be mounted to a vertical support (not shown) in a traditional manner.

A slidable shelf 2112 is mounted to one or more tracks 2114, which may be supported at least in part by the sides 2104. As depicted, the slidable shelf 2112 may include a support surface 2116 that supports a divider 2118. In one example, the support surface 2116 may support one or more display management systems, such as systems 1800 described previously. In one implementation, the support surface 2116 includes a rail 2120 mounted to the front of the shelf 2112. The rail, in turn, supports a retainer 2122. As depicted, a door 2124 with one or more handles 2126 may be mounted to the top 2102 via a hinge system 2128. In another implementation, the door 2124 may be referred to as a flip window 2124, and such that the flip window 2124 may be partially or wholly transparent to visible light. In this way, flip window 2124 may facilitate viewing of one or more display products within the box-shelf display management system 2100. In one specific example, the box-shelf display management system 2100 may be similar to the box-shelf 3405 described in U.S. application Ser. No. 14/046,385 filed 4 Oct. 2013, the entire contents of which are incorporated herein by reference for any and all non-limiting purposes.

In one implementation, the box-shelf display management system 2100 may be configured to retain one or more display products, such as display products 1902a-1902f schematically depicted in FIG. 19A. Accordingly, in one configuration, the box-shelf display management system 2100 positions the slidable shelf 2112 within the housing 2106. As such, in order to remove one or more display products (not shown in FIG. 21A) from the box-shelf display management system 2100, a user may rotate the flip window 2124 from a substantially vertical position (depicted in FIG. 21B to a substantially horizontal position depicted in FIG. 21A).

In one implementation, the box-shelf display management system 2100 may be configured with a sensor 2130. In particular, sensor 2130 may be an accelerometer. Further, the accelerometer sensor 2130 may be sensitive to accelerations (due to gravity or otherwise) along a single axis (one-axis accelerometer), along two mutually-perpendicular axes (a 2-axis accelerometer), or along three mutually-perpendicular axes (a 3-axis accelerometer). Those of ordinary skill in the art will recognize various specific implementations of one-axis, two-axis and three-axis accelerometer electronic circuits that may be utilized with the box-shelf display management system 2100, or other display management systems, such as systems 1800 and 2300, without departing from the disclosures described herein. Further, those of ordinary skill in the art will recognize that an accelerometer sensor 2130 may be utilized to determine an orientation of a structure to which it is affixed. As such, accelerometer sensor 2130 from FIG. 21A may be utilized to determine an orientation of the flip window 2124. Advantageously, the accelerometer sensor 2130 may offer improved accuracy in determining an orientation of the flip window 2124 when compared to one or more alternative sensor technologies positioned as hinge 2128, wherein a range of motion of hinge 2128 may be comparatively more limited.

In one implementation, an accelerometer sensor, such as accelerometer sensor 2130, may be utilized to determine an orientation of the flip window 2124. As such, those of ordinary skill in the art will recognize that the accelerometer sensor 2130 may be located on the flip window 2124 at any location configured to move in conjunction with the movement of the flip window 2124, without departing from the scope of the disclosures described herein. Additionally, those of ordinary skill in the art will recognize that the accelerometer sensor 2130 may be generally utilized to determine an orientation of a flip window, similar to flip window 2124, as part of any display management system. As such, display management system 2100, having flip window 2124, is merely one example of a display management system with which an accelerometer sensor 2130 may be utilized. Accordingly, those of ordinary skill in the art will readily recognize various additional or alternative implementations of a display management structure similar to the housing 2106 having a movable feature similar to the flip window 2124 that is configured to be moved in order to remove one or more products from the display management structure. In turn, the accelerometer sensor 2130 may be coupled to a movable feature of the various additional or alternative implementations of display management structures that may be envisioned by those of ordinary skill in the art.

In one example, accelerometer sensor 2130 may be implemented as part of an integrated accelerometer device, as schematically depicted in FIG. 22A. As such, the integrated accelerometer device 2130 may comprise an accelerometer circuit board 2200, a power supply 2202, and an interface 2203. Accordingly, and as previously described, those of ordinary skill the art will recognize various specific accelerometer circuits that may be implemented as the accelerometer circuit board 2200, without departing from the scope of the disclosures described herein. In one example, power supply 2202 may be configured to provide electrical energy to the accelerometer circuit board 2200 and the interface 2203. As such, the power supply 2202 may be similar to power supply 2008, and may be embodied as a wired electrical supply, one or more batteries, hardware configured to accommodate wireless transmission of electrical energy, or combinations thereof. In another example, interface 2203 may be similar to interface 2012, and such that interface 2203 may be configured to communicate one or more acceleration signals from the accelerometer sensor 2130 via a wired or wireless network.

In one implementation, the integrated accelerometer device 2130 may be configured to output one or more sensor signals (otherwise referred to as motion data) indicative of an orientation of the flip window 2124. In one example, the one or more sensor signals may comprise an analog or a digital signal indicative of an acceleration along one or more of the axes to which the integrated accelerometer device 2130 is sensitive. Accordingly, in one example, the sensor signal output from the integrated accelerometer device 2130 may be as a result of an acceleration due to gravity resolved along one, two, or three mutually perpendicular axes (x-, y-, and/or z-axis) to which the integrated accelerometer device 2330 is sensitive. In one example, the integrated accelerometer device 2130 is configured to communicate a sensor signal (otherwise referred to as motion data) via the interface 2203 to a control circuit, such as control circuit 2006 depicted in FIG. 22B. As such, in one implementation, communication between the control circuit 2006 and the integrated accelerometer device 2130 may be via a hardware (wired) connection. However, communication between the control circuit 2006 and the integrated accelerometer device 2130 may be, additionally or alternatively, via a wireless connection. As such, an output signal from the integrated accelerometer device 2130 may be processed and utilized in a similar manner to a sensor output from the capacitive sensor 1822 previously described. In another implementation, a sensor output from the integrated accelerometer device 2130 may be communicated directly to a display management system controller device 2400, described in further detail in relation to FIG. 24.

In one example, accelerometer sensor (otherwise referred to as an integrated accelerometer device) 2130 may be configured to operate in a low power configuration while a movable structure to which the accelerometer sensor 2130 is coupled remains stationary. As such, the accelerometer sensor 2130 may be configured to operate in this low power configuration while an output from the accelerometer circuit board 2200 is unchanging (indicative of, in one example, the flip window 2124 remaining at a fixed orientation). Accordingly, upon detection of motion of the flip window 2124, one or more of the accelerometer circuit board 2200, the control circuit 2006, and/or the display management system controller device 2400 may be configured to implement a high power configuration. As such, this high power configuration may be configured to execute one or more processes in response to movement of the flip window 2124, wherein movement of the flip window 2124 may be indicative of one or more display products, such as display products 1902a-1902f, being removed from a display management system, such as system 2100, 1800, and/or 2300.

Figure 23:
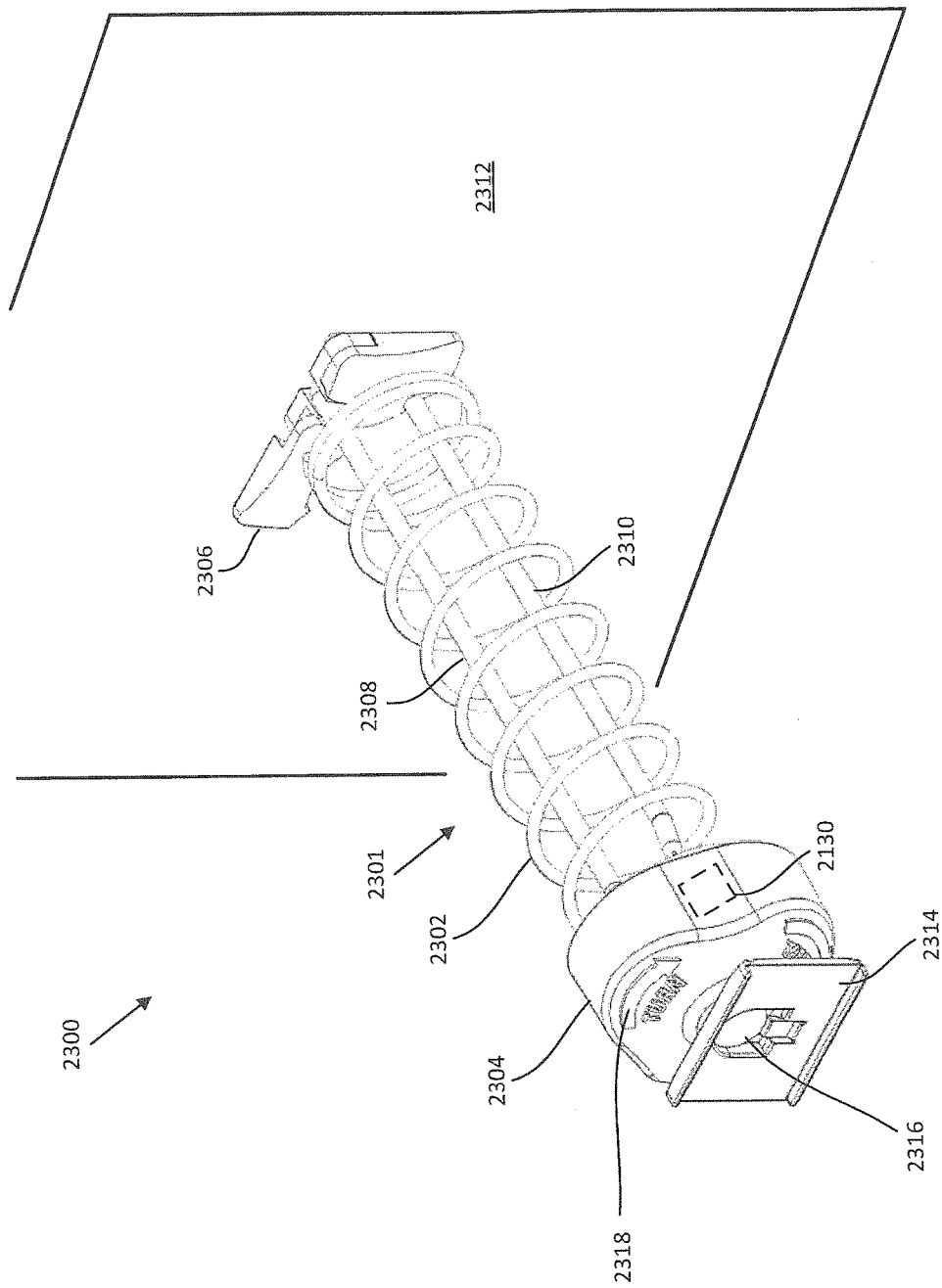
FIG. 23 depicts an alternative implementation of a display management system.

FIG. 23 depicts an alternative implementation of a display management system 2300. In particular, FIG. 23 depicts a spiral peghook security device 2301. As such, the spiral peghook security device 2301 may comprise a front structure 2314, rigidly-coupled to a back structure 2306 by a support rail 2308. Further, the back structure 2306 may comprise one or more coupling elements (not shown) configured to removably-couple the spiral peghook security device 2301 to a surface 2312. In one example, surface 2312 may be similar to the gondola wall 905 described in relation to FIG. 14. However, those of ordinary skill the art will recognize that surface 2312 may comprise any support structure configured to receive one or more coupling elements (not shown) of the spiral peghook security device 2301. In one implementation, the spiral peg hook security device 2301 comprises a knob 2304, rotatably-coupled to the front structure 2314, and configured to rotate about the center axis of bearing 2316. Additionally, the front structure 2340 may be configured to receive one or more labels associated with one or more display products supported by the spiral peghook security device 2301.

In one example, upon application of a manual rotational force to the knob 2304 in a first direction (e.g. that direction indicated by arrow 2318), spiral rail 2302 may be configured to rotate about the center axis of bearing 2316. In turn, based upon the rotation of the spiral rail 2302, one or more display products supported by (hanging from) support rail 2310 may be urged by the spiral rail 2302 towards the front structure 2314. Conversely, upon application of a manual rotational force to the knob 2304 in a second direction (e.g. a direction opposite to by arrow 2318), spiral rail 2302 may be configured to urge one or more display products hanging from support rail 2310 towards the back structure 2306.

In one example, the spiral peghook security device 2301 may be configured to display one or more products within a store. As such, in one embodiment, the spiral peghook security device 2301 may be utilized to prevent multiple products that are supported by support rail 2310 from being quickly removed from the spiral peghook security device 2301. In this way, the spiral peghook security device 2301 may be utilized to deter theft of one or more products hanging from support rail 2310, due to the extended time needed to rotate knob 2304 and spiral rail 2302 in order to remove the one or more products from the device 2301.

In one implementation, an accelerometer sensor 2130 may be utilized with the display management system 2300 in order to detect motion of the knob 2304 and/or spiral rail 2302. As previously described, the spiral rail 2302 may be rotated in order to insert and/or remove one or more display products from the display management system 2300. In this way, the accelerometer sensor 2130 may be coupled to a structure that is configured to rotate upon application of a manual force to knob 2304. In one specific example, the accelerometer sensor 2130 may be coupled within a structure of the knob 2304, as schematically depicted in FIG. 23. However, those of ordinary skill in the art will recognize additional or alternative placement options for the accelerometer sensor 2130 that may be utilized without departing from the scope of the disclosures described herein. In one example, a change in a sensor output from the accelerometer sensor 2130 as the spiral rail 2302 is being rotated may be utilized by one or more of the accelerometer circuit board 2200, the control circuit 2006, and/or the display management system controller device 2400, to track the rotation of the spiral rail 2302, and thus, determine a number of display products inserted onto/removed from the display management system 2300.

Similar to the display management system 2100, display management system 2300 may utilize the accelerometer sensor 2130 to detect motion, and in response, execute one or more processes. In one example, a motion of the spiral rail 2302 may execute one or more processes to transition the accelerometer sensor 2130 from a low power configuration into a high power configuration, as described previously.

Figure 24:
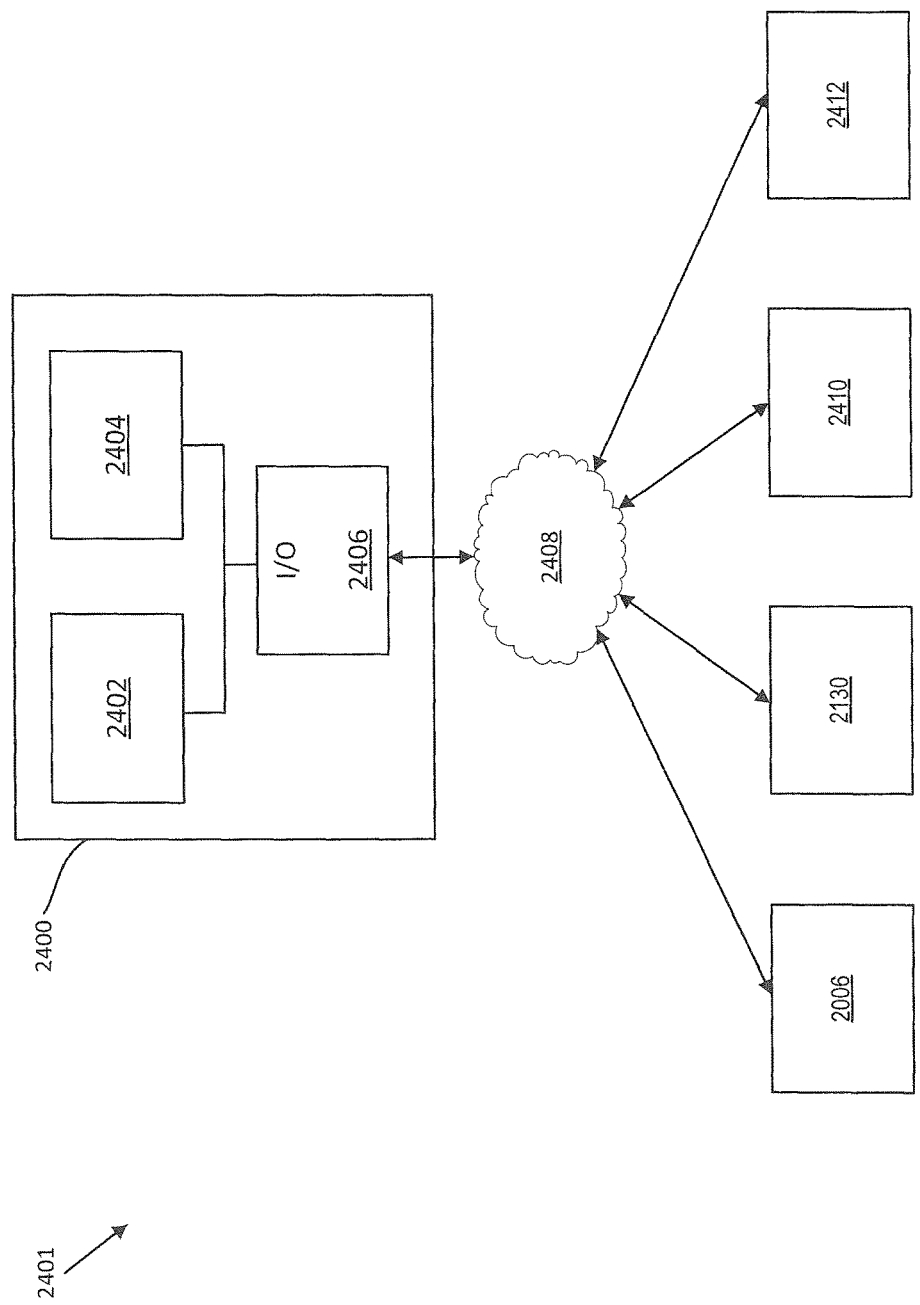
FIG. 24 schematically depicts a sensor network configured to implement one or more inventory management, security, and/or recognition functions in combination with one or more display management systems.

FIG. 24 schematically depicts a sensor network 2401 configured to implement one or more inventory management, security, and/or recognition functions in combination with one or more display management systems, such as systems 1800, 2100, and 2300, among others. In particular, the sensor network 2401 comprises a display management system controller device 2400. Accordingly, the display management system controller device 2400 may comprise a memory 2402. As such, memory 2402 may be a form of persistent or volatile memory, or combinations thereof. In this way, memory 2402 may comprise a form of random access memory (RAM) that is cleared by a power cycle or other reboot operation of the device 2400. In other embodiments, memory 2402 may be non-volatile, such that it does not require power to maintain information. As such, memory 2402 may comprise a form of read only memory (ROM), or flash memory, among others. Generally, memory 2402 may be referred to as a form of a non-transitory, computer-readable medium and utilized to store instructions that may be executed by processor 2404. Additionally, device 2400 may comprise an interface 2406, wherein interface 2406 is configured with hardware and supporting firmware that allow device 2400 to connect to network 2408. Further, device 2400 may comprise a processor 2404, wherein processor 2404 may comprise a microprocessor having one or more processing cores. As such, processor 2404 may be configured to execute instructions stored within memory 2402.

Generally, the display management system controller device 2400 may be configured to execute one or more processes in response to receiving sensor information from one or more of a capacitive sensor 1822 (via control circuit 2006), or from an accelerometer sensor 2130 (directly, or via control circuit 2006). In one example, communication between one or more of the control circuit 2006, the accelerometer sensor 2130, and the display management system controller device 2400 may be unidirectional, or may be bi-directional. In one implementation, the display management system controller device 2400 may be referred to as a remote processor, and may be positioned remotely from one or more display management systems (1800, 2100 and/or 2300) to which one or more sensors (1822, 2130) are attached for detection of motion indicative of one or more display products being removed. As such, a distance between the display management system controller device 2400 and one or more sensors with which it may be in communication may be any given distance, without departing from the scope of the disclosures described herein. For example, the display management system controller device 2400 may be positioned within a same geographic location (in one example, a same store) as the one or more sensor devices with which the display management system controller device 2400 is in communication. In another example, the display management system controller device 2400 may be positioned at a different geographic location to one or more display management systems (e.g. 1800, 2100, and/or 2300) with which the device 2400 in communication via network 2408.

In one implementation, the display management system controller device 2400 may be configured to calculate a position of a pusher 1804, a flip window 2124, and/or a spiral rail 2302. Accordingly, the display management system controller device 2400 may be configured to calculate a number of display products removed from one or more display management systems (e.g. 1800, 2100, and/or 2300) based upon detected motion of one or more pushers 1804, flip windows 2124, and/or spiral rails 2302.

In one specific example, the display management system controller device 2400 may be configured to determine a number of display products removed from the display management system 1800 based upon comparison of a first position of a pusher 1804 with a second position of said pusher 1804. In particular, processor 2404 may calculate a distance moved by pusher 1804, and execute one or more processes to consult a lookup table (stored, for example, in memory 2402) for a depth dimension associated with a plurality of products held within the display management system 1800. As such, processor 2404 may determine a product type held within display management system 1800 based upon information input by a user, or information sensed by one or more sensors 2410 (e.g. by scanning a barcode on the one or more products, or detecting a RFID signal associated with the one or more products within the display management system 1800, among others). In this way, upon receiving, from a lookup table within memory 2402, a depth dimension of a product held within the display management system 1800, and having calculated a distance moved by the pusher 1804, the processor 2404 may determine a number of products removed from the display management system 1800. Similarly, the processor 2404 may be utilized to determine a number of products inserted into a display management system 1800 (e.g. during a restocking process, and the like).

In another example, the display management system controller device 2400 may infer a depth dimension of a product type stored within a display management system 1800. In particular, without having information available within a lookup table stored in memory 2402, processor 2404 may determine a depth dimension of a product based upon one or more discrete motions of the pusher 1804. Specifically, after repeated instances of products being removed from the display management system 1800, processor 2404 may execute one or more processes to recognize a consistent distance moved by pusher 1804, and from this recognized distance, infer a depth dimension of a product to be utilized in determining a number of products removed from the display management system 1800 in response to future movements of pusher 1804.

Accordingly, the display management system controller device 2400 may be configured to execute one or more processes based upon information received from one or more control circuits, such as control circuit 2006, or accelerometer sensors, such as accelerometer sensor 2130. In addition, the display management system controller device 2400 may be configured to communicate with device 2410. In one example, device 2410 may comprise a camera, a speaker, a microphone, a proximity sensor, a motion sensor, an ambient light sensor, or an electronic display, among many others. In one specific example, the display management system controller device 2400 may be configured to display, on an electronic display device 2410, a message associated with one or more products stored within a display management system (e.g. system 1800, 2100, or 2300).

The display management system controller device 2400 may be configured to communicate with one or more mobile devices, such as mobile device 2412. As such, communication between the display management system controller device 2400 and one or more of a control circuit 2006, an accelerometer sensor 2130, device 2410, and/or mobile device 2412 may be via a network 2408. In turn, network 2408 may be a wired or wireless network that may utilize any communication protocol. As such, network 2408 may be the Internet, a wide area network (WAN), a local area network (LAN), or a Bluetooth connection, among many others. In one specific example, network 2408 may utilize one or more bands of the industrial, scientific and medical (ISM) radio bands.

In one implementation, the display management system controller device 2400 may execute one or more processes to receive and store one or more pieces of biographic information associated with a user, such as a user removing one or more display products from one or more display management systems (e.g. 1800, 2100, and/or 2300) in communication with the device 2400. In one example, the display management system controller device 2400 may receive one or more pieces of biographic information associated with the user, and received from a mobile device 2412 carried by the user. Specifically, the mobile device 2412 may comprise a smart phone or tablet carried by a user, and configured to communicate with the display management system controller device 2400 via one or more of a Bluetooth connection, an NFC connection, or a Wi-Fi connection, among others.

In one implementation, the display management system controller device 2400 may execute one or more processes to receive data from an additional sensor 2410, in response to receiving motion data from one or more sensors (e.g. one or more sensors 1822 and/or 2130) associated with one or more display management systems (e.g. 1800, 2100, and/or 2300). In one specific example, the display management system controller device 2400 may communicate with a camera device 2410, and execute one or more facial recognition processes to determine one or more pieces of demographic information associated with a user removing the one or more products from the display management systems from which motion data is received. In this way, the display management system controller device 2400 may be utilized to collect shopper behavior information that may be utilized to plan product displays within a store, and the like.

In yet another implementation, the display management system controller device 2400 may execute one or more processes to recognize one or more patterns from the data received from sensors associated with motion of one or more display management systems (e.g. systems 1800, 2100, and/or 2300). As such, processor 2404 may receive motion data from a plurality of sensors (e.g. one or more sensors 1822 and/or 2130), and based upon the received motion data, determine whether the sensor data represents a recognized pattern (stored in memory 2402) resulting from products being removed from the one or more display management systems (e.g. systems 1800, 2100, and/or 2300).

In one specific example, the display management system controller device 2400 may receive motion data from a single display management system (e.g. system 1800, 2100, or 2300) and determine that the received motion data represents removal of a plurality of a same product from the display management system. Further, the display management system controller device 2400 may calculate a rate at which products are being removed from this display management system. In one example, if a rate at which the products are being removed from this display management system is above a threshold level, the display management system controller device 2400 may determine that the removal of products may represent an attempted theft. For example, in the case were 10 or more products are removed within 30 seconds, the system controller device 2400 may recognize that an attempted theft is occurring. In response, the display management system controller device 2400 may execute one or more processes to communicate a warning message to security personnel. In one example, this warning message may be communicated as an electronic message delivered via network 2408. Additionally or alternatively, the display management system controller device 2400 may, in response to determining that motion data represents a pattern associated with an attempted theft, communicate with a camera device 2410 to capture one or more images of a user of the display management system from which the motion data has been received. In this way, one or more images of a suspected thief may be recorded. Further, the display management system controller device 2400 may, in response to determining that received motion data may represents an attempted theft, execute one or more processes to sound an audible message and/or siren.

In another example, the display management system controller device 2400 may receive sensor data, otherwise referred to as motion data, from a plurality of sensors (e.g. one or more sensors 1822 and/or 2130, among others) associated with a plurality of display management systems (e.g. 1800, 2100, and/or 2300). Accordingly, the display management system controller device 2400 may execute one or more processes to recognize one or more patterns from the data received from the sensors. In this way, the display management system controller device 2400 may determine, in response to a rate at which products are being removed from the display management systems in close proximity to one another within a store being above a threshold rate level, that the received sensor data may represent an attempted theft. In response, the display management system controller device 2400 may communicate with a camera 2410, or communicate a message to security personnel, among others.

In one implementation, the display management system controller device 2400 may receive sensor data from an accelerometer sensor 2130 coupled to a flip window 2124. As such, data received from the accelerometer sensor 2130 may represent an orientation of the flip window 2124. In one embodiment, the display management system controller device 2400 may be configured to recalibrate a rest position (otherwise referred to as a zeroed position) associated with the accelerometer sensor 2130. In particular, the processor 2404 may execute one or more processes to recognize that the flip window 2124 is positioned at a specific angle when the flip window 2124 is not being moved. As such, this specific angle may not be equal to a 0° angle from a vertical orientation. In response, the processor 2404 may determine that the specific angle represents a rest position from which motion of the accelerometer sensor 2130 is to be calculated.

In one implementation, the display management system controller device 2400 may be configured to postpone one or more processes associated with recognition of an attempted theft. As such, processor 2404 may execute one or more processes to allow for restocking of one or more display management systems in communication with the display management system controller device 2400, and the like. In one example, a physical key may be utilized to disarm communication between a display management system (1800, 2100 and/or 2300) and the display management system controller device 2400. In another example, and electronic communication device (not shown) may be carried by a user restocking one or more of the display management systems in communication with the display management system controller device 2400. As such, the electronic medication device may communicate across network 2408 to identify the user as a person engaged in restocking a display management system. In yet another example, one or more security features associated with the display management system controller device 2400 configured to identify potential attempted thefts may be temporarily suspended based upon instructions received by the display management system controller device 2400 from a user. In one specific example, this user may be a store manager, and the like. As such, a temporary suspension may be applied to a subset of display management systems (e.g. one or more of the display management systems 1800, 2100 and/or 2300) in communication with the display management system controller device 2400.

In yet another example, display management system controller device 2400 may be connected to an inventory control system (not shown). As such, information gathered by the display management system controller device 2400 related to a number of products removed from one or more display management systems (e.g. one or more of the display management systems 1800, 2100 and/or 2300) may be communicated to an inventory control system such that information related to an inventory held within a store may be updated in real-time, and the like.

In another example, the display management system controller device 2400 may communicate with one or more devices configured to provide data associated with one or more display management systems (e.g. one or more of the display management systems 1800, 2100 and/or 2300), one or more individuals within a store (e.g. customers removing one or more products from the display management systems), and/or one or more communication devices (e.g. cameras, electronic display screens, microphones, ambient light sensors, motion sensors, mobile devices, and the like), among others. As such, the display management system controller device 2400 may communicate with one or more of devices 2006, 2330, 2410, and/or 2412. However, in one implementation, communication between one or more of the devices 2006, 2130, 2410, and/or 2412 may not be using a direct network connection. As such, in one example, communication between one or more of the depicted devices 2006, 2130, 2410, and/or 2412 may utilize mesh networking methodologies, without departing from the scope of the disclosures described herein.

Figure 25:
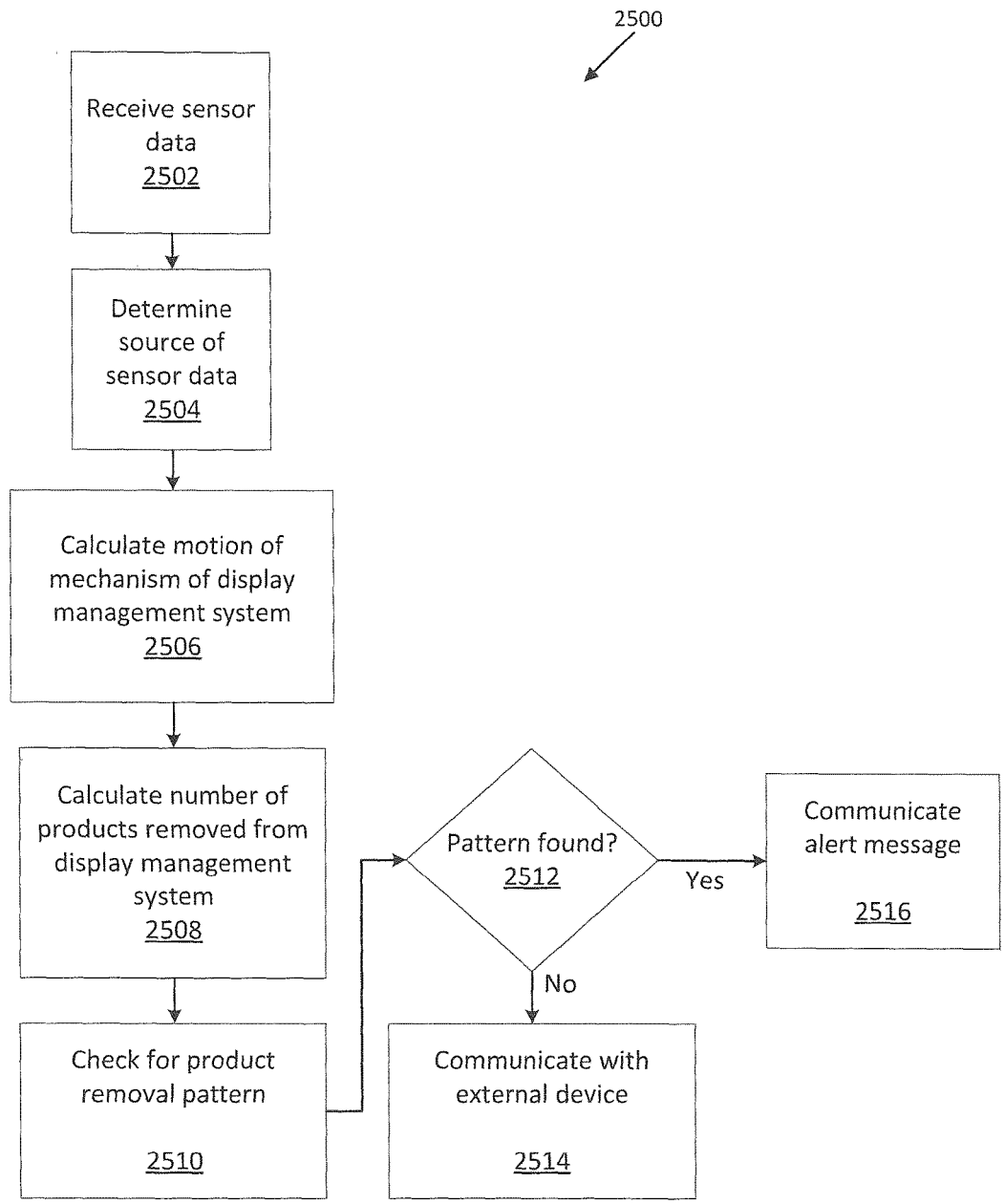
FIG. 25 schematically depicts a flowchart diagram of a process that may be executed by a display management system controller device to determine a number of products removed from a sensor-equipped display management system.

FIG. 25 schematically depicts a flowchart diagram of a process 2500 that may be executed by a display management system controller device 2400, and in particular, processor 2404. In particular, processor 2404 may receive sensor data from one or more sensors (e.g. one or more sensors 1822 and/or 2130, among others). In one example, the sensor data may be received at block 2502. In response to receiving sensor data, processor 2404 may execute one or more processes to determine a source of the received sensor data. In one implementation, processor 2404 may determine a source of the sensor data at block 2504 of process 2500. As such, the processor 2404 may determine a display management system source of the received sensor data, such as one or more of display management systems 1800, 2100, and/or 2300.

Upon determining a source of received sensor data, processor 2404 may execute one or more processes to calculate a motion of a mechanism of a display management system. In particular, the processor 2404 may calculate a position of one or more of a pusher 1804, a flip window 2124, and/or a spiral rail 2302. From this position information, processor 2404 may calculate a distance moved by one or more of the respective mechanisms (1804, 2124, and/or 2302). As such, these one or more processes to calculate a motion of a mechanism of a display management system may be executed at block 2506 in accordance with motion calculation methods previously described in this document.

Further, process 2500 may calculate a number of products removed from the display management system. In particular, processor 2404 may execute one or more processes to infer, or lookup, from a lookup table stored within memory 2402, a depth of a product. Using this information, processor 2404 may compare a depth of a product to a distance moved by, in one example, a pusher 1804. In turn, processor 2404 may calculate the number of products removed from a display management system 1800. Similarly, processor 2404 may utilize substantially similar processes to determine a number of products inserted into a display management system 1800. Accordingly, this determination of a number of products removed from a display management system may be executed at block 2508 of process 2500.

In one example, upon calculation of a number of products removed from a display management system, processor 2404 may execute one or more processes to attempt to identify a pattern from the received sensor data. As such, processor 2404 may execute one or more processes to attempt to identify a product removal pattern from one or more display management systems, such as systems 1800, 2100, and/or 2300. In particular, processor 2404 may identify one or more product removal pattern indicative of a potential attempted theft based upon one or more product removal rates being above one or more threshold rate levels, and/or products being removed from a same display management system and/or multiple display management systems within a predetermined physical radius of one another. In one example, processor 2404 may attempt to identify one or more patterns from received sensor data at block 2510. Accordingly, decision block 2512 represents one or more processes executed by processor 2404 two check whether one or more one or more product removal patterns have been found from received sensor data. In one example, if a product removal pattern is identified by processor 2404, process 2500 may proceed to block 2516, wherein processor 2404 may communicate an alert message. As such, this alert message may be an audible message and/or siren emitted by a local audio box, such as local audio box 950. In another example, this alert message may be an electronic message communicated to security personnel within a store, among others. In another example, if a product removal pattern is not identified by processor 2404, process 2500 may proceed to block 2514, and such that display management system controller device 2400 may communicate with an external device, such as device 2410 and/or 2412.

Figure 26:
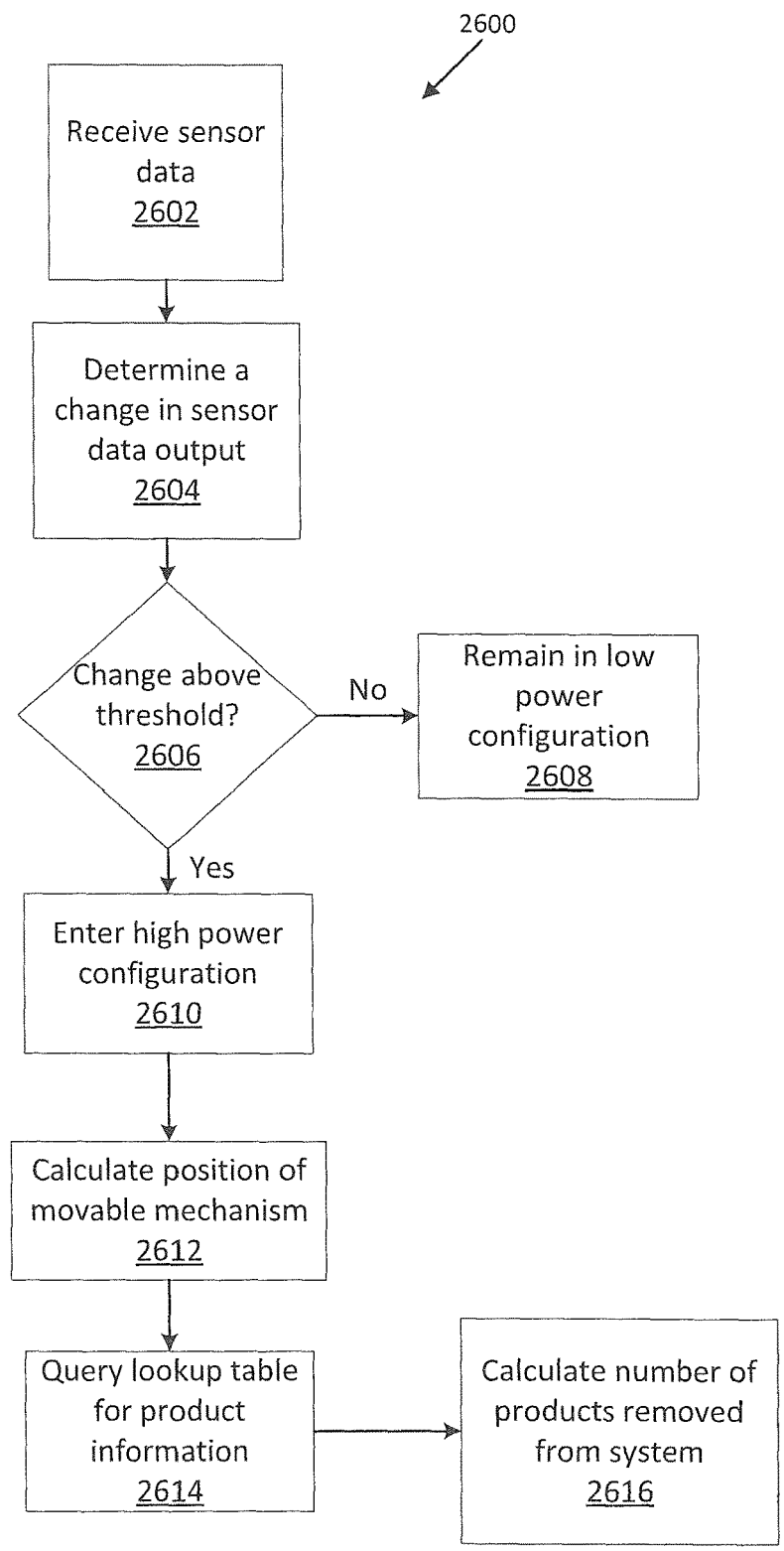
FIG. 26 is a flowchart diagram of a process for calculation of a number of products removed from a display management system.

FIG. 26 is a flowchart diagram of a process 2600 for calculation of a number of products removed from a display management system. In particular, process 2600 is described based upon sensor data received from a sensor (e.g. sensors 1822, and/or 2130) configured to output signals responsive to a motion of a movable mechanism (pusher 1804, flip window 2124, and/or spiral rail 2302, among others) within a display management system, such as display management system 1800, 2100, and/or 2300. In one example, this sensor data may be received at block 2602 of process 2600 by processor 2014. In response, one or more processes may be executed by processor 2014 to determine a change in the received output data. In particular, processor 2014 may execute one or more processes to query memory 2010 for a stored sensor value indicative of a previous output from a same sensor from which the data was received at block 2602. Accordingly, the processor 2014 may compare the stored sensor value to the new sensor value received from a display management system, and calculate a change in an output from the sensor In one implementation, and at decision block 2606, the processor 2014 may compare the calculated change in the output signal from the sensor to one or more predetermined threshold values. As such, the one or more predetermined threshold values may represent motion thresholds below which processor 2014 may discard the sensor data received at block 2602. Specifically, if the received sensor data is below the one or more predetermined threshold values, it may not be as a result of a product removal from a display management system, and may be due to random motion/vibration of a store shelf, among others. As such, in one example, block 2606 may have the behavior of an electronic filter, among others.

In one example, the processor 2014 may execute those processes associated with blocks 2602 and 2604 while operating in a low power configuration. In this way, assessment of received sensor data may be carried out while consuming a reduced amount of electrical energy, and thereby prolonging, in one example, the battery life of a sensor 1822, and/or 2130. Accordingly, if, at decision block 2606, it is determined that the received sensor data does not represent motion of a mechanism of a display management system above one or more threshold values, process 2600 proceeds to block 2608, and the processor 2014 remains in a low power configuration. If, however, it is determined that the received sensor data represents a motion of a mechanism of a display management system above the one or more threshold values, process 2600 proceeds to block 2610, and the processor 2014 may enter a high power configuration. In one example, the high power configuration may include communication of the sensor data to a remote processor, such as processor 2404. In another example, the high power configuration may include execution of one or more additional processes by the same processor 2014, wherein these additional processes may consume electrical energy at a higher rate than the processor 2014 consumers in a low power configuration.

In one example, process 2600 includes calculation of a position of a movable mechanism (e.g. pusher 1804, flip window 2124, and/or spiral rail 2302, among others) of a display management system. In particular, this calculation of a position of a movable mechanism of the display management system may be executed at block 2612. As such, calculation of a position of a movable mechanism of a display management system may include execution of one or more sub-processes to convert received sensor data into an indication of a position of the movable mechanism. Specifically, block 2612 may include execution of one or more processes to convert a value proportional to a capacitance of sensor 1822 into a position of pusher 1804. Additionally or alternatively, block 2612 may include execution of one or more processes to convert a value proportional to an acceleration sensed by accelerometer 2130 into a position of flip window 2124 or spiral rail 2302.

Upon calculation of a position of a movable mechanism of a display management system, processor 2014 and/or processor 2404 may query a lookup table, stored in memory 2010 and/or 2402 for information associated with one or more products stored within the display management system. This information may include a depth dimension of the product stored within the display management system. Accordingly, using this information, the processor 2014 and/or 2404 may calculate a number of products removed from the display management system. In particular, processor 2014 and/or 2404 may compare a distance moved by a movable mechanism of the display management system with the specific product dimensions. In one specific example, a distance moved by pusher 1804 may be divided by a depth dimension of a product stored within the display management system 1800. In one example, this calculation of a number of products removed from the display management system may be executed at block 2616.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the art will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

Figure 27:
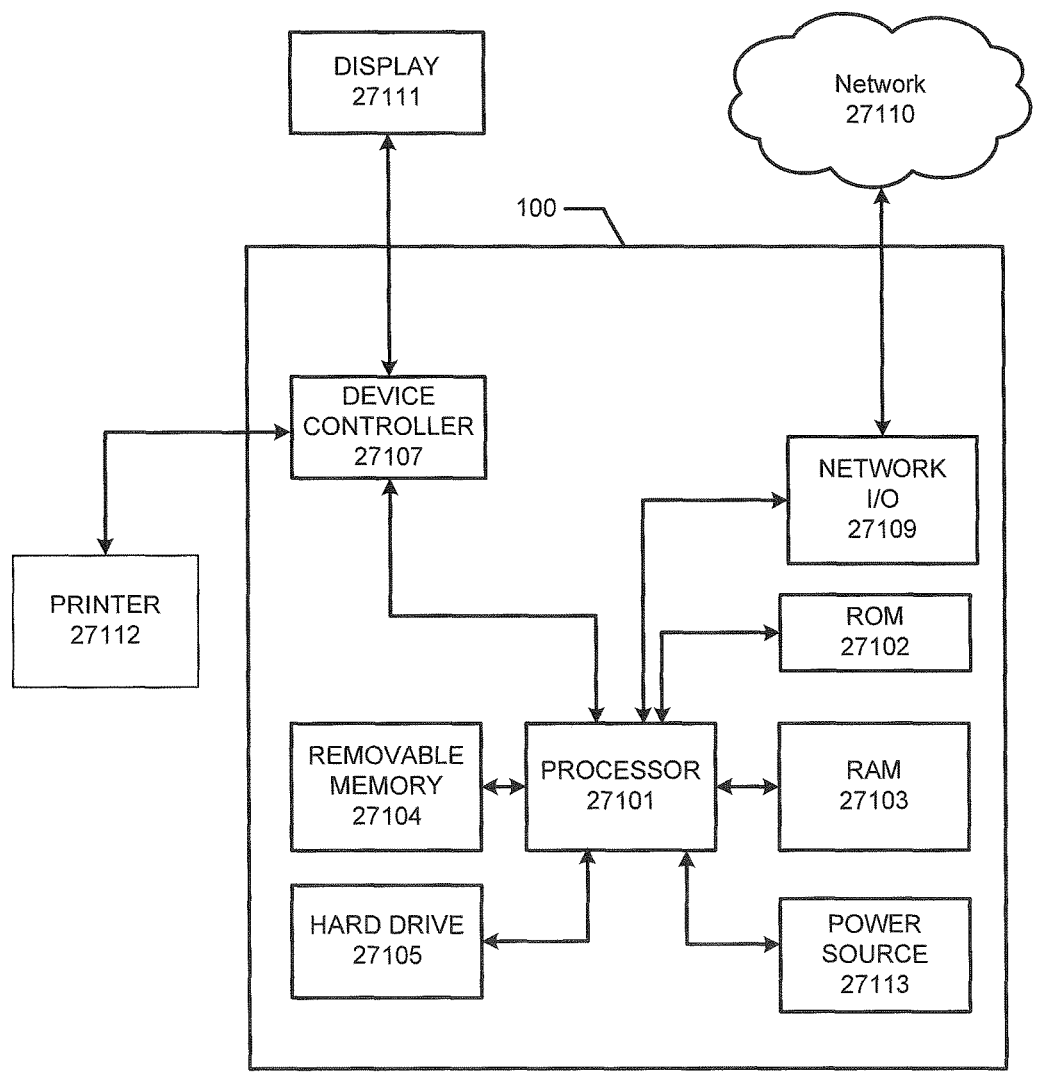
FIG. 27 illustrates an example block diagram of an apparatus for communicating and distributing content according to one or more illustrative aspects of the disclosure.

FIG. 27 illustrates an example block diagram of an apparatus for communicating and distributing content according to one or more illustrative aspects of the disclosure. Network 27110 may include networks of one or more access points, Internet devices, telephone networks, cellular telephone networks, fiber optic networks, local wireless networks (e.g., WiMAX), satellite networks, and any other desired network. The network 27110 may include and/or function as a cloud computing infrastructure comprising various processing and/or memory devices (e.g., servers, databases, application providers, etc.).

DETAILED DESCRIPTION

The various devices described herein, such as a continuous display shelf edge label device, a server, a scanner, a database, a computer, and the like may be computing devices, and FIG. 27 illustrates general hardware elements that can be used to implement any of the various computing devices discussed herein. The computing device 27100 may include one or more processors 27101, which may execute instructions of a computer program to perform any of the features described herein. Processor 27101 may comprise a customized digital integrated circuit such as an ASIC. However, in some applications, commercially available processors may be employed. The instructions may be stored in any type of non-transitory computer-readable medium or memory, to configure the operation of the processor 27101. For example, instructions may be stored in a read-only memory (ROM) 27102, random access memory (RAM) 27103, hard drive 27105, removable media 27104, such as a Universal Serial Bus (USB) drive, compact disk (CD) or digital versatile disk (DVD), floppy disk drive, or any other desired electronic storage medium. Instructions may also be stored in an attached (or internal) hard drive 27105. One or more of the memories 27102, 27103, 27104, and/or 27105 may include a more advanced operation environment such as an operating system for advanced functionality and adaptability.

One or more memories 27102, 27103, 27104, and/or 27105 may include a stored address location and display data location data. Address location may include an address that identifies the computing device 27100. The address may uniquely identify the computing device 27100. Display data location data may be used by processor 27101 to format data to be displayed on display 27111. This may include text data, graphics, dynamic content, and combinations. In accordance with at least one embodiment, the display data location data in a memory may is in accordance with a mark-up language such as HTML, XML, or the like. Although shown in FIG. 27 as being outside of computing device 27100, display 27111 also may be integrated into a same physical housing and/or structure as computing device 27100. One or more components shown within computing device 27100 similarly may be housed separately in another device and/or in another location from computing device 27100.

The computing device 27100 may include one or more output devices, such as a display 27111, and printer 27112, and may include one or more output device controllers 27107, such as a video processor. There may also be one or more user input devices (not shown), such as a remote control, keyboard, mouse, touch screen, microphone, etc. In another embodiment, input/output functions with a user may occur through display 27111 where display 27111 may be configured to allow for touch screen input in order to see additional output on the display 27111. As shown illustratively in the examples of FIGS. 29-34B, display 27111 may be configured to be oriented along an entire edge of a shelf of a retailer. This area of a shelf often includes paper labels that identify the product being sold above it and possibly additional information, such as price, cost/oz., and the like. Electronic shelf labels allow for a similar concept as a paper label, but with an individual computing device with a display screen for each product. Such electronic shelf label devices provide information regarding the single product being sold above it and possibly additional information, such as price, cost/oz., and the like and may include additional output such as video. The video may contain promotional content, seasonal greetings, and/or general messages directed to consumers. However, display 27111 of FIG. 27 is configured to output at least two user interfaces that correlate to two different products that a retailer may be offering for sale.

Display 27111, in operation with device controller 27107 and/or processor 27101, may be configured to receive swipes across its surface by an individual's finger. The swipes of a finger may be correlated to an operational table for an action to be taken with respect to outputted user interface data. Display 27111, in operation with device controller 27107 and/or processor 27101, may be configured to translate one or more finger swipes across its surface as one or more particular actions to be taken as described herein. Illustrative examples may include interpreting a movement of two fingers on the surface being moved away from each other as an expansion instruction, e.g., an input by an individual to expand the size of something, such as text size of the user interface, border design size of the user interface, frame size of the user interface, and the like. Other examples include interpreting the creation of an "X" by two finger movements over top of a user interface as a deletion instruction, e.g., an input by an individual to delete a user interface. Still other examples include interpreting a press and hold and movement of a finger from one area of the display to another area of the display as a movement instruction, e.g., an input by an individual to move a user interface from a current location on the display to another location on the display. Yet other illustrative examples include interpreting a double tap on the display surface by two finger taps as an addition instruction, e.g., an input by an individual to add a user interface to that area of the display that was tapped. Still further illustrative examples include interpreting a movement of two fingers on the surface being toward each other as a reduction instruction, e.g., an input by an individual to reduce the size of something, such as text size of the user interface, border design size of the user interface, frame size of the user interface, and the like. The examples described herein are merely illustrative and any of a number of additional input movements/taps across the surface of display 27111 may be included herein for any of a number of other types of instructional requests by an individual to change a parameter of a user interface on display 27111.

In other embodiments, display 27111 may be configured to identify movements of a stylus or other pointing device against its surface in a similar manner as described herein with respect to an individual's fingers. A user and display 27111 could interact with a stylus as the source of input by the user. As far as potential authorization of the individual, some manner of identification/authorization may be built into the stylus such that, if in contact with the display 27111, the stylus could act as the mechanism for authenticating the individual to make changes to one or more parameters of the continuous display shelf edge label device as described herein. In still further embodiments, display 27111 may be configured to identify movements of an individual's finger against its surface for entry of user interface information directly. A user could handwrite pricing information and/or other information about a particular product with her finger on display 27111. Software may be included in a memory of the computing device to translate received finger swipes as corresponding to pricing information, product name information, and/or other product data information. In such examples, a worker can merely write in the current pricing for a product.

Similarly, display 27111 may be configured to activate an electronic keyboard on screen and/or an electronic keypad. A digital alphanumeric user interface may be displayed on display 27111 to allow an authorized individual to enter product information data and/or modify a user interface on display 27111 in some other manner. For example, a worker could enter a pricing for a particular product by entering a number sequence on a displayed digital keypad. An entry of "$" character followed by "1", ".", "4", "9" may be translated by software within a memory of a computing device associated with display 27111 as entry of a pricing label of $1.49 for a user interface for a particular product. In other scenarios, a worker may use alphanumeric characters to type in text for display in a user interface of a product, such as "On Sale Now!" In still other scenarios, special digital input options may be made available to an authorized individual for quick entry. A favorites list may prompt a worker to choose from a list where one entry may be "On Sale Now," a second entry may be "Sale Ends Tomorrow," while another entry may be "Buy 1, Get 1 Free!"

Figure 28A:
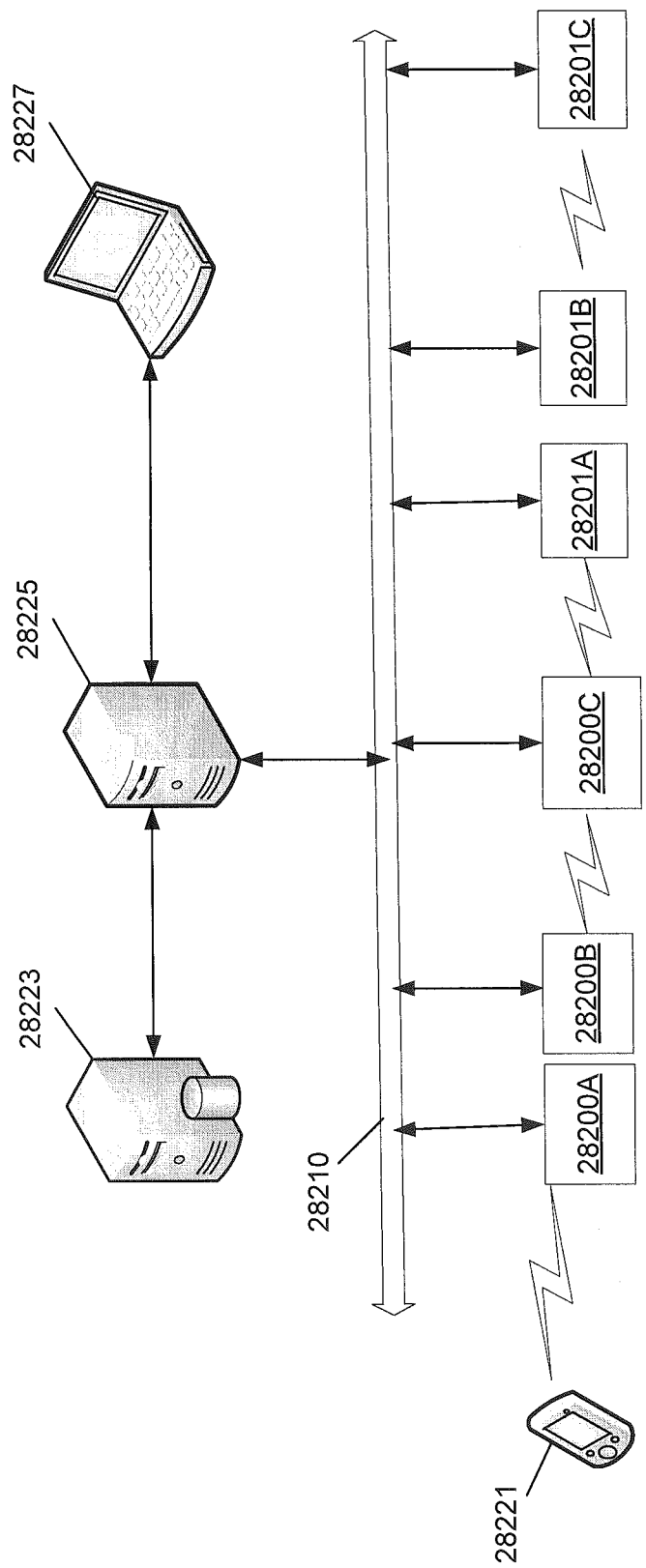
FIGS. 28A-28B illustrates example block diagrams of systems for communicating and distributing content according to one or more illustrative aspects of the disclosure.

In yet other embodiments, an authorized individual may access display 27111 in order to access data for a user interface from a remote location. In the example of FIG. 28A where data about products may be maintained in database 28223, a worker could access display 27111 about a particular user interface for a product. The worker could access the database through a visual file/folder system. Each component of a network system implementing the disclosure as described herein may be accessible through a continuous display shelf edge label device and may appear as some type of visual indicator on display 27111. A worker could search and find the applicable component for the requested data (such as find an icon corresponding to the database 28223) and access that component (launch the icon) to obtain the desired data. Any of a number of additional entry mechanisms may be utilized and the examples described herein are merely illustrative.

In additional embodiments, display 27111 may be configured to include gesture-based interface capabilities as one manner to allow an authorized individual to edit/manipulate the user interfaces on the display 27111. Display 27111 may include appropriate hardware and/or software components to interpret gestures of an individual, whether a finger, a hand, and/or some other portion, via mathematical algorithms. These gestures may include one or more of the finger to surface examples described herein. In some of these embodiments, one or more cameras may be associated with and/or included with display 27111 for capture of imaging and recognition of gestures. Although the majority of examples herein are for an individual interfacing with a display with her finger, it should be understood that such examples may be implemented similarly by way of gesture based technologies as described herein.

The computing device 27100 may also include one or more network interfaces, such as input/output circuits 27109 (such as a network interface circuit, a scanner interface circuit, and the like) to communicate with an external network 27110. The input/output circuits 27109 may be a wired interface, wireless interface, or a combination of the two. The input/output circuits 27109 allows for communication between two computing devices, such as a continuous display shelf edge label devices and a scanner, e.g., 28200 and 28221 in FIG. 28 described herein, a continuous display shelf edge label devices and a remote user terminal, e.g., 28200 and 28227 in FIG. 28 described herein, and/or a continuous display shelf edge label devices and a database, e.g., 28200 and 28223 in FIG. 28 described herein, and/or a continuous display shelf edge label device and the products on the shelf, e.g. 28200A, 28200B, and 28200C in FIG. 28B described herein.

Computing device 27100 also may include a power source 27113. Power source 27113 allows for the computing device to operate the processor 27101 and various other components. For example, power drawn from power source 113 may be used to power products on the shelves, e.g. 28200A, 28200B, and 28200C in FIG. 28B described herein. Power drawn from power source 113 may also be used to provide power to the packages encapsulating the products on the shelves. Power source 27113 may include a dedicated battery source or external power source, such as an AC source connection. In other embodiments, power source 27113 may be configured to operate by harvesting energy for operation from ambient light in a store where the computing device is located. Light energy may be captured by a variety of means for conversion, such as by photo sensors, solar photovoltaic panels, and photo diodes. Because the computing device 27100 may operate without an external source connection, movement of the computing device from one physical location to another physical location can be accomplished without the need to reconnect to another external source. Further, because the computing device 27100 may operate without an internal battery, the computing device does not need to be checked to ensure operation nor need to have a technician replace the internal battery.

Figure 28B:
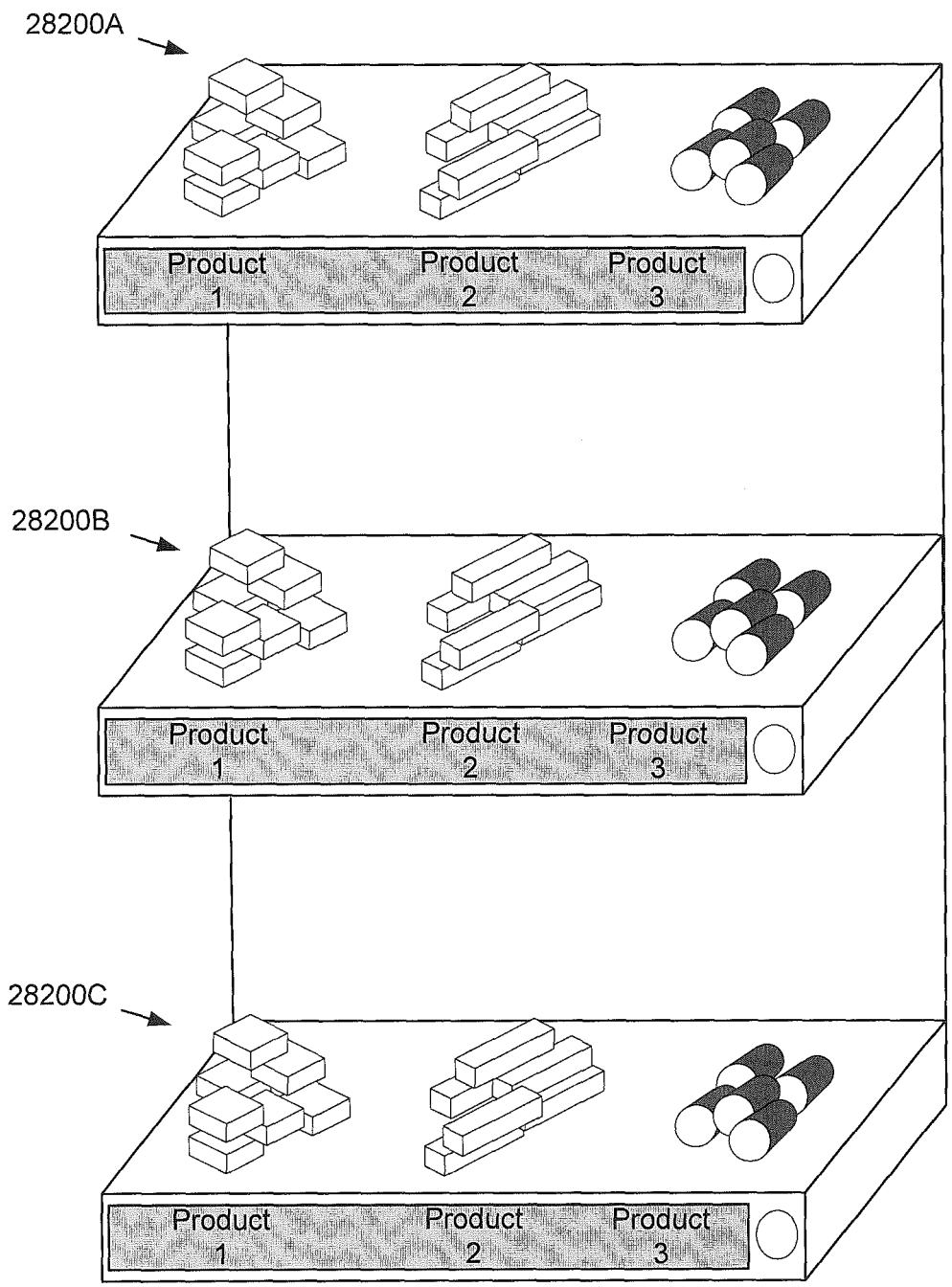

FIGS. 28A-28B illustrate example block diagrams of systems for communicating and distributing content according to one or more illustrative aspects of the disclosure. In the example of FIG. 28A, a plurality of computing devices, are shown operatively connected to a network 28210. Network 28210 may include network 27110. Connected to network 28210 are shown three continuous display shelf edge label devices 28200A-28200C and products 28201A-28201C. Additionally, the packages encapsulating products 28201A-28201C may also be connected to network 28210. Continuous display shelf edge label devices 28200A-28200C may be computing device 27100 and/or may include one or more of the components described therein. The three continuous display shelf edge label devices 28200A-28200C may be along an aisle of a retailer's store. The three continuous display shelf edge label devices 28200A-28200C may be positioned above each other as illustratively depicted in FIG. 28B. Products 28201A-201C may be positioned above each of continuous display shelf edge label devices 28200A-200C, respectively. Products 28201A-201C may communicate with each other and with continuous display shelf edge label devices 28200A-28200C. Although illustratively shown as a wireless communication, the transmission path between continuous display shelf edge label devices 28200A-200C and products 28201A-201C may be a wired communication path, through network 28210, and/or in some other manner.

Continuous display shelf edge label device 28200A is shown as being in communication with a scanner 28221. Although illustratively shown as a wireless communication, the transmission path between continuous display shelf edge label device 28200A and scanner 28221 may be a wired communication path, through network 28210, and/or in some other manner. Scanner 28221 may interact with continuous display shelf edge label device 28200A through a communication interface, such as input/output circuits 27109. Continuous display shelf edge label device 28200A may be configured to receive data representative of information about a product on a shelf where the continuous display shelf edge label device 28200A is located. An authorized individual, such as a worker for the retailer, may desire to update pricing data currently being displayed about a product on the shelf By interfacing with the scanner 28221, the price data for a particular product may be received electronically by the continuous display shelf edge label device 28200A. Illustrative manners for transmission of such data include coding data for wireless transmission and forwarding the data wirelessly to the continuous display shelf edge label device 28200A. In one example, an individual may type in a price at scanner 28221 and data representative of the price may be sent wirelessly to the continuous display shelf edge label device 28200A. The continuous display shelf edge label device 28200A may then update a user interface for a product corresponding to the price data as described herein.

Continuous display shelf edge label devices 28200B and 28200C are shown as being in communication with each other. Although illustratively shown as a wireless communication, the transmission path between continuous display shelf edge label devices 28200B and 28200C may be a wired communication path, through network 28210, and/or in some other manner. Continuous display shelf edge label device 28200B may interact with continuous display shelf edge label device 28200C through a communication interface, such as input/output circuits 27109. Continuous display shelf edge label device 28200B may be configured to receive data representative of information about a product on a shelf where the continuous display shelf edge label device 28200B is located. An authorized individual, such as a worker for the retailer, may desire to update pricing data currently being displayed about a product on the shelf. By interfacing with the continuous display shelf edge label device 28200C, the price data for a particular product may be received electronically by the continuous display shelf edge label device 28200B. Such an interface may be the worker swiping her finger across the display surface of the continuous display shelf edge label device 28200C to initiate a movement instruction to have a user interface from continuous display shelf edge label device 28200C be transferred to continuous display shelf edge label device 28200B. In one example, the worker may press and hold a user interface on continuous display shelf edge label device 28200C and move her finger up quickly in a flicking motion. Such a motion may be interpreted by the system to transfer the flicked user interface to the next shelf edge up. As such, because continuous display shelf edge label device 28200B is on the next shelf edge above continuous display shelf edge label device 28200C, the flicked user interface can be added to the continuous display shelf edge label device 28200B. Illustrative manners for transmission of such data include coding data for wired transmission and forwarding the data to the continuous display shelf edge label device 28200B.

Aspects of the interaction between a worker located near a shelf with a scanner 28221 may be similarly implemented between a worker located remote from such a shelf. User terminal device 28227 is shown operatively connected to continuous display shelf edge label devices 28200A-28200C and products 28201A-201C through network 28210 and a main hub 28225. Main hub 28225 may be some type of central processing server configured to accommodate transmission of communications between various backend components of a retailer's network, such as user terminals 28227 and a database 28223 and from a backend to a storefront end, such as to continuous display shelf edge label devices 28200A-28200C through network 28210. and products 28201A-201C through network 28210. Main hub 28225, user terminal 28227, and/or database 28223 may include one or more components of the computing device 27100 illustrated in FIG. 27.

A worker at user terminal 28227 may update pricing data, and/or other data, about a particular product on a particular shelf by accessing the continuous display shelf edge label device associated with that product. User terminal 28227 may access database 28223 for current product information for potential display and/or scheduled display. Instructions may be sent from user terminal 28227 on such product information to the appropriate continuous display shelf edge label device. In still other embodiments, database 28223, main hub 28225, and/or user terminal 28227 may periodically push current product information data to continuous display shelf edge label devices 28200A-200C, either globally or specifically. The continuous display shelf edge label devices 28200A-200C may receive such data and change user interfaces being displayed as needed.

Alternatively, continuous display shelf edge label devices 28200A-200C may be configured to automatically initiate the updating of prices. For example, continuous display shelf edge label devices 28200A-28200C may access database 28223 to obtain current product information data for respective user interfaces on the continuous display shelf edge label devices. Continuous display shelf edge label devices 28200A-28200C may periodically poll the database 28223 to obtain current product information data and change user interfaces being displayed as needed.

In one such example, database 28223 may be periodically updated with pricing changes, such as by a worker through user terminal 28227. In a second such example, database 28223 may, at the time of access by the continuous display shelf edge label devices, obtain current product information from external sources. These sources may include competing brick-and-mortar retailers and/or competing online retailers, and this allows the database 28223 to obtain real-time current product information. Such current product information may be transmitted from the database 28223 to continuous display shelf edge label devices 28200A-200C. In one example, the database 28223 may also transmit an indication of whether the continuous display shelf edge label device should update the user interfaces to reflect the current product information, using for example, a flag. Alternatively, the continuous display shelf edge label devices 28200A-200C may be configured to independently determine whether the user interfaces should be updated to reflect the current product information. For example, the continuous display shelf edge label devices 28200A-200C may be configured with threshold values. If the price in the current product information falls above or below a threshold value, or within a range of threshold values, the continuous display shelf edge label devices may update the user interface with the current product information. If the price in the current product information is outside the threshold values, the continuous display shelf edge label devices may determine that the user interfaces should not be updated. Alternatively, in such a scenario, the continuous display shelf edge label devices may query the database 28223 for an exception. If the database 28223 grants the exception, the continuous display shelf edge label device may the user interface with the current product information; otherwise, the continuous display shelf edge label device may not modify the user interface.

Figure 29:
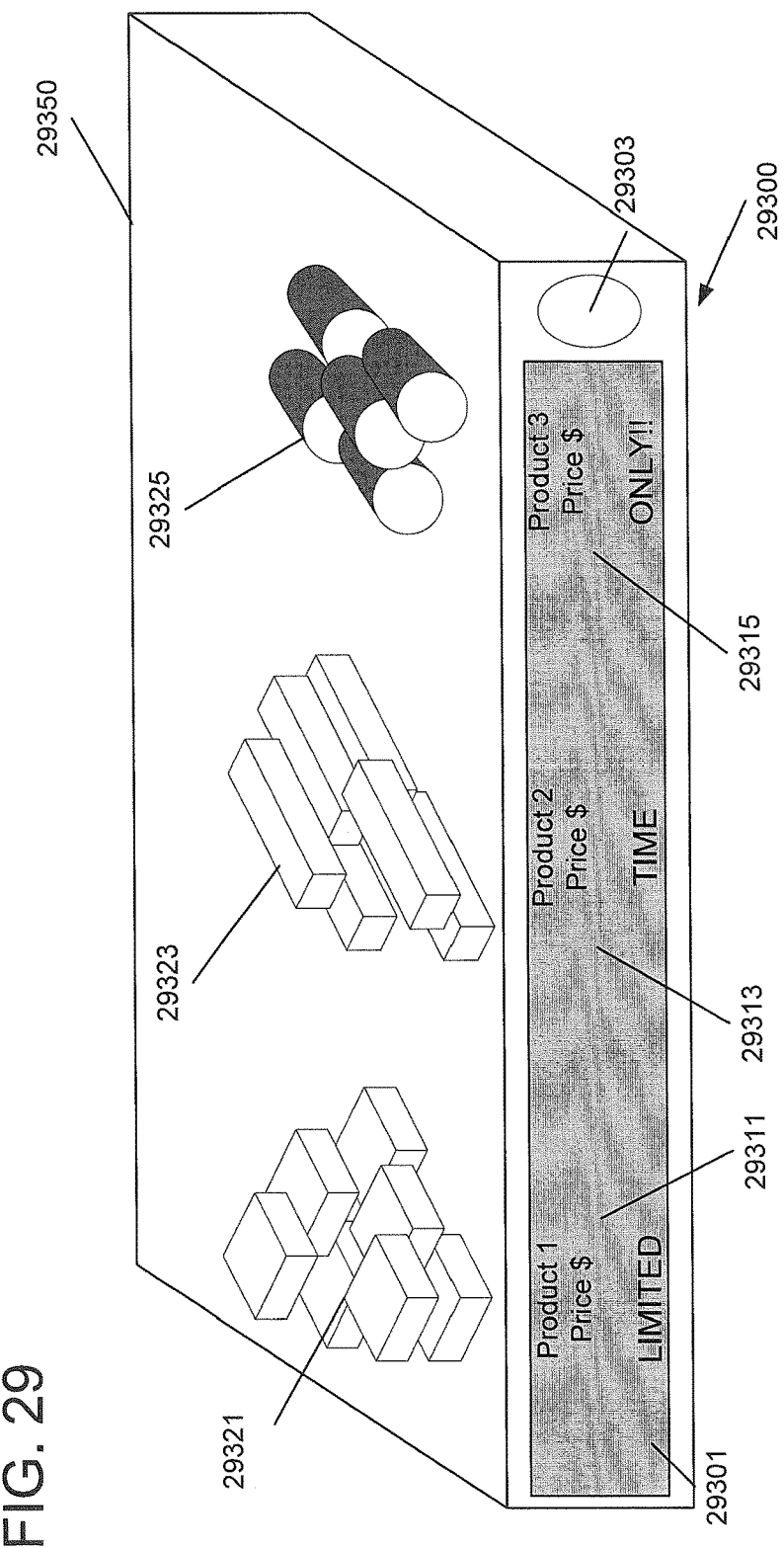
FIG. 29 illustrates an example block diagram of an apparatus for communicating and distributing content according to one or more illustrative aspects of the disclosure.

FIG. 29 illustrates an example block diagram of an apparatus for communicating and distributing content according to one or more illustrative aspects of the disclosure. FIG. 29 illustrates a continuous display shelf edge label device 29300, such as continuous display shelf edge label devices 28200A-28200C. In this example, continuous display shelf edge label device 29300 includes a single display area 29301 oriented along an entire edge of a shelf 29350. In one example, shelf 29350 is manufactured from plastic. Plastic shelves provide multiple advantages from a merchandising perspective, as plastic is light-weight. Light-weight plastic shelves are less expensive to ship and can be pulled-out for, for example, cleaning, retrieval of fallen products, and inventory purposes. This makes it easier and faster to rotate inventory and stock the shelves. The plastic shelves may be manufactured using a molding process, wherein the shelves may include a chassis in which continuous display shelf edge label devices may be integrated. The plastic shelves may have repeaters embedded within the shelves. Additionally, blade signs can be mounted on the plastic shelves.

Additionally, plastic shelves provide an advantage over traditional metal shelves because electricity (and other signals) can permeate through the plastic shelves with little to no interference. Electronics and other elements may be embedded directly into the plastic shelves. The passing of signals through the plastic shelves allows, for example, the powering of printer 27112, the products on the shelves, and the packages encapsulating the products on the shelves. For example, power may be sent from the plastic shelves, through the air, to a receiver in the product or its encapsulating package. The passing of signals through the plastic shelves allows for better communication between components throughout the entire network, including from the back-end computers to the shelves, the pushers, and the products. Plastic shelves may also be used to interact with the product—displays on the shelves may extend into the products or encapsulating packages.

As noted above, electric signals and other signals permeate through the plastic shelves with less interference than metal shelves. Accordingly, it is easier to mount and power additional user devices to plastic shelf 29350, such as printer 27112. This allows for greater user interaction and may incentivize the consumer to make purchases they would not otherwise make. For example, if a customer selects a first product, continuous display shelf edge label device 29300 can display assembly instructions for the first product as well as an option to allow the customer to print the assembly instructions via the printer 27112. In a second example, if the customer selects a first food item, continuous display shelf edge label device 29300 can provide recipes that incorporate the first food item. Continuous display shelf edge label device 29300 may present the user with an option to print out the recipe and/or a list of other ingredients used in the recipe via printer 27112.

Continuous display shelf edge label device 29300 also is shown to include a locking mechanism 29303 that allows an individual to change modes of operation of the continuous display shelf edge label device 29300 as described herein. In one mode, an authorized individual may edit one or more user interfaces 29311, 29313, and 29315 while in a second mode, the user interfaces 29311, 29313, and 29315 may not be edited.

The single continuous display 29301 provides a continuous label across shelf 29350, on the products themselves (e.g. 29321, 29323, and 29325), on the packages encapsulating the products, or any combination thereof. The single continuous display 29301 allows for both dynamic and static messaging to the consumer, including streaming video/audio. The dynamic messaging can include pricing, advertisements, imagery, and good-will greetings (e.g. Happy Holidays). As discussed above in reference to FIG. 28, changes in pricing can be quickly and efficiently reflected on the user interfaces. Price updates may be provided hourly, daily, weekly, yearly, etc., and may also fluctuate based on current and projected inventory. Additionally, the user interfaces on single continuous display 29301 is valuable real-estate that may be utilized by the retailer to recoup investment costs. For example, the retailer may rent out the display space on the user interfaces to manufacturers and other businesses for advertisements. Data collected by the single continuous display 29301 via the interactive user interfaces may also be sold to various manufacturers and the multitude of businesses directed to collecting, analyzing, and monetizing the data.

The single continuous display 29301 is shown to include three separate user interfaces that provide information regarding three separate products being offered for sale on the shelf 29350. In this example, shelf 29350 holds a first product 29321, a second product 29323, and a third product 29325. Single continuous display 29301 includes three digital user interfaces, one for each respective product being offered for sale. User interface 29311 provides information about first product 29321 directly above the user interface 29311. Similarly, user interfaces 29313 and 29315 provide information about second product 29323 and third product 29325, respectively, that are above the respective user interfaces 29313, 29315. Any of a number of types of information about a product may be displayed on the single continuous display 29301, including graphics, text, animations, video, and/or combinations.

As the single continuous display 29301 is designed to be dynamic, the displayed messages are not restricted to any particular size or configuration. Rather, the message may be dynamically and continuously altered, and may include any combination of any number of single continuous displays, user interfaces, products, and the packages encapsulating the products. In one instance, the separate user interfaces in single continuous display 29301 can be utilized to each display a portion of a larger message. For example, if the single continuous display 29301 is to display "Limited Time Only", user interface 29311 can be configured to display "Limited", user interface 29313 can be used to display "Time", and user interface 29315 can be configured to display "Only". In another example, a message can first be apportioned among vertically-stacked multiple continuous displays, and then further sub-divided between separate user interfaces and/or the packages corresponding to the user interfaces on each of the continuous displays. The message may include graphics, text, animations, streaming video, or any combination thereof. Each of the vertically-stacked multiple continuous displays, user interfaces, and packages may then simultaneously output a different part of the message.

Figure 30A:
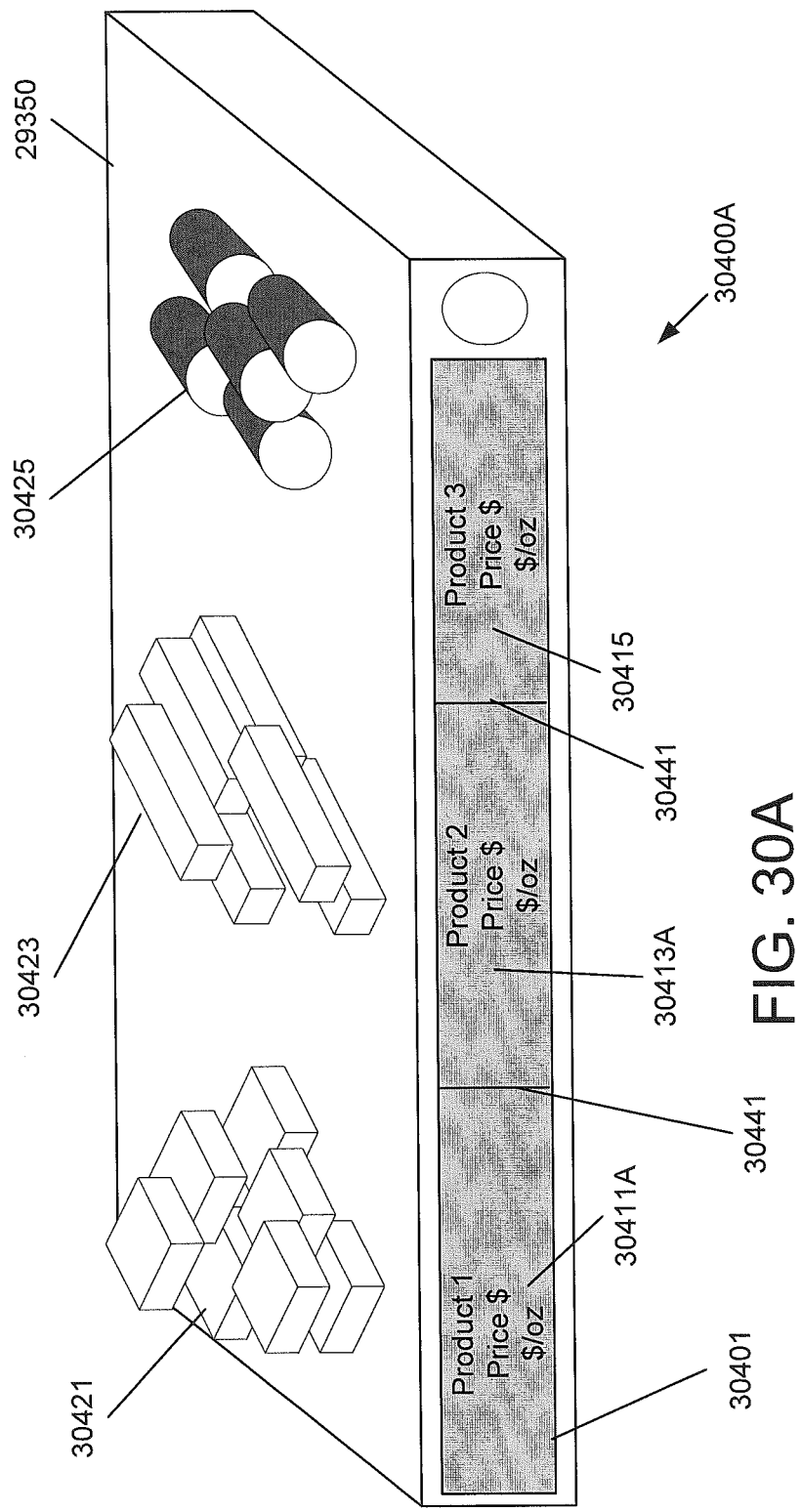
FIGS. 30A-30B illustrate an example of a changing continuous display according to one or more illustrative aspects of the disclosure.
Figure 30B:
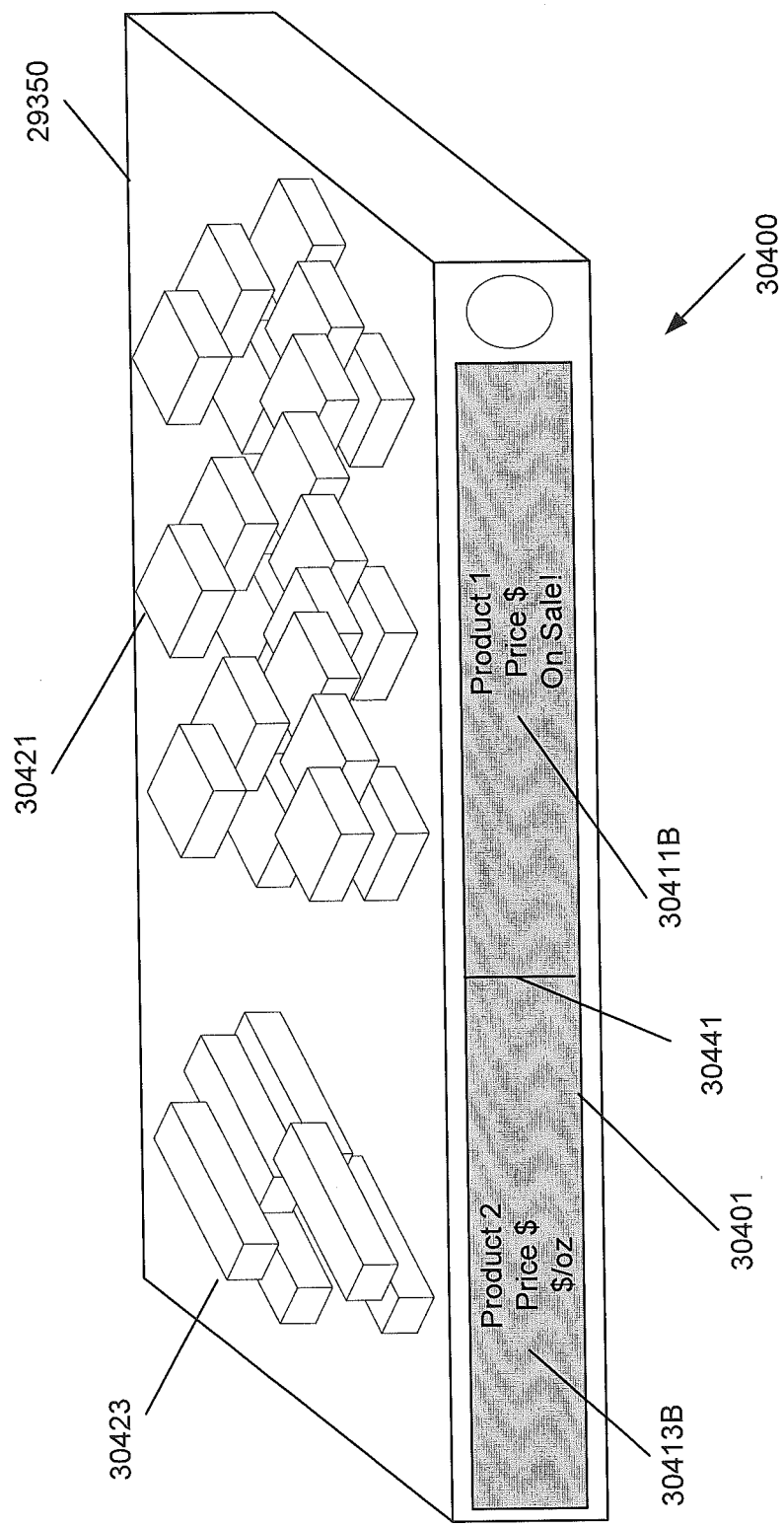

FIGS. 30A-30B illustrate an example of a changing continuous display according to one or more illustrative aspects of the disclosure. The transition from FIG. 30A to FIG. 30B illustrates one potential before and after operation of changing the user interfaces of a single continuous display. In FIG. 30A, a continuous display shelf edge label device 30400 is shown for a shelf 29350. Continuous shelf label device 30400 may be one of continuous display shelf edge label devices 28200A-28200C and 29300. Continuous display shelf edge label device 30400 includes a single display area 30401 oriented along an entire edge of shelf 29350. The single continuous display 30401 is shown to include three separate user interfaces that provide information regarding three separate products being offered for sale on the shelf 29350.

For this illustrative example, a digital divider line 30441 creates three separate visual frames for the three separate user interfaces 30411A, 30413A, and 30415. Digital divider line is not a physical line that separates two displays, rather it is a digital line that creates the appearance of separation of the single continuous display 30401 into multiple display areas. In this example, shelf 29350 holds a first product 30421, a second product 30423, and a third product 30425. Single continuous display 30401 includes three digital user interfaces, one for each respective product being offered for sale. User interface 30411A provides information about first product 30421 directly above the user interface 30411. User interface 30413A provides information about second product 30423 directly above user interface 30413A, and user interface 30415 provides information about third product 30425 directly above user interface 30415.

Transitioning to FIG. 30B, a worker may want to change the product layout for shelf 29350 and in this example has removed the third product 30425 from shelf 29350 and created a larger area on shelf 29350 for first product 30421 to reside. Accordingly, the worker, as described herein, has changed the user interfaces for the single continuous display 30401 in response. In this example, because the location of the user interfaces have been changed, user interface 30411B is now shown to have moved toward the right side of the continuous display 30401 since the first product 30421 has been moved to the right side of shelf 29350. Similarly, user interface 30413B is shown to have been moved toward the left side of the continuous display 30401 since the second product 30423 has been moved to the left side of shelf 29350. Because third product 30425 is no longer being offered for sale on shelf 29350, the user interface 30415 for third product 30425 has been deleted from continuous display 30401. In this example of FIG. 30B, because there are only two user interfaces 30411B and 30413B shown on continuous display 30401, only one digital divider line 30441 is shown to frame out the two separate user interfaces 30411B and 30413B.

Figure 31A:
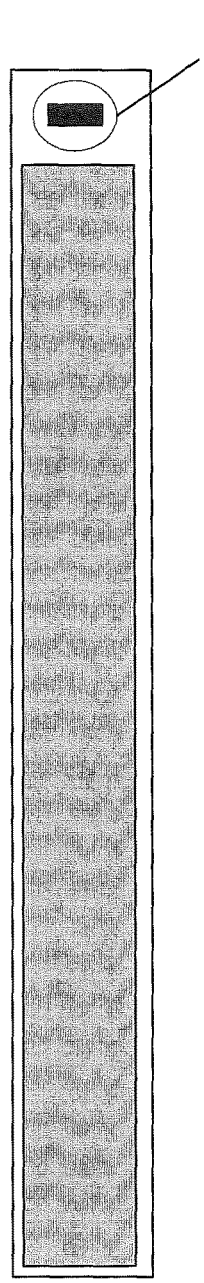
FIGS. 31A-31C illustrate example continuous displays with locking mechanism according to one or more illustrative aspects of the disclosure.
Figure 31B:
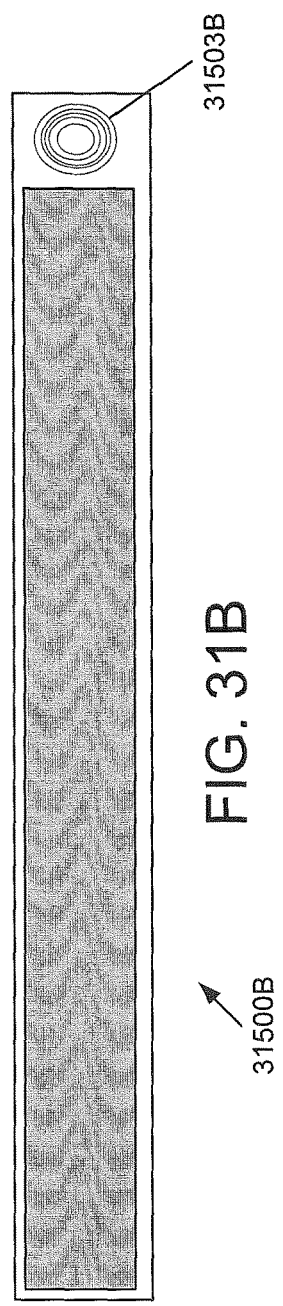
Figure 31C:
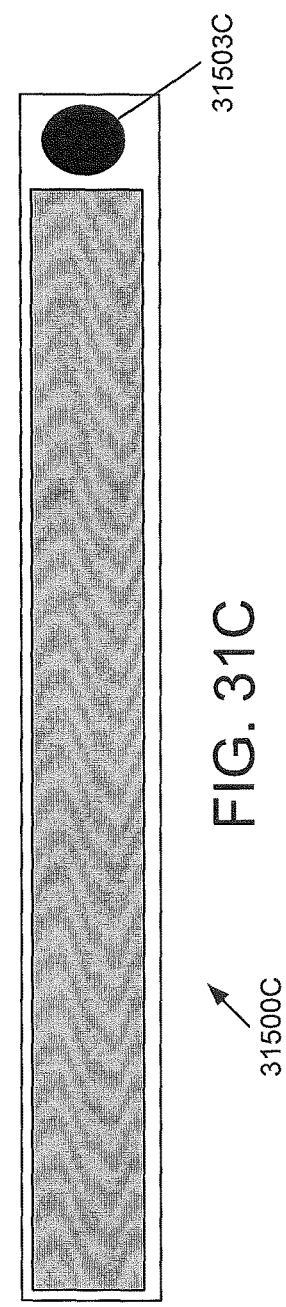

FIGS. 31A-31C illustrate example continuous displays with locking mechanism according to one or more illustrative aspects of the disclosure. As described herein, a locking mechanism may be included on a continuous display shelf edge label device in order to prevent an unauthorized individual from changing one or more parameters, such as displayed information, of a user interface displayed on the continuous display shelf edge label device. Any of a number of preventive manners may be included herein and the following are but some illustrative examples. In FIG. 31A, a manual device input 31503A, such as for a physical key, may be included in a continuous display shelf edge label device 31500A. By inserting a proper key, an authorized individual may change the mode of operation of the continuous display shelf edge label device from a display mode to a change mode.

A display mode may be a mode of operation where the continuous display shelf edge label device displays one or more interfaces on a single continuous display and may even allow a user, such as a customer, to access the single continuous display for additional information. Such an access may be by touch. However, in a display mode, such a customer cannot change a parameter of a user interface being displayed, such as the size of the user interface, the shape of the user interface, or the location of the user interface on the single continuous display. The customer can view and interact as allowed without having the ability to change parameters of the display area for the user interface.

A change mode may be a mode of operation where the continuous display shelf edge label device displays one or more interfaces on a single continuous display and allows an authorized user, such as a worker, to change one or more parameters of the single continuous display. Such an access may be by touch as described herein. In a change mode, the worker can change a parameter of a user interface being displayed, such as the size of the user interface, the shape of the user interface, or the location of the user interface on the single continuous display. As such, a worker easily can modify any aspect of a user interface corresponding to a product at the point of sale.

FIGS. 31B and 31C illustrate two other types of locking mechanisms. In FIG. 31B, a biometric scanner 31503B, such as to scan prints of a finger, may be included in a continuous display shelf edge label device 31500B. By pressing a finger against the biometric scanner 31503B, an authorized individual may change the mode of operation of the continuous display shelf edge label device from a display mode to a change mode. In FIG. 31C, a near field communication (NFC) reader 31503C, such as to scan NFC enabled access cards of workers, may be included in a continuous display shelf edge label device 31500C. By pressing an NFC enabled access card against the NFC reader 31503C, an authorized individual may change the mode of operation of the continuous display shelf edge label device from a display mode to a change mode.

FIGS. 31D-31F illustrates an example of a changing continuous display with locking mechanism user interface according to one or more illustrative aspects of the disclosure. In the example of FIGS. 31D-31F, a locking mechanism is built into the continuous display shelf edge label device 31500D. In this example, a worker will enter a code to change the mode of operation of the continuous display shelf edge label device 31500D. As shown in FIG. 31D, a single continuous display 31501D includes two user interfaces 31511 and 31513 for respective products. Also shown in FIG. 31D is a lock icon 31503D. Accessing lock icon 31503D allows an authorized individual to change modes of operation of continuous display shelf edge label device 31500D. By tapping on lock icon 31503D, the worker may be shown what is seen in FIG. 31E. In FIG. 31E, a new user interface 31503E appears that prompts an individual for entry of a code to authorize the changing of the modes of operation. By inserting a proper code in FIG. 31E, an authorized individual may change the mode of operation of the continuous display shelf edge label device 31500D from a display mode to a change mode.

If the individual does not enter a proper code, the continuous display shelf edge label device 31500D may transition back to the appearance shown in FIG. 31D. However, if the individual does enter a proper code, the continuous display shelf edge label device 31500D may change modes of operation to a change mode allowing the individual to change one or more parameters of one or more user interfaces for products. Following any changes, the individual does not enter a proper code, the continuous display shelf edge label device 31500D may transition back to a display mode as shown in FIG. 31F. As shown, the individual has changed the location of user interface 31511 and user interface 31513 with respect to each other on the single continuous display 31501D. Locking icon 31503D is shown as well.

Figure 32A:
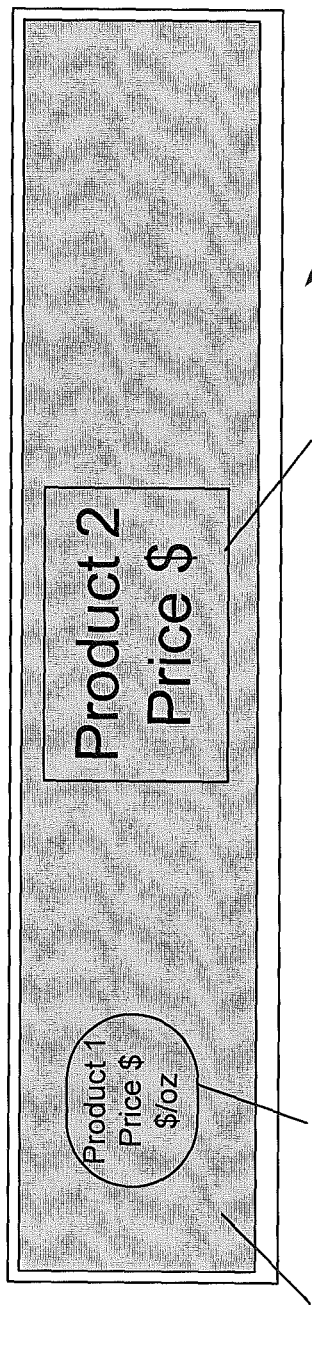
FIGS. 32A-32B illustrate an example of a changing size of a user interface according to one or more illustrative aspects of the disclosure.
Figure 32B:
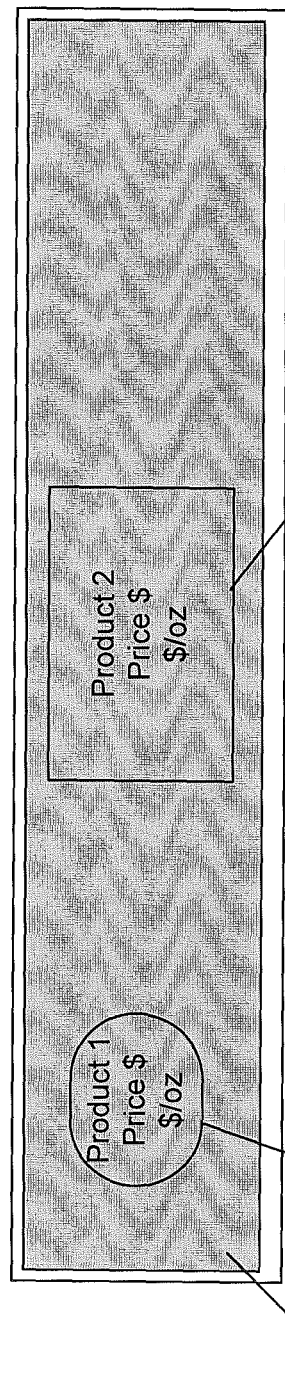

FIGS. 32A-32B illustrate an example of a changing size of a user interface according to one or more illustrative aspects of the disclosure. In this illustrative example, an authorized individual has accessed a change of mode request in the continuous display shelf edge label device 32600. In this example, continuous display shelf edge label device 32600 includes a single continuous display 32601 oriented along an entire edge of a shelf. FIG. 32A may illustrate two user interfaces 32611 and 32613A prior to a change of a parameter of the user interface 32613A. In this example, the shape of the border of each user interface 32611 and 32613A are different as well has the size of the text within the border. Through one or more of the operations described herein, FIG. 32B illustrates what the continuous display shelf edge label device 32600 may resemble after a change operation to change the size of the user interface 32613A. As shown in FIG. 32B, user interface 32613B has the text within it reduced in size. Transitioning from FIG. 32A to FIG. 32B, an authorized individual has changed a parameter, the large size of text, of user interface 32613A to the parameter, the smaller size of text, of user interface 32613B.

Figure 33A:
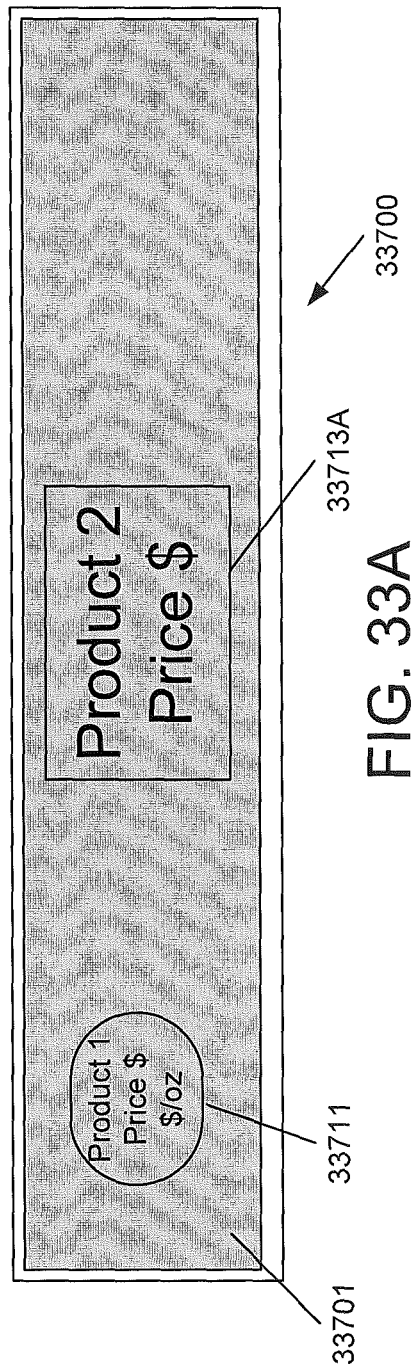
FIGS. 33A-33B illustrate an example of a changing shape of a user interface according to one or more illustrative aspects of the disclosure.
Figure 33B:
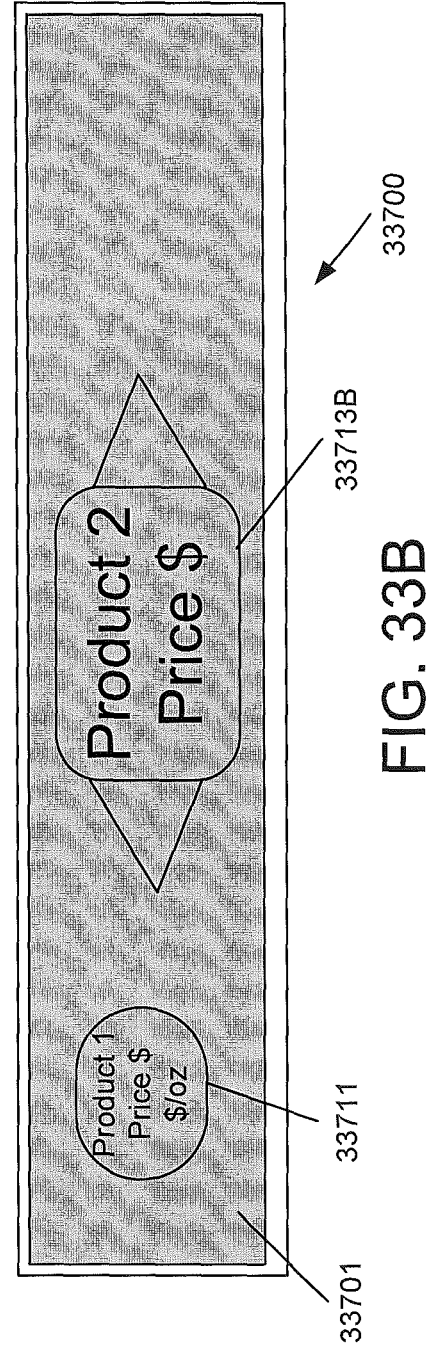

FIGS. 33A-33B illustrate an example of a changing shape of a user interface according to one or more illustrative aspects of the disclosure. In this illustrative example, an authorized individual has accessed a change of mode request in the continuous display shelf edge label device 33700. In this example, continuous display shelf edge label device 33700 includes a single continuous display 33701 oriented along an entire edge of a shelf. FIG. 33A may illustrate two user interfaces 33711 and 33713A prior to a change of a parameter of the user interface 33713A. In this example, the shape of the border of each user interface 33711 and 33713A are different as well has the size of the text within the border. Through one or more of the operations described herein, FIG. 33B illustrates what the continuous display shelf edge label device 33700 may resemble after a change operation to change the shape of the border of user interface 33713A. As shown in FIG. 33B, user interface 33713B has the shape of the border of the user interface different in appearance. Transitioning from FIG. 33A to FIG. 33B, an authorized individual has changed a parameter, the rectangular shape, of the border of user interface 33713A to the parameter, the rounded edge cornered rectangle with pointed ends shape, of the border of user interface 33713B.

FIGS. 34A-34B illustrate an example of a changing location of user interfaces according to one or more illustrative aspects of the disclosure. In this illustrative example, an authorized individual has accessed a change of mode request in the continuous display shelf edge label device 34800. In this example, continuous display shelf edge label device 34800 includes a single continuous display 34801 oriented along an entire edge of a shelf. FIG. 34A may illustrate two user interfaces 34811A and 34813A prior to a change of a parameter of the user interfaces 34811A and 34813A. In this example, the position of each user interface 34811A and 34813A within the single continuous display 34801 are changed. Through one or more of the operations described herein, FIG. 34B illustrates what the continuous display shelf edge label device 34800 may resemble after a change operation to change the position of the two user interfaces 34811A and 34813A. As shown in FIG. 34B, user interface 34813B has changed positional orientation with respect to user interface 34811B within the single continuous display 34801. Transitioning from FIG. 34A to FIG. 34B, an authorized individual has changed two parameters, the positions of each of the user interfaces 34811A and 34813A to the two parameters, the positions of each of the user interfaces 34811B and 34813B.

Figure 35:
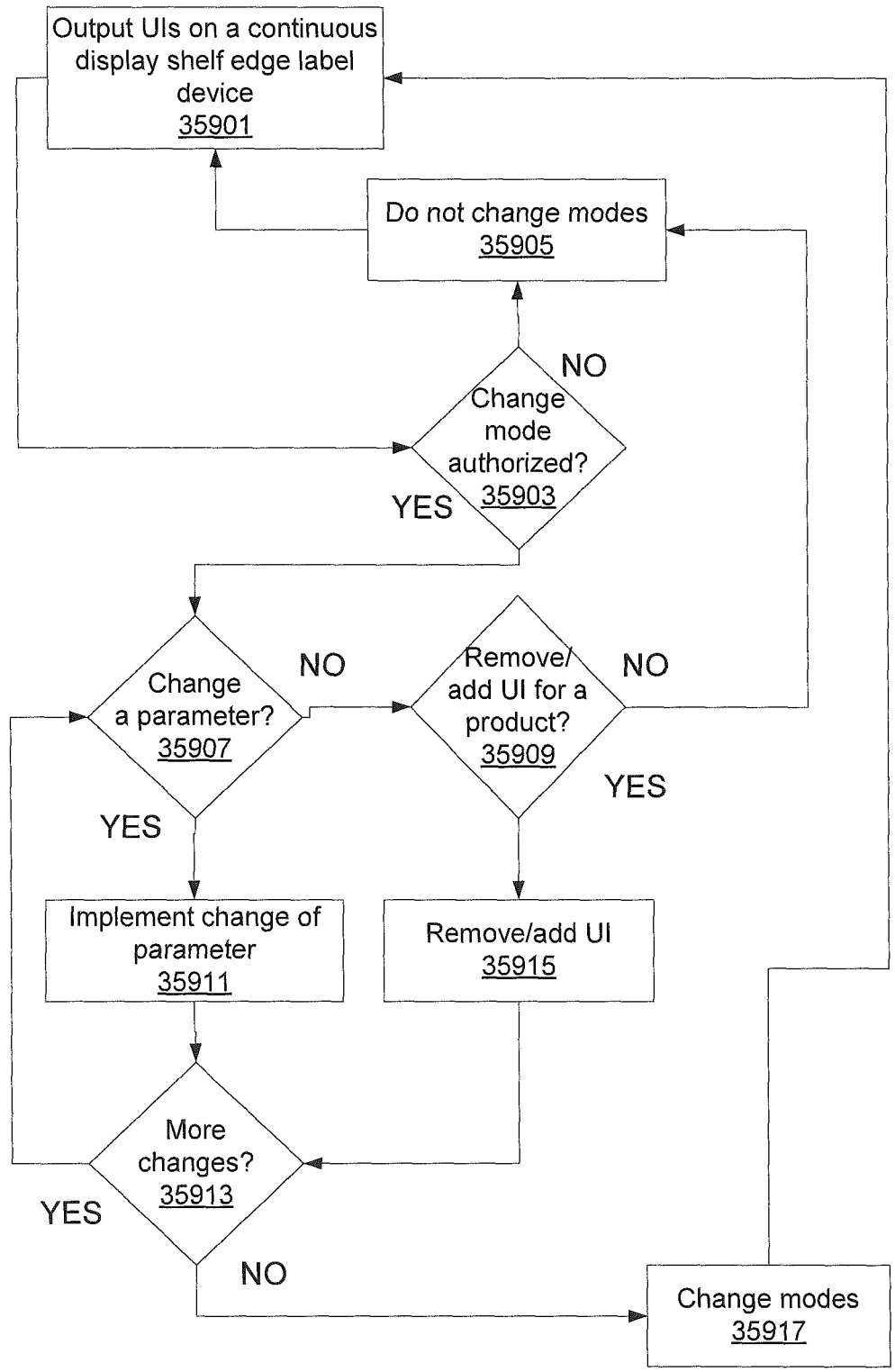
FIG. 35 illustrates an example method of distributing content according to one or more illustrative aspects of the disclosure.

FIG. 35 illustrates an example method of distributing content according to one or more illustrative aspects of the disclosure. In one example, one or more of the steps of FIG. 35 may be implemented by computing device 27100 in FIG. 27 and/or a device shown in FIGS. 28A-28B. The process starts and at step 35901 a continuous display shelf edge label device outputs, via a single continuous display, two or more user interfaces, each user interface corresponding to a product being offered for sale. Such an example is shown in FIG. 29. Proceeding to step 35903 a determination is made as to whether a change of mode of the continuous display shelf edge label device has been authorized. Such an example may be a worker inserting placing her finger at biometric scanner 31503B in FIG. 31B and having the system realize that she is authorized to change the mode of operation of the continuous display shelf edge label device.

If the change of mode of operation is not authorized in step 35903, the process moves to step 35905 where there is no instruction to change the mode of operation and the process returns to step 35901 to output, via the single continuous display, two or more user interfaces, each user interface corresponding to a product being offered for sale. If the change of mode of operation is authorized in step 35903, the process moves to step 35907 where an additional determination is made. In step 35907 a determination is made as to whether a change of parameter input has been received. An illustrative example of a change of parameter is shown with respect to FIGS. 32A and 32B, FIGS. 33A and 33B, and/or FIGS. 34A and 34B. If there is not change of parameter input received, the process moves to step 35909. If a change of parameter input is received in step 35907, the process move to step 35911 where the change of parameter, such as increasing the size of text of a user interface, is implemented on the requested user interface. The process then proceeds to step 35913.

Returning to step 35909, a further determination is made as to whether an input has been received to remove and/or add a user interface for a product. Such an illustrative example is shown with the removal of user interface 30415 from FIG. 30A to FIG. 30B. If no input has been received in step 35909, the process may return to step 35905 and further may exit from a change mode of operation to a display mode of operation before returning to step 35901. If an input is received in step 35909, the process moves to step 35915 where the user interface that the input applies to is either added or removed based upon the input. The process then proceeds to step 35913.

In step 35913 a determination is made as to whether additional changes in the change mode of operation are requested. If there are additional changes requested, the process may return to step 35907. If additional changes are not requested, the process proceeds to step 35917. In step 35917, operation of the continuous display shelf edge label device from a change mode of operation to a display mode of operation occurs before returning to step 35901 to output, via the single continuous display, two or more user interfaces, each user interface corresponding to a product being offered for sale and in accordance with any changes that may have been implemented.

Figure 36:
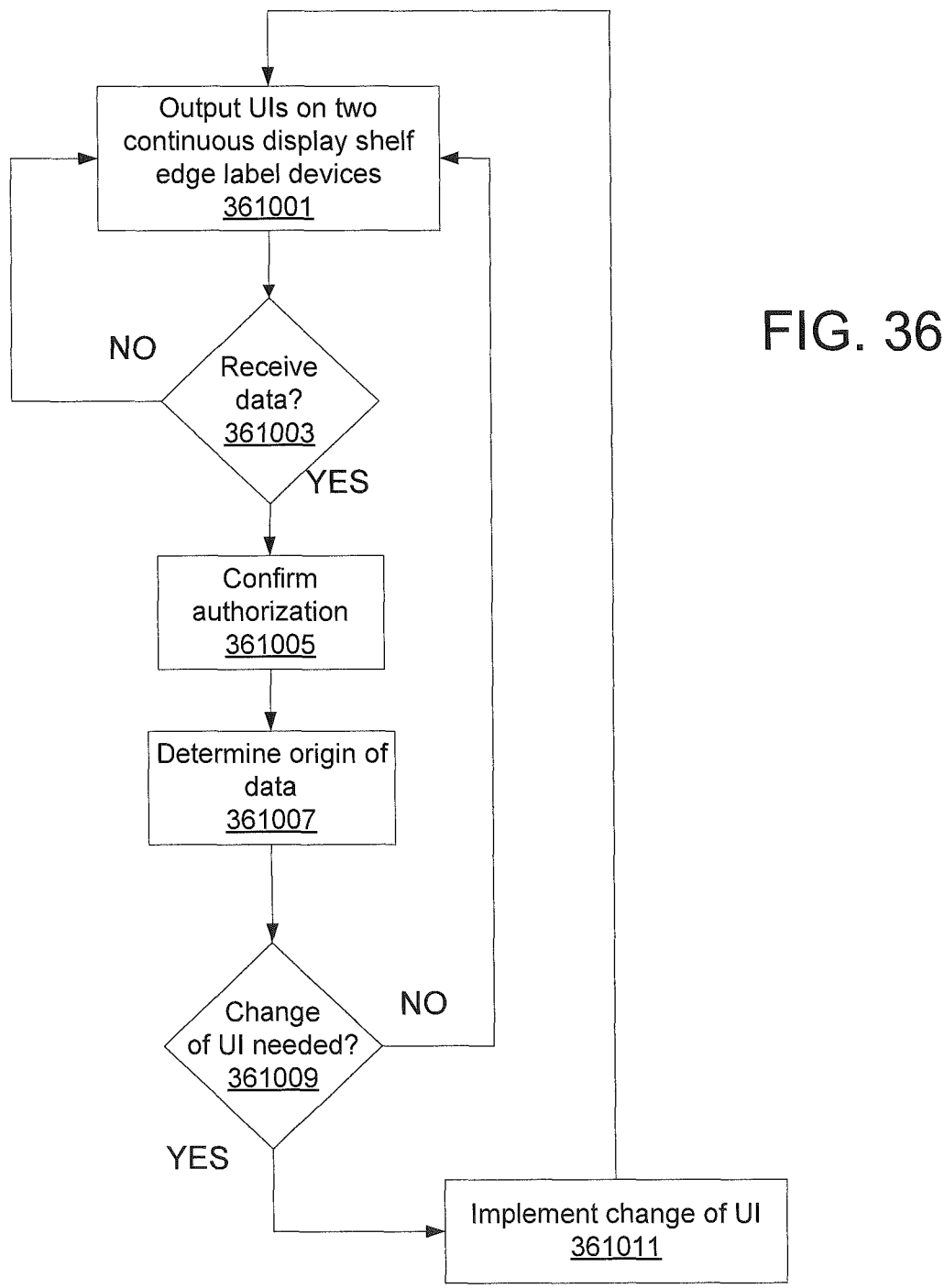
FIG. 36 illustrates another example method of distributing content according to one or more illustrative aspects of the disclosure.

FIG. 36 illustrates another example method of distributing content according to one or more illustrative aspects of the disclosure. In one example, one or more of the steps of FIG. 36 may be implemented by computing device 27100 in FIG. 27 and/or a device shown in FIGS. 28A-28B. The process starts and at step 271001 two continuous display shelf edge label devices each outputs, via a single continuous display, two or more user interfaces, each user interface corresponding to a product being offered for sale. Such an example is shown in FIG. 28B. Proceeding to step 271003, a determination is made as to whether data is being received by one of the continuous display shelf edge label devices. If not, the process may return to step 271001. If data is being received in step 271003, the process moves to step 271005.

In step 271005 the continuous display shelf edge label device confirms the authorization of the data. For example, the system may confirm that the data being received is for the continuous display shelf edge label device. If the data is a global transmission from a database, such as database 28223 in FIG. 28A, the continuous display shelf edge label device may determine that the data being received in step 271003 is not intended for the continuous display shelf edge label device. Upon confirming the authorization of the data in step 271005, the process moves to step 271007 where the origin of the data may be determined. For example, the continuous display shelf edge label device may determine that the data is being received locally from a wireless communication received from a scanner, such as scanner 27221 in FIG. 28A. In another example, the continuous display shelf edge label device may determine that the data is being received remotely from a wired communication received from a user terminal, such as user terminal 28227 through main hub 28225 and network 28210 in FIG. 28A.

Moving to step 271009, a determination may be made as to whether a change to one or more user interfaces currently being outputted, via a single continuous display, by the continuous display shelf edge label device is needed. For example, if the data received in step 271003 and confirmed as applying to the continuous display shelf edge label device in step 271005 may include a change in price of a product associated with a user interface being outputted. If no change is needed in step 271009, the process may return to step 271001. If a change to one or more user interfaces currently being outputted, via the single continuous display, by the continuous display shelf edge label device is needed in step 271009, the process moves to step 271011 where the one or more changes to one or more user interfaces currently being outputted, via the single continuous display, by the continuous display shelf edge label device is implemented. Thereafter, the process may return to step 271001 where the two continuous display shelf edge label devices each outputs, via a single continuous display, two or more user interfaces, each user interface corresponding to a product being offered for sale, where each user interface of the continuous display shelf edge label device that received data in step 271003 outputs one or more user interfaces in accordance with any changes that may have been implemented in step 271011.

Figure 37:
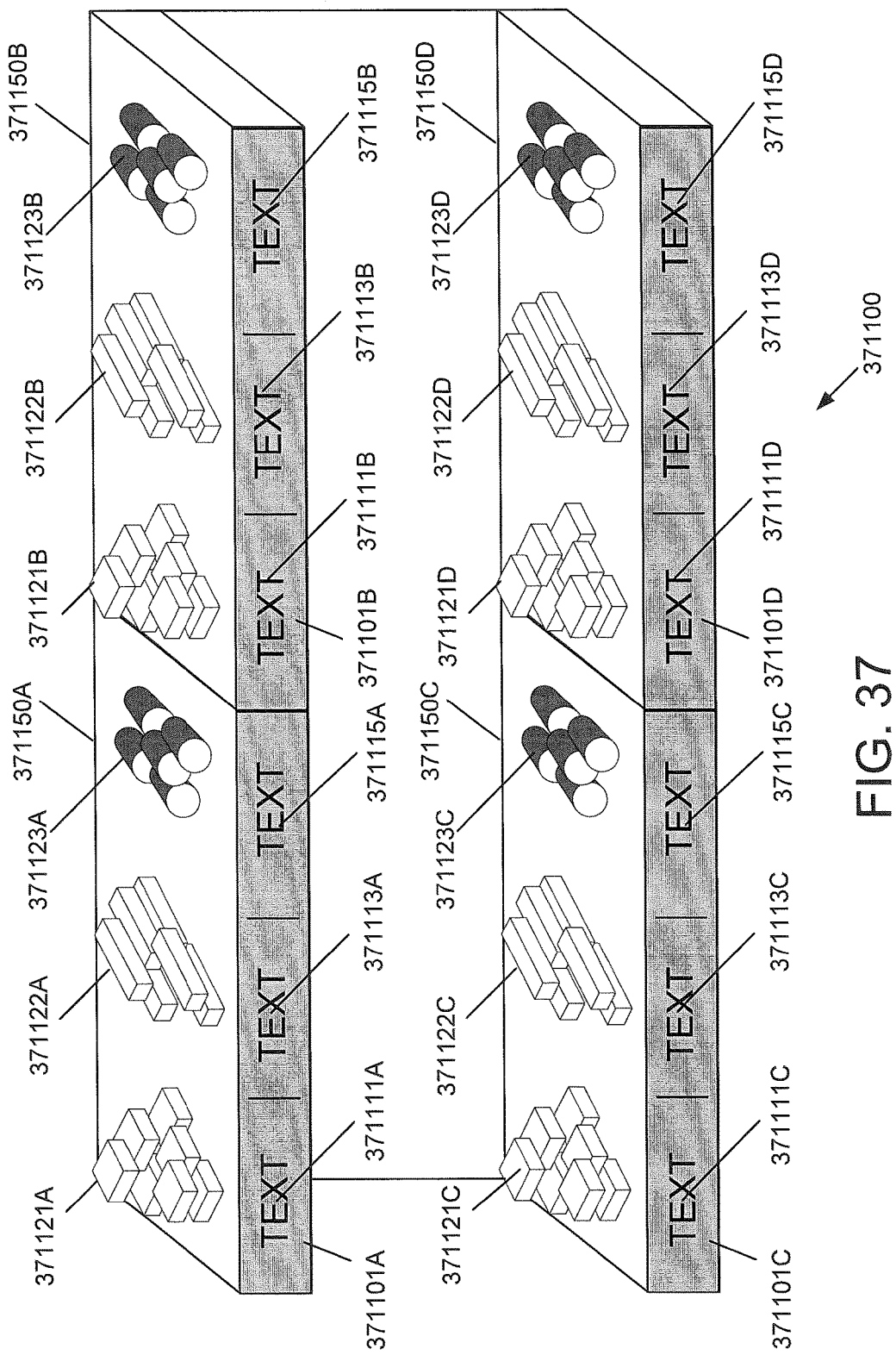
FIG. 37 illustrates an example block diagram of a system for communicating and distributing content according to one or more illustrative aspects of the disclosure.

FIG. 37 illustrates an example block diagram of a system for communicating and distributing content according to one or more illustrative aspects of the disclosure. In one example, one or more of the components of FIG. 37 may be implemented by computing device 27100 in FIG. 27 and/or one or more of devices shown in FIGS. 28A-36. In this example, a system 371100 of multiple continuous display shelf edge label devices are shown in operation together. In this example, there are four continuous display shelf edge label devices. Each continuous display shelf edge label device includes a single display area 371101A-371101D oriented along an entire edge of a shelf 371150A-371150D. Further in this example, shelves 371150A-D each hold a first product 371121A-371121D, a second product 371123A-D, and a third product 371125A-D, respectively. Single continuous displays 371101A-D each includes three digital user interfaces, one for each respective product being offered for sale. User interfaces 371111A-D provide information about first product 371121A-D directly above the user interface 371111A-D, respectively. Similarly, user interfaces 371113A-D and 371115A-D provide information about second product 371123A-D and third product 371125A-D, respectively, that are above the respective user interfaces 371113A-D, 371115A-D.

In accordance with one or more aspects of the present disclosure, the various continuous display shelf edge label devices could operate in unison for providing additional information to a customer. By having the continuous display shelf edge label devices arranged in side by side (371101A and 371101B or 371101C and 371101D) orientation and stacked on top of each other like shelves (371101A and 371101C or 371101B and 371101D), an array of continuous display shelf edge label devices may be configured. In the illustrative example of FIG. 37, there are four continuous display shelf edge label devices arranged as an array of 2×2, two rows and two columns of continuous display shelf edge label devices. Any of a number of additional arrangements may be made, including, but not limited to 4×1, 3×4, 3×3, and 4×4 configurations.

By configuring various continuous display shelf edge label devices to operate together, a retailer may utilize the displays to attract customers in any of a number of desired manners. Such configurations may be utilized to promote a single product, a single type of product, a single brand name, and the like. Animations and/or graphics may be implemented that span across multiple continuous display shelf edge label devices. Different outputs on the displays of the continuous display shelf edge label devices may be implemented based upon detecting the presence of a customer at an aisle, near a particular continuous display shelf edge label device, and/or at some other location in a retailer store. As described herein, different display modes may be implemented depending on the desired result and/or effect.

In one such example, every 10-15 seconds the display on one or more continuous display shelf edge label devices may change what is outputted in some way. In still other examples, one or more continuous display shelf edge label devices may remain constant in a displayed output acting as a very vibrant billboard. Whether the displayed output is moving or serving as a more constant billboard, continuous display shelf edge label devices could operate together.

In one embodiment, a customer may see and be attracted to such changing displayed output or stationary displayed output from further away. The changing displayed output or stationary displayed output may be a first display mode of operation. In response, she may approach a shelf. As she approaches the shelf, one or more continuous display shelf edge label devices may sense her presence, such as by a proximity sensor, and may switch to another mode of display. In such an example, specific advertising for a product may appear, such as for a product associated with the continuous display shelf edge label devices. Such advertising may be a notice of the product being on sale. Once the customer is in front of a particular continuous display shelf edge label device for a given period of time, such as 3-5 seconds, the continuous display shelf edge label device may switch to yet another mode of display where SKU specific pricing and packaging information may appear under each product.

In another embodiment, a continuous display shelf edge label device may be pre-configured to transition between different modes of display at select times. For example, a continuous display shelf edge label device may display a first price for a first product during the hours of 8 a.m. and 10 a.m. and may then automatically display a second price for the first product during the hours of 10 a.m. and 12 p.m. This allows a retailer to tailor the prices to the types of shoppers that typically shop during each time interval, or to easily transition from a special sale price (such as an early-bird price) back to a regular price.

In still other illustrative embodiments, a continuous display shelf edge label device may operate with a pusher assembly that is included with a shelf on which the continuous display shelf edge label device is oriented. The pusher assembly may include a pusher configured to place pressure behind a stack of products and push the stack forward towards the front of the shelf when a product is removed from the stack. Such a pusher assembly may include one or more components to determine a position of the pusher with respect to some portion of the assembly. For example, the stack of products may be able to fit 10 products. Integrated in the pusher assembly may be a floor that includes a tracker component at each of the 10 positions that the pusher may be configured to operate with the product. As the pusher reaches a tracker component, data regarding the position of the pusher may be known and such data may be transmitted to the continuous display shelf edge label device.

Similarly, other data may be determined and transferred as needed as well. For example, a movement of the pusher with respect to the shelf and/or the pusher assembly may be determined. Such a determination may be based upon a position and may include a timer component for use in determining the movement. In addition, in still other examples, a rate of change in a product level of a product associated with the continuous display shelf edge label device may be determined. In such an example, a shelf originally stocked with 50 items of a product is determined to only have 15 items of the product remaining after a period of time, such as an hour, a notice may be sent to a worker of the retailer to restock the product on the shelf. Similarly, such data may be sent to a continuous display shelf edge label device for changing a user interface associated with the product. For the same example, having received the data regarding only 15 items of a product remaining, the user interface of the continuous display shelf edge label device may be configured to change information. In some examples, a flashing/blinking display output of "Final 15 Left In Stock!" may be displayed, or a display output may automatically lower the price on the user interface by 10%, or a display may flash/blink upon determining the presence of a worker in the area of the continuous display shelf edge label device. The continuous display shelf edge label device may sense the presence of a worker, such as by sensing a NFC enabled access card of the worker being within a sensing range of a sensor associated with and/or included within the continuous display shelf edge label device.

Other data may be communicated to and/or determined by a continuous display shelf edge label device from a pusher and/or a pusher assembly. For example, a continuous display shelf edge label device may be programmed with data about a product that it is associated with and/or may access such data from a local or remote source, such as database 28223 in FIG. 23A. In one example, the product may have an expiration data. For example, the product may be milk and the particular products on the shelf for sale may all have a same expiration date. A threshold may be established to track the number of milk items remaining against the expiration date in order to move the milk items off of the shelf, whether to customers or for newer milk items with later expiration dates. In one scenario, the system may lower the price of the milk as the time until the expiration date is met lowers to a threshold. If the expiration date is a week away, the continuous display shelf edge label device may output a price for the milk of $2. When the expiration date is 4 days away, the price may be reduced by 10% or dropped in price by $0.25. Should some milk remain when the expiration date is 2 days away, the price may be reduced by 50% or dropped in price by $1. In still other scenarios, as the expiration date approaches a threshold, notice may be provided in some manner to a worker for the retailer. The worker may receive a text or email, a notice on a handheld scanner, and/or in some other manner that the milk needs to be replaced or may soon need to be replaced.

Other illustrative information about a product may be communicated to and/or determined by a continuous display shelf edge label device from a pusher and/or a pusher assembly as well. Such examples include determining the amount of product remaining for another product and changing a user interface of the continuous display shelf edge label device in response. For example, a continuous display shelf edge label device may determine or receive data from another continuous display shelf edge label device about a competitive product and/or related product (such as toothpastes to toothbrushes). Utilizing such data, the continuous display shelf edge label device may change a user interface for a product associated with it, such as the price of the product, accordingly. In this manner, algorithms may be established for handling when and under what circumstances a price change may occur automatically at the continuous display shelf edge label device. The continuous display shelf edge label device may access a remote source for authorization to do so and/or make the determination itself that the user interface for a product should be changed. Accordingly, a price reduction may occur for a product if it is determined that a competitor's product is moving off a shelf in a much quicker manner than the product is moving.

Features of the computing device described herein (which may be one the devices illustrated in FIG. 27) can be subdivided among multiple processors and computing devices.

Figure 38:
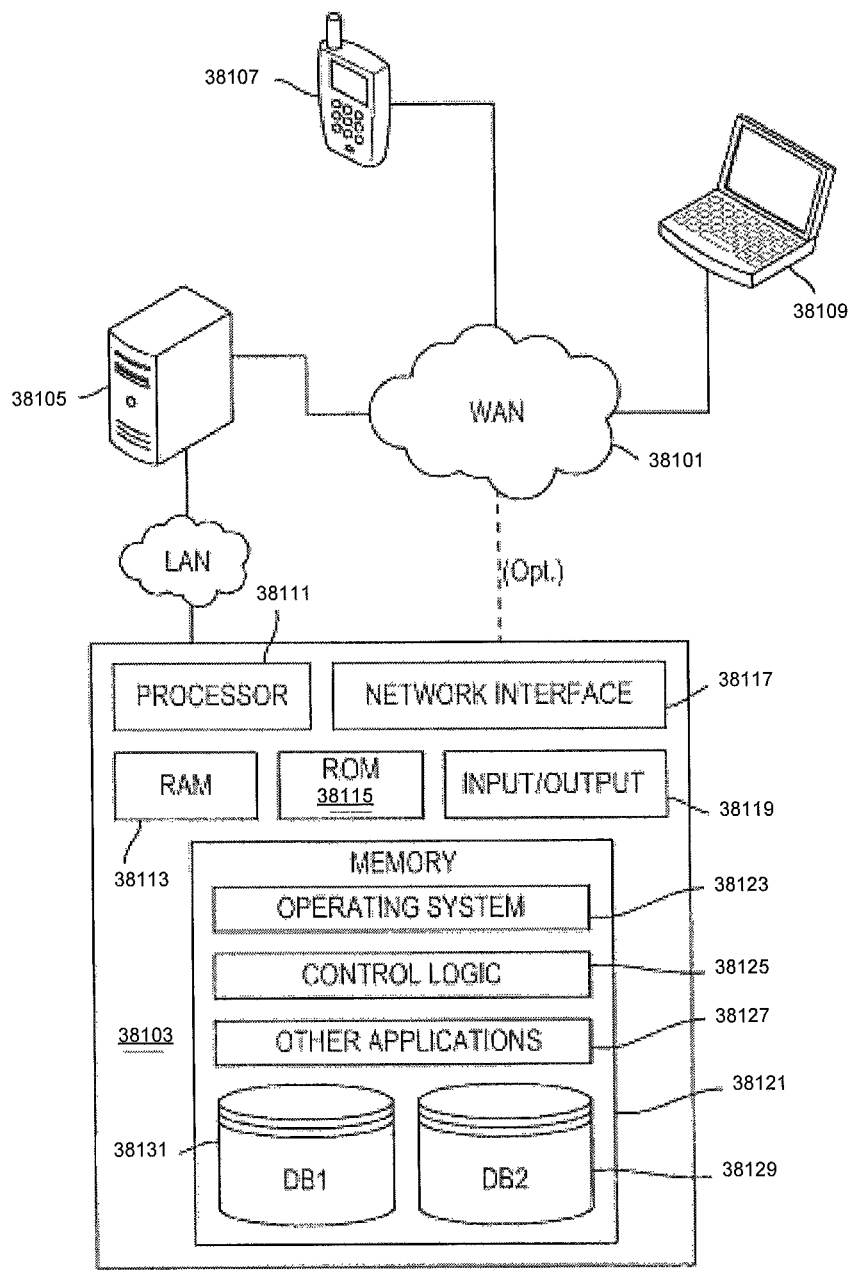
FIG. 38 depicts an illustrative computer system architecture that may be used in accordance with one or more illustrative aspects described herein.
Figure 39:
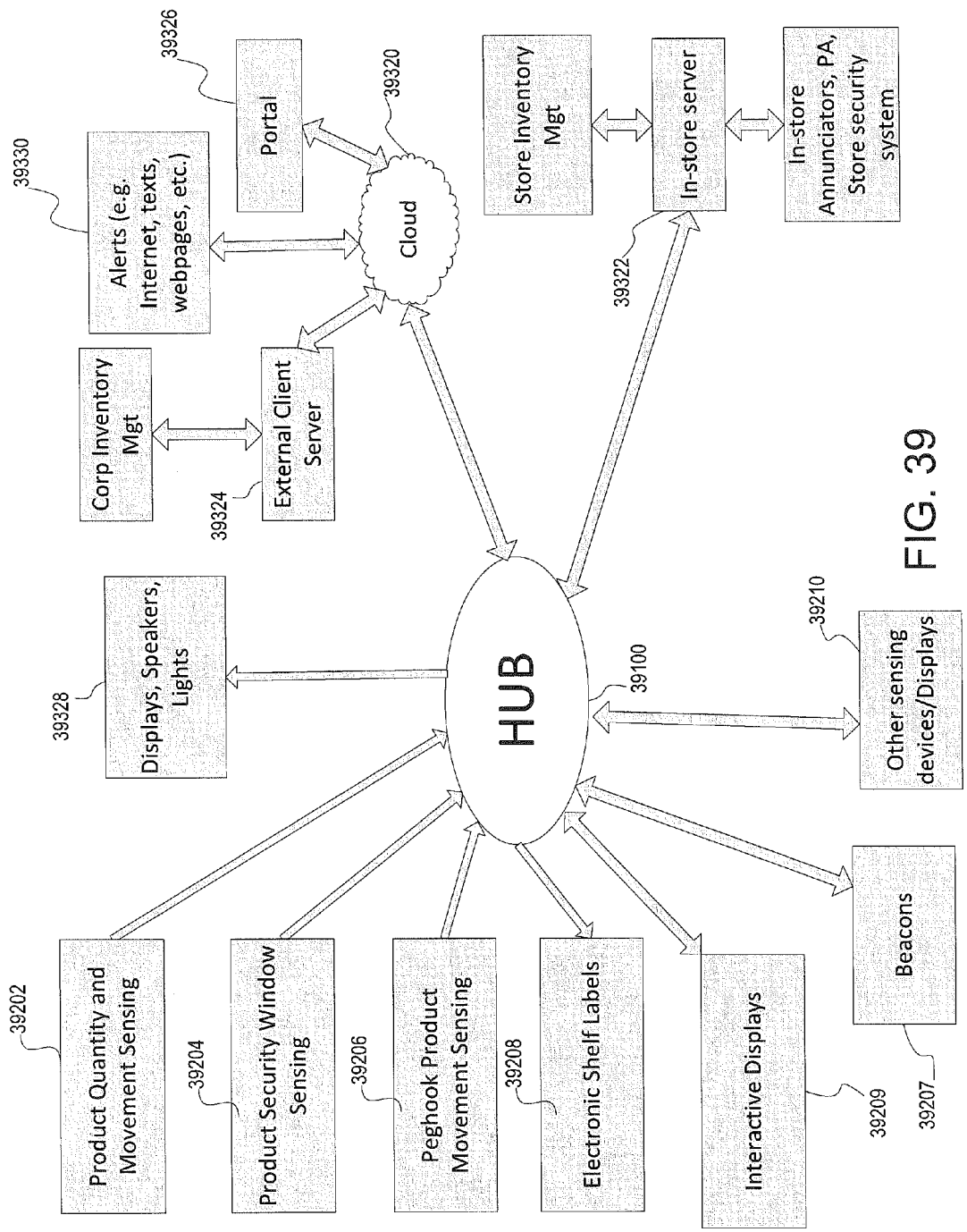
FIG. 39 depicts an example schematic of a facility intelligence system.
Figure 40:
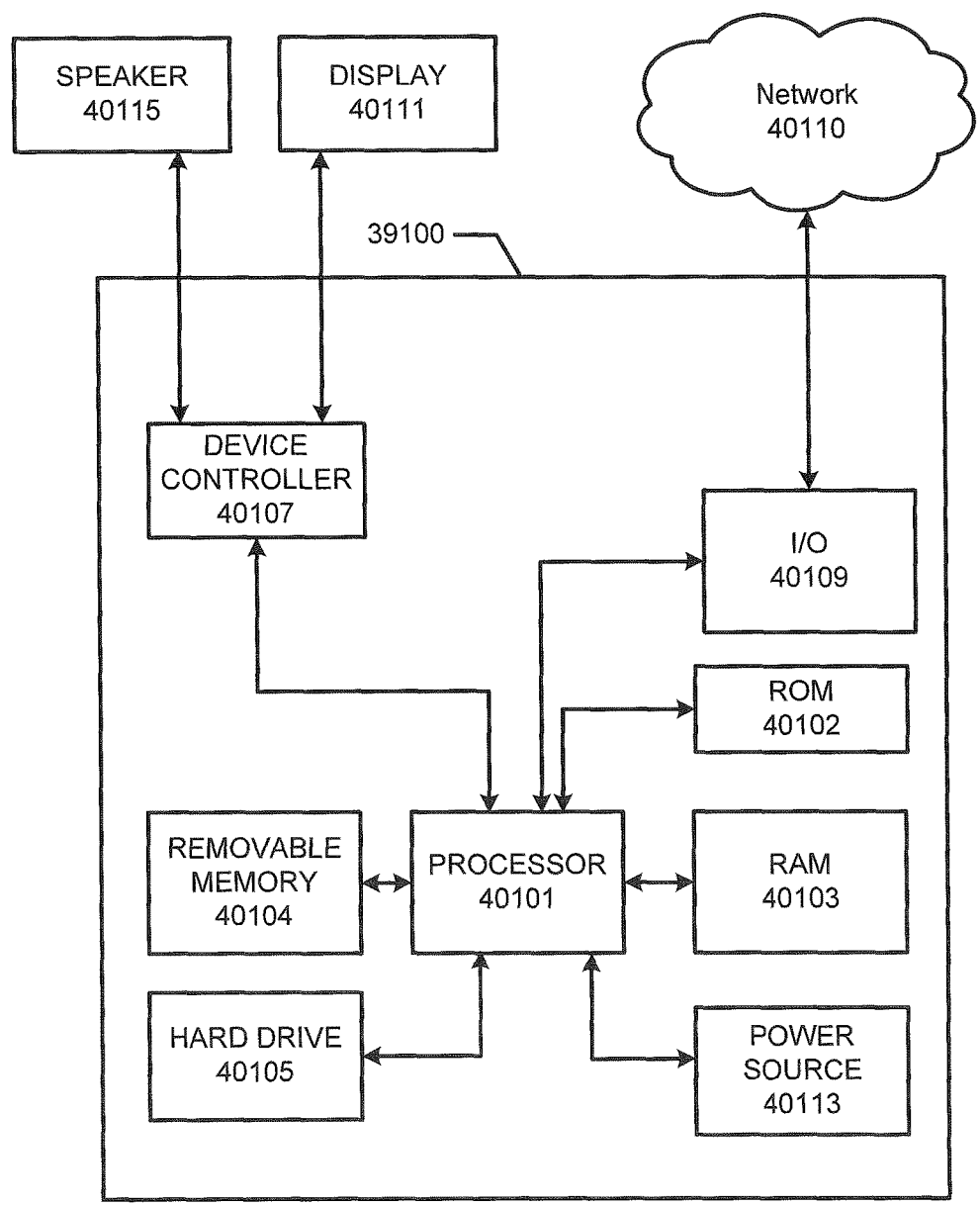
FIG. 40 depicts an example schematic of an exemplary computing device that can be configured as a hub.

FIGS. 38-40 illustrate one or more aspects of a wireless store intelligence system, which can be configured to be used in conjunction with the various devices discussed herein to, for example, consolidate theft prevention, manage inventory, handle electronic price display, provide marketing messaging, provide interactive displays, and provide shopping tools. FIG. 38 depicts an exemplary environment for implementing one or more aspects of the wireless store intelligence system. Computer software, hardware, and networks may be used in multiple different system environments, including standalone, networked, remote-access (aka, remote desktop), virtualized, and/or cloud-based environments, in addition to other examples. FIG. 38 illustrates an example of a system architecture and data processing system that can be used to implement one or more exemplary aspects described herein in a standalone and/or networked environment. Several network nodes 38103, 38105, 38107, and 38109 may be interconnected via a wide area network (WAN) 38101, e.g., the Internet. Other networks and configurations may also or alternatively be utilized, including private intranets, corporate networks, local area networks (LANs), metropolitan area networks (MAN), wireless networks, personal networks (PAN), etc. Network 38101 is for illustration purposes and may be replaced with fewer or more computer networks. A LAN can, for example, include one or more of any known LAN topology and may use one or more of multiple different protocols, such as Ethernet or WiFi. Devices 38103, 38105, 38107, 38109 and other devices (not shown) can be configured to connect to one or more of the networks by twisted pair wires, coaxial cable, fiber optics, radio waves or other communication media.

The term "network" as used herein and shown in the drawings refers not only to systems in which remote storage devices are connected together by one or more communication links, but also to stand-alone devices that may be coupled, from time to time, to such systems that have storage capacity. Consequently, the term "network" includes not only a "physical network" but also a "content network," which is comprised of the data—attributable to a single entity—which resides across all physical networks.

The components may include data server 38103, web server 38105, and client computers 38107, 38109. Data server 38103 provides access in general, control and administration of databases and control software for handling one or more illustrative aspects that are described herein. Data server 38103 may be linked to web server 38105 through which users can interact and obtain data as needed. In the alternative, data server 38103 may act as a web server itself and be directly connected to the Internet. Data server 38103 can be linked to web server 38105 through the network 38101 (e.g., the Internet), by direct or indirect connection, or by some other network. Users can work with the data server 38103 by utilizing remote computers 38107, 38109, e.g., using a web browser to link to the data server 38103 by one or more outside exposed web sites hosted by web server 38105. Client computers 38107, 38109 may be used together with data server 38103 to obtain the data stored therein, or may be used for other or additional functions. In one example, from client device 38107 a user can access web server 38105 using an Internet browser, or by utilizing a software application that communicates with web server 38105 and/or data server 38103 over a computer network (such as the Internet).

Servers and applications can be united on the same physical machines, and retain separate virtual or logical addresses, or may reside on separate physical machines. FIG. 38 illustrates just one iteration of a network architecture that can be utilized, and those of skill in the art will appreciate that the specific network architecture and data processing devices used may vary, and are secondary to the functionality that they provide, as further described herein. In one example, the functionalities provided by web server 38105 and data server 38103 may be joined on a single server.

Each component 38103, 38105, 38107, 38109 can be any type of computer, server, or data processing device as is known in the art. Data server 38103, for example, may include a processor 38111 directing overall operation of the rate server 38103. Data server 38103 may further include RAM 38113, ROM 38115, network interface 38117, input/output interfaces 38119 (e.g., keyboard, mouse, display, printer, camera, scanner, touchscreen, etc.), and memory 38121. I/O 38119 may include multiple interface units and drives for reading, writing, displaying, and/or printing data or files. Memory 38121 may further store operating system software 38123 for controlling overall operation of the data processing device 38103, control logic 38125 for instructing data server 38103 to accomplish aspects described herein, and other application software 38127 providing secondary, support, and/or other functionality, which may or may not be used in combination with the features described herein. The control logic may also be referred to herein as the data server software 38125. Functionality of the data server software may refer to operations or decisions made automatically based on rules coded into the control logic, made manually by a user providing input into the system, and/or a combination of automatic processing based on user input (e.g., queries, data updates, etc.).

Memory 38121 can also store data used in the action of performing one or more of the features described herein, including into a first database 38129 and a second database 38131. In some embodiments, the first database can have the second database (e.g., as a separate table, report, etc.). That is, the information may be filed in a single database, or portioned into different logical, virtual, or physical databases, depending on system design. Devices 38105, 38107, 38109 can include similar or different architecture as discussed in relation to device 38103. The functionality of data processing device 38103 (or device 38105, 38107, 38109) as discussed herein may be located across multiple data processing devices, for example, to allocate processing load across multiple computers, to segregate transactions based on geographic location, user access level, quality of service (QoS), etc. as is understood in the art.

In addition, any number of personal computers such as desktops, laptops, notebooks, mobile telephones or smartphones with applications and other functionality, a handheld device with Wi-Fi or other wireless connectivity (e.g., wireless enabled tablets, tablet computers, PDAs, and the like), displays with built-in or external memories and processors, or any other known computer, computing device, or handheld computer can also be connected to one or more of the networks described herein. It is also contemplated that other types of devices such as kiosks, ATMs, and other devices can be connected to one or more of the networks described herein. Wireless access points can be provided for connecting these devices and may include a series of cellular towers supported by one or more service providers. Additionally, the wireless access points may be Wi-Fi (e.g., compatible with IEEE 802.11b a/b/g/and similar wireless communication standards) connections and the computing devices may obtain access to the Internet at these connections. Other techniques as is understood by persons skilled in the art may be used to allow devices to connect with a network.

One or more features can be embodied in computer-usable or readable data and/or computer-executable instructions, one or more program modules, executed by one or more computers or other devices as described herein. Generally, program modules include routines, programs, objects, components, data structures, etc. that handle specific tasks or implement specific abstract data types when performed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a non-volatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

FIG. 39 shows an example configuration of a wireless store or facility intelligence system. As shown in FIG. 39, a hub 39100 may be provided. The hub 39100 can be a centralized data routing and receiving device and can be interconnected with various devices. Various inputs and outputs can be configured to be routed through the hub 39100 from these devices as described herein.

In one example, a plurality of end-point devices 39202-39210 that can be associated with a product shelf can be configured to connect to the hub 39202-39210 via a wired or wireless connection, as discussed herein. In one example, the plurality of end point devices 39202-39210 can be configured to transmit information to the hub or to receive information from the hub 39100. The end-point devices 39202-39210 can be configured to provide inventory data to the hub 39100, or the end-point devices 39202-39210 can be configured to receive product information, which may include product descriptions, price data and/or marketing material, for displaying on or near a product shelf or display. The hub 39100 can also be configured to make decisions based on the information received from the end-point devices 39202-39212 such as by producing certain alerts based on the inventory data and outputting the alerts to one or more of displays, speakers, or lights 39328.

In certain examples, the end-point devices can include product quantity and movement sensing devices 39202, product security window sensing devices 39204, peghook product movement sensing devices 39206, electronic shelf labels 39208, interactive displays 39209, beacons 39207 or other sensing devices and/or displays 39210. For example, the end-point devices can be the display management systems 1800, 2100, and 2300 described above in relation to FIGS. 18-24 or the continuous display shelf edge label devices described above in relation to FIGS. 28-37. In addition, interactive displays 39209 can be interconnected to the system that provide interactive shopping tools to customers to assist in making shopping decisions. The beacons interconnected with the system can be configured to determine that a target device (e.g. shopper cell phone) is within its range and initiate a communication with that device under certain circumstances for the purposes of advertising or providing shopping support/help. Additional end-point devices that provide inventory data and/or are configured to display product information or shelf labels are also contemplated.

The hub 39100 can also be interconnected with a network, which may include various servers 39322, 39324, 39326 and the cloud 39320. The hub 39100 can also be configured to send and receive information to and from the various servers 39322, 39324, 39326 or the cloud 39320 using various communication protocols as discussed herein. For example, the hub 39100 can download information from the plurality of end-point devices 39202-39210 and send the information to any desired server or part of the network, such as an in-store server 39322, cloud 39320, and/or external client server 39324. The information received can then be processed at one or more servers, and the servers can make decisions regarding the data received, for example, by producing certain alerts 39330 or requests based on inventory data or make the information received available for viewing on the portal 39326.

An exemplary hub 39100 is shown in FIG. 40, which can be configured as a computing device, which can include the components and features discussed herein in combination with or in addition to the hardware and software components discussed below. Additionally, any of the devices interconnected with the hub 39100 can be configured as computing devices and can include similar components and features as the hub 39100 and the features discussed herein. An example hub 39100 may include one or more processors 40101, which may execute instructions of a computer program to perform any of the features described herein. Processor 40101 may comprise a customized digital integrated circuit such as an ASIC. However, in some applications, commercially available processors may be employed. The instructions may be stored in any type of non-transitory computer-readable medium or memory, to configure the operation of the processor 40101. For example, instructions may be stored in a read-only memory (ROM) 40102, random access memory (RAM) 40103, hard drive 40105, removable media 40104, such as a Universal Serial Bus (USB) drive, compact disk (CD) or digital versatile disk (DVD), floppy disk drive, or any other desired electronic storage medium. Instructions may also be stored in an attached (or internal) hard drive 40105. One or more of the memories 40102, 40103, 40104, and/or 40105 may include a more advanced operation environment such as an operating system for advanced functionality and adaptability.

The hub 39100 may include various external controls. For example, there may be one or more user input devices (not shown), such as a remote control, keyboard, mouse, touch screen, microphone, camera, etc. The hub may also include an optional display 40111 and/or an optional speaker 40115, and may include one or more output device controllers 40107, such as a video or audio processor. The display can in one example be an LCD display, or any other known display types. In one example the hub may also include one or more lights such as indicator lights. In another embodiment, input/output functions with a user may occur through display 40111 where display 40111 may be configured to allow for touch screen input in order to see additional output on the display 40111.

One or more memories 40102, 40103, 40104, and/or 40105 may include a stored address location and display data location data. Address location may include an address that identifies the hub 40100, which in one example can be a unique identifier. In one example, display data location data may be used by processor 40101 to format data to be displayed on the optional display 40111. This may include text data, graphics, dynamic content, and combinations. In accordance with at least one embodiment, the display data location data in a memory may is in accordance with a mark-up language such as HTML, XML, or the like. Although shown in FIG. 40 as being outside of computing device 40100, display 40111 and speaker 40115 also may be integrated into a same physical housing and/or structure as the hub 39100. One or more components shown within hub 39100 similarly may be housed separately in another device and/or in another location from the hub 39100.

The hub 39100 may include an I/O module 40109, which provides one or more inputs and outputs. The hub 39100 may also include one or more network interfaces (such as a network interface circuit, a scanner interface circuit, and the like) to communicate with an external network 39110, in accordance with the example discussed above in relation to FIG. 39, but may include any other computing devices, end-point devices, servers, cloud servers, etc. The I/O module 39109 may be a wired interface, wireless interface, or a combination of the two. In one example, the hub 39100 may be connected to one or more networks 39324, 39326, 39320, computing devices, and/or end-point devices 39202-39212 via twisted pair wires, coaxial cable, fiber optics, radio waves (fixed or plug-in radio options), or other communication media. For example, the above connections can be made via the internet, Ethernet, Bluetooth, Wi-Fi, cell modems, or infrared. In one specific example, the above connections can be made using a reduced power consumption type of communication or low-power radio signals, e.g., Bluetooth Low Energy (also referred to as "Bluetooth LE," "Bluetooth Smart," or "BLE"), Zigbee, and ISM. In one example, the ISM can be 315/433 MHz ISM or NFC. Nevertheless, any other known method of wireless transmission is contemplated for forming the above connections, including other highly efficient proprietary and custom protocols.

The hub 39100 also may include a power source 40113. Power source 40113 allows for the hub 39100 to operate the processor 40101 and various other components. Power source 40113 may include a dedicated battery source, power over Ethernet, or an external power source, such as an AC source connection or combinations thereof.

In a facility, such as a store, multiple hubs 39100 can be provided depending on the quantity and location of the end-point devices 39202-39210. The hubs 39100 can be placed on a facility ceiling or at the top of a shelving or merchandizing system. Each of the hubs can be assigned to a predetermined group of end-point devices 39202-39210, and the plurality of end point devices 39202-39210 can be configured to transmit information to an adjacent predetermined hub of the plurality of hubs 39100 or to receive various data from a predetermined hub of the plurality of hubs 39100. Each hub 39100 can be positioned adjacent the predetermined group of end-point devices 39202-39210 that are assigned to the hub 39100. It is also contemplated that the plurality of hubs could be configured to communicate with each other and determine which end-point devices each hub should communicate with. Shorter distances between the end-point devices 39202-39210 and the hubs 39100 allow for a reduction of the power settings required for the transmission/reception of the information in that lower energy transmission protocols can be implemented such as Bluetooth low energy, Bluetooth LE, Zigbee, or ISM. This can help to reduce the cost of the overall system.

Additionally, in this example, each of the plurality of hubs 39100 can be interconnected with a server such a facility server such as in-store server 39322 or the cloud 39320. The plurality of hubs 39100 can receive inventory information from one or more of the plurality of endpoint devices 39202-39210 and transmit the inventory information to the in-store server, facility server or cloud. The hubs 39100 can also be configured to receive information from the in-store server, facility server, or cloud server and transmit the information to one or more of the plurality of end-point devices 39202-39210.

In accordance with the examples discussed herein, each of the plurality of hubs 39100 can receive information, such as price information, marketing material, and other product information, from the in-store server, facility server, or cloud server and transmit this information to a particular group of the end-point devices. Additionally, each of the hubs 39100 can be configured to send inventory received from a predetermined group of the end point devices 39202-39210 to the in-store server, facility server, or cloud.

As discussed above, the hub 39100 can be configured to link to the end-point devices 39202-39212 and other systems that utilize data from the end-point devices 39202-39212. In one example, the hub 39100 can be configured to perform one or more of the following functions: (1) act as a data aggregator to accumulate data and then pass data along to one or more networks, (2) receive, track, and calculate inventory levels, (3) perform various actions such as creating alerts depending on the data received from the end-point devices 39202-39212 (4) communicate various data efficiently to the end-point devices 39202-39212, (5) communicate data in higher level protocols, such as WiFi, to a network/internet at a higher data rate, (6) monitor the end-point devices and report the statuses of end-point devices.

The hub 39100 can receive and store data received from the end point devices 39202-39212, thus, acting as a data aggregator and can be configured to pass the stored data to another computing device, server, or to the internet. For example, the hub can be configured to receive inventory data or customer information from the end-point devices as discussed herein. In another example, the hub can be configured to receive various log files data from the end-point devices 39202-39212.

In one example, the hub 39100 can transfer the stored data upon request. In alternative examples, the hub 39100 can be configured to receive a predetermined amount of data before transmitting the data through the network. For example, the hub can manage when to alert the server of problematic end-point devices based on a predetermined duration of lack of input from the end-point devices. In one example, once an end-point device ceases communication with the hub, the hub could start a timer, and wait a predetermined time period before sending an error code or alert to the network and/or the appropriate person's device. The hub can also be configured to aggregate information into a single file and send the single file to the network e.g. by sending the entire facility's log file instead of sending a report for each end-point device separately. This helps to cut down on network traffic to create efficiencies across the network.

In other examples, the hub 39100 can transmit the data at a predetermined time, or when a certain condition occurs, such as a low inventory condition or a theft situation. In this way, for example, inventory data can be acted upon by the store inventory management system to schedule restocks or appropriate personnel can be notified regarding potential thefts. In addition, the hub 39100 can be configured to calculate and track a number of products based on the inventory information received from the end-point devices 39202-39212. For example, each of the end-point devices 39202-39212 can collect inventory data in accordance with the above examples, and the hub 39100 can receive the inventory data from each of the end-point devices 39202-39212 and calculate the number of products located on each of the shelves being monitored by the hub 39101. For example, the quantity and movement sensing devices 39202, product security window sensing devices 39204, peghook product movement sensing devices 39206 can provide the hub with respective individual tallies of the products being monitored by each device, and the hub 39100 can keep a running tally of the inventory on each shelf being monitored.

Alternatively or in addition, the hub 39100 can be configured to track the position of the end-point devices, which can be correlated to a number of products on the shelf, and the hub 39100 can be configured to determine how many products are on a shelf and/or facility. Where multiple hubs 39100 are employed, each hub 39100 can keep a running tally of inventory and can be configured to report inventory numbers to a centralized server, such as the in-store server 39322, or cloud 39320. The in-store server 39322 can then keep a running total of the number of products within a facility and make decisions based on the inventory, such notifying the appropriate personnel of product levels or when restocking is required. Additionally, the total inventory of the company can be calculated by routing all of the store inventory information to the client corporation server 39324. For example, the network may be configured to receive the inventory information and send notifications once an inventory level has reached a predetermined value.

The hub 39100 itself may also perform various actions on data received from the one or more end-point devices 202-212, in accordance with the examples described herein.

The hub, for example, may be programmed to detect theft situations, and various rules can be set up to trigger an alert based on theft activity. For example, if a possible theft is occurring, the hub can also be configured to send a predetermined message, e.g., an alert or text message to one or more responsible parties' smart phones or hand-held devices, such as a facility manager, clerk, stock person, etc. In other examples, the hub 100 can communicate with another computing device and/or a facility PA system to play a message based on one or more predetermined conditions. Additionally the hub can be configured to play an audio message (with a local audio option) on an attached speaker, e.g., the hub 39100 can include an audio message player having a speaker and audio playback circuit, which can be configured to play a security sound. In this way, a centralized hub can play the security message instead of configuring each product or merchandize displays to play a security message. In other examples, the hub 100 may be connected to a store security system, which can be programmed to position an optional camera and begin recording of video in the proximity of the potential theft similar to the examples discussed herein.

In another example, the hub 39100 can be configured to track the position of the end-point device, which can be correlated to a possible theft. For example, the hub can be configured to detect abnormal activity. Specifically the hub can detect quick and large movements of the pusher to detect abnormal shopping situations.

Additionally, indicator lights may be attached to the hub that can be illuminated when predetermined conditions occur. Specifically multiple colored indicator lights, e.g. green, yellow, and red, can each provide a different alert/meaning, e.g., green indicates that the system is functioning normal, yellow indicates a potential issue and red indicates a fault or theft situation. Certain color codes can also indicate a predetermined type of theft situation.

In addition, various rules can be set up to trigger an alert based on inventory levels. For example, if the inventory levels reach a certain threshold, the hub or network can also be configured to send a predetermined message, e.g., an alert or text message to one or more responsible parties' smart phones or hand-held devices, such as a facility manager, clerk, stock person, etc. In other examples, the hub or network can be provided with various rules that automate inventory actions such as when to request restocking or when to order additional products.

The hub 39100 can also be configured to communicate all data, as discussed herein, to the end-point devices 39202-39210, such as pricing, marketing material, product information, product location information, user instructions, advertisements, discounts, promotions, deals, coupons, shopping support/help information, rebate information, updates to software, updates to operating systems, etc. and can be in the form of text, images, audio, video, data files, executable files, etc. The hub 39100 can be configured to communicate any of the information discussed above to the end-point devices 39202-39210, such as the interactive displays 39209 or the continuous display shelf edge label device examples described above in relation to FIGS. 28-37. For example, the hub 39100 can be configured to send or update data representative of information about a product on a shelf where the end-point device is located, e.g. current product information data for user interfaces on a continuous display shelf edge label device or an interactive display. The information can come from any one of the various interconnected components in the wireless intelligence system network as discussed herein such as a facility server, in-store server, or cloud.

The hub 39100 can also be configured to periodically update the end-point devices 39202-39210 with current software, operating systems and/or updated content. The updates can be pushed out from the network as described herein. The hub can also review whether the end-point devices were properly updated and report back to the network at a predetermined time to indicate whether the updates were successful.

The hub can be configured to store the data discussed above for the end-point devices received from the network and to determine when to send out the data to the end-point devices such as at predetermined times of the day, week, month, etc. For example, the hub can be configured to send the data to the end-point devices during non-peak hours at the facility when the end-point devices are likely to not be in use. The hub can, therefore, manage network traffic to the end-point devices and not burden the end-point devices with certain non-crucial data when the end-point devices are in use.

The hub 39100 can be configured to communicate data in higher level protocols, such as Wi-Fi, to a network/internet at a higher data rate, permitting the hub 39100 to send data bi-directionally and to receive and send data efficiently making the system more cost effective and energy efficient. In one example, the hub 39100 can be configured to communicate in higher level protocols like Wi-Fi to store systems or to the internet and other areas of the network at higher data rates and can also be configured to communicate with the plurality of end-point devices via a low energy transmission protocol. In this way, the system can take advantage of low energy transmission to avoid having to provide a significant power source for each of the end-point devices without having to sacrifice the ability to efficiently gather data. This allows the hub 39100 to send data bi-directionally and to receive data efficiently as discussed herein aiding the hub 39100 to send larger files such as usage log info, video, and data updates more quickly and efficiently.

The hub 39100 can also be configured to monitor the end-point devices and to provide reports regarding the statuses of the end-point devices allowing for the assessment of end-point device health and the reporting of problematic end-point devices. In one example, the hub can also receive periodic updates or "heartbeats" from the end-point devices to indicate a status. These heartbeats can be in the form of any transmission discussed herein and can inform the hub 39100 that the end-point devices are connected to the system and operating. The heartbeat transmission can include various data pertinent to the operation of the end-point devices, e.g. serial number of device, online status, battery life information, operating system/software version, update status information, network up and down time information, etc. This helps to monitor the system's network integrity and to ensure that the end-point devices are properly connected to the system. In one example, after the end-point devices are installed in a store or facility, the heartbeat transmitted from the end-point devices can indicate to the hub that the device is functional and operational. In this way, if the hub does not receive a heartbeat from the end-point devices after a predetermined time, the hub can send a message or alert to the in-store server, cloud, etc. to indicate that the particular end-point device is not operational, and personnel such as a technician can troubleshoot or diagnose the situation. Also, the heartbeat from the end-point devices can include software and hardware information to allow personnel to determine whether any updating is necessary for the end-point devices.

In alternative examples, the hub 39100 can be configured to diagnose certain errors and faults of the end-point devices. For example, if the end-point devices are not responding to requests for inventory data, the hub 39100 can alert the appropriate personnel through the various channels discussed herein. In other examples, the end-point devices can be configured to ping the hub 39100 if certain faulty conditions or error codes are encountered such as a low battery, faulty sensor, or faulty display. Upon receiving an indication of a faulty condition, the hub 39100 can be configured to alert the appropriate personnel either immediately or after a pre-determined time depending on the error or fault and the likelihood that the issue can be resolved within the network. Personnel can then troubleshoot or replace the problematic end-point device.

As discussed in relation to the examples discussed above in relation to FIGS. 18-24, the end-point devices 39202-39212 can be configured to gather various data, such as inventory data and customer information. For example, the end-point devices can be configured to gather various data about the store environment and to pass the data along, as described herein. The end-point devices 39202-39212 can also be configured as display devices for displaying various data including static and dynamic imagery. For example, in accordance with the examples discussed above in relation to the continuous display shelf edge label devices in relation to FIGS. 28-37, certain end-point devices can be configured to display real-time data to shoppers on product info, pricing and/or marketing information. In a multiple hub example, the plurality of end point devices 39202-39212 can be configured to transmit inventory information to an adjacent predetermined hub of the plurality of hubs or to receive price information from a predetermined hub of the plurality of hubs.

Figure 41:
FIGS. 41-44d depict an example interactive display.

Another example end-point device can be configured as an interactive tablet and/or display device 39209, an example of which is depicted in FIG. 41. The interactive display device 39209 can be configured as a computing device and can include one or more the various hardware and software components as discussed herein. For example, the interactive display 39209 can be provided with multi-touch screen technology and other inputs such as a bar code scanner. The interactive display device 39209 can be configured to provide assistance to the consumer for decision making to determine which products to purchase to provide an opportunity for the retailer to bridge the gap between in-store and online retailing.

For example, the interactive display 39209 can be configured to provide customers and/or shoppers with interactive product information at the shelf edge. The interface can be provided with many different views and a menu of products that can be selected or can scan products to access the product information stored therein. The interactive display 39209 can also provide up-selling and cross-selling based on a customer's selections or previous selections and deliver relevant suggestions to the customer. For example, if a customer is interested in shoes, the interactive display can provide other similar shoe choices or matching shirts or pants. The interactive display device 39209 can also provide instant price comparisons and real-time updates. The interactive display device 39209 can offer a price match or certain incentives for purchasing the product in the store on that day. The interactive display device 39209 can provide the shopper with online reviews. In one example, the interactive display device 39202 can also rely on social media and can provide shopper's access to product recommendations from peers. Additionally, the interactive display device 39209 can integrate the store's website in the store and can be configured to check online availability for out-of-stock items and may provide for electronic or online ordering. The interactive display 39209 can also provide a mailing list sign-up to customers and shoppers where the customers can enter contact information into the display and can select topics of interest using the multi-touch screen. All of this information can be relayed to the network via transmission to the hub and acted on accordingly by the retailer.

Additionally, the interactive display 39209 can also be configured as a kiosk to sell products to customers and shoppers. For example, the interactive display can be provided with a transaction interface that can be configured to process payments. In this example, a printer can be connected to the interactive display or the hub such that the interactive display or hub can issue receipts to the customers. The transaction data can be stored on the interactive display and can be directly routed to the hub or routed to the hub at predetermined times or upon request from the hub or network.

Additionally log data, which can include the transaction data, access data, customer information, etc. from the interactive display can be collected, logged, transferred and routed through the hub. The log file data can include data regarding the number of customers or shoppers using the particular interactive display, whether the customers or shoppers viewed certain product information, and any other information that explains the effectiveness of the interactive display. In this way, the network can further process and track the data for later viewing and analysis. For example, the retailer can determine which customers accessed which interactive displays at which times and which customers made purchases and which did not to determine the effectiveness of the interactive displays.

The end-point devices can, in one example, include one or more location beacons 39207. The beacons 39207 can be configured to determine that a target device, such as a customer computing device, is within its range and initiate a communication with that device under certain circumstances for the purposes of advertising or providing shopping support/help. For example, customer computing device may be a desktop computer, laptop computer, tablet computer, smart phone, or the like. In one or more arrangements, customer computing device may be a personal computing device, such as a mobile computing device (e.g., a smart phone, a tablet computer, a wearable computer, augmented reality glasses, or any other type of mobile device), that belongs to and/or is used by a customer of the facility or store at and/or near the facility or store and/or any other location operated by, controlled by, and/or otherwise associated with the facility or store. The location beacon can be configured to transmit one or more signals, such as radio signals, that may be detected and/or received by devices located in proximity of and/or otherwise within a specified distance of the beacon. In one or more embodiments, the location beacon may implement Bluetooth Low Energy (also referred to as "Bluetooth LE," "Bluetooth Smart," or "BLE"), Zigbee, or ISM technology to transmit low-power radio signals. The beacons can communicate with the Hubs using any of the protocols discussed herein, including wired or wireless connections.

The particular signal(s) transmitted by a particular location beacon may include one or more features, such as a unique identifier assigned to and/or otherwise connected with the particular location beacon, which may enable the location beacon to be identified by any device getting the particular signal(s) transmitted by the particular location beacon. In sensing a particular signal transmitted by a location beacon (which may, e.g., be positioned at a specific location) and subsequently identifying the location beacon transmitting the particular signal, a computing device may be able to conclude that it is located at and/or near the specific place where the location beacon is situated.

For example, location beacons may be positioned at and/or near a facility or store, and may be specifically positioned at and/or near different areas of the facility or store, such as at a welcome area, at various product displays, or at a waiting area, etc. Beacons may be placed strategically in a retail environment to attract customers to certain displays or locations within a store or facility. In addition, each location beacon may transmit a radio signal that may be detected and/or received by other devices, such as a customer computing device, which may enable such devices to determine that they are present at the facility or store and/or located at and/or near a particular area of the facility or store. The beacons can also be configured to track information about costumer behavior, such as the locations that the customer travels within the store. This data may be helpful in accessing the effectiveness of certain promotions and to better understand customer presence and demographics in stores. The retailer could also track how often certain customers are in the facility or store and provide automated loyalty discounts or loyalty programs based on how often the customers visit the store.

The beacons also can communicate with the hubs to consolidate their data and receive the information, as discussed herein, from the hubs, e.g., advertising information, product information, or shopping information. For example, the hubs may communicate with customer devices and transmit various advertisements, discounts, promotions, deals, or coupons, or provide shopping support/help or location information for particular products nearby. The hubs can also be configured to adjust beacon transmission to make the beacons the most efficient within a store setting. For example, the hub can use real-time aggregate data from several co-located beacons and adjust their power output or RF radiation patterns to target specific areas of the store, fill RF gaps within the store, or use the RSS (Received Signal Strength) data from the beacons to triangulate the location of a target device for more accurate position information, allowing a more relevant push of information to that target.

In one example, the beacons may be present in a retail store to send advertising or discount information related to several specific brands and the effectiveness of beacon advertising can be assessed. As beacons throughout a store communicate to the hubs, it can be determined whether a particular shopper is allowing or acting upon ads and discounts from brand 'A' and not from 'B'. As the system tracks the shopper through the store, decisions can be made about the strength of content in ads or discounts presented to either reinforce brand 'A' or elevate 'B'. Further, using aggregate data from beacons and other end-point devices, it can be surmised that if a shopper is presented with an ad or discount for a brand 'A' product in the vicinity of the placement of brand 'A' product, and within a predetermined time an end point device can indicate through a hub that brand 'A' product is removed and presumably shopped for purchase. In this way, the effectiveness of beacon advertising can be directly assessed.

Referring back to FIG. 39, the network, e.g., in-store server 39322, cloud 39320, or external client server 39324, is configured to receive data from the hub 39100. Generally speaking, as discussed in further detail below, the network, e.g., the in-store server 39322, cloud 39320, or external client server 39324, can (1) store any data received or transmitted to the hub and the end-point devices (2) make decisions regarding the data received and transmitted to the hubs and end-point devices, (3) display any data received or transmitted to the hub and the end-point devices, and (4) allow data received or transmitted to the hub and the end-point devices to be modified.

The network can store any data received or transmitted to the hub and the end-point devices as discussed herein, e.g., inventory data, customer information, end-point device status, usage and activity information, customer information, product information, pricing information, marketing material, product information, user instructions, rebate information, content, updates to software, updates to operating systems, etc. In this way, the network can continuously provide updates to data received or transmitted to the hub and the end-point devices and continuously update internal webpages and any external webpages displaying this information.

The network can also make various decisions regarding the data received and transmitted to the end-point devices. In one example, various rules or algorithms can be provided to monitor inventory levels and to send instructions to request additional inventory, and the network can be configured to request additional inventory for particular areas or locations.

The network can also make decisions regarding the data received by the end-point devices in producing certain alerts 39330 based on the inventory data received. In one example, the in-store server 39322 can be interconnected with one or more of a store security system, camera, displays, light indicators, or PA system. Upon receiving indication of a possible theft situation, which can be determined in accordance with the examples discussed herein, the network can be configured to turn on a camera so as to capture images of the potential theft, display predetermined messages to alert personnel, provide alerts through the light indicators and/or provide alerts over the PA system in accordance with one or more examples discussed herein. The network can also be configured to send messages in accordance with the examples discussed above to personnel to alert personnel of a possible theft.

Additionally, in one example, the network can make decisions regarding the data sent to the end-point devices. For example, various rules or algorithms can also be provided to update content, e.g. interactive display data or electronic shelf display data, such as pricing information, based on demand, supply, market conditions, and/or the time of day, week, month, or year.

All of the information received at the network can be viewed by personnel at the facility or corporation with the appropriate network credentials. In one example, the portal can be web based and can provide different views and breakdowns of information that is provided by the one or more hubs. For example, the portal can provide trending theft situations from specific end-point devices, facilities, or regions. In this way, various personnel can view the portal and can view trends, such as the theft of certain products, thefts in certain regions or theft at certain time points during the year.

Additionally, the facility or corporation can view and manage inventory levels through the portal. The portal can also provide inventory intelligence to the retailers such that the retailers can better manage trends of product both from an inventory replenishment standpoint and anticipate events. This improves the ability for stocking the product within the store or facility and can be used to alert stock personnel to ready inventory for restocking purposes.

The portal can also provide real time data regarding the integrity of the network. For example, the portal can provide information on whether the end-point devices at the monitored facilities are online or offline. In particular, the portal can track and receive periodic updates or heartbeats from the end-point devices. For example, if the hub does not receive a heartbeat from one or more of the end-point devices, the hub can send a message or alert to through the network to indicate that the particular end-point devices are not operational, and this information can then be viewed on the portal. This can help personnel monitor various facilities and employ the appropriate personnel to diagnose and troubleshoot faulty end-point devices and generally monitor the system.

In addition, the portal can provide shopping activity data based on the transactions that occur and other data received from the end-point devices. The portal can also provide shopping data from certain facilities about certain product types and certain end-point devices. For example, the portal can provide information to help retailers understand the effectiveness of marketing of certain products. In particular, often times within a store setting, it becomes difficult to understand where customers decide to make purchases in the instance where products are located in more than one location within a store or facility. The end-point devices can provide product location information such that the retailers can understand which locations and/or displays are the most effective in enticing purchases.

Any of the data that is provided on the portal can be aggregated and distilled depending on how the data would like to be viewed. The portal software can be configured provide various outputs, such as tables, charts, or graphs, etc. to illustrate this information. In addition, the portal software can include various searching capabilities for the retailers to search by store, facility, region, product and product type, thefts, pricing information, sales amount, or particular end-point device/end-point device type, etc.

All of the information received at the network can be modified by the appropriate personnel, for example, personnel with the appropriate network credentials. For example, the appropriate personnel could modify data e.g. display or pricing information that is provided to the end-point devices at the portal 39326.

The examples herein can provide a centralized wireless store intelligence system, which can be configured to, for example, consolidate theft prevention, manage shelf inventory, provide shopper price display and marketing messaging, provide interactive shopping tools all under one system to provide for a singular digital in-facility strategy. The examples provided herein can provide a mechanism for maintaining and viewing inventory data in one location and provide a centralized mechanism for the management of theft reduction and inventory data. In addition, the system provides a method for homogenizing of the data so it can be considered in large scale way. The system can also provide a consistent look and feel to the users and provide an enhanced user experience.

Although in certain examples discussed above the processing and display of the various data collected from the end-point devices is discussed in relation to certain computing devices, such as the hub and/or servers, it is contemplated that the processing and display of the various data collected from the end-point devices can be completed at any computing device within the network including any known computing devices not discussed or depicted herein. Moreover, it is also contemplated that any hub can also be configured as any end-point device as discussed herein.

Figure 42:
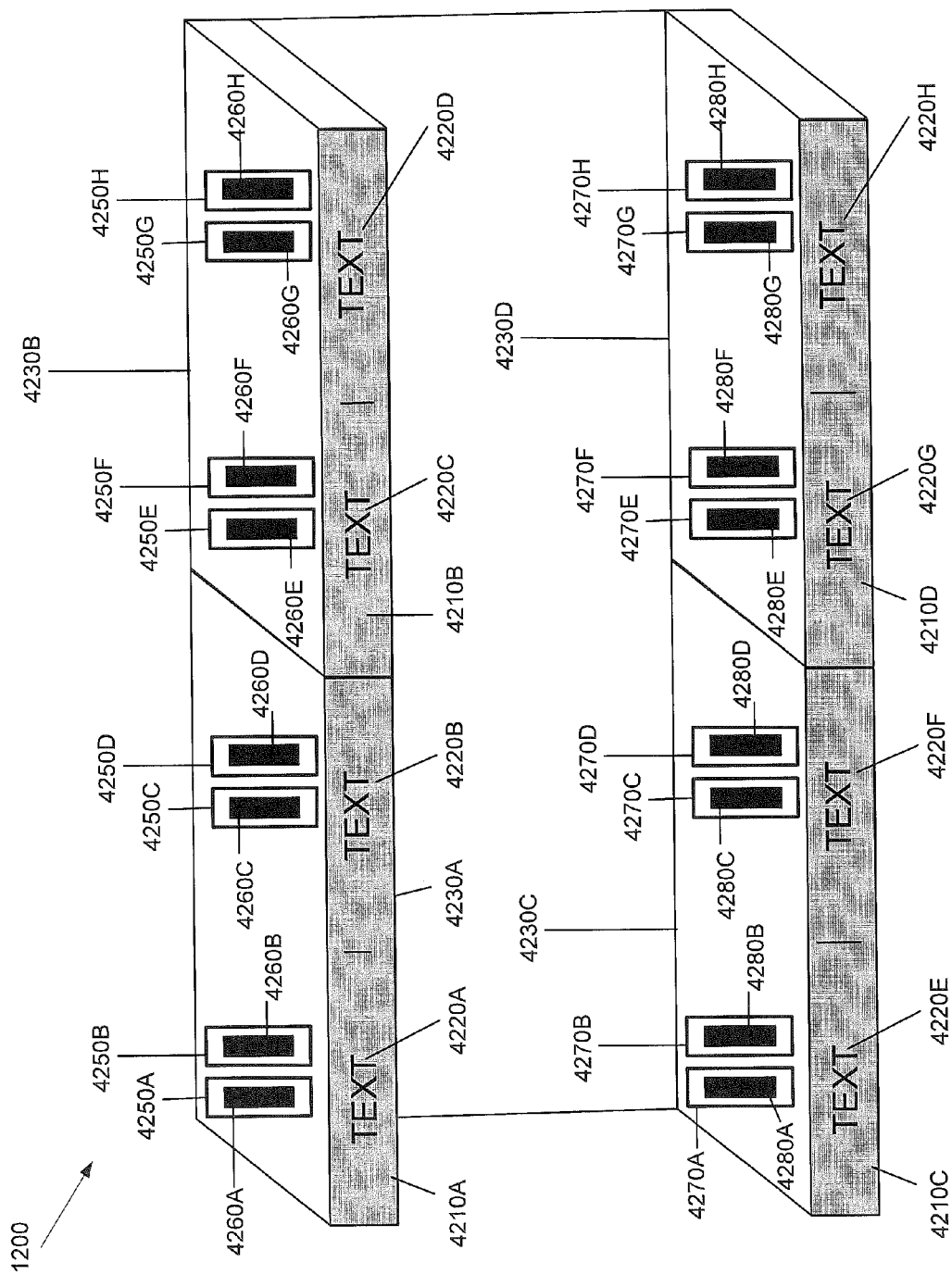

As discussed below in relation to the examples in FIGS. 42 and 43 a merchandising system can also be configured to provide a continuous label across the bottom of shelves, on products themselves, or across both products and screens on the bottom of the shelves to allow for dynamic messaging to a consumer. FIG. 42 illustrates an example block diagram of a system for communicating and distributing content according to one or more illustrative aspects of the disclosure. In one example, one or more of the components of FIG. 42 may be implemented by computing device 100 in FIG. 27 and/or one or more of devices shown in FIGS. 2A-12. In this example, a system 4200 of multiple continuous display shelf edge label devices are shown in operation together. In this example, there are four continuous display shelf edge label devices. However, as discussed below, it is contemplated that any number of shelf edge label devices can be used depending on the sizing of the shelves and products.

Each continuous display shelf edge label device includes a single display area 4210A-4210D oriented along an entire edge of a shelf 4230A-4230D. Further in this example, shelves 4230A-B hold products 4260A-4260H, wherein 4260A-B may be of a first type, 4260C-D may be of a second type, 4260E-F may be of a third type, and so on, or any combination thereof. Shelves 4230C-D hold products 4280A-H, wherein 4280A-B may be of a first type, 4280C-D may be of a second type, 4280E-F may be of a third type, and so on, or any combination thereof. The products 4260A-4260H and 4280A-H are each encapsulated in packages 4250A-4250H and 4270A-4270H, respectively.

In one example, the displays 4210A-4210D can be embedded into their respective shelves 4230A-4230D. The shelves can be formed of any suitable material, and, in one example, the shelves can be formed of a plastic material. This allows for power to be sent over the air and through the shelves in order to provide power to the packages 4250A-4250H and 4270A-4270H. Additionally, a plastic shelf may allow electronic signals to pass through and can be embedded with other electric elements in addition to the displays 4210A-4210D. This allows for additional hardware to be installed and integrated into the merchandising display system, such as the various components discussed above and herein. Additionally, plastic shelves can also be formed lightweight for easier handling such that it is easier to clean, ship, stock, or move, for instance, if products get lost behind the shelves, etc.

Packages 4250A-4250H and 4270A-4270H can include electronic display screens or LEDs. In one example, the electronic display screens or LEDs can located on the packages or embedded therein. In other examples, the packages 4250A-4250H and 4270A-4270H can be provided with bi-stable or electrophoretic displays to display any desired characters or images. In certain examples, the packages 4250A-4250H and 4270A-4270H can mostly consist of display such that a majority of the package surface can display any desired characters or images.

In one example, single continuous displays 4210A-4210D can be formed of multiple displays. For example each single continuous display 4210A-4210D can include two digital displays 4220A-H, one for each respective type of product being offered for sale. Each of the displays 4220A-H can provide information about the type of product above the user interface. For example, display may provide information on products 4260A-B, display provides information on products 4260C-D, display 4220C provides information on products 4260E-F, display 4220D provides information on products 4260G-H, display 4220E provides information on products 4280A-B, display 4220F provides information on products 4280C-D, display 4220G provides information on products 4280E-F, and display 4220H provides information on products 4280G-H. Displays 4210C-4210D may also display additional information, such as advertisements and promotions. Additionally, displays 4210C-4210D can be configured as user interfaces such that, for example, users can obtain additional interactive product information at the shelf edge in accordance with the examples discussed above in relation to FIG. 41, e.g., the user interfaces can be provided with many different views and a menu of products that can be selected or can scan products to access the product information stored therein.

Continuous display shelf edge label devices 4210A-D may be in communication with each other, products 4260A-H and 4280A-H, as well as corresponding packages 4250A-H and 4270A-H. For example, continuous display shelf edge label device 4210A may be in communication with packages 4250A-D, continuous display shelf edge label device 4210B may be in communication with packages 4250E-H, continuous display shelf edge label device 4210C may be in communication with packages 4270A-D, and continuous display shelf edge label device 4210D may be in communication with packages 4270E-H. Although illustratively shown as a wireless communication, the transmission path between continuous display shelf edge label devices 4210A-D and packages 4250A-H and 4270A-H may be a wired communication path, through network 210 or in accordance with the examples disclosed in relation to FIG. 39, and/or in some other manner. Additionally, information, such as pricing information, product data, and advertisements, can be provided to the continuous display shelf edge label devices 4210A-D and packages 4250A-H and 4270A-H through network and hub 39100 discussed above in relation to FIG. 39.

In accordance with one or more aspects of the present disclosure, the various continuous display shelf edge label devices could operate in unison for providing additional information to a customer, e.g., product information, pricing information, discount information, advertisements, and product logos. By having the continuous display shelf edge label devices arranged in side by side (4210A and 4210B or 4210C and 4210D) orientation and stacked on top of each other like shelves (4210A and 4210C or 4210B and 4210D), an array of continuous display shelf edge label devices may be configured, which can be configured to be combined together display a uniform image or video. In the illustrative example of FIG. 42, there are four continuous display shelf edge label devices arranged as an array of 2×2, two rows and two columns of continuous display shelf edge label devices. However, any of a number of additional arrangements may be made, including, but not limited to 6×1, 4×1, 3×4, 3×3, and 4×4 configurations.

Additionally, the various continuous display shelf edge label devices may work in unison with packages 4250A-H and 4270A-H for providing additional information to a customer or for drawing a customer's attention. For example, select packages from 4250A-H and 4270A-H could be lit up to promote select products, wherein said lighting may be coordinated by continuous display shelf edge label devices 4210-4210D. Additionally, complementary products may have their packages lit up using similar or complementary visual effects. In one example, packages 4250A-F may be constantly lit up, packages 4250G-H may be lit up during select time intervals, packages 4270A-D may be lit up when continuous display shelf edge label device 4210C detects the presence of a customer through a proximity sensor, packages 4270E-F may be lit up when a customer interacts with one or more of the displays 4220A-H when configured as user interfaces, and packages 4270G-H may be lit up when a change in product information, such as price, is effectuated at the user interfaces or when the information is pushed out through the network as is discussed herein.

In one example, the front-most packages of the packages 4250A-H and 4270A-H and the forward facing surfaces of the front-most packages can also be determined such that only the forward facing surfaces of the front-most packages are displaying information. For example, the front and the rear of the plurality of shelves can be determined and a group of front most packages are determined from the plurality of packages. The front most packages can be configured to form the continuous display and further the forward facing surfaces of the front-most packages can be configured to display the desired imagery. Additionally it is also contemplated that any of the multiple surfaces of the packages can have a package digital display, such that the package can be placed on the shelf in any orientation to form part of the continuous display.

In accordance with one or more aspects of the present disclosure, the various continuous display shelf edge label device 4210A may communicate with products 4260A-D, continuous display shelf edge label device 4210B may communicate with products 4260E-H, continuous display shelf edge label device 4210C may communicate with products 4280A-D, and continuous display shelf edge label device 4210D may communicate with products 4280E-H. Although illustratively shown as a wireless communication, the transmission path between continuous display shelf edge label devices 4210A-D and packages 4250A-H and 4270A-H may be a wired communication path, through network 210, from hub 39100, in accordance with any of the examples discussed herein, and/or in some other manner.

The various continuous display shelf edge label devices 4210A-D may work in unison with products 4260A-H and 4280A-H for providing additional information to a customer or to attract a customer's attention. In one example, a continuous display shelf edge label device may send a trigger to the products above the continuous display shelf edge label device, the trigger causing the products to power on. In a second example, products 4260A-B are electronic devices and continuous display shelf edge label device 4210A may communicate a trigger to products 4260A-B to power on the displays of the electronic devices. Continuous display shelf edge label device 4210A may communicate such a trigger at select time intervals, upon detecting an interaction between a customer and display 4220A, or when continuous display shelf edge label device 4210A detects the presence of a customer through a proximity sensor. Additionally, the continuous display shelf edge label devices 4210A-D and products 4260A-H and 4280A-H can be powered on by one or more hubs 39100 or the network as discussed herein. Once the displays of electronic products 4260A-B have been powered on in response to the trigger from continuous display shelf edge label device 4210A, a customer may be able to interact with the displays of electronic products 4260A-B through display 4220A when configured as a user interface. When configured as a user interface, the user may interact with display 4220A using any of the methodologies provided in reference to FIG. 27. For example, user inputs on the display 4220A may be transmitted to and mirrored on the displays of products 4260A-B. The display 4220A may also be updated with data received from products 4260A-B in response to the user's input, and this interaction may repeat one or more times. This feature is discussed in detail below in reference to FIGS. 44*a-d*.

Figure 43:
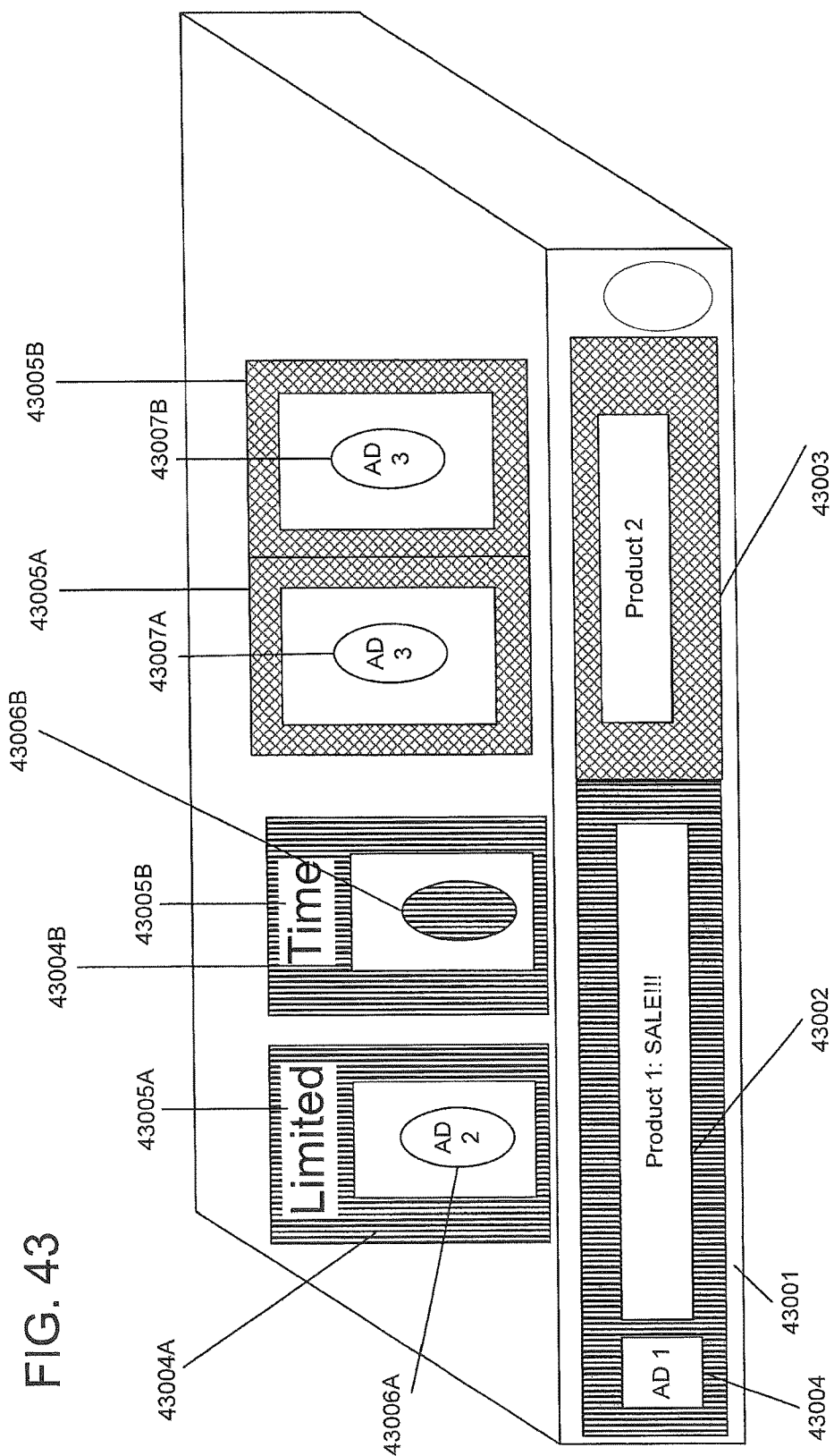
Figure 44A:
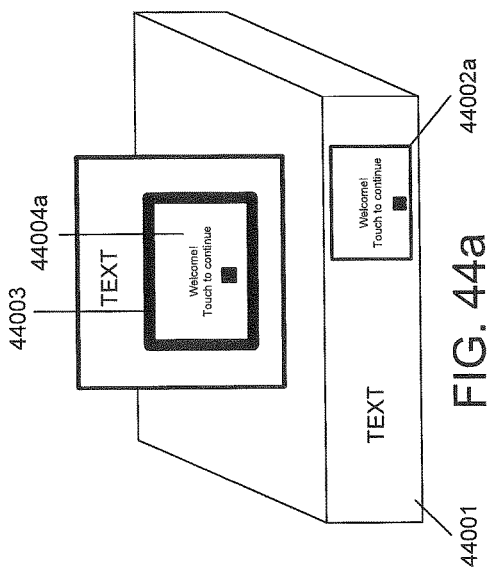
Figure 44B:
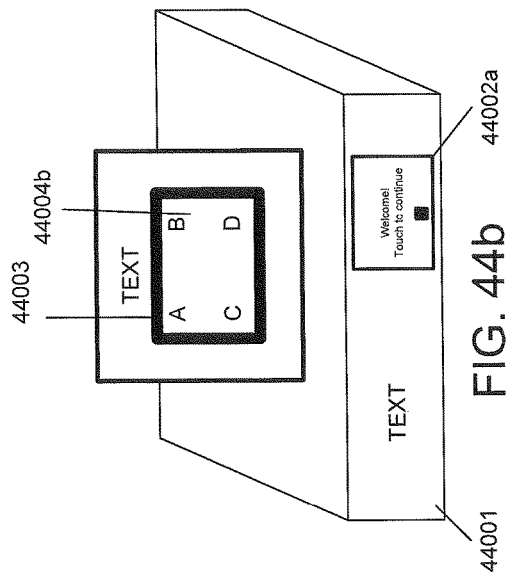
Figure 44C:
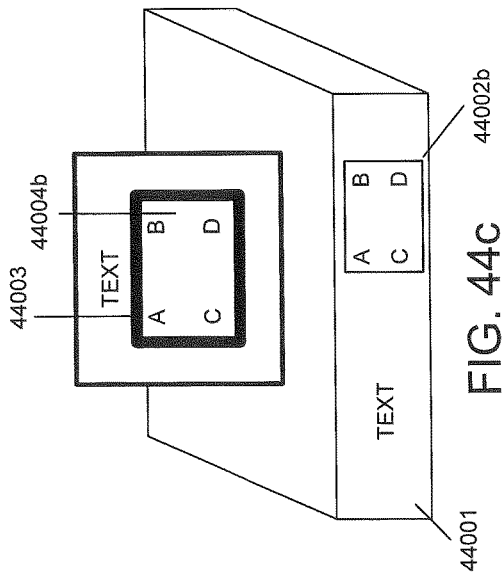
Figure 44D:
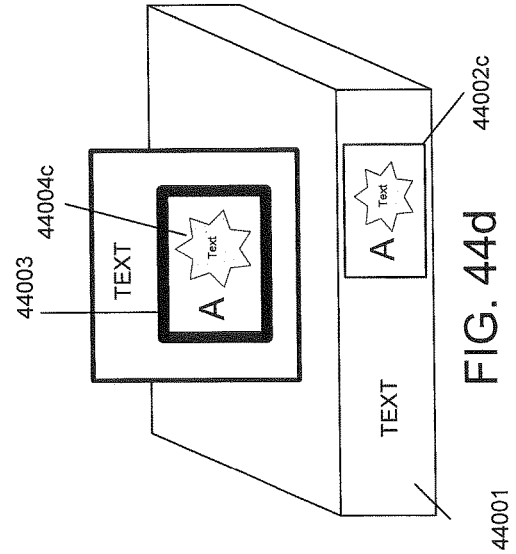

FIG. 43 depicts another example block diagram of a system for communicating and distributing content according to one or more illustrative aspects of the disclosure. The example in FIG. 43 can have similar features and functionality as the example above discussed in relation to FIG. 42. In one example, one or more of the components of FIG. 43 may be implemented by computing device 100 in FIG. 27, one or more of devices shown in FIGS. 2A-12, and/or the examples discussed in relation to FIG. 39. In this example, a single continuous display shelf edge label device 43001 is shown. Continuous display shelf edge label device 43001 can be provided with any number of displays. In this example, continuous display shelf label device 43001 can be provided with two displays which again may or may not be configured also as user interfaces and can be configured similarly as the example discussed above in relation to FIG. 42. Display 43002 provides information on products 43006A and 43006B and may also display a static or dynamic advertisement 43004. For example, the background of display 43002 may display the logo representing the manufacturer of products 43006A and 43006B. Display 43003 can provide information on products 43007A and 43007B. Also the background of display 43003 may display the logo representing the manufacturer of products 43007A and 43007B, where the logo displayed on the background of display 43003 may differ from the logo displayed on the background of display 43002. However, it is contemplated that the backgrounds of displays 43002 and 43003 may display additional information, such as static images or streaming video of products 43006A-B and 43007A-B, promotional content, good-will messages, advertisements or any related information.

Products 43006A and 43006B are encapsulated in packages 43004A and 43004B, respectively. Packages 43004A and 43004B can be each embedded with an electronic display screen or LEDs. Products 43006A and 43006B may be powered by a receiver or transceiver within packages 43004A and 43004B. In one example, a continuous display shelf edge label device 43001 may send a trigger to products 43006A-B and 43007A-B, the trigger causing the displays of products 43006A-B and 43007A-B to power on. Continuous display shelf edge label device 43001 may communicate such a trigger at select time intervals, upon detecting an interaction between a customer and one or more of displays 43002 and 43003, or when continuous display shelf edge label device 43001 detects the presence of a customer through a proximity sensor. It is also contemplated that the content can be pushed out to the to the continuous display shelf edge label device 43001 and the displays of products 43006A-B and 43007A-B by the hubs 39100 or networks as discussed herein. Also the hubs 39100 or networks as discussed herein can be configured to power on the continuous display shelf edge label device 43001 and the displays of products 43006A-B and 43007A-B either automatically or when certain conditions occur such as when a customer is detected within a vicinity of the continuous display shelf edge label device 43001.

Once powered, the displays of products 43006A and 43006B may be dynamically configured with various static or streaming messages by continuous display shelf edge label device 43001 or the network. In one example, the display of product 43006A can display an advertisement and the display of product 43006B displays the logo representing the manufacturer of products 43006A and 43006B. The displays on products 43006A and 43006B may alternatively include promotional content, seasonal greetings, and/or general messages directed to consumers. Products 43007A and 43007B may be powered by a receiver or transceiver in packages 43005A-B, respectively. Packages 43005A-B are each embedded with an electronic display screen or LEDs. The displays of products 43007A and 43007B may be dynamically configured by continuous display shelf edge label device 43001 to display static or stream video or images, including information about the products, manufacturer, promotional content, good-will messages, and/or advertisements (shown).

Additionally, the displays on products 43006A-B and 43007A-B may be interactive. Continuous display shelf edge label device 43001 may dynamically configure the displays of products 43006A-B and 43007A-B. For example, promotional content may dynamically be displayed on one or more of products 43006A-B and 43007A-B when the presence of a consumer is detected. A customer may then interact with the displays of one of products 43006A-B and 43007A-B through displays 43002 or 43003. For example, user inputs on displays 43002 may be transmitted to and mirrored on the display of product 43006A. Display 43002 may then be updated with data received from products 43006A in response to the user's input, and this interaction may repeat one or more times. This feature is discussed in detail below in reference to FIGS. 44*a-d*.

Products 43006A-B and 43007A-B are encapsulated in packages 43004A-B and 43005A-B, respectively. The displays of packages 43004A-B and 43005A-B may be powered from display shelf edge label device 43001. In one example, the displays of packages 43004A-B and 43005A-B may be consistently powered over the air. Consistent powering over the air may be implemented via a highly resonant wireless power transfer process. A coil of wire with a special drive circuit may be placed in a base deck of a plastic shelving unit that holds packages 43004A-B and 43005A-B and also houses display shelf edge label device 43001. A small and thin coiled antenna wire may be placed in a wall of each product package 43004A-B and 43005A-B. Packages 43004A-B and 43005A-B may each intercept a portion of the power that is wirelessly transmitted by the coiled wire via the coiled antenna wire in each package. The intercepted power may then be used to operate the display or LED on the product package or the displays on products 43006A-B and 43007A-B. In a second example, a continuous display shelf edge label device 43001 may send a trigger to one or more of packages 43004A-B and 43005A-B, the trigger causing the displays of packages 43004A-B and 43005A-B to power on. Continuous display shelf edge label device 43001 may communicate such a trigger at select time intervals, upon detecting an interaction between a customer and one or more of user interfaces 43002 and 43003, or when continuous display shelf edge label device 43001 detects the presence of a customer through a proximity sensor.

Once powered, the displays of packages 43004A-B and 43005A-B may be dynamically configured with various static or streaming images or video by continuous display shelf edge label device 43001. In one example, the packages 43004A-B and 43005A-B may be dynamically configured by continuous display shelf edge label device 43001 to mirror displays 43002 and 43003 by displaying the logo representing the manufacturer of products 43006A-B and 43007B, respectively. In another example, packages 43004A-B may be dynamically configured by display shelf edge label device 43001 to display, along with the logo, other information related to products 43006A and 43006B (here, that the price is only for a "Limited Time"). Packages 43004A-B and 43005A-B may display additional or alternative information, such as a streaming video of a product within the package, a related product, an advertisement, or any related information thereof.

Though the displays of each of user interfaces 43002, products 43006A and 43006B, packages 43004A and 43004B is shown to be self-contained, continuous display shelf edge label device 43001 may dynamically configure one or more of the aforementioned components to each display a portion of the logo, product, or any other desired visual content. In this way, a larger display may be apportioned between all of or any combination of the user interfaces 43002, products 43006A and 43006B, and packages 43004A and 43004B. For example, packages 43005A-B cohesively display the logo of the manufacturer of products 43007A-B. In place of the logo, a streaming video of a product could also be apportioned across packages 43005A-B. Similarly, a larger display may be apportioned between all of or any combination of the displays 43003, products 43007A-B and packages 43005A-B. In one example, continuous display shelf edge label device 43001 may apportion a display across both displays 43001 and 43003, as well as the products and packages corresponding to these user interfaces. Thus, the comprehensive visual display would be apportioned between all of or any combination of the user interfaces 43002 and 43003, products 43006A-B and 43007A-B, and packages 43004A-B and 43005A-B, wherein each component may simultaneously output a different part of the visual display.

Continuous display shelf edge label device 43001 may also dynamically coordinate with one or more additional continuous display shelf edge label devices to create a dynamic display that spans across the user interfaces, products, and packages of multiple continuous display shelf edge label devices. Thus, a static image or streaming video of a product, a manufacturer's logo, or any related content would then be apportioned between multiple continuous shelf edge label devices, as well the user interface(s), product(s), and package(s) corresponding to each continuous shelf edge label device.

In one example, continuous display shelf edge label 43001 or other sensors placed proximately to the continuous display shelf edge label 43001 may detect the presence of a consumer through a proximity sensor. Continuous display shelf edge label 43001 may then send triggers to packages 43004A-B, as well as neighboring or surrounding continuous display shelf edge labels. The neighboring and/or surrounding continuous display shelf edge labels may then send activation triggers to their corresponding packages. Continuous display shelf edge label 43001 may then apportion a streaming video among itself and the surrounding continuous display shelf edge labels. Each continuous display shelf edge labels may then further sub-divide the apportioned video between its packages. Alternatively, continuous display shelf edge label 43001 may control apportioning among all of the surrounding continuous display shelf edge label and their corresponding packages.

The displays or the continuous display formed by the packages and shelf edge displays allow for a dynamic sizing of the desired message in the retail setting. For example, when the planogram changes, the size of the shelf edge label can be changed. Also the various displays can be formed as either one large screen to display one continuous message or can be separated into various screens to display various messages. Additionally, the displays or the continuous display formed by the packages and shelf edge displays could be paid for by the retailer by renting out the space to the distributor of the products.

The continuous display shelf edge labels may further be integrated with software applications. For example, a user may download and install a software application on a mobile device, such as a cellular device. The software application may be associated with one or more retailers, and the user may use the software application to catalog one or more items that the user wishes to purchase or view. For example, the software application may be associated with a grocery store, and the user may use the software application to store a grocery list. The software application may additionally or alternatively be associated with an electronics retailer, and the user may use the software application to store a list of electronic devices that the user wants to analyze.

The user may launch the software application upon entering designated premises, such as the grocery store or the electronics retailer. The software application may scan the grocery list and determine the locations of each of the items on the grocery list in relation to the continuous display shelf edge label devices that are populated throughout the store. Such information may alternatively be stored by the software application upon initial list entries made by the user (i.e. prior to the user launching the software application in the grocery store). The software application may then establish wireless communications with the one or more continuous display shelf edge label device that hold the one or more items on the grocery list as the user approaches the items.

For example, the software application may determine that a first item on the user's list is located in a first aisle, on a first plastic shelf housing a first continuous display shelf edge label device. The software application may track the user's location within the store and detect when the user enters the first aisle. The software application may then establish a wireless connection to the first continuous display shelf edge label device. As the user enters the first aisle, the software application may sent a signal to the first continuous display shelf edge label device. The first continuous display shelf edge label device may then initiate a predetermined display utilizing the continuous display shelf edge label device itself, the surrounding continuous display shelf edge label devices, one or more packages and/or product displays on the continuous display shelf edge label device, and/or one or more package and/or product displays on the surrounding continuous display shelf edge label devices. For example, continuous display shelf edge label 43001 may utilize a chase-light effect to direct the user to product 43006A. This may include displaying various graphical messages or images, such as arrows, to help direct the user to the first item on the list. Additionally, a package encapsulating an item matching the first item on the user's list may be activated, thus drawing the user's attention. Alternatively or in addition, the contiguous display shelf edge labels can be provided with a speaker, which can alert the user with an audible alarm to direct the user to the item on the list.

A comprehensive visual display may be launched by the first continuous display shelf edge label device upon detection of the user entering the first aisle. Such a comprehensive visual display would be apportioned between all of or any combination of the user interfaces 43002 and 43003, products 43006A-B and 43007A-B, and packages 43004A-B and 43005A-B, wherein each component may simultaneously output a different part of the visual display. The packages of complementary items may also be activated in a coordinating manner. For example, the retailer may utilize coordinating displays to up-sell or cross-sell different products based on the retailer's preferences (such as directing a user to a retailer's generic brand in lieu of the brand name item on the user's list).

The software application may continue to track the user's location within the store as the user traverses the different aisles. Upon the user's entering of an aisle, the software application may cross-reference the items on the user's list and the items stored in the aisle. If one or more items on the user's list or any items complementary to items on the user's list are stored in the user's current aisle, the software application may establish a wireless communication with one or more continuous display shelf edge label devices in the user's current aisle, and an appropriate display may be launched directing the user to the item on the list or a complementary item. A complementary item may items that are commonly purchased together. For example, if the user's grocery list indicates that the user will be purchasing peanut butter, the visual display may be targeted to drawing the user's attention to the shelf holding bread. The complementary item may also be a similar item on sale, a retailer's house brand item, an item that the retailer is attempting to up-sell, etc.

FIGS. 44*a-d* illustrate exemplary states of the screen of an electronic product and the display of a user interface within the continuous display shelf edge label. A portion of continuous display shelf edge label device 44001 has been configured as user interface 44002*a*. The continuous display shelf edge label device 44001 may work in unison with the product 44003 to provide additional information to a customer or to attract a customer's attention. In FIGS. 44*a-d*, only one exemplary continuous display shelf edge label device 44001 and one product 44003 are shown. However, any number of continuous display shelf edge labels and products may be configured to interact as described herein.

In one example, product 44003 is an electronic device with a digital display screen. Continuous display shelf edge label device 44001 may communicate a trigger to product 44003 to power on the display 44004*a* of the electronic device 44003. Alternatively, the display 44004*a* of the electronic device 44003 may remain consistently or constantly powered. Continuous display shelf edge label device 44001 may communicate such a trigger at select time intervals, upon detecting an interaction between a customer and continuous display shelf edge label device 44001, or when continuous display shelf edge label device 44001 detects the presence of a customer through a proximity sensor. Additionally, product 44003 can be powered on by one or more hubs 39100 or the network as discussed herein.

In addition to sending a trigger to the electronic product 44003, continuous display shelf edge label device 44001 may configure at least a portion of the display of continuous display shelf edge label device 44001 to be a user interface 44002*a*. Once the display 44004*a* of electronic product 44003 has been powered on in response to the trigger from continuous display shelf edge label device 44001 (or one or more hubs 39100 or the network), the display 44004*a* may show a default screen. This default screen may also be replicated on user interface 44002*a*. The default screen may include an icon that, when selected by a user, brings up a home menu screen. The default screen may additionally or alternatively include advertisements, other promotional content, or information about electronic product 44003. A customer may then interact with the display 44004*a* of electronic product 44003 through user interface 44002*a* (for example, using any of the methodologies provided in reference to FIG. 27).

If the user selects the icon displayed on the default home screen through user interface 44002*a*, the selection may be transmitted from the continuous display shelf edge label device 44001 to the electronic product 44003. The display screen 44004*a* of electronic product 44003 may then transition to the display screen 44004*b*, showing the home menu screen, in response to the user selection. Electronic product 44003 may then transmit the data required for the display of the home menu screen to the user interface 44002*a*. Alternatively, this data may already be stored in continuous display shelf edge label device 44001. In response to receiving the data, the display in user interface 44002*a* may then transition to the display in user interface 44002*b*. User interface 44002*b* is now mirroring the display screen 44004*b* of product 44003 by displaying the same home menu screen as electronic display 44004*b*. The user may then select an item from the home screen menu (currently shown on both display screen 44004*b* of product 44003 and the display in user interface 44002*b*) through the user interface 44002*b*. The user's selection may be transmitted from user interface 44002*b* to electronic product 44003. In response to receiving the user's selection, the electronic display 44004*b* on product 44003 may transition to electronic display 44004*c*. Electronic display 44004*c* shows a graphic associated with the item selected by the user through user interface 44002*b*. The data required for the display of the graphic associated with the selected item may then be transmitted from electronic product 44003 to user interface 44002*b*. The data may be transmitted via continuous display shelf edge label device 44001. In response to receiving the data, the display on user interface 44002*b* may then transition to the display shown on user interface 44002*c*. User interface 44002*c* is now mirroring electronic display 44004*c* by displaying the graphic associated with the selected item. This type of interaction may continue until terminated by the user.

In one aspect, this disclosure includes a display management system having a mechanism that may be configured to move in response to a product being removed from the display management system. The display management system may additionally have a sensor that outputs motion data in response to movement of the mechanism. Further, the display management system may have a control circuit that receives the motion data and communicates the motion data to a remote processor if it exceeds a threshold value. Additionally, the display management system may have a non-transitory computer-readable medium comprising computer-executable instructions that may be executed by the remote processor to calculate the current position of the mechanism from the motion data, and calculate the number of products removed from the display management system based on the position of the mechanism.

In another aspect, this disclosure includes a display management system that may have a mechanism configured to move in response to a product being removed from the display management system. The display management system may further have a sensor that outputs motion data in response to movement of the mechanism. Additionally, the display management system may have a transmitter circuit that transmits the motion data to a remote processor, and a non-transitory computer readable medium comprising computer-executable instructions that may be executed by the remote processor to calculate the current position of the mechanism and calculate a product removal pattern.

In yet another aspect, this disclosure includes a non-transitory computer-readable medium comprising computer-executable instructions that when executed by a processor may be configured to receive sensor data from sensors associated with one or more display management systems. Additionally, the sensor data may be used to calculate a number of products removed from the one or more display management system, and may be used to detect product removal pattern based on the number of products removed from the display management systems.

In another aspect, a method and apparatus for providing information along a shelf edge of a retailer is provided. On a display configured to be oriented along an edge of a shelf of a retailer, a first user interface including first information about a first product on the shelf is provided. At least one second user interface including at least one second information about at least one second product on the shelf is provided on the display. An individual is permitted to edit a parameter of the first user interface and/or the at least one second user interface. The parameter may include at least one of: a size of the user interface on the display, a shape of the user interface on the display, and a location of the user interface on the display. The first information and the at least one second information may be outputted concurrently to the display.

In one example, a system can include a plurality of end-point devices associated with a product shelf configured to display product, and a plurality of hubs each positioned adjacent to one or more of the plurality of end-point devices. The one or more of the plurality of end-point devices can be configured to detect and transmit inventory information to a predetermined adjacent hub of the plurality of hubs, and the one or more of the plurality of end-point devices can be configured to receive and display price information or product information from a predetermined hub of the plurality of hubs. The plurality of hubs can be each configured to perform one or more of the following: receive inventory information from one or more of the plurality of endpoint devices, provide one or more alerts depending on the received inventory information, to transmit inventory information to a network, receive price information and product information and to transmit the price information and product information to one or more of the plurality of end-point devices, to communicate with the plurality of end-point devices via a low energy transmission protocol, and in one example, the low energy transmission protocol can be one or more of Bluetooth, Bluetooth low energy or ISM.

The end-point devices can include one or more of the following: product door sensors, peg-hook security sensors, inventory-measuring pusher sensors, electronic shelf label displays, or interactive touchscreen displays. The one or more of the end-point devices are configured to send a periodic transmission to a predetermined one of the plurality of hubs indicating a status. One or more of the end point devices can include a product pusher and can be configured to detect the position of the product pusher.

The plurality of hubs can be configured to calculate a number of products based on the inventory information received from the one or more end-point devices. The number of products calculated by the plurality of hubs can be received by the network, and the network can calculate the number of products in a facility. The plurality of hubs can be configured to transmit one or more of a message, audio, or visual indicator upon the detection of a predetermined rate of products being displaced from a product shelf. The plurality of hubs can be configured to transmit one or more of a message, audio, or visual indicator upon the detection of a predetermined level of product. The plurality of hubs can be configured to aggregate and accumulate inventory information and transfer the inventory information to the network. The plurality of hubs can be configured to monitor the end-point devices and report statuses of the end-point devices. At least one of the plurality of hubs can be configured to track the position of one or more of the end-point devices, and the at least one of the plurality of hubs can be configured to detect a possible occurrence of a theft based on a change in position of the one or more of the end-point devices or calculate an inventory level based on the position of the one or more of the end-point devices. The plurality of hubs can each comprise a series of indicator lights configured to illuminate when predetermined conditions occur. The plurality of hubs can be configured to update software or operating systems of the end-point devices. The plurality of hubs can be configured to send selected information to the end-point devices at predetermined times.

A portal for viewing the inventory information received from one or more of the plurality of end-point devices and for modifying the price information and product information transmitted to the one or more end-point devices may also be provided. A network can be configured to receive the inventory information, and the network can be configured to request additional inventory based on the inventory information received from one or more of the plurality of end-point devices. The network can be configured to receive the inventory information and send notifications once an inventory level has reached a predetermined value.

In another example, a method may include one or more of: providing a plurality of end-point devices associated with a product shelf configured to display product, providing a plurality of hubs and positioning each of the plurality of hubs adjacent to one or more of the plurality of end-point devices, configuring one or more of the plurality of end-point devices to transmit inventory information to a predetermined adjacent hub of the plurality of hubs or to receive price or product information from a predetermined hub of the plurality of hubs, configuring each of the plurality of hubs to receive inventory information from one or more of the plurality of end-point devices, to transmit inventory information to the network, to calculate a number of products based on the received inventory information, to transmit the number of products to the network, and to communicate with the plurality of end-point devices via a low energy transmission protocol, configuring a network for receiving and transmitting information to the plurality of hubs and to calculate a total number of products within a facility and configuring the network to receive price information and to transmit the price information to one or more of the plurality of end-point devices.

Additionally the method may also include one or more of configuring the end-point devices as one or more of the following: product door sensors, peg-hook security sensors, inventory-measuring pusher sensors, electronic shelf label displays, and touchscreen displays, configuring one or more of the end-point devices to send a periodic transmission to a predetermined one of the plurality of hubs indicating a status. One or more of the end point devices may include a product pusher and the method may include detecting the position of the product pusher.

The method may also include one or more of the following: configuring the plurality of hubs to transmit one or more of a message, audio, or visual indicator upon detection of a predetermined rate of products being displaced from a product shelf, to aggregate and accumulate the inventory information and transfer the inventory information, configuring the low energy transmission protocol as one or more of Bluetooth, Bluetooth low energy or ISM, configuring the plurality of hubs to monitor the end-point devices and report statuses of the end-point devices, configuring at least one of the plurality of hubs to track the position of one or more of the end-point devices, configuring the at least one of the plurality of hubs to detect a possible occurrence of a theft based on a change in position of the one or more of the end-point devices or to calculate an inventory level based on the position of the one or more of the end-point devices, providing each of the plurality of hubs with a series of indicator lights configured to illuminate when predetermined conditions occur, configuring the hubs to update software or operating systems of the end-point devices configuring the plurality of hubs to update software or operating systems of the end-point devices, and configuring the plurality of hubs to send selected information to the end-point devices at predetermined times.

The method may also include providing a portal for viewing the inventory information received from one or more of the plurality of end-point devices and for modifying the price information and product information transmitted to the one or more end-point devices, configuring a network to receive the inventory information and configuring the network to request additional inventory based on the inventory information received from one or more of the plurality of end-point devices, configuring a network to receive the inventory information and send notifications once an inventory level has reached a predetermined value.

Another example method may include one or more of the following: configuring a network for receiving and transmitting information to a plurality of hubs, configuring one or more plurality of end-point devices to transmit inventory information to a predetermined adjacent hub of the plurality of hubs or to receive price or product information from a predetermined hub of the plurality of hubs, configuring each of the plurality of hubs to receive inventory information from one or more of the plurality of end-point devices, to transmit inventory information to the network, to calculate a number of products based on the received inventory information, to transmit the number of products to the network, to receive price information and to transmit the price information to one or more of the plurality of end-point devices, and to communicate with the plurality of end-point devices via a low energy transmission protocol.

In one aspect, a system for forming a continuous display between one or more electronic label devices positioned along a product shelf and a plurality packages stored on the product shelf can be provided, where the plurality of packages comprise embedded displays. The electronic label devices may be configured to receive a streaming video and apportion the streaming video between the one or more electronic label devices and the plurality of packages. The one or electronic label devices may send an activation trigger to the plurality of packages. The activation trigger may be sent when one or more electronic label devices detect a presence of a user through a proximity sensor. The plurality of packages may each encapsulate a product and the products may comprise display screens. The one or more electronic label devices can send activation triggers to the display screen of the product of each of the plurality of packages. The activation trigger to the display screen of the product of one or more of the plurality of packages may be sent when a user interacts with one or more electronic label devices. The user may interact with the display screen of a product through one or more electronic label devices.

In one example, the system may comprise a second product shelf vertically adjacent to the product shelf and a second electronic label device positioned along a bottom of the second product shelf, the second electronic label device comprising one or more electronic displays. The one or more electronic displays of the product shelf and the one or more electronic displays of the second product shelf may form a continuous display. The system may further comprise a second plurality of packages connected to the second electronic label device, wherein each of the second plurality of packages is stored on the second product shelf and comprises an embedded display. The one or more electronic displays of the product shelf, the one or more electronic displays of the second product shelf, the plurality of displays, and the second plurality of embedded displays may form a continuous display. The electronic label device may output a streaming video to the continuous display upon detecting a presence of a user through a proximity sensor. In one instance, the front-most packages of the packages and the forward facing surfaces of the front-most packages are determined such that only the forward facing surfaces of the front-most packages form the continuous display.

In one aspect, a system for forming a continuous display along a first electronic label device positioned along a bottom of a first product shelf, a second electronic label device positioned along a bottom of a second product shelf, a first group of packages stored on the first product shelf and comprising a first group of electronic displays, and a second group of packages stored on the second product shelf and comprising a second group of electronic displays is provided. The first electronic label device may be configured to apportion a streaming video among each of the first electronic label device, the second electronic label device, the first group of electronic displays, and the second group of electronic displays. Each of the first electronic label device, the second electronic label device, the first group of electronic displays, and the second group of electronic displays may be configured to simultaneously output a different portion of the streaming video. Front-most packages of the first group of packages and the second group of packages and the forward facing surfaces of the front-most packages may be determined such that only the forward facing surfaces of the front-most packages form the continuous display.

In one aspect, a method for displaying a first video on a first electronic label device embedded along a bottom of a first product shelf, displaying a second video on a second electronic label device embedded along a bottom of a second product shelf, sending, by the first electronic label device, a first activation trigger to a first set of packages stored on and positioned at a front of the first product shelf, sending, by the second electronic label device, a second activation trigger to a second set of packages stored on and positioned at a front of the second product shelf, apportioning, by the first electronic label device, a streaming video between each of the first electronic label device, the second electronic label devices, the first set of packages, and the second set of packages; and simultaneously displaying, by each of the first electronic label device, the second electronic label devices, the first set of packages, and the second set of packages, a different portion of the streaming video such that each of the first electronic label device, the second electronic label devices, the first set of packages, and the second set of packages form a continuous display, is provided. The first electronic label device may send the first activation trigger in response to detecting a presence of a user through a proximity sensor. The first electronic label device may detect a presence of a user through a proximity sensor and sends a trigger to the second electronic label device. The second electronic label device may send the second activation trigger in response to receiving the trigger from the first electronic label device.

In one aspect, a merchandise display system comprising a plurality of shelves each shelf comprising a shelf digital display positioned along an edge of a shelf of a retailer to form a plurality of shelf digital displays, and a plurality of packages placed on the plurality of shelves each package having a package digital display to form a plurality of package digital displays, is provided, wherein the plurality of shelf digital displays and the plurality of package digital displays are configured to form a continuous display, wherein the continuous display is configured to form a uniform display to display one of price, advertisements, or messaging. The package digital displays may comprise e-ink. Power may be sent over the air through the plurality of shelves to the plurality of shelf digital displays. The plurality of shelves may be configured to interact with the plurality of packages. The plurality of shelves may define a front and a rear and wherein a group of front most packages are determined from the plurality of packages and wherein the front most packages are configured to form the continuous display. A front surface of each of the group of front most packages may be determined for forming the continuous display. The plurality of packages may have multiple surfaces and each of the surfaces may have a package digital display such that the package can be placed on the shelf in any orientation to form part of the continuous display.

In one aspect, an apparatus for directing a user to one or more items is provided. The apparatus may comprise a processor and memory storing computer readable instructions that, when executed by the processor, cause the apparatus to store one or more items for purchasing or viewing, determine a location of one or more shelf edge electronic displays associated with the one or more items within a facility, detect a user's computing device within the facility and determine whether the user is in proximity to the one or more shelf edge electronic displays associated with the one or more items, and direct the user to the one or more items by altering the one or more shelf edge electronic displays or altering an electronic display of the one or more items when the user is in proximity to the one or more items. The apparatus may further be configured to direct the user to items similar or related to the one or more items by altering the one or more shelf edge electronic displays or altering an electronic display of the one or more items when the user is in proximity to the one or more items. The apparatus may further be configured to determine that the one or more items are on a shopping list stored on a mobile device associated with the user.

In another example, one or more non-transitory computer-readable media having instructions stored thereon that, when executed, cause at least one computing device to perform the methods discussed herein.

The various features described above are merely non-limiting examples, and can be rearranged, combined, subdivided, omitted, and/or altered in any desired manner. The true scope of this patent should only be defined by the claims that follow.

What is claimed is:

1. A system comprising:
   a product shelf having an electronic label device positioned along a bottom of the product shelf, the electronic label device comprising one or more electronic displays; and a plurality of packages connected to the electronic label device, wherein each of the plurality of packages is configured to be stored on the product shelf and wherein each of the plurality of packages comprises a corresponding display, wherein the one or more electronic displays and each display of the plurality of packages forms a continuous display, wherein the electronic label device receives a streaming video and apportions the streaming video between each of the one or more electronic displays and the corresponding display of each of the plurality of packages, wherein the electronic label device is configured to transmit a user input received at a first electronic display of the electronic label device to a first electronic display of a first package, of the plurality of packages, wherein the electronic label device is configured to receive data from the first electronic display in response to transmitting the user input to the first electronic display, and wherein the electronic label device is configured to output the data to the one or more electronic displays.

2. The system of claim 1 wherein the electronic label device sends an activation trigger to one or more of the plurality of displays.

3. The system of claim 2 wherein the electronic label device sends the activation trigger upon detecting a presence of a user through a proximity sensor.

4. The system of claim 1 wherein each of the plurality of packages encapsulates a product, the product comprising a display screen.

5. The system of claim 4 wherein the electronic label device sends an activation trigger to the display screen of the product of one or more of the plurality of packages.

6. The system of claim 5, wherein the electronic label device sends the activation trigger upon a user interacting with one of the electronic displays.

7. The system of claim 6, wherein a user may interact with the display screen through the one of the electronic displays.

8. The system of claim 1 further comprising a second product shelf vertically adjacent to the product shelf and a second electronic label device positioned along a bottom of the second product shelf, the second electronic label device comprising one or more electronic displays.

9. The system of claim 8 wherein the one or more electronic displays of the product shelf and the one or more electronic displays of the second product shelf form a continuous display.

10. The system of claim 8, further comprising a second plurality of packages connected to the second electronic label device, wherein each of the second plurality of packages is stored on the second product shelf and comprises an embedded display.

11. The system of claim 10, wherein the one or more electronic displays of the product shelf, the one or more electronic displays of the second product shelf, the plurality of displays, and the embedded displays in each of the second plurality of packages form a continuous display.

12. The system of claim 9, wherein the electronic label device outputs a streaming video to the continuous display upon detecting a presence of a user through a proximity sensor.

13. The system of claim 1 wherein front-most packages of the packages and forward facing surfaces of the front-most packages are determined such that only the forward facing surfaces of the front-most packages form the continuous display.

14. The system of claim 1 wherein the one or more electronic displays and each display of the plurality of packages is configured to be altered to direct a user to one or more items stored on a computing device of the user.

15. A system comprising:
a first product shelf comprising a first electronic label device positioned along a bottom of the first product shelf;
a second product shelf vertically adjacent to the first product shelf, the second product shelf comprising a second electronic label device positioned along a bottom of the second product shelf;
a first group of packages stored on the first product shelf and connected to the first electronic label device, the first group of packages comprising a first group of electronic displays; and
a second group of packages stored on the second product shelf and connected to the second electronic label device, the second group of packages comprising a second group of electronic displays;
wherein the first electronic label device, the second electronic label device, the first group of electronic displays, and the second group of electronic displays form a continuous display,
wherein the first electronic label device is configured to transmit user inputs received at the first electronic label device to a first electronic display of a first package, of the first group of packages,
wherein the first electronic label device is configured to receive data from the first electronic display in response to transmitting the user input to the first electronic display, and
wherein the first electronic label device is configured to out gut the data to the one or more electronic displays.

16. The system of claim 15, wherein the first electronic label device apportions a streaming video among each of the first electronic label device, the second electronic label device, the first group of electronic displays, and the second group of electronic displays.

17. The system of claim 16, wherein each of the first electronic label device, the second electronic label device, the first group of electronic displays, and the second group of electronic displays simultaneously outputs a different portion of the streaming video.

18. The system of claim 15 wherein front-most packages of the first group of packages and the second group of packages and forward facing surfaces of the front-most packages are determined such that only the forward facing surfaces of the front-most packages form the continuous display.

19. The system of claim 15 wherein one or more of the first electronic label device, the second electronic label device, the first group of electronic displays, and the second group of electronic displays are configured to be altered to direct a user to one or more items stored on a computing device of the user.

20. A method comprising:
displaying a first video on a first electronic label device embedded along a bottom of a first product shelf;
displaying a second video on a second electronic label device embedded along a bottom of a second product shelf;
sending, by the first electronic label device, a first activation trigger to a first set of packages stored on and positioned at a front of the first product shelf;

sending, by the second electronic label device, a second activation trigger to a second set of packages stored on and positioned at a front of the second product shelf;

apportioning, by the first electronic label device, a streaming video between each of the first electronic label device, the second electronic label devices, the first set of packages, and the second set of packages;

simultaneously displaying, by each of the first electronic label device, the second electronic label devices, the first set of packages, and the second set of packages, a different portion of the streaming video such that each of the first electronic label device, the second electronic label devices, the first set of packages, and the second set of packages form a continuous display;

receiving, by the first electronic label device, a first user input;

transmitting, by the first electronic label device and to a first package of the first set of packages, the first user input;

receiving, by the first electronic label device, and from the first package in response to transmitting the first user input to the first package, data to the first electronic label device; and outputting, by the first electronic label device, the data to the first electronic label device.

21. The method of claim 20, wherein the first electronic label device sends the first activation trigger in response to detecting a presence of a user through a proximity sensor.

22. The method of claim 20, wherein the first electronic label device detects a presence of a user through a proximity sensor and sends a trigger to the second electronic label device.

23. The method of claim 22, wherein the second electronic label device sends the second activation trigger in response to receiving the trigger from the first electronic label device.

24. A merchandise display system comprising:
a plurality of shelves, each shelf comprising a shelf digital display positioned along an edge of a shelf of a retailer to form a plurality of shelf digital displays;
a plurality of packages placed on the plurality of shelves, each package having a package digital display to form a plurality of package digital displays;

wherein the plurality of shelf digital displays and the plurality of package digital displays are configured to form a continuous display, wherein the continuous display is configured to form a uniform display to display one of price, advertisements, or messaging, wherein a first shelf digital display, of the plurality of shelf digital displays, is configured to transmit a user input received at the first shelf digital display to a first package digital display of the plurality of package digital displays, wherein the shelf digital display is configured to receive data from the first package digital display in response to transmitting the user input to the shelf digital display, and wherein the shelf digital display is configured 10 output the data on the shelf digital display.

25. The merchandise display system of claim 24 wherein the package digital displays comprise e-ink.

26. The merchandise display system of claim 24 wherein power is sent over the air through the plurality of shelves to the plurality of shelf digital displays.

27. The merchandise display system of claim 24 wherein the plurality of shelves are configured to interact with the plurality of packages.

28. The merchandise display system of claim 24 wherein the plurality of shelves define a front and a rear and wherein a group of front most packages are determined from the plurality of packages and wherein the front most packages are configured to form the continuous display.

29. The merchandise display system of claim 28 wherein a front surface of each of the group of front most packages is determined for forming the continuous display.

30. The merchandise display system of claim 24 wherein the plurality of packages have multiple surfaces and each of the surfaces have a package digital display such that the package can be placed on the shelf in any orientation to form part of the continuous display.

31. The merchandise display system of claim 24 wherein one or more of the plurality of shelf digital displays are configured to be altered to direct a user to one or more items stored on a computing device of the user.

* * * * *